(12) United States Patent
Haddick et al.

(10) Patent No.: US 9,875,406 B2
(45) Date of Patent: Jan. 23, 2018

(54) ADJUSTABLE EXTENSION FOR TEMPLE ARM

(75) Inventors: John D. Haddick, Berkeley, CA (US); Ralph F. Osterhout, San Francisco, CA (US); Robert Michael Lohse, Palo Alto, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1538 days.

(21) Appl. No.: 13/049,861

(22) Filed: Mar. 16, 2011

(65) Prior Publication Data

US 2012/0062445 A1    Mar. 15, 2012

Related U.S. Application Data

(63) Continuation of application No. 13/037,324, filed on Feb. 28, 2011, now abandoned, and a continuation of
(Continued)

(51) Int. Cl.
*G06F 3/048* (2013.01)
*G06F 3/01* (2006.01)
(Continued)

(52) U.S. Cl.
CPC ....... *G06K 9/00604* (2013.01); *G02B 27/017* (2013.01); *G02B 27/0172* (2013.01);
(Continued)

(58) Field of Classification Search
CPC  G02B 2027/0178; G02B 27/01; G02B 27/28; G02B 5/30; G02B 5/60031;
(Continued)

(56) References Cited

U.S. PATENT DOCUMENTS

| 3,152,215 A | 10/1964 | Barstow et al. |
| RE27,356 E | 5/1972 | La Russa |

(Continued)

FOREIGN PATENT DOCUMENTS

| CN | 1607884 A | 4/2005 |
| CN | 101243392 A | 8/2008 |

(Continued)

OTHER PUBLICATIONS

IPEA European Patent Office, Written Opinion of the International Preliminary Examining Authority Issued in International Application No. PCT/US2014/033623, dated Feb. 2, 2015, WIPO, 8 pages.
(Continued)

*Primary Examiner* — Nicholas Augustine
(74) *Attorney, Agent, or Firm* — Alleman Hall Creasman & Tuttle LLP

(57) ABSTRACT

This disclosure concerns an interactive head-mounted eyepiece with an integrated processor for handling content for display and an integrated image source for introducing the content to an optical assembly through which the user views a surrounding environment and the displayed content. The eyepiece includes an adjustable wrap around extendable arm comprising a shape memory material for securing the position of the eyepiece on the user's head, wherein the extendable arm extends from an end of an eyepiece arm.

12 Claims, 53 Drawing Sheets

Related U.S. Application Data application No. 13/037,335, filed on Feb. 28, 2011, now abandoned.

(60) Provisional application No. 61/373,791, filed on Aug. 13, 2010, provisional application No. 61/382,578, filed on Sep. 14, 2010, provisional application No. 61/410,983, filed on Nov. 8, 2010, provisional application No. 61/429,445, filed on Jan. 3, 2011, provisional application No. 61/429,447, filed on Jan. 3, 2011, provisional application No. 61/308,973, filed on Feb. 28, 2010.

(51) Int. Cl.

| | | |
|---|---|---|
| G06K 9/00 | (2006.01) | |
| G02B 27/01 | (2006.01) | |
| G06F 1/16 | (2006.01) | |
| G06Q 30/02 | (2012.01) | |
| G02C 11/00 | (2006.01) | |
| H04N 5/225 | (2006.01) | |
| H04N 5/232 | (2006.01) | |
| H04N 5/44 | (2011.01) | |

(52) U.S. Cl.
CPC ............ *G02C 11/10* (2013.01); *G06F 1/1673* (2013.01); *G06F 3/012* (2013.01); *G06F 3/013* (2013.01); *G06F 3/017* (2013.01); *G06K 9/00617* (2013.01); *G06Q 30/02* (2013.01); *G06Q 30/0261* (2013.01); *H04N 5/2254* (2013.01); *H04N 5/23293* (2013.01); *H04N 5/44* (2013.01); *G02B 2027/0138* (2013.01); *G02B 2027/0178* (2013.01); *G06F 3/011* (2013.01); *G06F 3/014* (2013.01)

(58) Field of Classification Search
CPC .......... G06F 3/011; G06F 3/017; G06F 1/163; G06T 19/006; G06T 17/00; G06T 17/05
See application file for complete search history.

(56) References Cited

U.S. PATENT DOCUMENTS

| | | |
|---|---|---|
| 3,940,203 A | 2/1976 | La Russa |
| 3,966,303 A | 6/1976 | Yamamoto |
| 4,026,641 A | 5/1977 | Bosserman et al. |
| 4,257,062 A | 3/1981 | Meredith |
| 4,277,980 A | 7/1981 | Coats et al. |
| 4,347,508 A | 8/1982 | Spooner |
| 4,376,404 A | 3/1983 | Haddad |
| 4,394,656 A | 7/1983 | Goettsche |
| 4,398,805 A | 8/1983 | Cole |
| 4,453,327 A | 6/1984 | Clarke |
| 4,526,473 A | 7/1985 | Zahn, III |
| 4,537,739 A | 8/1985 | Ruhl |
| 4,567,513 A | 1/1986 | Imsand |
| 4,643,789 A | 2/1987 | Parker et al. |
| 4,669,810 A | 6/1987 | Wood |
| 4,673,953 A | 6/1987 | Hecht |
| 4,711,512 A | 12/1987 | Upatnieks |
| 4,713,658 A | 12/1987 | Swinton |
| 4,751,691 A | 6/1988 | Perera |
| 4,763,990 A | 8/1988 | Wood |
| 4,772,942 A | 9/1988 | Tuck |
| 4,776,045 A | 10/1988 | Mysliwiec et al. |
| 4,790,629 A | 12/1988 | Rand |
| 4,795,223 A | 1/1989 | Moss |
| 4,796,987 A | 1/1989 | Linden |
| 4,799,765 A | 1/1989 | Ferrer |
| 4,822,160 A | 4/1989 | Tsai |
| 4,830,464 A | 5/1989 | Cheysson et al. |
| 4,859,031 A | 8/1989 | Berman et al. |
| 4,869,575 A | 9/1989 | Kubik |
| 4,886,958 A | 12/1989 | Merryman et al. |
| 4,904,078 A | 2/1990 | Gorike |
| 4,934,773 A | 6/1990 | Becker |
| 4,949,580 A | 8/1990 | Graham et al. |
| 4,961,626 A | 10/1990 | Fournier, Jr. et al. |
| 4,973,952 A | 11/1990 | Malec et al. |
| 5,003,300 A | 3/1991 | Wells |
| 5,029,963 A | 7/1991 | Naselli et al. |
| 5,076,664 A | 12/1991 | Migozzi |
| 5,103,713 A | 4/1992 | Loving |
| 5,134,521 A | 7/1992 | Lacroix et al. |
| 5,151,722 A | 9/1992 | Massof et al. |
| 5,162,828 A | 11/1992 | Furness et al. |
| 5,191,319 A | 3/1993 | Kiltz |
| 5,210,626 A | 5/1993 | Kumayama et al. |
| 5,212,821 A | 5/1993 | Gorin et al. |
| 5,227,769 A | 7/1993 | Leksell et al. |
| 5,258,785 A | 11/1993 | Dawkins, Jr. |
| 5,266,977 A | 11/1993 | Linden |
| 5,276,471 A | 1/1994 | Yamauchi et al. |
| 5,281,957 A | 1/1994 | Schoolman |
| 5,286,471 A | 2/1994 | Hung |
| 5,305,244 A | 4/1994 | Newman et al. |
| 5,325,242 A | 6/1994 | Fukuchi et al. |
| 5,343,313 A | 8/1994 | Fergason |
| 5,357,372 A | 10/1994 | Chen et al. |
| 5,436,639 A | 7/1995 | Arai et al. |
| 5,436,765 A | 7/1995 | Togino |
| 5,446,588 A | 8/1995 | Missig et al. |
| 5,467,104 A | 11/1995 | Furness, III et al. |
| 5,479,224 A | 12/1995 | Yasugaki et al. |
| 5,483,307 A | 1/1996 | Anderson |
| 5,485,172 A | 1/1996 | Sawachika et al. |
| 5,506,730 A | 4/1996 | Morley et al. |
| 5,513,041 A | 4/1996 | Togino |
| 5,513,129 A | 4/1996 | Bolas et al. |
| 5,517,366 A | 5/1996 | Togino |
| 5,526,183 A | 6/1996 | Chen |
| 5,530,865 A | 6/1996 | Owens et al. |
| 5,561,538 A | 10/1996 | Kato et al. |
| D375,495 S | 11/1996 | MacIness et al. |
| 5,572,229 A | 11/1996 | Fisher |
| 5,572,343 A | 11/1996 | Okamura et al. |
| 5,572,596 A | 11/1996 | Wildes et al. |
| 5,585,871 A | 12/1996 | Linden |
| 5,587,836 A | 12/1996 | Takahashi et al. |
| 5,594,563 A | 1/1997 | Larson |
| 5,594,588 A | 1/1997 | Togino |
| 5,596,433 A | 1/1997 | Konuma |
| 5,596,451 A | 1/1997 | Handschy et al. |
| 5,601,078 A | 2/1997 | Schaller et al. |
| 5,606,458 A | 2/1997 | Fergason |
| 5,615,132 A | 3/1997 | Horton et al. |
| 5,619,377 A | 4/1997 | Rallison |
| 5,623,479 A | 4/1997 | Takahashi |
| 5,625,765 A | 4/1997 | Ellenby et al. |
| 5,635,948 A | 6/1997 | Tonosaki |
| 5,644,436 A | 7/1997 | Togino et al. |
| 5,646,783 A | 7/1997 | Banbury |
| 5,654,828 A | 8/1997 | Togino et al. |
| 5,659,327 A | 8/1997 | Furness, III et al. |
| 5,659,430 A | 8/1997 | Togino |
| 5,661,603 A | 8/1997 | Hanano et al. |
| 5,677,801 A | 10/1997 | Fukuchi et al. |
| 5,682,196 A | 10/1997 | Freeman |
| 5,689,619 A | 11/1997 | Smyth |
| 5,696,521 A | 12/1997 | Robinson et al. |
| 5,699,194 A | 12/1997 | Takahashi |
| 5,701,202 A | 12/1997 | Takahashi |
| 5,703,605 A | 12/1997 | Takahashi et al. |
| 5,706,026 A | 1/1998 | Kent et al. |
| 5,715,337 A | 2/1998 | Spitzer et al. |
| 5,717,422 A | 2/1998 | Fergason |
| 5,724,463 A | 3/1998 | Deacon et al. |
| 5,726,620 A | 3/1998 | Arikawa |
| 5,726,670 A | 3/1998 | Tabata et al. |
| 5,726,807 A | 3/1998 | Nakaoka et al. |
| 5,734,357 A | 3/1998 | Matsumoto |
| 5,734,373 A | 3/1998 | Rosenberg et al. |

(56) References Cited

U.S. PATENT DOCUMENTS

| | | |
|---|---|---|
| 5,734,505 A | 3/1998 | Togino et al. |
| 5,742,262 A | 4/1998 | Tabata et al. |
| 5,742,263 A | 4/1998 | Wang et al. |
| 5,745,295 A | 4/1998 | Takahashi |
| 5,745,380 A | 4/1998 | Sandvoss et al. |
| 5,748,378 A | 5/1998 | Togino et al. |
| 5,751,494 A | 5/1998 | Takahashi |
| 5,751,836 A | 5/1998 | Wildes et al. |
| 5,754,344 A | 5/1998 | Fujiyama |
| 5,757,544 A | 5/1998 | Tabata et al. |
| 5,760,931 A | 6/1998 | Saburi et al. |
| 5,764,785 A | 6/1998 | Jones et al. |
| 5,768,024 A | 6/1998 | Takahashi |
| 5,768,025 A | 6/1998 | Togino et al. |
| 5,768,039 A | 6/1998 | Togino |
| 5,774,558 A | 6/1998 | Drucker |
| 5,777,715 A | 7/1998 | Kruegle et al. |
| 5,781,913 A | 7/1998 | Felsenstein et al. |
| 5,790,184 A | 8/1998 | Sato et al. |
| 5,790,311 A | 8/1998 | Togino |
| 5,790,312 A | 8/1998 | Togino |
| 5,793,339 A | 8/1998 | Takahashi |
| 5,796,373 A | 8/1998 | Ming-Yen |
| 5,801,704 A | 9/1998 | Oohara et al. |
| 5,805,167 A | 9/1998 | van Cruyningen |
| 5,808,800 A | 9/1998 | Handschy et al. |
| 5,812,100 A | 9/1998 | Kuba |
| 5,812,323 A | 9/1998 | Takahashi |
| 5,815,126 A | 9/1998 | Fan et al. |
| 5,815,326 A | 9/1998 | Takahashi |
| 5,815,411 A | 9/1998 | Ellenby et al. |
| 5,818,641 A | 10/1998 | Takahashi |
| 5,831,712 A | 11/1998 | Tabata et al. |
| 5,844,392 A | 12/1998 | Peurach et al. |
| 5,844,824 A | 12/1998 | Newman et al. |
| 5,854,697 A | 12/1998 | Caulfield et al. |
| 5,875,056 A | 2/1999 | Takahashi |
| 5,883,606 A | 3/1999 | Smoot |
| 5,886,822 A | 3/1999 | Spitzer |
| 5,886,824 A | 3/1999 | Takahashi |
| 5,909,183 A | 6/1999 | Borgstahl et al. |
| 5,909,317 A | 6/1999 | Nakaoka et al. |
| 5,909,325 A | 6/1999 | Kuba et al. |
| 5,912,650 A | 6/1999 | Carollo |
| 5,923,477 A | 7/1999 | Togino |
| 5,926,144 A | 7/1999 | Bolanos et al. |
| 5,933,811 A | 8/1999 | Angles et al. |
| 5,936,610 A | 8/1999 | Endo |
| 5,940,218 A | 8/1999 | Takahashi |
| 5,943,171 A | 8/1999 | Budd et al. |
| 5,949,388 A * | 9/1999 | Atsumi .............. G02B 27/0172 345/53 |
| 5,949,583 A | 9/1999 | Rallison et al. |
| 5,950,200 A | 9/1999 | Sudai et al. |
| 5,959,780 A | 9/1999 | Togino et al. |
| 5,974,413 A | 10/1999 | Beauregard et al. |
| 5,982,343 A | 11/1999 | Iba et al. |
| 5,986,812 A | 11/1999 | Takahashi |
| 5,986,813 A | 11/1999 | Saikawa et al. |
| 5,991,085 A | 11/1999 | Rallison et al. |
| 5,991,103 A | 11/1999 | Togino |
| 6,006,227 A | 12/1999 | Freeman et al. |
| 6,008,778 A | 12/1999 | Takahashi et al. |
| 6,008,946 A | 12/1999 | Knowles |
| 6,009,435 A | 12/1999 | Taubin et al. |
| 6,014,261 A | 1/2000 | Takahashi |
| 6,018,423 A | 1/2000 | Takahashi |
| 6,023,372 A | 2/2000 | Spitzer et al. |
| 6,028,608 A | 2/2000 | Jenkins |
| 6,028,709 A | 2/2000 | Takahashi |
| 6,034,653 A | 3/2000 | Robertson et al. |
| 6,037,914 A | 3/2000 | Robinson |
| 6,040,945 A | 3/2000 | Karasawa |
| 6,041,193 A | 3/2000 | Aoki |
| 6,045,229 A | 4/2000 | Tachi et al. |
| 6,046,712 A | 4/2000 | Beller et al. |
| 6,054,991 A | 4/2000 | Crane et al. |
| 6,060,933 A | 5/2000 | Jordan et al. |
| 6,064,335 A | 5/2000 | Eschenbach |
| 6,073,443 A | 6/2000 | Okada et al. |
| 6,078,411 A | 6/2000 | Aoki |
| 6,078,704 A | 6/2000 | Bischel et al. |
| 6,084,556 A | 7/2000 | Zwern |
| 6,085,428 A | 7/2000 | Casby et al. |
| 6,088,165 A | 7/2000 | Janeczko et al. |
| 6,091,546 A | 7/2000 | Spitzer |
| 6,091,832 A | 7/2000 | Shurman et al. |
| 6,091,910 A | 7/2000 | Mihara |
| 6,094,283 A | 7/2000 | Preston |
| 6,097,354 A | 8/2000 | Takahashi et al. |
| 6,097,542 A | 8/2000 | Takahashi et al. |
| 6,101,038 A | 8/2000 | Hebert et al. |
| 6,118,888 A | 9/2000 | Chino et al. |
| 6,118,908 A | 9/2000 | Bischel et al. |
| 6,120,461 A | 9/2000 | Smyth |
| 6,124,954 A | 9/2000 | Popovich et al. |
| 6,124,977 A | 9/2000 | Takahashi |
| 6,127,990 A | 10/2000 | Zwern |
| 6,128,136 A | 10/2000 | Togino et al. |
| 6,130,784 A | 10/2000 | Takahashi |
| 6,134,051 A | 10/2000 | Hayakawa et al. |
| 6,135,951 A | 10/2000 | Richardson et al. |
| 6,137,042 A | 10/2000 | Kurtzberg et al. |
| 6,140,980 A | 10/2000 | Spitzer et al. |
| 6,141,465 A | 10/2000 | Bischel et al. |
| 6,144,366 A | 11/2000 | Numazaki et al. |
| 6,147,678 A | 11/2000 | Kumar et al. |
| 6,151,061 A | 11/2000 | Tokuhashi |
| 6,154,314 A | 11/2000 | Takahashi |
| 6,160,551 A | 12/2000 | Naughton et al. |
| 6,160,666 A | 12/2000 | Rallison et al. |
| 6,166,679 A | 12/2000 | Lemelson et al. |
| 6,166,744 A | 12/2000 | Jaszlics et al. |
| 6,167,169 A | 12/2000 | Brinkman et al. |
| 6,167,413 A | 12/2000 | Daley, III |
| 6,169,613 B1 | 1/2001 | Amitai et al. |
| 6,172,657 B1 | 1/2001 | Kamakura et al. |
| 6,181,475 B1 | 1/2001 | Togino et al. |
| 6,185,045 B1 | 2/2001 | Hanano |
| 6,193,375 B1 | 2/2001 | Nagata et al. |
| 6,195,136 B1 | 2/2001 | Handschy et al. |
| 6,195,207 B1 | 2/2001 | Takahashi |
| 6,201,557 B1 | 3/2001 | Kitazawa et al. |
| 6,201,629 B1 | 3/2001 | McClelland et al. |
| 6,201,646 B1 | 3/2001 | Togino et al. |
| 6,204,974 B1 | 3/2001 | Spitzer |
| 6,211,976 B1 | 4/2001 | Popovich et al. |
| 6,215,593 B1 | 4/2001 | Bruce |
| 6,222,675 B1 | 4/2001 | Mall et al. |
| 6,222,676 B1 | 4/2001 | Togino et al. |
| 6,222,677 B1 | 4/2001 | Budd et al. |
| RE37,169 E | 5/2001 | Togino |
| RE37,175 E | 5/2001 | Takahashi |
| 6,229,503 B1 | 5/2001 | Mays, Jr. et al. |
| 6,232,934 B1 | 5/2001 | Heacock et al. |
| 6,236,037 B1 | 5/2001 | Asada et al. |
| 6,243,054 B1 | 6/2001 | DeLuca |
| 6,243,755 B1 | 6/2001 | Takagi et al. |
| 6,244,703 B1 | 6/2001 | Resnikoff et al. |
| 6,246,527 B1 | 6/2001 | Hayakawa et al. |
| 6,252,728 B1 | 6/2001 | Togino |
| 6,252,989 B1 | 6/2001 | Geisler et al. |
| RE37,292 E | 7/2001 | Togino et al. |
| 6,263,022 B1 | 7/2001 | Chen et al. |
| 6,271,808 B1 | 8/2001 | Corbin |
| 6,278,556 B1 | 8/2001 | Togino |
| 6,287,200 B1 | 9/2001 | Sharma |
| 6,295,145 B1 | 9/2001 | Popovich |
| 6,304,234 B1 | 10/2001 | Horiuchi |
| 6,304,303 B1 | 10/2001 | Yamanaka |
| 6,307,589 B1 | 10/2001 | Maquire, Jr. |
| 6,313,950 B1 | 11/2001 | Hayakawa et al. |
| 6,317,267 B1 | 11/2001 | Takahashi |
| 6,323,807 B1 | 11/2001 | Golding et al. |

(56) References Cited

U.S. PATENT DOCUMENTS

| | | |
|---|---|---|
| 6,327,074 B1 | 12/2001 | Bass et al. |
| 6,329,986 B1 | 12/2001 | Cheng |
| 6,333,815 B1 | 12/2001 | Takahashi |
| 6,333,820 B1 | 12/2001 | Hayakawa et al. |
| 6,346,929 B1 | 2/2002 | Fukushima et al. |
| 6,349,001 B1 | 2/2002 | Spitzer |
| 6,349,337 B1 | 2/2002 | Parsons, Jr. et al. |
| RE37,579 E | 3/2002 | Takahashi |
| 6,353,492 B2 | 3/2002 | McClelland et al. |
| 6,353,503 B1 | 3/2002 | Spitzer et al. |
| 6,356,392 B1 | 3/2002 | Spitzer |
| 6,359,603 B1 | 3/2002 | Zwern |
| 6,359,723 B1 | 3/2002 | Handschy et al. |
| 6,363,160 B1 | 3/2002 | Bradski et al. |
| 6,369,952 B1 | 4/2002 | Rallison et al. |
| 6,384,982 B1 | 5/2002 | Spitzer |
| 6,384,983 B1 | 5/2002 | Yamazaki et al. |
| 6,388,683 B1 | 5/2002 | Ishai et al. |
| 6,396,497 B1 | 5/2002 | Reichlen |
| 6,396,639 B1 | 5/2002 | Togino et al. |
| 6,407,724 B2 | 6/2002 | Waldern et al. |
| 6,411,266 B1 | 6/2002 | Maguire, Jr. |
| 6,417,970 B1 | 7/2002 | Travers et al. |
| 6,421,031 B1 | 7/2002 | Ronzani et al. |
| 6,421,453 B1 | 7/2002 | Kanevsky et al. |
| 6,424,338 B1 | 7/2002 | Anderson |
| 6,431,705 B1 | 8/2002 | Linden |
| 6,445,364 B2 | 9/2002 | Zwern |
| 6,445,507 B2 | 9/2002 | Togino et al. |
| 6,445,679 B1 | 9/2002 | Taniguchi et al. |
| 6,452,544 B1 | 9/2002 | Hakala et al. |
| 6,456,438 B1 | 9/2002 | Lee et al. |
| 6,474,809 B2 | 11/2002 | Tanijiri et al. |
| 6,474,816 B2 | 11/2002 | Butler et al. |
| 6,480,174 B1 * | 11/2002 | Kaufmann ......... G02B 27/0172 345/7 |
| 6,483,483 B2 | 11/2002 | Kosugi et al. |
| 6,496,598 B1 | 12/2002 | Harman |
| 6,501,590 B2 | 12/2002 | Bass et al. |
| 6,502,000 B1 | 12/2002 | Arnold et al. |
| 6,519,420 B1 | 2/2003 | Yokomae et al. |
| 6,522,342 B1 | 2/2003 | Gagnon et al. |
| 6,522,474 B2 | 2/2003 | Cobb et al. |
| 6,522,794 B1 | 2/2003 | Bischel et al. |
| 6,529,331 B2 | 3/2003 | Massof et al. |
| 6,538,799 B2 | 3/2003 | McClelland et al. |
| 6,554,444 B2 | 4/2003 | Shimada et al. |
| 6,558,050 B1 | 5/2003 | Ishibashi |
| 6,559,813 B1 | 5/2003 | DeLuca et al. |
| 6,560,036 B2 | 5/2003 | Takahashi et al. |
| 6,597,320 B2 | 7/2003 | Maeda et al. |
| 6,603,608 B2 | 8/2003 | Togino |
| 6,611,385 B2 | 8/2003 | Song |
| 6,611,789 B1 | 8/2003 | Darley |
| 6,618,009 B2 | 9/2003 | Griffin et al. |
| 6,625,299 B1 | 9/2003 | Meisner et al. |
| 6,629,076 B1 | 9/2003 | Haken |
| 6,636,356 B2 | 10/2003 | Takeyama |
| 6,643,062 B1 | 11/2003 | Kamo |
| 6,646,812 B2 | 11/2003 | Togino |
| 6,650,448 B2 | 11/2003 | Nakamura et al. |
| 6,680,802 B1 | 1/2004 | Ichikawa et al. |
| 6,690,393 B2 | 2/2004 | Heron et al. |
| 6,690,516 B2 | 2/2004 | Aritake et al. |
| 6,693,749 B2 | 2/2004 | King et al. |
| 6,701,038 B2 | 3/2004 | Rensing et al. |
| 6,710,753 B2 | 3/2004 | Gillespie et al. |
| 6,710,902 B2 | 3/2004 | Takeyama |
| 6,711,414 B1 | 3/2004 | Lightman et al. |
| 6,714,665 B1 | 3/2004 | Hanna et al. |
| 6,724,354 B1 | 4/2004 | Spitzer et al. |
| 6,729,726 B2 | 5/2004 | Miller et al. |
| 6,732,080 B1 | 5/2004 | Blants |
| 6,735,328 B1 | 5/2004 | Helbing et al. |
| 6,738,040 B2 | 5/2004 | Jahn et al. |
| 6,752,498 B2 | 6/2004 | Covannon et al. |
| 6,753,828 B2 | 6/2004 | Tuceryan et al. |
| 6,757,068 B2 | 6/2004 | Foxlin |
| 6,757,107 B2 | 6/2004 | Togino |
| 6,760,169 B2 | 7/2004 | Takahashi et al. |
| 6,765,730 B2 | 7/2004 | Takahashi |
| 6,768,066 B2 | 7/2004 | Wehrenberg |
| 6,769,767 B2 | 8/2004 | Swab et al. |
| 6,771,294 B1 | 8/2004 | Pulli et al. |
| 6,772,143 B2 | 8/2004 | Hung |
| 6,801,347 B2 | 10/2004 | Nakamura et al. |
| 6,803,884 B1 | 10/2004 | Ohzawa et al. |
| 6,804,066 B1 | 10/2004 | Ha et al. |
| 6,816,141 B1 | 11/2004 | Fergason |
| 6,829,095 B2 | 12/2004 | Amitai |
| 6,829,391 B2 | 12/2004 | Comaniciu et al. |
| 6,879,443 B2 | 4/2005 | Spitzer et al. |
| 6,879,835 B2 | 4/2005 | Greene et al. |
| 6,882,479 B2 | 4/2005 | Song et al. |
| 6,888,502 B2 | 5/2005 | Beigel et al. |
| 6,898,550 B1 | 5/2005 | Blackadar et al. |
| 6,898,759 B1 | 5/2005 | Terada et al. |
| 6,899,539 B1 | 5/2005 | Stallman et al. |
| 6,900,778 B1 | 5/2005 | Yamamoto |
| 6,903,876 B2 | 6/2005 | Okada et al. |
| 6,920,283 B2 | 7/2005 | Goldstein |
| 6,937,400 B2 | 8/2005 | Olsson |
| 6,955,542 B2 | 10/2005 | Roncalez et al. |
| 6,966,668 B2 | 11/2005 | Cugini et al. |
| 6,967,569 B2 | 11/2005 | Weber et al. |
| 6,970,130 B1 | 11/2005 | Walters et al. |
| 6,975,389 B2 | 12/2005 | Takahashi |
| 6,983,370 B2 | 1/2006 | Eaton et al. |
| 6,987,620 B2 | 1/2006 | Nagaoka |
| 6,999,238 B2 | 2/2006 | Glebov et al. |
| 6,999,649 B1 | 2/2006 | Chen et al. |
| 7,002,551 B2 | 2/2006 | Azuma et al. |
| 7,003,562 B2 | 2/2006 | Mayer |
| 7,003,737 B2 | 2/2006 | Chiu et al. |
| 7,009,757 B2 | 3/2006 | Nishioka et al. |
| 7,012,593 B2 | 3/2006 | Yoon et al. |
| 7,019,798 B2 | 3/2006 | Endo et al. |
| 7,021,777 B2 | 4/2006 | Amitai |
| 7,024,046 B2 | 4/2006 | Dekel et al. |
| 7,050,078 B2 | 5/2006 | Dempski |
| 7,050,239 B2 | 5/2006 | Kamo |
| 7,059,728 B2 | 6/2006 | Alasaarela et al. |
| 7,059,781 B2 | 6/2006 | Suzuki et al. |
| 7,073,129 B1 | 7/2006 | Robarts et al. |
| 7,076,616 B2 | 7/2006 | Nguyen et al. |
| 7,088,516 B2 | 8/2006 | Yagi et al. |
| 7,098,896 B2 | 8/2006 | Kushler et al. |
| 7,103,906 B1 | 9/2006 | Katz et al. |
| 7,113,269 B2 | 9/2006 | Takahashi et al. |
| 7,113,349 B2 | 9/2006 | Takahashi |
| 7,116,412 B2 | 10/2006 | Takahashi et al. |
| 7,116,833 B2 | 10/2006 | Brower et al. |
| 7,119,965 B1 | 10/2006 | Rolland et al. |
| 7,123,215 B2 | 10/2006 | Nakada |
| 7,124,425 B1 | 10/2006 | Anderson, Jr. et al. |
| 7,126,558 B1 | 10/2006 | Dempski |
| 7,129,927 B2 | 10/2006 | Mattsson |
| 7,143,439 B2 | 11/2006 | Cooper et al. |
| 7,145,726 B2 | 12/2006 | Geist |
| 7,151,596 B2 | 12/2006 | Takahashi et al. |
| 7,154,395 B2 | 12/2006 | Raskar et al. |
| 7,158,096 B1 | 1/2007 | Spitzer |
| 7,162,054 B2 | 1/2007 | Meisner et al. |
| 7,162,392 B2 | 1/2007 | Vock et al. |
| 7,163,330 B2 | 1/2007 | Matsui et al. |
| 7,172,563 B2 | 2/2007 | Takiguchi et al. |
| 7,180,476 B1 | 2/2007 | Guell et al. |
| 7,191,233 B2 | 3/2007 | Miller |
| 7,192,136 B2 | 3/2007 | Howell et al. |
| 7,194,000 B2 | 3/2007 | Balachandran et al. |
| 7,196,315 B2 | 3/2007 | Takahashi |
| 7,199,720 B1 | 4/2007 | Shapiro |
| 7,203,635 B2 | 4/2007 | Oliver et al. |
| 7,206,134 B2 | 4/2007 | Weissman et al. |

(56) References Cited

U.S. PATENT DOCUMENTS

| | | |
|---|---|---|
| 7,206,804 B1 | 4/2007 | Deshpande et al. |
| 7,216,973 B2 | 5/2007 | Jannard et al. |
| 7,219,302 B1 | 5/2007 | O'Shaughnessy et al. |
| 7,221,505 B2 | 5/2007 | Goral |
| 7,242,527 B2 | 7/2007 | Spitzer et al. |
| 7,242,572 B2 | 7/2007 | Norton et al. |
| 7,245,440 B2 | 7/2007 | Peseux |
| 7,251,367 B2 | 7/2007 | Zhai |
| 7,254,287 B2 | 8/2007 | Ellwood, Jr. |
| 7,257,266 B2 | 8/2007 | Atsumi et al. |
| 7,259,898 B2 | 8/2007 | Khazova et al. |
| 7,262,919 B1 | 8/2007 | Yamazaki et al. |
| 7,265,896 B2 | 9/2007 | Miller |
| 7,272,646 B2 | 9/2007 | Cooper et al. |
| 7,278,734 B2 | 10/2007 | Jannard et al. |
| 7,284,267 B1 | 10/2007 | McArdle et al. |
| 7,292,243 B1 | 11/2007 | Burke |
| 7,301,529 B2 | 11/2007 | Marvit et al. |
| 7,301,648 B2 | 11/2007 | Foxlin |
| 7,313,246 B2 | 12/2007 | Miller et al. |
| 7,315,254 B2 | 1/2008 | Smith et al. |
| 7,319,437 B2 | 1/2008 | Yamamoto |
| 7,322,700 B2 | 1/2008 | Miyagaki et al. |
| 7,324,695 B2 | 1/2008 | Krishnan et al. |
| 7,327,852 B2 | 2/2008 | Ruwisch |
| 7,342,503 B1 | 3/2008 | Light et al. |
| 7,346,260 B2 | 3/2008 | Arakida et al. |
| D566,744 S | 4/2008 | Travers et al. |
| 7,353,034 B2 | 4/2008 | Haney |
| 7,353,996 B2 | 4/2008 | Goodman et al. |
| 7,355,795 B1 | 4/2008 | Yamazaki et al. |
| 7,362,738 B2 | 4/2008 | Taube et al. |
| 7,369,101 B2 | 5/2008 | Sauer et al. |
| 7,376,965 B2 | 5/2008 | Jemes et al. |
| 7,391,573 B2 | 6/2008 | Amitai |
| 7,394,346 B2 | 7/2008 | Bodin |
| 7,395,507 B2 | 7/2008 | Robarts et al. |
| 7,397,607 B2 | 7/2008 | Travers |
| 7,401,300 B2 | 7/2008 | Nurmi |
| 7,412,234 B2 | 8/2008 | Zellner |
| 7,415,522 B2 | 8/2008 | Kaluskar et al. |
| 7,420,282 B2 | 9/2008 | Iwane et al. |
| 7,423,802 B2 | 9/2008 | Miller |
| 7,431,463 B2 | 10/2008 | Beeson et al. |
| 7,436,568 B1 | 10/2008 | Kuykendall, Jr. |
| 7,453,439 B1 | 11/2008 | Kushler et al. |
| 7,453,451 B1 | 11/2008 | Maguire, Jr. |
| 7,457,040 B2 | 11/2008 | Amitai |
| 7,461,355 B2 | 12/2008 | SanGiovanni |
| 7,467,353 B2 | 12/2008 | Kurlander et al. |
| 7,478,066 B2 | 1/2009 | Remington et al. |
| 7,486,291 B2 | 2/2009 | Berson et al. |
| 7,486,930 B2 | 2/2009 | Bisdikian et al. |
| 7,487,461 B2 | 2/2009 | Zhai et al. |
| 7,500,747 B2 | 3/2009 | Howell et al. |
| 7,501,995 B2 | 3/2009 | Morita et al. |
| 7,502,168 B2 | 3/2009 | Akutsu et al. |
| 7,508,988 B2 | 3/2009 | Hara et al. |
| 7,513,670 B2 | 4/2009 | Yang et al. |
| 7,515,344 B2 | 4/2009 | Travers |
| 7,522,058 B1 | 4/2009 | Light et al. |
| 7,522,344 B1 | 4/2009 | Curatu et al. |
| 7,525,955 B2 | 4/2009 | Velez-Rivera et al. |
| 7,538,745 B2 | 5/2009 | Borovoy et al. |
| 7,542,012 B2 | 6/2009 | Kato et al. |
| 7,542,209 B2 | 6/2009 | McGuire, Jr. |
| 7,545,569 B2 | 6/2009 | Cassarly |
| 7,545,571 B2 | 6/2009 | Garoutte et al. |
| 7,548,256 B2 | 6/2009 | Pilu |
| 7,551,172 B2 | 6/2009 | Yaron et al. |
| 7,552,265 B2 | 6/2009 | Newman et al. |
| 7,561,966 B2 | 7/2009 | Nakamura et al. |
| 7,565,340 B2 | 7/2009 | Herlocker et al. |
| 7,568,672 B2 | 8/2009 | Ferrer et al. |
| 7,576,916 B2 | 8/2009 | Amitai |
| 7,577,326 B2 | 8/2009 | Amitai |
| 7,586,663 B1 | 9/2009 | Radmard et al. |
| 7,587,053 B1 | 9/2009 | Pereira |
| 7,589,269 B2 | 9/2009 | Lemons |
| 7,593,757 B2 | 9/2009 | Yamasaki |
| 7,595,933 B2 | 9/2009 | Tang |
| 7,602,950 B2 | 10/2009 | Goldstein et al. |
| 7,604,348 B2 | 10/2009 | Jacobs et al. |
| 7,613,826 B2 | 11/2009 | Guichard et al. |
| 7,619,626 B2 | 11/2009 | Bernier |
| 7,623,987 B2 | 11/2009 | Vock et al. |
| 7,624,918 B2 | 12/2009 | Sweeney et al. |
| 7,631,968 B1 | 12/2009 | Dobson et al. |
| 7,639,218 B2 | 12/2009 | Lee et al. |
| 7,643,214 B2 | 1/2010 | Amitai |
| 7,645,041 B2 | 1/2010 | Frare |
| 7,648,236 B1 | 1/2010 | Dobson |
| 7,648,463 B1 | 1/2010 | Elhag et al. |
| 7,651,033 B2 | 1/2010 | Asakura et al. |
| 7,651,594 B2 | 1/2010 | Komada et al. |
| 7,663,805 B2 | 2/2010 | Zaloum et al. |
| 7,667,657 B2 | 2/2010 | Koshiji |
| 7,672,055 B2 | 3/2010 | Amitai |
| 7,674,028 B2 | 3/2010 | Cassarly et al. |
| 7,675,683 B2 | 3/2010 | Dobson et al. |
| 7,676,583 B2 | 3/2010 | Eaton et al. |
| 7,677,723 B2 | 3/2010 | Howell et al. |
| 7,680,667 B2 | 3/2010 | Sonoura et al. |
| 7,685,433 B2 | 3/2010 | Mantyjarvi et al. |
| 7,698,513 B2 | 4/2010 | Sechrest et al. |
| 7,699,473 B2 | 4/2010 | Mukawa et al. |
| 7,706,616 B2 | 4/2010 | Kristensson et al. |
| 7,711,961 B2 | 5/2010 | Fujinuma et al. |
| 7,715,873 B1 | 5/2010 | Biere et al. |
| 7,716,281 B2 | 5/2010 | Lin et al. |
| 7,719,521 B2 | 5/2010 | Yang et al. |
| 7,719,769 B2 | 5/2010 | Sugihara et al. |
| 7,724,441 B2 | 5/2010 | Amitai |
| 7,724,442 B2 | 5/2010 | Amitai |
| 7,724,443 B2 | 5/2010 | Amitai |
| 7,729,325 B2 | 6/2010 | Gopalakrishnan et al. |
| 7,732,694 B2 | 6/2010 | Rosenberg |
| 7,734,119 B2 | 6/2010 | Cheryauka et al. |
| 7,735,018 B2 | 6/2010 | Bakhash |
| 7,738,179 B2 | 6/2010 | Nishi |
| 7,751,122 B2 | 7/2010 | Amitai |
| 7,755,566 B2 | 7/2010 | Hoisko |
| 7,755,667 B2 | 7/2010 | Rabbani et al. |
| 7,769,412 B1 | 8/2010 | Gailloux |
| 7,769,794 B2 | 8/2010 | Moore et al. |
| 7,787,992 B2 | 8/2010 | Pretlove et al. |
| 7,791,809 B2 | 9/2010 | Filipovich et al. |
| 7,797,338 B2 | 9/2010 | Feng et al. |
| 7,805,003 B1 | 9/2010 | Cohen et al. |
| 7,809,842 B2 | 10/2010 | Moran et al. |
| 7,810,750 B2 | 10/2010 | Abreu |
| 7,820,081 B2 | 10/2010 | Chiu et al. |
| 7,822,804 B2 | 10/2010 | Lee et al. |
| 7,826,531 B2 | 11/2010 | Wang et al. |
| 7,827,495 B2 | 11/2010 | Bells et al. |
| 7,830,319 B2 | 11/2010 | Cohen et al. |
| 7,839,926 B1 | 11/2010 | Metzger et al. |
| 7,840,979 B2 | 11/2010 | Poling, Jr. et al. |
| 7,843,403 B2 | 11/2010 | Spitzer |
| 7,843,425 B2 | 11/2010 | Lu et al. |
| 7,850,306 B2 | 12/2010 | Uusitalo et al. |
| 7,851,758 B1 | 12/2010 | Scanlon et al. |
| 7,855,743 B2 | 12/2010 | Sako et al. |
| 7,862,522 B1 | 1/2011 | Barclay et al. |
| 7,864,440 B2 | 1/2011 | Berge |
| 7,871,323 B2 | 1/2011 | Walker et al. |
| 7,872,636 B1 | 1/2011 | Gopi et al. |
| 7,876,489 B2 | 1/2011 | Gandhi et al. |
| 7,876,914 B2 | 1/2011 | Grosvenor et al. |
| 7,877,121 B2 | 1/2011 | Seshadri et al. |
| 7,877,707 B2 | 1/2011 | Westerman et al. |
| 7,878,408 B2 | 2/2011 | Lapstun et al. |
| 7,889,290 B2 | 2/2011 | Mills |
| 7,894,440 B2 | 2/2011 | Xu et al. |

(56) References Cited

U.S. PATENT DOCUMENTS

| | | |
|---|---|---|
| 7,895,261 B2 | 2/2011 | Jones et al. |
| 7,899,915 B2 | 3/2011 | Reisman |
| 7,900,068 B2 | 3/2011 | Weststrate et al. |
| 7,907,122 B2 | 3/2011 | LaPointe et al. |
| 7,907,166 B2 | 3/2011 | Lamprecht et al. |
| 7,920,102 B2 | 4/2011 | Breed |
| 7,924,655 B2 | 4/2011 | Liu et al. |
| RE42,336 E | 5/2011 | Fateh et al. |
| 7,948,451 B2 | 5/2011 | Gustafsson et al. |
| 7,956,822 B2 | 6/2011 | Nakabayashi et al. |
| 7,958,457 B1 | 6/2011 | Brandenberg et al. |
| 7,991,294 B2 | 8/2011 | Dreischer et al. |
| 8,009,141 B1 | 8/2011 | Chi et al. |
| 8,049,680 B2 | 11/2011 | Spruck et al. |
| 8,060,533 B1 | 11/2011 | Wheeler et al. |
| 8,094,091 B2 | 1/2012 | Noma |
| 8,130,260 B2 | 3/2012 | Krill et al. |
| 8,135,815 B2 | 3/2012 | Mayer |
| 8,139,943 B2 | 3/2012 | Asukai et al. |
| 8,140,970 B2 | 3/2012 | Brown et al. |
| 8,160,311 B1 | 4/2012 | Schaefer |
| 8,175,297 B1 | 5/2012 | Ho et al. |
| 8,176,437 B1 | 5/2012 | Taubman |
| 8,179,604 B1 | 5/2012 | Prada Gomez et al. |
| 8,183,997 B1 | 5/2012 | Wong et al. |
| 8,184,067 B1 | 5/2012 | Braun et al. |
| 8,184,068 B1 | 5/2012 | Rhodes et al. |
| 8,184,069 B1 | 5/2012 | Rhodes |
| 8,184,070 B1 | 5/2012 | Taubman |
| 8,184,983 B1 | 5/2012 | Ho et al. |
| 8,185,845 B2 | 5/2012 | Bjorklund et al. |
| 8,188,880 B1 | 5/2012 | Chi et al. |
| 8,189,263 B1 | 5/2012 | Wang et al. |
| 8,190,749 B1 | 5/2012 | Chi et al. |
| 8,203,502 B1 | 6/2012 | Chi et al. |
| 8,212,859 B2 | 7/2012 | Tang et al. |
| 8,217,856 B1 | 7/2012 | Petrou |
| 8,228,315 B1 | 7/2012 | Starner et al. |
| 8,392,353 B2 | 3/2013 | Cho et al. |
| 8,448,170 B2 | 5/2013 | Wipfel et al. |
| 8,456,485 B2 | 6/2013 | Tsujimoto |
| 8,467,133 B2 | 6/2013 | Miller |
| 8,472,120 B2 | 6/2013 | Border et al. |
| 8,477,425 B2 | 7/2013 | Border et al. |
| 8,482,859 B2 | 7/2013 | Border et al. |
| 8,487,786 B1 | 7/2013 | Hussey et al. |
| 8,488,246 B2 | 7/2013 | Border et al. |
| 8,533,485 B1 | 9/2013 | Bansal et al. |
| 8,582,206 B2 | 11/2013 | Travis |
| 8,605,008 B1 | 12/2013 | Prest et al. |
| 8,630,947 B1 | 1/2014 | Freund |
| 8,632,376 B2 | 1/2014 | Dooley et al. |
| 8,711,487 B2 | 4/2014 | Takeda et al. |
| 8,854,735 B2 | 10/2014 | Totani et al. |
| 9,024,972 B1 | 5/2015 | Bronder et al. |
| 9,229,227 B2 | 1/2016 | Border et al. |
| 2001/0010598 A1 | 8/2001 | Aritake et al. |
| 2001/0021012 A1 | 9/2001 | Shirai et al. |
| 2001/0021058 A1 | 9/2001 | McClelland et al. |
| 2001/0022682 A1 | 9/2001 | McClelland et al. |
| 2001/0035845 A1 | 11/2001 | Zwern |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0007306 A1 | 1/2002 | Granger et al. |
| 2002/0008708 A1 | 1/2002 | Weiss et al. |
| 2002/0010571 A1 | 1/2002 | Daniel, Jr. et al. |
| 2002/0021498 A1 | 2/2002 | Ohtaka et al. |
| 2002/0036617 A1 | 3/2002 | Pryor |
| 2002/0039085 A1* | 4/2002 | Ebersole ............ A62B 9/006 345/8 |
| 2002/0042292 A1 | 4/2002 | Hama |
| 2002/0044152 A1 | 4/2002 | Abbott, III et al. |
| 2002/0052684 A1 | 5/2002 | Bide |
| 2002/0054174 A1 | 5/2002 | Abbott et al. |
| 2002/0057280 A1 | 5/2002 | Anabuki et al. |
| 2002/0069072 A1 | 6/2002 | Friedrich et al. |
| 2002/0070611 A1 | 6/2002 | Cline et al. |
| 2002/0084974 A1 | 7/2002 | Ohshima et al. |
| 2002/0101546 A1 | 8/2002 | Sharp et al. |
| 2002/0105482 A1 | 8/2002 | Lemelson et al. |
| 2002/0106115 A1 | 8/2002 | Rajbenbach et al. |
| 2002/0122015 A1 | 9/2002 | Song et al. |
| 2002/0131121 A1 | 9/2002 | Jeganathan et al. |
| 2002/0149467 A1 | 10/2002 | Calvesio et al. |
| 2002/0149545 A1 | 10/2002 | Hanayama et al. |
| 2002/0158813 A1 | 10/2002 | Kiyokawa et al. |
| 2002/0158815 A1 | 10/2002 | Zwern |
| 2002/0167536 A1 | 11/2002 | Valdes et al. |
| 2002/0178246 A1 | 11/2002 | Mayer |
| 2002/0180727 A1 | 12/2002 | Guckenberger et al. |
| 2002/0184525 A1 | 12/2002 | Cheng |
| 2002/0186348 A1 | 12/2002 | Covannon et al. |
| 2002/0196554 A1 | 12/2002 | Cobb et al. |
| 2003/0013483 A1 | 1/2003 | Ausems et al. |
| 2003/0020707 A1 | 1/2003 | Kangas et al. |
| 2003/0026461 A1 | 2/2003 | Arthur Hunter |
| 2003/0030597 A1 | 2/2003 | Geist |
| 2003/0030912 A1 | 2/2003 | Gleckman et al. |
| 2003/0032436 A1 | 2/2003 | Mikuni |
| 2003/0038922 A1 | 2/2003 | Ferrell |
| 2003/0046401 A1 | 3/2003 | Abbott et al. |
| 2003/0058100 A1 | 3/2003 | Jumpertz |
| 2003/0059078 A1* | 3/2003 | Downs, Jr. ............ H04R 1/083 381/381 |
| 2003/0063383 A1 | 4/2003 | Costales |
| 2003/0076300 A1 | 4/2003 | Lauper et al. |
| 2003/0086054 A1 | 5/2003 | Waters |
| 2003/0090439 A1 | 5/2003 | Spitzer et al. |
| 2003/0093187 A1 | 5/2003 | Walker |
| 2003/0184864 A1 | 10/2003 | Bruzzone et al. |
| 2003/0210911 A1 | 11/2003 | Takahashi et al. |
| 2003/0214481 A1 | 11/2003 | Xiong |
| 2003/0214734 A1 | 11/2003 | Nishioka et al. |
| 2003/0215610 A1 | 11/2003 | DiGiampaolo et al. |
| 2003/0227470 A1 | 12/2003 | Genc et al. |
| 2003/0229808 A1 | 12/2003 | Heintz et al. |
| 2004/0008157 A1 | 1/2004 | Brubaker et al. |
| 2004/0027475 A1 | 2/2004 | Kamo |
| 2004/0030882 A1 | 2/2004 | Forman |
| 2004/0056870 A1 | 3/2004 | Shimoyama et al. |
| 2004/0070611 A1 | 4/2004 | Tanaka et al. |
| 2004/0080467 A1 | 4/2004 | Chinthammit et al. |
| 2004/0083295 A1 | 4/2004 | Amara et al. |
| 2004/0101178 A1 | 5/2004 | Fedorovskaya et al. |
| 2004/0105573 A1 | 6/2004 | Neumann et al. |
| 2004/0111643 A1 | 6/2004 | Farmer |
| 2004/0120583 A1 | 6/2004 | Zhai |
| 2004/0150884 A1 | 8/2004 | Domjan et al. |
| 2004/0157648 A1 | 8/2004 | Lightman |
| 2004/0169663 A1 | 9/2004 | Bernier |
| 2004/0174610 A1 | 9/2004 | Aizenberg et al. |
| 2004/0176143 A1 | 9/2004 | Willins et al. |
| 2004/0183749 A1 | 9/2004 | Vertegaal |
| 2004/0193413 A1 | 9/2004 | Wilson et al. |
| 2004/0204240 A1 | 10/2004 | Barney |
| 2004/0233551 A1 | 11/2004 | Takahashi et al. |
| 2004/0257663 A1 | 12/2004 | Edelmann |
| 2004/0263613 A1 | 12/2004 | Morita |
| 2005/0007672 A1 | 1/2005 | Wu |
| 2005/0013021 A1 | 1/2005 | Takahashi et al. |
| 2005/0021679 A1 | 1/2005 | Lightman et al. |
| 2005/0046954 A1 | 3/2005 | Achtner |
| 2005/0048918 A1 | 3/2005 | Frost et al. |
| 2005/0052684 A1 | 3/2005 | Ferlitsch |
| 2005/0061890 A1 | 3/2005 | Hinckley |
| 2005/0068239 A1 | 3/2005 | Fischer et al. |
| 2005/0071158 A1 | 3/2005 | Byford |
| 2005/0078378 A1 | 4/2005 | Geist |
| 2005/0086610 A1 | 4/2005 | Mackinlay et al. |
| 2005/0091184 A1 | 4/2005 | Seshadri et al. |
| 2005/0094019 A1 | 5/2005 | Grosvenor et al. |
| 2005/0104089 A1 | 5/2005 | Engelmann et al. |

(56) References Cited

U.S. PATENT DOCUMENTS

| | | |
|---|---|---|
| 2005/0174470 A1 | 8/2005 | Yamasaki |
| 2005/0174651 A1 | 8/2005 | Spitzer et al. |
| 2005/0180021 A1 | 8/2005 | Travers |
| 2005/0190258 A1 | 9/2005 | Siegel et al. |
| 2005/0190973 A1 | 9/2005 | Kristensson et al. |
| 2005/0200937 A1 | 9/2005 | Weidner |
| 2005/0201704 A1 | 9/2005 | Ellwood, Jr. |
| 2005/0201705 A1 | 9/2005 | Ellwood, Jr. |
| 2005/0201715 A1 | 9/2005 | Ellwood, Jr. |
| 2005/0206583 A1 | 9/2005 | Lemelson et al. |
| 2005/0225868 A1 | 10/2005 | Nelson et al. |
| 2005/0230596 A1 | 10/2005 | Howell et al. |
| 2005/0248852 A1 | 11/2005 | Yamasaki |
| 2005/0250552 A1 | 11/2005 | Eagle et al. |
| 2005/0257244 A1 | 11/2005 | Joly et al. |
| 2005/0264502 A1 | 12/2005 | Sprague et al. |
| 2005/0264527 A1 | 12/2005 | Lin |
| 2005/0264752 A1 | 12/2005 | Howell et al. |
| 2005/0275718 A1 | 12/2005 | Lun Lai et al. |
| 2005/0289538 A1 | 12/2005 | Black-Ziegelbein et al. |
| 2005/0289590 A1 | 12/2005 | Cheok et al. |
| 2006/0007056 A1 | 1/2006 | Ou |
| 2006/0007223 A1 | 1/2006 | Parker |
| 2006/0007671 A1 | 1/2006 | Lavoie |
| 2006/0010492 A9 | 1/2006 | Heintz et al. |
| 2006/0012566 A1 | 1/2006 | Siddeeq |
| 2006/0013440 A1 | 1/2006 | Cohen et al. |
| 2006/0028400 A1 | 2/2006 | Lapstun et al. |
| 2006/0028543 A1 | 2/2006 | Sohn et al. |
| 2006/0033992 A1 | 2/2006 | Solomon |
| 2006/0036585 A1 | 2/2006 | King et al. |
| 2006/0038880 A1 | 2/2006 | Starkweather et al. |
| 2006/0038881 A1 | 2/2006 | Starkweather et al. |
| 2006/0041758 A1 | 2/2006 | Dunn et al. |
| 2006/0052144 A1 | 3/2006 | Seil et al. |
| 2006/0061544 A1 | 3/2006 | Min et al. |
| 2006/0061555 A1 | 3/2006 | Mullen |
| 2006/0085367 A1 | 4/2006 | Genovese |
| 2006/0097986 A1 | 5/2006 | Mizuno |
| 2006/0098293 A1 | 5/2006 | Garoutte et al. |
| 2006/0110090 A1 | 5/2006 | Ellwood, Jr. |
| 2006/0110900 A1 | 5/2006 | Youn et al. |
| 2006/0115130 A1 | 6/2006 | Kozlay |
| 2006/0119539 A1 | 6/2006 | Kato et al. |
| 2006/0119540 A1 | 6/2006 | Dobson et al. |
| 2006/0123463 A1 | 6/2006 | Yeap et al. |
| 2006/0129670 A1 | 6/2006 | Mayer |
| 2006/0129672 A1 | 6/2006 | Mayer |
| 2006/0132382 A1 | 6/2006 | Jannard |
| 2006/0146767 A1 | 7/2006 | Moganti |
| 2006/0152434 A1 | 7/2006 | Sauer et al. |
| 2006/0152782 A1 | 7/2006 | Noda et al. |
| 2006/0158329 A1 | 7/2006 | Burkley et al. |
| 2006/0177103 A1 | 8/2006 | Hildreth |
| 2006/0181537 A1 | 8/2006 | Vasan et al. |
| 2006/0182287 A1 | 8/2006 | Schulein et al. |
| 2006/0192306 A1 | 8/2006 | Giller et al. |
| 2006/0192307 A1 | 8/2006 | Giller et al. |
| 2006/0221098 A1 | 10/2006 | Matsui et al. |
| 2006/0227151 A1 | 10/2006 | Bannai |
| 2006/0232665 A1 | 10/2006 | Schowengerdt et al. |
| 2006/0238878 A1 | 10/2006 | Miyake et al. |
| 2006/0239471 A1 | 10/2006 | Mao et al. |
| 2006/0241792 A1 | 10/2006 | Pretlove et al. |
| 2006/0241864 A1 | 10/2006 | Rosenberg |
| 2006/0244820 A1 | 11/2006 | Morita et al. |
| 2006/0248554 A1 | 11/2006 | Priddy |
| 2006/0250574 A1 | 11/2006 | Grand et al. |
| 2006/0253793 A1 | 11/2006 | Zhai et al. |
| 2006/0259511 A1 | 11/2006 | Boerries et al. |
| 2006/0277474 A1 | 12/2006 | Robarts et al. |
| 2006/0279662 A1 | 12/2006 | Kapellner et al. |
| 2006/0284791 A1 | 12/2006 | Chen et al. |
| 2006/0284792 A1 | 12/2006 | Foxlin |
| 2006/0288842 A1 | 12/2006 | Sitrick et al. |
| 2007/0003915 A1 | 1/2007 | Templeman |
| 2007/0011723 A1 | 1/2007 | Chao |
| 2007/0018975 A1 | 1/2007 | Chuanggui et al. |
| 2007/0030211 A1 | 2/2007 | McGlone et al. |
| 2007/0030442 A1 | 2/2007 | Howell et al. |
| 2007/0035562 A1 | 2/2007 | Azuma et al. |
| 2007/0035563 A1 | 2/2007 | Biocca et al. |
| 2007/0037520 A1 | 2/2007 | Warren |
| 2007/0047040 A1 | 3/2007 | Ha |
| 2007/0047091 A1 | 3/2007 | Spitzer et al. |
| 2007/0052672 A1 | 3/2007 | Ritter et al. |
| 2007/0053513 A1 | 3/2007 | Hoffberg |
| 2007/0058261 A1 | 3/2007 | Sugihara et al. |
| 2007/0061870 A1 | 3/2007 | Ting et al. |
| 2007/0064310 A1 | 3/2007 | Mukawa et al. |
| 2007/0070069 A1 | 3/2007 | Samarasekera et al. |
| 2007/0070859 A1 | 3/2007 | Hirayama |
| 2007/0078552 A1 | 4/2007 | Rosenberg |
| 2007/0094597 A1 | 4/2007 | Rostom |
| 2007/0103388 A1 | 5/2007 | Spitzer |
| 2007/0117576 A1 | 5/2007 | Huston |
| 2007/0124721 A1 | 5/2007 | Cowing et al. |
| 2007/0132785 A1 | 6/2007 | Ebersole, Jr. et al. |
| 2007/0136064 A1 | 6/2007 | Carroll |
| 2007/0139769 A1 | 6/2007 | DeCusatis et al. |
| 2007/0157106 A1 | 7/2007 | Bishop |
| 2007/0157286 A1 | 7/2007 | Singh et al. |
| 2007/0161875 A1* | 7/2007 | Epley .................. A61B 5/0484 600/301 |
| 2007/0176851 A1 | 8/2007 | Willey et al. |
| 2007/0177275 A1 | 8/2007 | McGuire, Jr. |
| 2007/0180979 A1 | 8/2007 | Rosenberg |
| 2007/0184422 A1 | 8/2007 | Takahashi |
| 2007/0188407 A1 | 8/2007 | Nishi |
| 2007/0188837 A1 | 8/2007 | Shimizu et al. |
| 2007/0195012 A1 | 8/2007 | Ichikawa et al. |
| 2007/0220108 A1 | 9/2007 | Whitaker |
| 2007/0220441 A1 | 9/2007 | Melton et al. |
| 2007/0237402 A1 | 10/2007 | Dekel et al. |
| 2007/0237491 A1 | 10/2007 | Kraft |
| 2007/0245048 A1 | 10/2007 | Mesut et al. |
| 2007/0248238 A1* | 10/2007 | Abreu .................. G02C 3/003 381/381 |
| 2007/0262958 A1 | 11/2007 | Cai et al. |
| 2007/0263137 A1 | 11/2007 | Shigeta et al. |
| 2007/0273557 A1 | 11/2007 | Baillot |
| 2007/0273610 A1 | 11/2007 | Baillot |
| 2007/0273611 A1 | 11/2007 | Torch |
| 2007/0273679 A1 | 11/2007 | Barton |
| 2007/0273796 A1 | 11/2007 | Silverstein et al. |
| 2007/0273983 A1 | 11/2007 | Hebert |
| 2007/0285346 A1 | 12/2007 | Li |
| 2007/0285621 A1 | 12/2007 | Kimura |
| 2007/0300185 A1 | 12/2007 | Macbeth et al. |
| 2008/0002859 A1 | 1/2008 | Tsan |
| 2008/0004952 A1 | 1/2008 | Koli |
| 2008/0010534 A1 | 1/2008 | Athale et al. |
| 2008/0013185 A1 | 1/2008 | Garoutte et al. |
| 2008/0015018 A1 | 1/2008 | Mullen |
| 2008/0024523 A1 | 1/2008 | Tomite et al. |
| 2008/0026838 A1 | 1/2008 | Dunstan et al. |
| 2008/0036653 A1 | 2/2008 | Huston |
| 2008/0037880 A1 | 2/2008 | Lai |
| 2008/0048930 A1 | 2/2008 | Breed |
| 2008/0048932 A1 | 2/2008 | Yanagisawa |
| 2008/0059578 A1 | 3/2008 | Albertson et al. |
| 2008/0062069 A1 | 3/2008 | Sinclair et al. |
| 2008/0068559 A1 | 3/2008 | Howell et al. |
| 2008/0071559 A1 | 3/2008 | Arrasvuori |
| 2008/0089556 A1 | 4/2008 | Salgian et al. |
| 2008/0089587 A1 | 4/2008 | Kim et al. |
| 2008/0102916 A1 | 5/2008 | Kovacs et al. |
| 2008/0106775 A1 | 5/2008 | Amitai et al. |
| 2008/0111832 A1 | 5/2008 | Emam et al. |
| 2008/0115069 A1 | 5/2008 | Veselova |
| 2008/0117341 A1 | 5/2008 | McGrew |
| 2008/0118897 A1 | 5/2008 | Perales |
| 2008/0122736 A1 | 5/2008 | Ronzani et al. |
| 2008/0122737 A1 | 5/2008 | Lea et al. |

(56) References Cited

U.S. PATENT DOCUMENTS

| | | |
|---|---|---|
| 2008/0136916 A1 | 6/2008 | Wolff |
| 2008/0136923 A1 | 6/2008 | Inbar et al. |
| 2008/0141149 A1 | 6/2008 | Yee et al. |
| 2008/0144264 A1 | 6/2008 | Cosgrove |
| 2008/0151379 A1 | 6/2008 | Amitai |
| 2008/0157946 A1 | 7/2008 | Eberl et al. |
| 2008/0168188 A1 | 7/2008 | Yue et al. |
| 2008/0186254 A1 | 8/2008 | Simmons |
| 2008/0186604 A1 | 8/2008 | Amitai |
| 2008/0198471 A1 | 8/2008 | Amitai |
| 2008/0199080 A1 | 8/2008 | Subbiah et al. |
| 2008/0208396 A1 | 8/2008 | Cairola et al. |
| 2008/0208466 A1 | 8/2008 | Iwatani |
| 2008/0211771 A1 | 9/2008 | Richardson |
| 2008/0216171 A1 | 9/2008 | Sano et al. |
| 2008/0218434 A1 | 9/2008 | Kelly et al. |
| 2008/0219025 A1 | 9/2008 | Spitzer et al. |
| 2008/0219522 A1 | 9/2008 | Hook |
| 2008/0239236 A1 | 10/2008 | Blum et al. |
| 2008/0239523 A1 | 10/2008 | Beck et al. |
| 2008/0246694 A1 | 10/2008 | Fischer |
| 2008/0247567 A1 | 10/2008 | Kjolerbakken et al. |
| 2008/0247722 A1 | 10/2008 | Van Gorkom et al. |
| 2008/0249936 A1 | 10/2008 | Miller et al. |
| 2008/0252527 A1 | 10/2008 | Garcia |
| 2008/0259022 A1 | 10/2008 | Mansfield et al. |
| 2008/0262910 A1 | 10/2008 | Altberg et al. |
| 2008/0266323 A1 | 10/2008 | Biocca et al. |
| 2008/0268876 A1 | 10/2008 | Gelfand et al. |
| 2008/0275764 A1 | 11/2008 | Wilson et al. |
| 2008/0278812 A1 | 11/2008 | Amitai |
| 2008/0278821 A1 | 11/2008 | Rieger |
| 2008/0281940 A1 | 11/2008 | Coxhill |
| 2008/0285140 A1 | 11/2008 | Amitai |
| 2009/0003662 A1 | 1/2009 | Joseph et al. |
| 2009/0013052 A1 | 1/2009 | Robarts et al. |
| 2009/0015902 A1 | 1/2009 | Powers et al. |
| 2009/0017916 A1 | 1/2009 | Blanchard, III et al. |
| 2009/0040308 A1 | 2/2009 | Temovskiy |
| 2009/0051879 A1 | 2/2009 | Vitale et al. |
| 2009/0052030 A1 | 2/2009 | Kaida et al. |
| 2009/0052046 A1 | 2/2009 | Amitai |
| 2009/0052047 A1 | 2/2009 | Amitai |
| 2009/0055739 A1 | 2/2009 | Murillo et al. |
| 2009/0061901 A1 | 3/2009 | Arrasvuori et al. |
| 2009/0066782 A1 | 3/2009 | Choi et al. |
| 2009/0076894 A1 | 3/2009 | Bates et al. |
| 2009/0081959 A1 | 3/2009 | Gyorfi et al. |
| 2009/0088204 A1 | 4/2009 | Culbert et al. |
| 2009/0096714 A1 | 4/2009 | Yamada |
| 2009/0096746 A1 | 4/2009 | Kruse et al. |
| 2009/0096937 A1 | 4/2009 | Bauer et al. |
| 2009/0097127 A1 | 4/2009 | Amitai |
| 2009/0111526 A1 | 4/2009 | Masri |
| 2009/0112713 A1 | 4/2009 | Jung et al. |
| 2009/0122414 A1 | 5/2009 | Amitai |
| 2009/0125510 A1 | 5/2009 | Graham et al. |
| 2009/0125849 A1 | 5/2009 | Bouvin et al. |
| 2009/0128449 A1 | 5/2009 | Brown et al. |
| 2009/0137055 A1 | 5/2009 | Bognar |
| 2009/0141324 A1 | 6/2009 | Mukawa |
| 2009/0153468 A1 | 6/2009 | Ong et al. |
| 2009/0161383 A1 | 6/2009 | Meir et al. |
| 2009/0164212 A1 | 6/2009 | Chan et al. |
| 2009/0170532 A1 | 7/2009 | Lee et al. |
| 2009/0174946 A1 | 7/2009 | Raviv et al. |
| 2009/0177663 A1 | 7/2009 | Hulaj et al. |
| 2009/0181650 A1 | 7/2009 | Dicke |
| 2009/0189974 A1 | 7/2009 | Deering |
| 2009/0204928 A1 | 8/2009 | Kallio et al. |
| 2009/0213037 A1 | 8/2009 | Schon |
| 2009/0213321 A1 | 8/2009 | Galstian et al. |
| 2009/0219283 A1 | 9/2009 | Hendrickson et al. |
| 2009/0221374 A1 | 9/2009 | Yen et al. |
| 2009/0228552 A1 | 9/2009 | Abbott et al. |
| 2009/0231116 A1 | 9/2009 | Takahashi et al. |
| 2009/0232351 A1 | 9/2009 | Kagitani et al. |
| 2009/0234614 A1 | 9/2009 | Kahn et al. |
| 2009/0234732 A1 | 9/2009 | Zorman et al. |
| 2009/0237423 A1 | 9/2009 | Shih et al. |
| 2009/0237804 A1 | 9/2009 | Amitai et al. |
| 2009/0239591 A1 | 9/2009 | Alameh et al. |
| 2009/0241171 A1 | 9/2009 | Sunwoo et al. |
| 2009/0244048 A1 | 10/2009 | Yamanaka |
| 2009/0261490 A1 | 10/2009 | Martineau et al. |
| 2009/0278766 A1 | 11/2009 | Sako et al. |
| 2009/0282030 A1 | 11/2009 | Abbott et al. |
| 2009/0289956 A1 | 11/2009 | Douris et al. |
| 2009/0290450 A1 | 11/2009 | Rioux |
| 2009/0293000 A1 | 11/2009 | Lepeska |
| 2009/0300535 A1 | 12/2009 | Skourup et al. |
| 2009/0300657 A1 | 12/2009 | Kumari |
| 2009/0309826 A1 | 12/2009 | Jung et al. |
| 2009/0316097 A1 | 12/2009 | Presniakov et al. |
| 2009/0319178 A1 | 12/2009 | Khosravy et al. |
| 2009/0319181 A1 | 12/2009 | Khosravy et al. |
| 2009/0319672 A1 | 12/2009 | Reisman |
| 2009/0319902 A1 | 12/2009 | Kneller et al. |
| 2009/0320073 A1 | 12/2009 | Reisman |
| 2010/0001928 A1 | 1/2010 | Nutaro |
| 2010/0002154 A1 | 1/2010 | Hua |
| 2010/0005293 A1 | 1/2010 | Errico |
| 2010/0007582 A1 | 1/2010 | Zalewski |
| 2010/0007807 A1 | 1/2010 | Galstian et al. |
| 2010/0013739 A1 | 1/2010 | Sako et al. |
| 2010/0016757 A1 | 1/2010 | Greenburg et al. |
| 2010/0017872 A1 | 1/2010 | Goertz et al. |
| 2010/0023506 A1 | 1/2010 | Sahni et al. |
| 2010/0023878 A1 | 1/2010 | Douris et al. |
| 2010/0030578 A1 | 2/2010 | Siddique et al. |
| 2010/0039353 A1 | 2/2010 | Cernasov |
| 2010/0040151 A1 | 2/2010 | Garrett |
| 2010/0045701 A1 | 2/2010 | Scott et al. |
| 2010/0046070 A1 | 2/2010 | Mukawa |
| 2010/0046219 A1 | 2/2010 | Pijlman et al. |
| 2010/0048256 A1 | 2/2010 | Huppi et al. |
| 2010/0048302 A1 | 2/2010 | Lutnick et al. |
| 2010/0050221 A1 | 2/2010 | McCutchen et al. |
| 2010/0053753 A1 | 3/2010 | Nestorovic et al. |
| 2010/0058435 A1 | 3/2010 | Buss et al. |
| 2010/0060552 A1 | 3/2010 | Watanabe et al. |
| 2010/0060863 A1 | 3/2010 | Hudman et al. |
| 2010/0063794 A1 | 3/2010 | Hernandez-Rebollar |
| 2010/0064228 A1 | 3/2010 | Tsern |
| 2010/0066676 A1 | 3/2010 | Kramer et al. |
| 2010/0066821 A1 | 3/2010 | Rosener et al. |
| 2010/0069035 A1 | 3/2010 | Johnson |
| 2010/0079356 A1 | 4/2010 | Hoellwarth |
| 2010/0099464 A1 | 4/2010 | Kim |
| 2010/0103075 A1 | 4/2010 | Kalaboukis et al. |
| 2010/0103078 A1 | 4/2010 | Mukawa et al. |
| 2010/0103196 A1 | 4/2010 | Kumar et al. |
| 2010/0110368 A1 | 5/2010 | Chaum |
| 2010/0119072 A1 | 5/2010 | Ojanpera |
| 2010/0120585 A1 | 5/2010 | Quy |
| 2010/0125812 A1 | 5/2010 | Hartman et al. |
| 2010/0128356 A1 | 5/2010 | Feklistov |
| 2010/0131308 A1 | 5/2010 | Collopy et al. |
| 2010/0138481 A1 | 6/2010 | Behrens |
| 2010/0142189 A1 | 6/2010 | Hong et al. |
| 2010/0144268 A1 | 6/2010 | Haberli |
| 2010/0146441 A1 | 6/2010 | Halme |
| 2010/0149073 A1 | 6/2010 | Chaum et al. |
| 2010/0152620 A1 | 6/2010 | Ramsay et al. |
| 2010/0157433 A1 | 6/2010 | Mukawa et al. |
| 2010/0164990 A1 | 7/2010 | Van Doorn |
| 2010/0165092 A1 | 7/2010 | Yamaguchi |
| 2010/0171680 A1 | 7/2010 | Lapidot et al. |
| 2010/0171700 A1 | 7/2010 | Sharan et al. |
| 2010/0174801 A1 | 7/2010 | Tabaaloute |
| 2010/0177114 A1 | 7/2010 | Nakashima |
| 2010/0177386 A1 | 7/2010 | Berge et al. |
| 2010/0182340 A1 | 7/2010 | Bachelder et al. |
| 2010/0201716 A1 | 8/2010 | Tanizoe et al. |

(56) References Cited

U.S. PATENT DOCUMENTS

| | | |
|---|---|---|
| 2010/0211431 A1 | 8/2010 | Lutnick et al. |
| 2010/0217099 A1 | 8/2010 | LeBoeuf et al. |
| 2010/0217657 A1 | 8/2010 | Gazdzinksi |
| 2010/0220037 A1 | 9/2010 | Sako et al. |
| 2010/0226535 A1 | 9/2010 | Kimchi et al. |
| 2010/0254543 A1 | 10/2010 | Kjolerbakken |
| 2010/0277692 A1 | 11/2010 | Mukai et al. |
| 2010/0278480 A1 | 11/2010 | Vasylyev |
| 2010/0280919 A1 | 11/2010 | Everett et al. |
| 2010/0295769 A1 | 11/2010 | Lundstrom |
| 2010/0295987 A1 | 11/2010 | Berge |
| 2010/0304787 A1 | 12/2010 | Lee et al. |
| 2010/0313225 A1 | 12/2010 | Cholas et al. |
| 2010/0315329 A1 | 12/2010 | Previc et al. |
| 2010/0318500 A1 | 12/2010 | Murphy et al. |
| 2010/0319004 A1 | 12/2010 | Hudson et al. |
| 2010/0321409 A1 | 12/2010 | Komori et al. |
| 2010/0328204 A1 | 12/2010 | Edwards et al. |
| 2010/0328492 A1 | 12/2010 | Fedorovskaya et al. |
| 2010/0332640 A1 | 12/2010 | Goodrow et al. |
| 2010/0332818 A1 | 12/2010 | Prahlad et al. |
| 2011/0001695 A1 | 1/2011 | Suzuki et al. |
| 2011/0001699 A1 | 1/2011 | Jacobsen et al. |
| 2011/0002469 A1 | 1/2011 | Ojala |
| 2011/0007035 A1 | 1/2011 | Shai |
| 2011/0007081 A1 | 1/2011 | Gordon |
| 2011/0007277 A1 | 1/2011 | Solomon |
| 2011/0009241 A1 | 1/2011 | Lane et al. |
| 2011/0010672 A1 | 1/2011 | Hope |
| 2011/0012896 A1 | 1/2011 | Ji |
| 2011/0018903 A1 | 1/2011 | Lapstun et al. |
| 2011/0022357 A1 | 1/2011 | Vock et al. |
| 2011/0032187 A1 | 2/2011 | Kramer et al. |
| 2011/0035684 A1 | 2/2011 | Lewis et al. |
| 2011/0037606 A1 | 2/2011 | Boise |
| 2011/0037951 A1 | 2/2011 | Hua et al. |
| 2011/0038512 A1 | 2/2011 | Petrou et al. |
| 2011/0041100 A1 | 2/2011 | Boillot |
| 2011/0043436 A1 | 2/2011 | Yamamoto |
| 2011/0043680 A1 | 2/2011 | Uehara |
| 2011/0046483 A1 | 2/2011 | Fuchs et al. |
| 2011/0057862 A1 | 3/2011 | Chen |
| 2011/0066682 A1 | 3/2011 | Aldunate et al. |
| 2011/0072492 A1 | 3/2011 | Mohler et al. |
| 2011/0080289 A1 | 4/2011 | Minton |
| 2011/0082390 A1 | 4/2011 | Krieter et al. |
| 2011/0082690 A1 | 4/2011 | Togami et al. |
| 2011/0087534 A1 | 4/2011 | Strebinger et al. |
| 2011/0090148 A1 | 4/2011 | Li et al. |
| 2011/0090444 A1 | 4/2011 | Kimura |
| 2011/0098056 A1 | 4/2011 | Rhoads et al. |
| 2011/0107220 A1 | 5/2011 | Perlman |
| 2011/0107227 A1 | 5/2011 | Rempell et al. |
| 2011/0107270 A1 | 5/2011 | Wang et al. |
| 2011/0112771 A1 | 5/2011 | French |
| 2011/0122081 A1 | 5/2011 | Kushler |
| 2011/0125844 A1 | 5/2011 | Collier et al. |
| 2011/0125894 A1 | 5/2011 | Anderson et al. |
| 2011/0125895 A1 | 5/2011 | Anderson et al. |
| 2011/0126047 A1 | 5/2011 | Anderson et al. |
| 2011/0126099 A1 | 5/2011 | Anderson et al. |
| 2011/0126197 A1 | 5/2011 | Larsen et al. |
| 2011/0126207 A1 | 5/2011 | Wipfel et al. |
| 2011/0126275 A1 | 5/2011 | Anderson et al. |
| 2011/0128364 A1 | 6/2011 | Ono |
| 2011/0140994 A1 | 6/2011 | Noma |
| 2011/0150501 A1 | 6/2011 | Guttag et al. |
| 2011/0156998 A1 | 6/2011 | Huang et al. |
| 2011/0157667 A1 | 6/2011 | Lacoste et al. |
| 2011/0161076 A1 | 6/2011 | Davis et al. |
| 2011/0161875 A1 | 6/2011 | Kankainen |
| 2011/0169928 A1 | 7/2011 | Gassel et al. |
| 2011/0173260 A1 | 7/2011 | Biehl et al. |
| 2011/0185176 A1 | 7/2011 | Takahashi et al. |
| 2011/0187640 A1 | 8/2011 | Jacobsen et al. |
| 2011/0191316 A1 | 8/2011 | Lai et al. |
| 2011/0191432 A1 | 8/2011 | Layson, Jr. |
| 2011/0194029 A1 | 8/2011 | Herrmann et al. |
| 2011/0199389 A1 | 8/2011 | Lu et al. |
| 2011/0213664 A1 | 9/2011 | Osterhout et al. |
| 2011/0214082 A1 | 9/2011 | Osterhout et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0231757 A1 | 9/2011 | Haddick et al. |
| 2011/0231899 A1 | 9/2011 | Pulier et al. |
| 2011/0238855 A1 | 9/2011 | Korsunsky et al. |
| 2011/0249122 A1 | 10/2011 | Tricoukes et al. |
| 2011/0254855 A1 | 10/2011 | Anders |
| 2011/0267321 A1 | 11/2011 | Hayakawa |
| 2011/0270522 A1 | 11/2011 | Fink |
| 2011/0286068 A1 | 11/2011 | Hudman |
| 2011/0319148 A1 | 12/2011 | Kinnebrew et al. |
| 2012/0001846 A1 | 1/2012 | Taniguchi et al. |
| 2012/0005724 A1 | 1/2012 | Lee |
| 2012/0019373 A1 | 1/2012 | Kruse et al. |
| 2012/0019557 A1 | 1/2012 | Aronsson et al. |
| 2012/0021806 A1 | 1/2012 | Maltz |
| 2012/0026191 A1 | 2/2012 | Aronsson et al. |
| 2012/0050143 A1 | 3/2012 | Border et al. |
| 2012/0062445 A1 | 3/2012 | Haddick et al. |
| 2012/0062850 A1 | 3/2012 | Travis |
| 2012/0069131 A1 | 3/2012 | Abelow |
| 2012/0075168 A1 | 3/2012 | Osterhout et al. |
| 2012/0081800 A1 | 4/2012 | Cheng et al. |
| 2012/0105474 A1 | 5/2012 | Cudalbu et al. |
| 2012/0119978 A1 | 5/2012 | Border et al. |
| 2012/0120103 A1 | 5/2012 | Border et al. |
| 2012/0133580 A1 | 5/2012 | Kirby et al. |
| 2012/0139903 A1 | 6/2012 | Rush et al. |
| 2012/0166350 A1 | 6/2012 | Piccionelli et al. |
| 2012/0176411 A1 | 7/2012 | Huston |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0198532 A1 | 8/2012 | Headley |
| 2012/0200488 A1 | 8/2012 | Osterhout et al. |
| 2012/0200499 A1 | 8/2012 | Osterhout et al. |
| 2012/0200592 A1 | 8/2012 | Kimura |
| 2012/0200601 A1 | 8/2012 | Osterhout et al. |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0212406 A1 | 8/2012 | Osterhout et al. |
| 2012/0212414 A1 | 8/2012 | Osterhout et al. |
| 2012/0212484 A1 | 8/2012 | Haddick et al. |
| 2012/0212499 A1 | 8/2012 | Haddick et al. |
| 2012/0218172 A1 | 8/2012 | Border et al. |
| 2012/0218301 A1 | 8/2012 | Miller |
| 2012/0229248 A1 | 9/2012 | Parshionikar et al. |

(56) References Cited

U.S. PATENT DOCUMENTS

| | | | |
|---|---|---|---|
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235886 A1 | 9/2012 | Border et al. |
| 2012/0235887 A1 | 9/2012 | Border et al. |
| 2012/0235900 A1 | 9/2012 | Border et al. |
| 2012/0235902 A1 | 9/2012 | Eisenhardt et al. |
| 2012/0236030 A1 | 9/2012 | Border et al. |
| 2012/0236031 A1 | 9/2012 | Haddick et al. |
| 2012/0240185 A1 | 9/2012 | Kapoor et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0249797 A1 | 10/2012 | Haddick et al. |
| 2012/0287070 A1 | 11/2012 | Wang et al. |
| 2012/0293548 A1 | 11/2012 | Perez et al. |
| 2012/0320100 A1 | 12/2012 | Machida et al. |
| 2012/0320155 A1 | 12/2012 | Suh et al. |
| 2013/0044042 A1 | 2/2013 | Olsson et al. |
| 2013/0044129 A1 | 2/2013 | Latta et al. |
| 2013/0127980 A1 | 5/2013 | Haddick et al. |
| 2013/0141419 A1 | 6/2013 | Mount et al. |
| 2013/0187943 A1 | 7/2013 | Bohn et al. |
| 2013/0208234 A1 | 8/2013 | Lewis |
| 2013/0278631 A1 | 10/2013 | Border et al. |
| 2013/0314303 A1 | 11/2013 | Osterhout et al. |
| 2014/0063054 A1 | 3/2014 | Osterhout et al. |
| 2014/0063055 A1 | 3/2014 | Osterhout et al. |
| 2014/0098425 A1 | 4/2014 | Schon et al. |
| 2014/0253605 A1 | 9/2014 | Border et al. |
| 2014/0340286 A1 | 11/2014 | Machida et al. |

FOREIGN PATENT DOCUMENTS

| | | |
|---|---|---|
| CN | 102809821 A | 12/2012 |
| EP | 562742 A1 | 9/1993 |
| EP | 0562742 A1 | 9/1993 |
| EP | 807917 A2 | 11/1997 |
| EP | 0807917 A2 | 11/1997 |
| EP | 0827337 A1 | 3/1998 |
| EP | 827337 A1 | 3/1998 |
| EP | 1637975 A1 | 3/2006 |
| EP | 1736812 A1 | 12/2006 |
| EP | 1739594 A1 | 1/2007 |
| EP | 2088501 A1 | 8/2009 |
| EP | 2530510 A2 | 12/2012 |
| FR | 2265144 | 3/1974 |
| FR | 2265144 A1 | 10/1975 |
| JP | 62157007 A | 7/1987 |
| JP | S62157007 A | 7/1987 |
| JP | H06308891 A | 11/1994 |
| JP | 8006660 A | 1/1996 |
| JP | H086660 A | 1/1996 |
| JP | 8136852 A | 5/1996 |
| JP | H08136852 A | 5/1996 |
| JP | H09139927 A | 5/1997 |
| JP | 10123450 A | 5/1998 |
| JP | H10123450 A | 5/1998 |
| JP | 2000207575 A | 7/2000 |
| JP | 2002157606 A | 5/2002 |
| JP | 2002186022 A | 6/2002 |
| JP | 2006135884 A | 5/2006 |
| JP | 2006229538 A | 8/2006 |
| JP | 2008176681 A | 7/2008 |
| JP | 2008185609 A | 8/2008 |
| JP | 2008227813 A | 9/2008 |
| JP | 2009222774 A | 10/2009 |
| JP | 2011118402 A | 6/2011 |
| KR | 1020080020110 A | 3/2008 |
| KR | 1020090001667 A | 1/2009 |
| KR | 20110063075 A | 6/2011 |
| WO | 9409398 A1 | 4/1994 |
| WO | 9636898 A2 | 11/1996 |
| WO | 9829775 A1 | 7/1998 |
| WO | 9946619 A1 | 9/1999 |
| WO | 0180561 A1 | 10/2001 |
| WO | 2005034523 A1 | 4/2005 |
| WO | 2005122128 A1 | 12/2005 |
| WO | 2007093983 A2 | 8/2007 |
| WO | 2007103889 A2 | 9/2007 |
| WO | 2008087250 A1 | 7/2008 |
| WO | 2008089417 A2 | 7/2008 |
| WO | 2009017797 A2 | 2/2009 |
| WO | 2009073336 A1 | 6/2009 |
| WO | 2010092409 A1 | 8/2010 |
| WO | 2010123934 A1 | 10/2010 |
| WO | 2010129599 A1 | 11/2010 |
| WO | 2010135184 A1 | 11/2010 |
| WO | 2010149823 A1 | 12/2010 |
| WO | 2011003181 A1 | 1/2011 |
| WO | 2011044680 A1 | 4/2011 |
| WO | 2011079240 A1 | 6/2011 |
| WO | 2011106797 A1 | 9/2011 |
| WO | 2011106798 A1 | 9/2011 |
| WO | 2012037290 A2 | 3/2012 |
| WO | 2012037290 A3 | 3/2012 |
| WO | 2012118573 A1 | 9/2012 |
| WO | 2012118575 A2 | 9/2012 |
| WO | 2013049248 A2 | 4/2013 |
| WO | 2013049248 A3 | 4/2013 |
| WO | 2013111471 A1 | 8/2013 |

OTHER PUBLICATIONS

Aggarwal, C. et al., "Integrating Sensors and Social Networks," Social Network Data Analytics, Chapter 12, pp. 379-412, Mar. 17, 2011, 34 pages.

Ando, T. et al., "Head Mounted Display for Mixed Reality Using Holographic Optical Elements," Mem. Fac. Eng., Osaka City Univ., vol. 40, pp. 1-6, Sep. 1999, 6 pages.

Ando, T. et al., "Head Mounted Display Using Holographic Optical Element," SPIE vol. 3293, Practical Holography XII, pp. 183-189, Mar. 18, 1998, 7 pages.

"Android Muzikant: Automatelt goes Pro!," http/muzikant-android.blogspot.com/2011/05/automateit-goes-pro.html, May 31, 2011, 11 pages.

Aye, T. et al., "Compact HMD Optics Based on Multiplexed Aberration Compensated Holographic Optical Elements," SPIE vol. 4361, Helmet- and Head-Mounted Displays VI, pp. 89-97, Aug. 22, 2001, 9 pages.

Aye, T., "Miniature Guided Light Array Sequential Scanning Display for Head Mounted Displays," U.S. Army CECOM Sponsored Report, Contract No. DAAB07-98-C-G011, May 15, 1998, 35 pages.

Azuma, R. "A Survey of Augmented Reality," Presence (by MIT), vol. 6, No. 4, pp. 355-385, Aug. 1997, 31 pages.

Azuma, R. et al., "Recent Advances in Augmented Reality," IEEE Computer Graphics and Applications, vol. 21, No. 6, pp. 34-47, Nov. 2001, 15 pages.

BAE Systems, "The Q-Sight Family of Helmet Display Products," Oct. 2007, 4 pages.

Buchmann, V. et al., "FingARtips—Gesture Based Direct Manipulation in Augmented Reality," Graphite '04, 2nd International Conference on Computer Graphics and Interactive Techniques in Australasia and South East Asia, pp. 212-221, Jun. 15, 2004, 10 pages.

Buchmann, V., "Road Stakeout in Wearable Outdoor Augmented Reality," Doctoral Thesis in Philosophy, University of Canterbury, Available as early as Jan. 1, 2008, 203 pages.

Buchroeder, R. et al., "Design of a Catadioptric VCASS Helmet-Mounted Display," Air Force Aerospace Medical Research Laboratory Sponsored Report No. AFAMRL-TR-81-133, Nov. 1981, 73 pages.

Cakmakci, O. et al., "Head-Worn Displays: A Review," Journal of Display Technology, vol. 2, No. 3, pp. 199-216, Sep. 2006, 18 pages.

Cameron, A., "The Application of Holographic Optical Waveguide Technology to Q-Sight Family of Helmet Mounted Displays," SPIE

(56) References Cited

OTHER PUBLICATIONS vol. 7326, Head- and Helmet-Mounted Displays XIV: Design and Applications, May 6, 2009, 11 pages.
Cheng, D. et al., "Design of an Optical See-Through Head-Mounted Display With a Low f-Number and Large Field of View Using a Freeform Prism," Applied Optics, vol. 48, No. 14, pp. 2655-2668, May 10, 2009, 14 pages.
Choi, J. et al., "Intelligent Wearable Assistance System for Communicating with Interactive Electronic Media," 13th International Conference on Artificial Reality and Telexistence, Dec. 3-5, 2003, 6 pages.
Creating Flags and Reminders in Outlook, University of Wisconsin Website, http://www.uwex.uwc.edu/outlook/tips/?file=2003-04-25, Apr. 2003, 5 pages.
De Keukelaere, F. et al., "MPEG-21 Session Mobility on Mobile Devices," IFIP TC6 Workshops on Broadband Satellite Communication Systems and Challenges of Mobility, pp. 135-144, Aug. 2004, 7 pages.
Demirbas, M. et al., "Crowd-Sourced Sensing and Collaboration Using Twitter," 2010 IEEE International Symposium on a World of Wireless Mobile and Multimedia Networks (WoWMoM), pp. 1-9, Jun. 2010, 9 pages.
Demiryont, H. et al., "Solid-State Monolithic Electrochromic Switchable Visors and Spectacles," SPIE vol. 7326, Head- and Helmet-Mounted Displays XIV: Design and Applications, May 7, 2009, 8 pages.
Dorfmuller-Ulhaas, K. et al., "Finger Tracking for Interaction in Augmented Environments," IEEE and ACM International Symposium on Augmented Reality, pp. 55-64, Oct. 2001, 10 pages.
Esfahbod, B., "Preload—An Adaptive Prefetching Daemon," Master Thesis in Science, University of Toronto, Available as early as Jan. 1, 2006, 81 pages.
Fails, J. et al., "Light Widgets: Interacting in Every-Day Spaces," 7th International Conference on Intelligent User Interfaces, pp. 63-69, Jan. 13, 2002, 7 pages.
Ferrin, F., "An Update on Optical Systems for Military Head Mounted Displays," SPIE vol. 3689, Helmet and Head-Mounted Displays IV, pp. 178-185, Apr. 1999, 8 pages.
Fisher, T., "Device Manager," PC Support Website on About.com, http://pcsupport.about.com/od/termsd/p/devicemanager.htm, Available as early as Aug. 16, 2008, 2 pages.
Fisher, T., "Driver," About.com, http://pcsupport.about.com/od/termsag/g/term_driver.htm, Available as early as Oct. 22, 2006, 1 page.
Gafurov, D. et al., "Biometric Gait Authentication Using Accelerometer Sensor," Journal of Computers, vol. 1, No. 7, pp. 51-59, Oct. 2006, 9 pages.
Genc, Y. et al., "Practical Solutions for Calibration of Optical See-Through Devices," ISMAR 2002, International Symposium on Mixed and Augmented Reality, pp. 169-175, Sep. 2002, 9 pages.
Haase, K. et al., "AR Binocular: Augmented Reality System for Nautical Navigation," Lecture Notes in Informatics Series (LNI), Workshop on Mobile and Embedded Interactive Systems, pp. 295-300, Sep. 2008, 6 pages.
Hilton, P., "Ultra-Wide FOV Retinal Display," Physics Applications Ltd, P.O. Box 56, Diamond Harbour, Christchurch, New Zealand, Available as early as 2005, 4 pages.
Hossack, W. et al., "High-Speed Holographic Optical Tweezers Using a Ferroelectric Liquid Crystal Microdisplay," Optics Express, vol. 11, No. 17, pp. 2053-2059, Aug. 25, 2003, 7 pages.
Hua, H. et al., "Design of a Bright Polarized Head-Mounted Projection Display," Applied Optics, vol. 46, No. 14, pp. 2600-2610, May 10, 2007, 11 pages.
Johnston, R., "Development of a Commercial Retinal Scanning Display," SPIE vol. 2465, Helmet- and Head-Mounted Displays and Symbology Requirements II, May 22, 1995, 12 pages.
Joo, Y. et al., "FAST: Quick Application Launch on Solid-State Drives," 9th USENIX conference on File and Strorage Technologies, Feb. 15, 2011, 14 pages.
Juang, K. et al., "Use of Eye Movement Gestures for Web Browsing," Computer Science Department, Clemson University, Available as early as Jan. 1, 2005, 7 pages.
Kok, A. et al., "A Multimodal Virtual Reality Interface for 3D Interaction with VTK," Knowledge and Information Systems, vol. 13, No. 2, pp. 197-219, Feb. 8, 2007, 23 pages.
Lantz, E., "Future Directions in Visual Display Systems," Computer Graphics, vol. 31, No. 2, pp. 38-42, May 1997, 16 pages.
Liarokapis, F. et al., "Multimodal Augmented Reality Tangible Gaming," The Visual Computer, vol. 25, No. 12, pp. 1109-1120, Aug. 27, 2009, 12 pages.
Liu, S. et al., "An Optical See-Through Head Mounted Display with Addressable Focal Planes," IEEE International Symposium on Mixed and Augmented Reality, pp. 33-42, Sep. 2008, 10 pages.
Liu, Y. et al., "A Robust Hand Tracking for Gesture-Based Interaction of Wearable Computers," Eighth International Symposium on Wearable Computers, vol. 1, pp. 22-29, Oct. 2004, 8 pages.
Maeda, M. et al., "Tracking of User Position and Orientation by Stereo Measurement of Infrared Markers and Orientation Sensing," Eighth International Symposium on Wearable Computers, vol. 1, pp. 77-84, Oct. 2004, 8 pages.
Mas, I. et al., "IPTV Session Mobility," Third International Conference on Communications and Networking in China, pp. 903-909, Aug. 2008, 7 pages.
Miluzzo, E. et al., "CenceMe—Injecting Sensing Presence into Social Networking Applications," 2nd European Conference on Smart Sensing and Context, pp. 1-28, Oct. 23, 2007, 28 pages.
Missig, M., "Diffractive Optics Applied to Eyepiece Design," Master Thesis in Science, University of Rochester, Available as early as Jan. 1, 1994, 148 pages.
Mukawa, H. et al., "A Full Color Eyewear Display Using Holographic Planar Waveguides," SID Symposium Digest of Technical Papers, vol. 39, No. 1, pp. 89-92, May 2008, 4 pages.
Murph, D., "WPI Students Create Wireless 3D Ring Mouse," Engadget at: http://www.engadget.com/2007/05/21/wpi-students-create-wireless-3d-ring-mouse/, May 21, 2007, 3 pages.
Nelson, R. et al., "Tracking Objects Using Recognition," Technical Report 765, University of Rochester, Computer Science Department, Feb. 2002, 15 pages.
Nguyen, L. et al., "Virtual Reality Interfaces for Visualization and Control of Remote Vehicles," Autonomous Robots, vol. 11, No. 1, pp. 59-68, Jul. 2001, 10 pages.
Nolker, C. et al., "Detection of Fingertips in Human Hand Movement Sequences," International Gesture Workshop on Gesture and Sign Language in Human-Computer Interaction, pp. 209-218, Sep. 17, 1997, 10 pages.
Ong, S. et al., "Markerless Augmented Reality Using a Robust Point Transferring Method," 13th International Multimedia Modeling Conference, Part II, pp. 258-268, Jan. 2007, 11 pages.
Pamplona, V. et al., "The Image-Based Data Glove," Proceedings of X Symposium on Virtual Reality (SVR'2008), pp. 204-211, May 2008, 8 pages.
Pansing, C. et al., "Optimization of Illumination Schemes in a Head-Mounted Display Integrated With Eye Tracking Capabilities," SPIE vol. 5875, Novel Optical Systems Design and Optimization VIII, Aug. 30, 2005, 13 pages.
Purdy, K., "Install Speech Macros in Vista," Lifehacker at http://lifehacker.com/397701/install-speech-macros-in-vista, Jul. 2, 2008, 1 page.
Rolland, J. et al., "Head-Mounted Display Systems," Encyclopedia of Optical Engineering, Available as early as Jan. 1, 2005, 14 pages.
Rolland, J. et al., "Head-Worn Displays: The Future Through New Eyes," Optics and Photonics News, vol. 20, No. 4, pp. 20-27, Apr. 2009, 8 pages.
Rolland-Thompson, K. et al., "The Coming Generation of Head-Worn Displays (HWDs): Will the Future Come to Us Through New Eyes?," Presentation at Annual Meeting of the Optical Society of America, Oct. 2009, 40 pages.
Spitzer, M. et al., "Eyeglass-Based Systems for Wearable Computing," First International Symposium on Wearable Computers, pp. 48-51, Oct. 1997, 4 pages.
Starner, T. et al., "Augmented Reality Through Wearable Computing," M.I.T. Media Laboratory Perceptual Computing Section Tech-

(56) References Cited

OTHER PUBLICATIONS nical Report No. 397, Presence, Special Issue on Augmented Reality, vol. 6 No. 4, pp. 386-398, Aug. 1997, 9 pages.
Starner, T. et al., "The Perceptive Workbench: Computer Vision-Based Gesture Tracking, Object Tracking, and 3D Reconstruction for Augmented Desks," Machine Vision and Applications, vol. 14, No. 1, pp. 59-71, Apr. 1, 2003, 13 pages.
Starner, T. et al., "Real-Time American Sign Language Recognition Using Desk and Wearable Computer Based Video," M.I.T. Media Laboratory Perceptual Computing Section Technical Report No. 466, Published in IEEE Transactions on Pattern Analysis and Machine Intelligence, vol. 20, No. 12, pp. 1371-1375, Dec. 1998, 7 pages.
Storring, M. et al., "Computer Vision-Based Gesture Recognition for an Augmented Reality Interface," 4th IASTED International Conference on Visualization, Imaging, and Image Processing, pp. 766-771, Sep. 2004, 6 pages.
Sturman, D. et al., "A Survey of Glove-Based Input," IEEE Computer Graphics and Applications, vol. 14, No. 1, pp. 30-39, Jan. 1994, 10 pages.
Takahashi, C. et al., "Polymeric Waveguide Design of a 2D Display System," SPIE vol. 6177, Health Monitoring and Smart Nondestructive Evaluation of Structural and Biological Systems V, Mar. 15, 2006, 9 pages.
Tan, H. et al., "A Haptic Back Display for Attentional and Directional Cueing," Haptics-e, vol. 3 No. 1, Jun. 11, 2003, 20 pages.
Tanenbaum, A., "Structured Computer Organization," 2nd Edition, Introduction, Prentice-Hall, Inc., Jan. 1984, 5 pages.
Tuceryan, M. et al., "Single Point Active Alignment Method (SPAAM) for Optical See-Through HMD Calibration for AR," IEEE and ACM International Symposium on Augmented Reality, pp. 149-158, Oct. 2000, 10 pages.
Vargas-Martin, F. et al., "Augmented-View for Restricted Visual Field: Multiple Device Implementations," Optometry and Vision Science, vol. 79, No. 11, pp. 715-723, Nov. 2002, 9 pages.
Virtual Hand for CATIA V5, Immersion Corporation Datasheet, Available at www.immersion.com/catia as early as Apr. 2003, 2 pages.
Wacyk, I. et al., "Low Power SXGA Active Matrix OLED," SPIE vol. 7326, Head- and Helmet-Mounted Displays XIV: Design and Applications, May 6, 2009, 11 pages.
Wang, H. et al., "Target Classification and Localization in Habitat Monitoring," 2003 IEEE International Conference on Acoustics, Speech, and Signal Processing, vol. 4, pp. 844-847, Apr. 2003, 4 pages.
Waveguides, Encyclopedia of Laser Physics and Technology Website, Available at www.rp-photonics.com/waveguides.html as Early as Feb. 2006, 3 pages.
Williams, G. et al., "Physical Presence—Palettes in Virtual Spaces," SPIE vol. 3639, Stereoscopic Displays and Virtual Reality Systems VI, May 24, 1999, 11 pages.
Woods, R. et al., "The Impact of Non-Immersive Head-Mounted Displays (HMDs) on the Visual Field," Journal of the Society for Information Display, vol. 11, No. 1, pp. 191-198, Mar. 2003, 8 pages.
Woodward, O., et al., "A Full-Color SXGA TN AMLCD for Military Head-Mounted Displays and Viewer Applications," SPIE vol. 6955, Head- and Helmet-Mounted Displays XIII: Design and Applications, Apr. 2008, 10 pages.
Wu, Y. et al., "Vision-Based Gesture Recognition: A Review," Gesture-Based Communication in Human-Computer Interaction, International GestureWorkshop, Section 3, pp. 103-115, Mar. 1999, 12 pages.
Yalcinkaya, A. et al., "Two-Axis Electromagnetic Microscanner for High Resolution Displays," Journal of Microelectromechanical Systems, vol. 15, No. 4, Aug. 2006, 9 pages.
Yan, T. et al., "mCrowd—A Platform for Mobile Crowdsourcing," 7th ACM Conference on Embedded Networked Sensor Systems, pp. 347-348, Nov. 4, 2009, 2 pages.
Zhai, S., "Text Input, Laws of Action, and Eye-Tracking Based Interaction," Distinguished Lecture Series on the Future of Human-Computer Interaction, Oregon Health & Sciences University, Feb. 28, 2003, 31 pages.
Zhang, R. et al., "Design of a Polarized Head-Mounted Projection Display Using Ferroelectric Liquid-Crystal-on-Silicon Microdisplays," Applied Optics, vol. 47, No. 15, pp. 2888-2896, May 15, 2008, 9 pages.
Zieniewicz, M. et al., "The Evolution of Army Wearable Computers," IEEE Pervasive Computing, vol. 1, No. 4, pp. 30-40, Oct. 2002, 11 pages.
Ellwood, Jr., Sutherland Cook, "System, Method, and Computer Program Product for Magneto-Optic Device Display" U.S. Appl. No. 60/554,591, filed Feb. 12, 2004, 199 pages.
Border, John N. et al., "See-Through Near-to-Eye Display with Integrated Imager for Simultaneous Scene Viewing Projected Content Viewing, and User Gesture Tracking," U.S. Appl. No. 13/590,592, filed Aug. 21, 2012, 473 pages (Submitted in Two Parts).
Border, John N. et al., "Dual Beamsplitter Frontlight for a See-Through Near-to-Eye Display," U.S. Appl. No. 13/591,127, filed Aug. 21, 2012, 478 pages (Submitted in Two Parts).
Border, John N. et al., "Position Adjustment About a Vertical Axis of a Display of an Optical Assembly in a See-Through Near-to-Eye Display," U.S. Appl. No. 13/591,155, filed Aug. 21, 2012, 475 pages (Submitted in Two Parts).
Border, John N. et al., "See-Through Near-to-Eye Display with Camera In-Line with the Optical Train," U.S. Appl. No. 13/591,187, filed Aug. 21, 2012, 475 pages (Submitted in Two Parts).
Osterhout, Ralph F. et al., "RF Shielding of an Augmented Reality Device," U.S. Appl. No. 13/591,148, filed Aug. 21, 2012, 473 pages (Submitted in Three Parts).
Osterhout, Ralph F. et al., "Marker Location in a Virtual Reality Eyepiece," U.S. Appl. No. 13/591,154, filed Aug. 21, 2012, 473 pages (Submitted in Two Parts).
Osterhout, Ralph F. et al., "A See-Through Near-to-Eye Display Adapted to Function in a Retail Environment," U.S. Appl. No. 13/591,158, filed Aug. 21, 2012, 474 pages (Submitted in Two Parts).
Osterhout, Ralph F. et al., "A See-Through Near-to-Eye Display Adapted to Function in an Education Environment," U.S. Appl. No. 13/591,161, filed Aug. 21, 2012, 474 pages (Submitted in Two Parts).
Osterhout, Ralph F. et al., "A See-Through Near-to-Eye Display Adapted to Function in a Transportation Environment," U.S. Appl. No. 13/591,164, filed Aug. 21, 2012, 474 pages (Submitted in Two Parts).
Osterhout, Ralph F. et al., "A See-Through Near-to-Eye Display Adapted to Function in a Home Environment," U.S. Appl. No. 13/591,169, filed Aug. 21, 2012, 474 pages (Submitted in Two Parts).
Osterhout, Ralph F. et al., "A See-Through Near-to-Eye Display Adapted to Function in an Event Environment," U.S. Appl. No. 13/591,173, filed Aug. 21, 2012, 474 pages (Submitted in Two Parts).
Osterhout, Ralph F. et al., "A See-Through Near-to-Eye Display Adapted to Function in a Drinking/Eating Environment with Display Locking on a Feature of the Environment," U.S. Appl. No. 13/591,176, filed Aug. 21, 2012, 474 pages (Submitted in Two Parts).
Osterhout, Ralph F. et al., "A See-Through Near-to-Eye Display Adapted to Function in an Outdoors Environment," U.S. Appl. No. 13/591,180, filed Aug. 21, 2012, 474 pages (Submitted in Two Parts).
Osterhout, Ralph F. et al., "A See-Through Near-to-Eye Display Adapted to Function in an Exercise Environment," U.S. Appl. No. 13/591,185, filed Aug. 21, 2012, 474 pages (Submitted in Three Parts).
United States Patent and Trademark Office, Office Action Issued in U.S. Appl. No. 13/429,644, dated Nov. 4, 2014, 7 pages.
United States Patent and Trademark Office, Office Action Issued in U.S. Appl. No. 13/342,954, dated Nov. 4, 2014, 17 Pages.

(56) References Cited

OTHER PUBLICATIONS

United States Patent and Trademark Office, Office Action Issued in U.S. Appl. No. 13/342,957, dated Nov. 20, 2014, 19 Pages.
United States Patent and Trademark Office, Office Action Issued in U.S. Appl. No. 13/342,962, dated Nov. 6, 2014, 12 Pages.
United States Patent and Trademark Office, Office Action Issued in U.S. Appl. No. 13/357,815, dated Nov. 5, 2014, 13 Pages.
United States Patent and Trademark Office, Office Action Issued in U.S. Appl. No. 13/049,868, dated Dec. 3, 2014, 19 Pages.
United States Patent and Trademark Office, Office Action Issued in U.S. Appl. No. 13/232,930, dated Dec. 8, 2014, 12 Pages.
Starner, Thad et al., "Augmented Reality Through Wearable Computing", MIT Media Laboratory Perceptual Computing Section Technical Report, vol. 397, Jan. 1, 1997, 9 pages.
ISA European Patent Office, International Search Report and Written Opinion for Patent Application No. PCT/US2011/026558, dated Aug. 11, 2011, 11 pages.
ISA European Patent Office, International Search Report and Written Opinion for Patent Application No. PCT/US2011/026559, dated Aug. 11, 2011, 11 pages.
ISA European Patent Office, International Search Report and Written Opinion for Patent Application No. PCT/US2011/051650, dated Jul. 11, 2012, 23 pages.
ISA Korean Intellectual Property Office, International Search Report and Written Opinion for Patent Application No. PCT/US2012/022492, dated Jul. 30, 2012, 10 pages.
ISA Korean Intellectual Property Office, International Search Report and Written Opinion for Patent Application No. PCT/US2012/022568, dated Oct. 31, 2012, 9 pages.
ISA Korean Intellectual Property Office, International Search Report and Written Opinion for Patent Application No. PCT/US2012/057387, dated Mar. 29, 2013, 11 pages.
Android Muzikant, "Automate It goes Pro", available at: http://muzikant-android.blogspot.com/2011/05/automateit-goes-pro.html, May 31, 2011, 14 pages.
Miniature Guided Light Array Sequential Scanning Display for Head Mounted Displays, U.S. Army CECOM, May 15, 1998, 35 pages.
Virtual Hand for CATIA V5, Cyber Glove Systems, 2003, 2 pages.
Aggarwal et al., "Integrating Sensors and Social Networks", Social Network Data Analytics, Chapter 14, Mar. 2011, pp. 379-412.
Buchmann, Volkert, "Road Stakeout in Wearable Outdoor Augmented Reality", A thesis submitted in partial fulfilment of the requirements for the Degree of Doctor of Philosophy in the University of Canterbury, 2008, 203 pages.
Cakmakci et al., "Head-Worn Displays: A Review", Journal of display technology, vol. 2, No. 3, IEEE, Sep. 2006, pp. 199-216.
Choi et al., "Intelligent Wearable Assistance System for Communicating with Interactive Electronic Media", ICAT 2003, Dec. 3-5, 2003, 6 pages.
Demirbas et al., "Crowd-Sourced Sensing and Collaboration Using Twitter", 2010 IEEE International Symposium on a World of Wireless, Mobile, and Multimedia Networks, Jun. 14, 2010, 9 pages.
Dorfmuller-Ulhaas et al., "Finger tracking for interaction in augmented environments", Proceedings. IEEE and ACM International Symposium on Augmented Reality, 2001, 10 pages.
Esfahbod, Behdad, "Preload—An Adaptive Prefetching Daemon", A thesis submitted in conformity with the requirements for the degree of Master of Science Graduate Department of Computer Science, University of Toronto, 2006, 81 pages.
Gafurov et al., "Biometric Gait Authentication Using Accelerometer Sensor", Journal of Computers, vol. 1, No. 7, Oct./Nov. 2006, pp. 51-59.
Haase et al., "AR Binocular: Augmented Reality System for nautical navigation", Lecture Notes in Informatics Series (LNI), Workshop on Mobile and Embedded Interactive Systems, 2008, pp. 295-300.

Joo et al., "FAST: Quick Application Launch on Solid-State Drives", Proceedings of 9th USENIX Conf. on file and storage technologies, 2011, 14 pages.
Juang et al., "Use of Eye Movement Gestures for Web Browsing", 2005, 7 pages.
Keukelaere et al., "MPEG-21 Session Mobility on Mobile Devices", Multimedia Lab, Department of Electronics and Information Systems, Jun. 2005, 7 pages.
Liarokapis et al., "Multimodal augmented reality tangible gaming", The Visual Computer (1432-2315). vol. 25, Iss.12., Aug. 27, 2009, pp. 1109-1120.
Liu et al., "A Robust Hand Tracking for Gesture-Based Interaction of Wearable Computers", Eighth International Symposium on Wearable Computers, 2004. ISWC 2004, Oct.-Nov. 2004, 8 pages.
Maeda et al., "Tracking of User Position and Orientation by Stereo Measurement of Infrared Markers and Orientation Sensing", Eighth IEEE International Symposium on Wearable Computers, Oct.-Nov. 2004, 8 pages.
Más et al., "IPTV Session Mobility", IEEE Xplore, Jun. 12, 2009, 7 pages.
Miluzzo et al., "CenceMe—Injecting Sensing Presence into Social Networking Applications", EuroSSC 2007, LNCS 4793, Oct. 23-25, 2007, 28 pages.
Mukawa et al., "A Full Color Eyewear Display using Holographic Planar Waveguides", SID Symposium Digest of Technical Papers, vol. 39, Iss. 1, May 2008, pp. 89-92.
Murph, Darren, "WPI students create wireless 3D ring mouse", www.engadget.com, May 21, 2007, 6 pages.
Nelson et al., "Tracking Objects using Recognition", Technical Report 765, University of Rochester, Computer Science Department, Feb. 2002, 15 pages.
Nölker et al., "Detection of Fingertips in Human Hand Movement Sequences", Proceedings of the International Gesture Workshop, 2007, pp. 209-218.
Ong et al., "Markerless Augmented Reality Using a Robust Point Transferring Method", Lecture Notes in Computer Science, vol. 4352, Jul. 7, 2007, pp. 258-268.
Pamplona et al., "The Image Based Data Glove", Proceeding of the 10th Symposium on Virtual and Augmented Reality, SVR, 2008, 8 pages.
International Application Serial No. PCT/US2012/22492, International Search Report and Written Opinion dated Jul. 30, 2012, 7 pages.
International Application Serial No. PCT/US2011/026558, International Preliminary Report on Patentability dated Sep. 3, 2012, 6 pages.
International Application Serial No. PCT/US2011/026559, International Preliminary Report on Patentability dated Sep. 13, 2012, 6 pages.
International Application Serial No. PCT/US2011/051650, International Search Report and Written Opinion dated Jul. 11, 2012, 23 pages.
International Application Serial No. PCT/US2012/022568, International Search Report and Written Opinion dated Oct. 31, 2012, 9 pages.
Purdy, Kevin, "Install Speech Macros in Vista", http://lifehacker.com/397701/install-speech-macros-in-vista, (accessed online Jun. 27, 2012), Jul. 2, 2008, 1 page.
Spitzer et al., "Eyeglass-Based Systems for Wearable Computing", Digest of Papers, First Int'l Symposium on Wearable Computers, Oct. 13-14, 1997, pp. 48-51.
Starner et al., "Computer Vision-Based Gesture Tracking, Object Tracking, and 3D Reconstruction for Augmented Desks", The perceptive workbench, Machine Vision and Applications, 2003, vol. 14, No. 1, 2003, pp. 1-13.
Starner et al., "Real-Time American Sign Language Recognition Using Desk and Wearable Computer Based Video", IEEE Transactions on Pattern Analysis and Machine Intelligence, vol. 20, No. 12, Dec. 1998, pp. 1-7.
Störring et al., "Computer Vision-Based Gesture Recognition for an Augmented Reality Interface", in 4th IASTED International Conference on Visualization, Imaging, and Image Processing, Sep. 2004, pp. 1-6.

(56) References Cited

OTHER PUBLICATIONS

Sturman et al., "A Survey of Glove-Based Input", IEEE Computer Graphics and Applications, Jan. 1994, pp. 30-39.
Takahashi et al., "Polymeric Waveguide Design of a 2D display system", Health Monitoring and Smart Nondestructive Evaluation of Structural and Biological Systems V, Proc. of SPIE, vol. 6177, 617719, Feb. 27, 2006, 9 pages.
Tan et al., "A Haptic Back Display for Attentional and Directional Cueing", http://www.haptics-e.org, vol. 3, No. 1, Haptics-e, Jun. 11, 2003, pp. 1-20.
Tanenbaum, Andrew, "Structured Computer Organization", Prentice-Hall Inc., second edition, 1984, pp. 10-12.
Wang et al., "Target Classification and Localization in Habitat Monitoring", Proceedings of the 2003 IEEE International Conference on Acoustics, Speech, and Signal Processing (Apr. 2003.) Retrieved from the Internet on Jun. 29, 2012 (http://citeseerx.ist.psu.edu/viewdoc/download?doi=10.1.1.82.1027&rep=rep-1&type=pdf, Apr. 2003, 4 pages.
Williams et al., "Physical Presence: Palettes in Virtual Spaces", Proc. of the 3d Annual Immersive Proj. Tech. Workshop, 1999, 11 pages.
Wu et al., "Vision-Based Gesture Recognition: A Review", Lecture Notes in Computer Science, Gesture Workshop, Jan. 1, 1999, 12 pages.
Yan et al., "mCrowd—A Platform for Mobile Crowdsourcing", Proceedings of the 7th ACM Conference on Embedded Networked Sensor Systems, Nov. 4-6, 2009, 2 pages.
Zhai, Shumin, "Samples of User Interface Research: Text Input, Laws of Movement, and Eye-Tracking Based Interaction, Department of Computer and Information Science", Linkoping University, Linkoping, Sweden, Sep. 18, 2002, 31 pages.
Zieniewicz, Matthew J., "The Evolution of Army Wearable Computers", Pervasive Computing, IEEE, vol. 1, No. 4, Oct./Dec. 2002, pp. 30-40.
Takahisa, Ando et al., Head Mounted Display using holographic optical element, vol. 3293, Date, pp. 183-189, SPIE.
BAE systems, The Q-Sight family of helmet display products, Electronics and integrated solutions, Oct. 2007, 4 pgs., BAE Systems. Place unknown.
Takahisa, Ando, et al., Head Mounted Display for Mixed Reality using Holographic Optical Elements, p. 1-6, vol. 40 Sep. 30, 1999, Mem. Fac. Eng., Osaka City Univ.
Aye et al., Compact HMD optics based on multiplexed aberration compensated holographic optical elements, pp. 1-9, 2001, Proceedings of SPIE vol. 4361, SPIE.
Starner et al., Augmented Reality Through Wearable Computing, MIT Media Laboratory Perceptual Computing Section Technical report No. 397 to Appear: Presence, Special issue on Augmented Reality, 1997, 9 pgs.
R. A. Buchroeder et al., Design of a Catadioptric VCASS Helmet-Mounted Display, Nov. 1981, 73 Pgs, Air Force Aersopace medical Research Laboratory, Wright-Patterson Air Force base, Ohio.
Missig, Michael D., Diffractive Optics Applied to Eyepiece Design, Submitted in Partial Fulfillment of the Requirements for the Degree of Master of Science, Institute of Optics The College School of Engineering and Applied Sciences, The university if Rochester, Rochester, NY, 1994, 148 Pgs.
Lantz, Ed, Future Directions in Visual Display Systems, Spitz, Inc., Chadds Ford, PA 19317, May 1997, 16 pgs, Published in Computer Graphics, pp. 38-42, May 1997.
Woods, Russell L. et al., The impact of non-immersive head-mounted displays (HMDs) on the visual field, Journal of the Society for Information Display, Nov. 1, 2003, pp. 191-198, 1-71-0922/03/1101-0191, Revised version of a paper presented at the 2002 SID international Symposium, Seminar and Exhibition May 23, 2002 Boston, MA.
Rolland, Jannick, Head-Mounted Display Systems, Encyclopedia of Optical Engineering 2005, pp. 1-14, DOI: 10.1081/E-EOE-120009801, Taylor & Francis.

Pansing, Craig, W. et al., Optimization of illumination schemes in a head-mounted display integrated with eye tracking capabilities, Novel Optical Systems Design and Optimization VIII, Proceedings of SPIE, 2005, 13 pgs. vol. 587501, SPIE, Bellingham, WA.
Hilton, P.J., Ultra-wide FOV Retinal Display, Physics Applications Ltd, P.O. Box 56, Diamond Harbour, Christchurch, New Zealand, Date believed to be 2005, 4 pgs.
Yalcinkaya, Arda D. et al., Two-Axis Electromagnetic Microscanner for High Resolution Displays, Journal of Microelectromechanical Systems, Aug. 2006, pp. 786-794, vol. 15, No. 4.
Rui Zhang, Hong Hua, Design of a polarized head-mounted projection display using FLCOS microdisplays, Projection Displays XII Proc. of SPIE, 2007, 10 pgs, vol. 6489, 64890B.
Woodward, Ollie, et al., A Full-Color SXGA TON AMLCD for Military Head-Mounted Displays and Viewer Applications, Head- and Helmet-Mounted Displays XIII: Design and Applications, Proc. of SPIE, 2008, 10 pgs, vol. 6955, 69550B.
Liu, Sheng, et al., An Optical See-Through Head Mounted Display with Addressable Focal Planes, IEEE International Symposium on Mixed and Augmented Reality, 2008, Sep. 15-18, pp. 33-43, 7978-1-4244-2859-5/08, Cambridge, UK.
Ferrin, Frank J., An update on optical systems for military head mounted displays, Honeywell Inc. Sensor and Guidance Products, Part of the SPIE Conference on Helmet and Head mounted Displays IV, Apr. 1999, pp. 178-185, SPIE vol. 3689, 0277-786X/99, 8 pgs, Orlando, FL.
Ronald Azuma et al., Recent Advances in Augmented Reality, IEEE Computer Graphics and Applications, Nov./Dec. 2001, pp. 34-47, 0272-1716/01.
Hong Hua et al., Design of a bright polarized head-mounted projection display, Applied Optics, pp. 2601-2610, vol. 46, No. 14, May 10, 2007, published Apr. 23, 2007, Optical Society of America.
Dewen Cheng et al., Design of an optical see-through head-mounted display with a low f-number and large filed of view using a freeform prism, Optical Society of America May 10, 2009, pp. 2655-2688, vol. 48 No. 14, Applied Optics, Published May 5, 2009.
Related U.S. Appl. No. 13/049,861.
William J Hossack, et al., High-speed holographic optical tweezers using a ferroelectric liquid crystal microdisplay, Aug. 25, 2003, Optics Express pp. 2053-2059, vol. 11, No. 17, Optical Society of America.
Richard S. Johnston, et al., Development of a commercial retinal scanning display, Society of Photo-Optical Instrumentation Engineers, 1995, 12 pgs.
Ihor Wacyk, et al., Low Power SXGA Active Matrix OLED, Head and helmet mouted Displays XIV: Design and Applications, Proc. of SPIE 2009, 11 pgs, vol. 7326, 73260E.
Hulya Demiryont et al., Solid-State Monolithic Electrochromic Switchable Visors and Spectacles, Head and Helmet Mounted Displays XVV: Design and Applications, Proc. of SPIE, 2009, 8 pgs., vol. 73260K.
Alex Cameron, The Application of Holographic Optical Waveguide Technology to Q-Sight Family of Helmet Mounted Displays, Head and Helmet-Mounted Displays XIV: Design and Applications, Proc of SPIE vol. 7326, 73260H, Presented at the SPIE Head and Helmet-Mounted Displays XIV conference BAE Systems, 2009, 11 pgs.
International Searching Authority, International Search Report for International Application No. PCT/US2011/026558, dated Aug. 11, 2011, 4 pgs.
International Searching Authority, International Search Report for International Application No. PCT/US2011/026559, dated Aug. 11, 2011, 4 pgs.
Related U.S. Appl. No. 13/232,930.
Rolland, Jannick et al., Head-worn Displays: The Future Through New Eyes, OPN Apr. 2009, 8 pages.
Rolland-Thompson, Kevin and Jannick et al., The Coming Generation of Head-worn Displays (HWDs), Optical Society of America (OSA), 2009, 40 pages.
Tuceryan and Navab, Single Point active alignment method (SPAAM) for optical see-through HMD calibration for AR, Proc. of the IEEE and ACM Int'l Symposium on Augmented Reality, Munich, Oct. 2000, 10 pages.

(56) References Cited

OTHER PUBLICATIONS

Genc, Tuceryan and Navab, Practical Solutions for Calibration of Optical See-Through Devices, Proc. of Int'l Symposium on Mixed and Augmented Reality 200 (ISMAR '02), 9 pages.
"Augmented Reality—Will AR Replace Household Electronic Appliances?!," Nikkei Electronics, Sep. 2009, 17 pages (See p. 1, explanation of relevance).
Japanese Patent Office, Office Action Issued in Japanese Patent Application No. 2012-556146, dated Mar. 26, 2015, 9 pages.
IPEA European Patent Office, International Preliminary Report on Patentability Issued in International Application No. PCT/US2014/033623, dated May 28, 2015, WIPO, 21 pages.
State Intellectual Property Office of the People's Republic of China, First Office Action Issued in Chinese Patent Application No. 201280046955.X, dated Aug. 14, 2015, 12 pages.
Taylor, Mary E. et al., "Methods and Arrangements Employing Sensor-Equipped Smart Phones," U.S. Appl. No. 61/291,812, filed Dec. 31, 2009, 13 pages.
The Authoritative Dictionary of IEEE Standards Terms, 7th ed. IEEE Press, 2000. Chapter C, pp. 133-265.
State Intellectual Property Office of the People's Republic of China, Second Office Action Issued in Application No. 201280046955.X, dated Apr. 14, 2016, 6 pages.
ISA European Patent Office, International Search Report and Written Opinion Issued in Application No. PCT/US2011/026558, dated Aug. 11, 2011, WIPO, 8 pages.
ISA European Patent Office, International Search Report and Written Opinion Issued in Application No. PCT/US2011/026559, dated Aug. 11, 2011, WIPO, 8 pages.
ISA European Patent Office, International Search Report and Written Opinion Issued in Application No. PCT/US2011/051650, dated May 22, 2012, WIPO, 16 pages.
ISA European Patent Office, International Search Report and Written Opinion Issued in Application No. PCT/US2012/022492, dated Jul. 30, 2012, WIPO, 8 pages.
International Bureau of WIPO, International Preliminary Report on Patentability Issued in Application No. PCT/US2011/026558, dated Sep. 13, 2012, 6 pages.
International Bureau of WIPO, International Preliminary Report on Patentability Issued in Application No. PCT/US2011/026559, dated Sep. 13, 2012, 6 pages.
ISA European Patent Office, International Search Report and Written Opinion Issued in Application No. PCT/US2012/022568, dated Oct. 31, 2012, WIPO, 7 pages.
International Bureau of WIPO, International Preliminary Report on Patentability Issued in Application No. PCT/US2011/051650, dated Mar. 28, 2013, 11 pages.
ISA European Patent Office, International Search Report and Written Opinion Issued in Application No. PCT/US2012/057387, dated Mar. 29, 2013, WIPO, 9 pages.
United States Patent and Trademark Office, Office Action Issued in U.S. Appl. No. 13/627,930, dated Dec. 11, 2013, 7 pages.
European Patent Office, Supplementary European Search Report Issued in Application No. 12837262.0, dated Jun. 24, 2014, 2 pages.
United States Patent and Trademark Office, Notice of Allowance Issued in U.S. Appl. No. 13/627,930, dated Jun. 26, 2014, 9 pages.
ISA European Patent Office, International Search Report and Written Opinion Issued in Application No. PCT/US2014/033623, dated Jul. 4, 2014, WIPO, 12 pages.
European Patent Office, European Examination Report Issued in Application No. 12837262.0, dated Aug. 15, 2014, 7 pages.
United States Patent and Trademark Office, Office Action Issued in U.S. Appl. No. 13/341,779, dated Aug. 27, 2014, 14 pages.
United States Patent and Trademark Office, Office Action Issued in U.S. Appl. No. 13/358,229, dated Aug. 29, 2014, 9 pages.
United States Patent and Trademark Office, Office Action Issued in U.S. Appl. No. 13/049,814, dated Oct. 3, 2014, 19 pages.
United States Patent and Trademark Office, Office Action Issued in U.S. Appl. No. 13/441,145, dated Oct. 14, 2014, 23 pages.
United States Patent and Trademark Office, Office Action Issued in U.S. Appl. No. 13/429,415, dated Oct. 23, 2014, 7 pages.
Japan Patent Office, Office Action Issued in Patent Application No. 2014533694, dated Oct. 3, 2016, 14 pages.
State Intellectual Property Office of the People's Republic of China, Third Office Action Issued in Patent Application No. 201280046955.X, dated Oct. 9, 2016, 6 pages.
"Merriam Webster Online Dictionary Definition of 'optical'," Merriam Webster Website, As available Apr. 10, 2010, Retrieved Dec. 22, 2016, Available Online at https://web.archive.org/web/20100410202940/http://www.merriam-webster.com/dictionary/optical, 2 pages.

\* cited by examiner

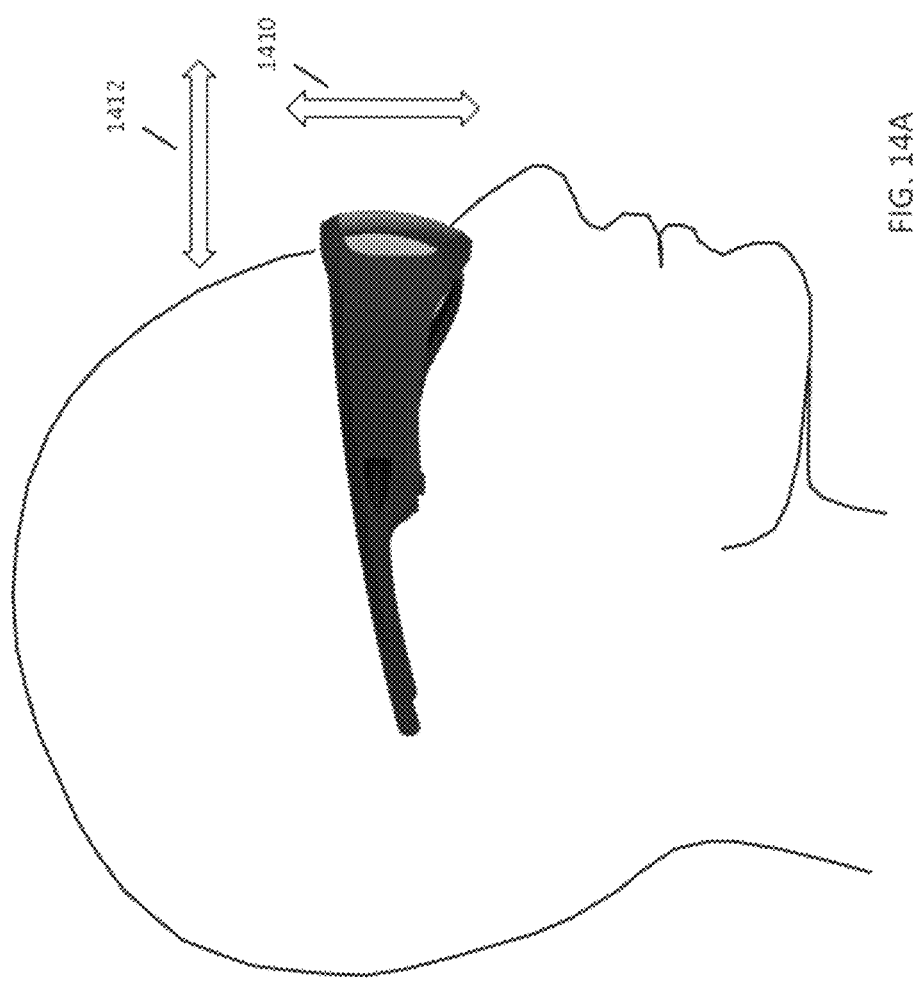

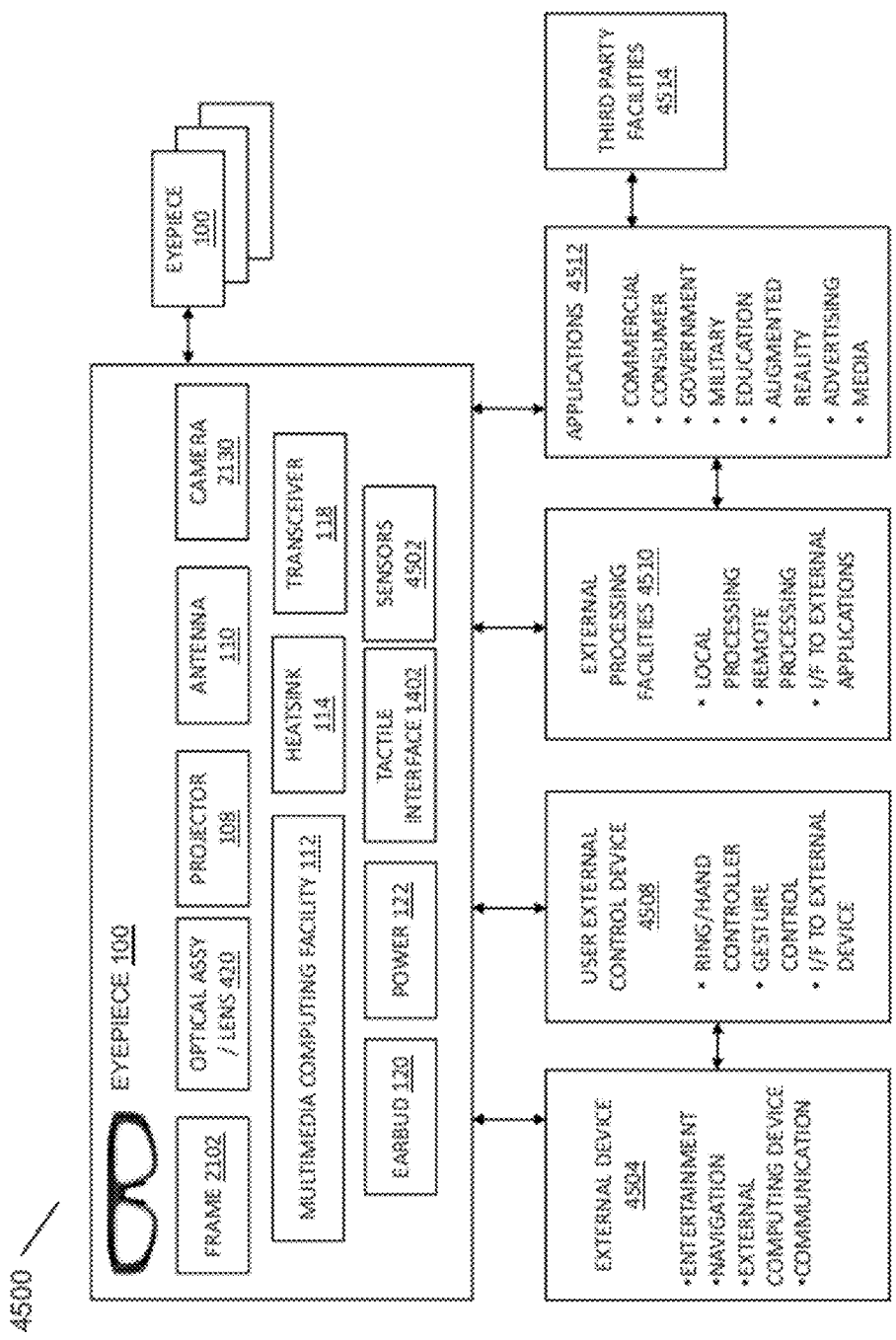

ADJUSTABLE EXTENSION FOR TEMPLE ARM

CROSS-REFERENCE TO RELATED APPLICATIONS

This application is a continuation of the following U.S. nonprovisional patent applications, each of which is incorporated herein by reference in its entirety:

U.S. patent application Ser. No. 13/037,324, filed Feb. 28, 2011 and U.S. patent application Ser. No. 13/037,335, filed Feb. 28, 2011, each of which claim the benefit of the following provisional applications, each of which is hereby incorporated herein by reference in its entirety: U.S. Provisional Patent Application 61/308,973, filed Feb. 28, 2010; U.S. Provisional Patent Application 61/373,791, filed Aug. 13, 2010; U.S. Provisional Patent Application 61/382,578, filed Sep. 14, 2010; U.S. Provisional Patent Application 61/410,983, filed Nov. 8, 2010; U.S. Provisional Patent Application 61/429,445, filed Jan. 3, 2011; and U.S. Provisional Patent Application 61/429,447, filed Jan. 3, 2011.

This application claims the benefit of the following United States provisional applications, each of which is hereby incorporated by reference in its entirety:

U.S. Provisional Patent Application 61/373,791, filed Aug. 13, 2010; U.S. Provisional Patent Application 61/382,578, filed Sep. 14, 2010; U.S. Provisional Patent Application 61/410,983, filed Nov. 8, 2010; U.S. Provisional Patent Application 61/429,445, filed Jan. 3, 2011; and U.S. Provisional Patent Application 61/429,447, filed Jan. 3, 2011.

BACKGROUND

Field

The present disclosure relates to an augmented reality eyepiece, associated control technologies, and applications for use.

SUMMARY

In one embodiment, an eyepiece may include a nano-projector (or micro-projector) comprising a light source and an LCoS display, a (two surface) freeform wave guide lens enabling TIR bounces, a coupling lens disposed between the LCoS display and the freeform waveguide, and a wedge-shaped optic (translucent correction lens) adhered to the waveguide lens that enables proper viewing through the lens whether the projector is on or off. The projector may include an RGB LED module. The RGB LED module may emit field sequential color, wherein the different colored LEDs are turned on in rapid succession to form a color image that is reflected off the LCoS display. The projector may have a polarizing beam splitter or a projection collimator.

In one embodiment, an eyepiece may include a freeform wave guide lens, a freeform translucent correction lens, a display coupling lens and a micro-projector.

In another embodiment, an eyepiece may include a freeform wave guide lens, a freeform correction lens, a display coupling lens and a micro-projector, providing a FOV of at least 80-degrees and a Virtual Display FOV (Diagonal) of ~25-30°.

In an embodiment, an eyepiece may include an optical wedge waveguide optimized to match with the ergonomic factors of the human head, allowing it to wrap around a human face.

In another embodiment, an eyepiece may include two freeform optical surfaces and waveguide to enable folding the complex optical paths within a very thin prism form factor.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly, wherein the displayed content comprises an interactive control element; and an integrated camera facility that images the surrounding environment, and identifies a user hand gesture as an interactive control element location command, wherein the location of the interactive control element remains fixed with respect to an object in the surrounding environment, in response to the interactive control element location command, regardless of a change in the viewing direction of the user.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; wherein the displayed content comprises an interactive control element; and an integrated camera facility that images a user's body part as it interacts with the interactive control element, wherein the processor removes a portion of the interactive control element by subtracting the portion of the interactive control element that is determined to be co-located with the imaged user body part based on the user's view.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly. The displayed content may comprise an interactive keyboard control element, and where the keyboard control element is associated with an input path analyzer, a word matching search facility, and a keyboard input interface. The user may input text by sliding a pointing device (e.g. a finger, a stylus, and the like) across character keys of the keyboard input interface in an sliding motion through an approximate sequence of a word the user would like to input as text, wherein the input path analyzer determines the characters contacted in the input path, the word matching facility finds a best word match to the sequence of characters contacted and inputs the best word match as input text.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; and an integrated camera facility that images an external visual cue, wherein the integrated processor identifies and interprets the external visual cue as a command to display content associated with the visual cue. The visual cue may be a sign in the surrounding environment, and where the projected content is associated with an advertisement. The sign may be a billboard, and the advertisement a personalized advertisement based on a preferences profile of the user. The visual cue may be a hand gesture, and the projected content a projected virtual keyboard. The hand gesture may be a thumb and index finger gesture from a first user hand, and the virtual keyboard projected on the palm of the first user hand, and where the user is able to type on the virtual keyboard with a second user hand. The hand gesture may be a thumb and index finger gesture combination of both user hands, and the virtual keyboard projected between the user hands as configured in the hand gesture, where the user is able to type on the virtual keyboard using the thumbs of the user's hands.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; and an integrated camera facility that images a gesture, wherein the integrated processor identifies and interprets the gesture as a command instruction. The control instruction may provide manipulation of the content for display, a command communicated to an external device, and the like.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; and a tactile control interface mounted on the eyepiece that accepts control inputs from the user through at least one of a user touching the interface and the user being proximate to the interface.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; and at least one of a plurality of head motion sensing control devices integrated with the eyepiece that provide control commands to the processor as command instructions based upon sensing a predefined head motion characteristic.

The head motion characteristic may be a nod of the user's head such that the nod is an overt motion dissimilar from ordinary head motions. The overt motion may be a jerking motion of the head. The control instructions may provide manipulation of the content for display, be communicated to control an external device, and the like.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly, wherein the optical assembly includes an electrochromic layer that provides a display characteristic adjustment that is dependent on displayed content requirements and surrounding environmental conditions. In embodiments, the display characteristic may be brightness, contrast, and the like. The surrounding environmental condition may be a level of brightness that without the display characteristic adjustment would make the displayed content difficult to visualize by the wearer of the eyepiece, where the display characteristic adjustment may be applied to an area of the optical assembly where content is being projected.

In embodiments, the eyepiece may be an interactive head-mounted eyepiece worn by a user wherein the eyepiece includes and optical assembly through which the user may view a surrounding environment and displayed content. The optical assembly may comprise a corrective element that corrects the user's view of the surrounding environment, and an integrated image source for introducing the content to the optical assembly. Further, the eyepiece may include an adjustable wrap round extendable arm comprising any shape memory material for securing the position of the eyepiece on the user's head. The extendable arm may extend from an end of an eyepiece arm. The end of a wrap around extendable arm may be covered with silicone. Further, the extendable arms may meet and secure to each other or they may independently grasp a portion of the head. In other embodiments, the extendable arm may attach to a portion of the head mounted eyepiece to secure the eyepiece to the user's head. In embodiments, the extendable arm may extend telescopically from the end of the eyepiece arm. In other embodiments, at least one of the wrap around extendable arms may be detachable from the head mounted eyepiece. Also, the extendable arm may be an add-on feature of the head mounted eyepiece.

In embodiments, the eyepiece may be an interactive head-mounted eyepiece worn by a user wherein the eyepiece includes and optical assembly through which the user may view a surrounding environment and displayed content. The optical assembly may comprise a corrective element that corrects the user's view of the surrounding environment, and an integrated image source for introducing the content to the optical assembly. Further, the displayed content may comprise a local advertisement wherein the location of the eyepiece is determined by an integrated location sensor. Also, the local advertisement may have relevance to the location of the eyepiece. In other embodiments, the eyepiece may contain a capacitive sensor capable of sensing whether the eyepiece is in contact with human skin. The local advertisement may be sent to the user based on whether the capacitive sensor senses that the eyepiece is in contact with human skin. The local advertisements may also be sent in response to the eyepiece being powered on.

In other embodiments, the local advertisement may be displayed to the user as a banner advertisement, two dimensional graphic, or text. Further, advertisement may be associated with a physical aspect of the surrounding environment. In yet other embodiments, the advertisement may be displayed as an augmented reality associated with a physical aspect of the surrounding environment. The augmented reality advertisement may be two or three-dimensional.

Further, the advertisement may be animated and it may be associated with the user's view of the surrounding environment. The local advertisements may also be displayed to the user based on a web search conducted by the user and displayed in the content of the search results. Furthermore, the content of the local advertisement may be determined based on the user's personal information. The user's personal information may be available to a web application or an advertising facility. The user's information may be used by a web application, an advertising facility or eyepiece to filter the local advertising based on the user's personal information. A local advertisement may be cashed on a server where it may be accessed by at least one of an advertising facility, web application and eyepiece and displayed to the user.

In another embodiment, the user may request additional information related to a local advertisement by making any action of an eye movement, body movement and other gesture. Furthermore, a user may ignore the local advertisement by making any an eye movement, body movement and other gesture or by not selecting the advertisement for further interaction within a given period of time from when the advertisement is displayed. In yet other embodiments, the user may select to not allow local advertisements to be displayed by selecting such an option on a graphical user interface. Alternatively, the user may not allow such advertisements by tuning such feature off via a control on said eyepiece.

In one embodiment, the eyepiece may include an audio device. Further, the displayed content may comprise a local advertisement and audio. The location of the eyepiece may be determined by an integrated location sensor and the local advertisement and audio may have a relevance to the location of the eyepiece. As such, a user may hear audio that corresponds to the displayed content and local advertisements.

In an aspect, the interactive head-mounted eyepiece may include an optical assembly, through which the user views a surrounding environment and displayed content, wherein the optical assembly includes a corrective element that corrects the user's view of the surrounding environment and an optical waveguide with a first and a second surface enabling total internal reflections. The eyepiece may also include an integrated processor for handling content for display to the user, and an integrated image source for introducing the content to the optical assembly. In this aspect, displayed content may be introduced into the optical waveguide at an angle of internal incidence that does not result in total internal reflection. However, the eyepiece also includes a mirrored surface on the first surface of the optical waveguide to reflect the displayed content towards the second surface of the optical waveguide. Thus, the mirrored surface enables a total reflection of the light entering the optical waveguide or a reflection of at least a portion of the light entering the optical waveguide. In embodiments, the surface may be 100% mirrored or mirrored to a lower percentage. In some embodiments, in place of a mirrored surface, an air gap between the waveguide and the corrective element may cause a reflection of the light that enters the waveguide at an angle of incidence that would not result in TIR.

In one aspect, the interactive head-mounted eyepiece may include an optical assembly, through which the user views a surrounding environment and displayed content, wherein the optical assembly includes a corrective element that corrects the user's view of the surrounding environment and an integrated processor for handling content for display to the user. The eyepiece further includes an integrated image source that introduces the content to the optical assembly from a side of the optical waveguide adjacent to an arm of the eyepiece, wherein the displayed content aspect ratio is between approximately square to approximately rectangular with the long axis approximately horizontal.

In an, the interactive head-mounted eyepiece includes an optical assembly through which a user views a surrounding environment and displayed content, wherein the optical assembly includes a corrective element that corrects the user's view of the surrounding environment, a freeform optical waveguide enabling internal reflections, and a coupling lens positioned to direct an image from an LCoS display to the optical waveguide. The eyepiece further includes an integrated processor for handling content for display to the user and an integrated projector facility for projecting the content to the optical assembly, wherein the projector facility comprises a light source and the LCoS display, wherein light from the light source is emitted under control of the processor and traverses a polarizing beam splitter where it is polarized before being reflected off the LCoS display and into the optical waveguide. In another aspect, the interactive head-mounted eyepiece, includes an optical assembly through which a user views a surrounding environment and displayed content, wherein the optical assembly includes a corrective element that corrects the user's view of the surrounding environment, an optical waveguide enabling internal reflections, and a coupling lens positioned to direct an image from an optical display to the optical waveguide. The eyepiece further includes an integrated processor for handling content for display to the user, and an integrated image source for introducing the content to the optical assembly, wherein the image source comprises a light source and the optical display. The corrective element may be a see-through correction lens attached to the optical waveguide that enables proper viewing of the surrounding environment whether the image source or projector facility is on or off. The freeform optical waveguide may include dual freeform surfaces that enable a curvature and a sizing of the waveguide, wherein the curvature and the sizing enable placement of the waveguide in a frame of the interactive head-mounted eyepiece. The light source may be an RGB LED module that emits light sequentially to form a color image that is reflected off the optical or LCoS display. The eyepiece may further include a homogenizer through which light from the light source is propagated to ensure that the beam of light is uniform. A surface of the polarizing beam splitter reflects the color image from the optical or LCoS display into the optical waveguide. The eyepiece may further include a collimator that improves the resolution of the light entering the optical waveguide. Light from the light source may be emitted under control of the processor and traverse a polarizing beam splitter where it is polarized before being reflected off the optical display and into the optical waveguide. The optical display may be at least one of an LCoS and an LCD display. The image source may be a projector, and wherein the projector is at least one of a microprojector, a nanoprojector, and a picoprojector. The eyepiece further includes a polarizing beam splitter that polarizes light from the light source before being reflected off the LCoS display and into the optical waveguide, wherein a surface of the polarizing beam splitter reflects the color image from the LCoS display into the optical waveguide.

In an embodiment, an apparatus for biometric data capture is provided. Biometric data may be visual biometric data, such as facial biometric data or iris biometric data, or may be audio biometric data. The apparatus includes an optical assembly through which a user views a surrounding environment and displayed content. The optical assembly also includes a corrective element that corrects the user's view of the surrounding environment. An integrated processor handles content for display to the user on the eyepiece. The eyepiece also incorporates an integrated image source for introducing the content to the optical assembly. Biometric data capture is accomplished with an integrated optical sensor assembly. Audio data capture is accomplished with an integrated endfire microphone array. Processing of the captured biometric data occurs remotely and data is transmitted using an integrated communications facility. A remote computing facility interprets and analyzes the captured biometric data, generates display content based on the captured biometric data, and delivers the display content to the eyepiece.

A further embodiment provides a camera mounted on the eyepiece for obtaining biometric images of an individual proximate to the eyepiece.

A yet further embodiment provides a method for biometric data capture. In the method an individual is placed proximate to the eyepiece. This may be accomplished by the wearer of the eyepiece moving into a position that permits the capture of the desired biometric data. Once positioned, the eyepiece captures biometric data and transmits the captured biometric data to a facility that stores the captured biometric data in a biometric data database. The biometric data database incorporates a remote computing facility that interprets the received data and generates display content based on the interpretation of the captured biometric data. This display content is then transmitted back to the user for display on the eyepiece.

A yet further embodiment provides a method for audio biometric data capture. In the method an individual is placed proximate to the eyepiece. This may be accomplished by the wearer of the eyepiece moving into a position that permits the capture of the desired audio biometric data. Once positioned, the microphone array captures audio biometric data and transmits the captured audio biometric data to a facility that stores the captured audio biometric data in a biometric data database. The audio biometric data database incorporates a remote computing facility that interprets the received data and generates display content based on the interpretation of the captured audio biometric data. This display content is then transmitted back to the user for display on the eyepiece.

In embodiments, the eyepiece includes a see-through correction lens attached to an exterior surface of the optical waveguide that enables proper viewing of the surrounding environment whether there is displayed content or not. The see-through correction lens may be a prescription lens customized to the user's corrective eyeglass prescription. The see-through correction lens may be polarized and may attach to at least one of the optical waveguide and a frame of the eyepiece, wherein the polarized correction lens blocks oppositely polarized light reflected from the user's eye. The see-through correction lens may attach to at least one of the optical waveguide and a frame of the eyepiece, wherein the correction lens protects the optical waveguide, and may include at least one of a ballistic material and an ANSI-certified polycarbonate material.

In one embodiment, an interactive head-mounted eyepiece includes an eyepiece for wearing by a user, an optical assembly mounted on the eyepiece through which the user views a surrounding environment and a displayed content, wherein the optical assembly comprises a corrective element that corrects the user's view of the environment, an integrated processor for handling content for display to the user, an integrated image source for introducing the content to the optical assembly, and an electrically adjustable lens integrated with the optical assembly that adjusts a focus of the displayed content for the user.

One embodiment concerns an interactive head-mounted eyepiece. This interactive head-mounted eyepiece includes an eyepiece for wearing by a user, an optical assembly mounted on the eyepiece through which the user views a surrounding environment and a displayed content, wherein the optical assembly comprises a corrective element that corrects a user's view of the surrounding environment, and an integrated processor of the interactive head-mounted eyepiece for handling content for display to the user. The interactive head-mounted eyepiece also includes an electrically adjustable liquid lens integrated with the optical assembly, an integrated image source of the interactive head-mounted eyepiece for introducing the content to the optical assembly, and a memory operably connected with the integrated processor, the memory including at least one software program for providing a correction for the displayed content by adjusting the electrically adjustable liquid lens.

Another embodiment is an interactive head-mounted eyepiece for wearing by a user. The interactive head-mounted eyepiece includes an optical assembly mounted on the eyepiece through which the user views a surrounding environment and a displayed content, wherein the optical assembly comprises a corrective element that corrects the user's view of the displayed content, and an integrated processor for handling content for display to the user. The interactive head-mounted eyepiece also includes an integrated image source for introducing the content to the optical assembly, an electrically adjustable liquid lens integrated with the optical assembly that adjusts a focus of the displayed content for the user, and at least one sensor mounted on the interactive head-mounted eyepiece, wherein an output from the at least one sensor is used to stabilize the displayed content of the optical assembly of the interactive head mounted eyepiece using at least one of optical stabilization and image stabilization.

One embodiment is a method for stabilizing images. The method includes steps of providing an interactive head-mounted eyepiece including a camera and an optical assembly through which a user views a surrounding environment and displayed content, and imaging the surrounding environment with the camera to capture an image of an object in the surrounding environment. The method also includes steps of displaying, through the optical assembly, the content at a fixed location with respect to the user's view of the imaged object, sensing vibration and movement of the eyepiece, and stabilizing the displayed content with respect to the user's view of the surrounding environment via at least one digital technique.

Another embodiment is a method for stabilizing images. The method includes steps of providing an interactive head-mounted eyepiece including a camera and an optical assembly through which a user views a surrounding environment and displayed content, the assembly also comprising a processor for handling content for display to the user and an integrated projector for projecting the content to the optical assembly, and imaging the surrounding environment with the camera to capture an image of an object in the surrounding environment. The method also includes steps of displaying, through the optical assembly, the content at a fixed location with respect to the user's view of the imaged object, sensing vibration and movement of the eyepiece, and stabilizing the displayed content with respect to the user's view of the surrounding environment via at least one digital technique.

One embodiment is a method for stabilizing images. The method includes steps of providing an interactive, head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user and an integrated image source for introducing the content to the optical assembly, and imaging the surrounding environment with a camera to capture an image of an object in the surrounding environment. The method also includes steps of displaying, through the optical assembly, the content at a fixed location with respect to the user's view of the imaged object, sensing vibration and movement of the eyepiece, sending signals indicative of the vibration and movement of the eyepiece to the integrated processor of the interactive head-mounted device, and stabilizing the displayed content with respect to the user's view of the environment via at least one digital technique.

Another embodiment is an interactive head-mounted eyepiece. The interactive head-mounted eyepiece includes an eyepiece for wearing by a user, an optical assembly mounted on the eyepiece through which the user views a surrounding environment and a displayed content, and a corrective element mounted on the eyepiece that corrects the user's view of the surrounding environment. The interactive, head-mounted eyepiece also includes an integrated processor for handling content for display to the user, an integrated image source for introducing the content to the optical assembly, and at least one sensor mounted on the camera or the eyepiece, wherein an output from the at least one sensor is used to stabilize the displayed content of the optical assembly of the interactive head mounted eyepiece using at least one digital technique.

One embodiment is an interactive head-mounted eyepiece. The interactive head-mounted eyepiece includes an interactive head-mounted eyepiece for wearing by a user, an optical assembly mounted on the eyepiece through which the user views a surrounding environment and a displayed content, and an integrated processor of the eyepiece for handling content for display to the user. The interactive head-mounted eyepiece also includes an integrated image source of the eyepiece for introducing the content to the optical assembly, and at least one sensor mounted on the interactive head-mounted eyepiece, wherein an output from the at least one sensor is used to stabilize the displayed content of the optical assembly of the interactive head mounted eyepiece using at least one of optical stabilization and image stabilization.

Another embodiment is an interactive head-mounted eyepiece. The interactive head-mounted eyepiece includes an eyepiece for wearing by a user, an optical assembly mounted on the eyepiece through which the user views a surrounding environment and a displayed content and an integrated processor for handling content for display to the user. The interactive head-mounted eyepiece also includes an integrated image source for introducing the content to the optical assembly, an electro-optic lens in series between the integrated image source and the optical assembly for stabilizing content for display to the user, and at least one sensor mounted on the eyepiece or a mount for the eyepiece, wherein an output from the at least one sensor is used to stabilize the electro-optic lens of the interactive head mounted eyepiece.

Aspects disclosed herein include an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly.

The eyepiece may further include a control device worn on a hand of the user, including at least one control component actuated by a digit of a hand of the user, and providing a control command from the actuation of the at least one control component to the processor as a command instruction. The command instruction may be directed to the manipulation of content for display to the user.

The eyepiece may further include a hand motion sensing device worn on a hand of the user, and providing control commands from the motion sensing device to the processor as command instructions.

The eyepiece may further include a bi-directional optical assembly through which the user views a surrounding environment simultaneously with displayed content as transmitted through the optical assembly from an integrated image source and a processor for handling the content for display to the user and sensor information from the sensor, wherein the processor correlates the displayed content and the information from the sensor to indicate the eye's line-of-sight relative to the projected image, and uses the line-of-sight information relative to the projected image, plus a user command indication, to invoke an action.

In the eyepiece, line of sight information for the user's eye is communicated to the processor as command instructions.

The eyepiece may further include a hand motion sensing device for tracking hand gestures within a field of view of the eyepiece to provide control instructions to the eyepiece.

In an aspect, a method of social networking includes contacting a social networking website using the eyepiece, requesting information about members of the social networking website using the interactive head-mounted eyepiece, and searching for nearby members of the social networking website using the interactive head-mounted eyepiece.

In an aspect, a method of social networking includes contacting a social networking website using the eyepiece, requesting information about other members of the social networking website using the interactive head-mounted eyepiece, sending a signal indicating a location of the user of the interactive head-mounted eyepiece, and allowing access to information about the user of the interactive head-mounted eyepiece.

In an aspect, a method of social networking includes contacting a social networking website using the eyepiece, requesting information about members of the social networking website using the interactive, head-mounted eyepiece, sending a signal indicating a location and at least one preference of the user of the interactive, head-mounted eyepiece, allowing access to information on the social networking site about preferences of the user of the interactive, head-mounted eyepiece, and searching for nearby members of the social networking website using the interactive head-mounted eyepiece.

In an aspect, a method of gaming includes contacting an online gaming site using the eyepiece, initiating or joining a game of the online gaming site using the interactive head-mounted eyepiece, viewing the game through the optical assembly of the interactive head-mounted eyepiece, and playing the game by manipulating at least one body-mounted control device using the interactive, head mounted eyepiece.

In an aspect, a method of gaming includes contacting an online gaming site using the eyepiece, initiating or joining a game of the online gaming site with a plurality of members of the online gaming site, each member using an interactive head-mounted eyepiece system, viewing game content with the optical assembly, and playing the game by manipulating at least one sensor for detecting motion.

In an aspect, a method of gaming includes contacting an online gaming site using the eyepiece, contacting at least one additional player for a game of the online gaming site using the interactive head-mounted eyepiece, initiating a game of the online gaming site using the interactive head-mounted eyepiece, viewing the game of the online gaming site with the optical assembly of the interactive head-mounted eyepiece, and playing the game by touchlessly manipulating at least one control using the interactive head-mounted eyepiece.

In an aspect, a method of using augmented vision includes providing an interactive head-mounted eyepiece including an optical assembly through which a user views a surrounding environment and displayed content, scanning the surrounding environment with a black silicon short wave infrared (SWIR) image sensor, controlling the SWIR image sensor through movements, gestures or commands of the user, sending at least one visual image from the sensor to a processor of the interactive head-mounted eyepiece, and viewing the at least one visual image using the optical assembly, wherein the black silicon short wave infrared (SWIR) sensor provides a night vision capability.

In an aspect, a method of using augmented vision includes providing an interactive head-mounted eyepiece including a camera and an optical assembly through which a user views a surrounding environment and displayed content, viewing the surrounding environment with a camera and a black silicon short wave infra red (SWIR) image sensor, controlling the camera through movements, gestures or commands of the user, sending information from the camera to a processor of the interactive head-mounted eyepiece, and viewing visual images using the optical assembly, wherein the black silicon short wave infrared (SWIR) sensor provides a night vision capability.

In an aspect, a method of using augmented vision includes providing an interactive head-mounted eyepiece including an optical assembly through which a user views a surrounding environment and displayed content, wherein the optical assembly comprises a corrective element that corrects the user's view of the surrounding environment, an integrated processor for handling content for display to the user, and an integrated image source for introducing the content to the optical assembly, viewing the surrounding environment with a black silicon short wave infrared (SWIR) image sensor, controlling scanning of the image sensor through movements and gestures of the user, sending information from the image sensor to a processor of the interactive head-mounted eyepiece, and viewing visual images using the optical assembly, wherein the black silicon short wave infrared (SWIR) sensor provides a night vision capability.

In an aspect, a method of receiving information includes contacting an accessible database using an interactive head-mounted eyepiece including an optical assembly through which a user views a surrounding environment and displayed content, requesting information from the accessible database using the interactive head-mounted eyepiece, and viewing information from the accessible database using the interactive head-mounted eyepiece, wherein the steps of requesting and viewing information are accomplished without contacting controls of the interactive head-mounted device by the user.

In an aspect, a method of receiving information includes contacting an accessible database using the eyepiece, requesting information from the accessible database using the interactive head-mounted eyepiece, displaying the information using the optical facility, and manipulating the information using the processor, wherein the steps of requesting, displaying and manipulating are accomplished without touching controls of the interactive head-mounted eyepiece.

In an aspect, a method of receiving information includes contacting an accessible database using the eyepiece, requesting information from the accessible website using the interactive, head-mounted eyepiece without touching of the interactive head-mounted eyepiece by digits of the user, allowing access to information on the accessible website without touching controls of the interactive head-mounted eyepiece, displaying the information using the optical facility, and manipulating the information using the processor without touching controls of the interactive head-mounted eyepiece.

In an aspect, a method of social networking includes providing the eyepiece, scanning facial features of a nearby person with an optical sensor of the head-mounted eyepiece, extracting a facial profile of the person, contacting a social networking website using a communications facility of the interactive head-mounted eyepiece, and searching a database of the social networking site for a match for the facial profile.

In an aspect, a method of social networking includes providing the eyepiece, scanning facial features of a nearby person with an optical sensor of the head-mounted eyepiece, extracting a facial profile of the person, contacting a database using a communications facility of the head-mounted eyepiece, and searching the database for a person matching the facial profile.

In an aspect, a method of social networking includes contacting a social networking website using the eyepiece, requesting information about nearby members of the social networking website using the interactive, head-mounted eyepiece, scanning facial features of a nearby person identified as a member of the social networking site with an optical sensor of the head-mounted eyepiece, extracting a facial profile of the person, and searching at least one additional database for information concerning the person.

In one aspect, a method of using augmented vision includes providing the eyepiece, controlling the camera through movements, gestures or commands of the user, sending information from the camera to a processor of the interactive head-mounted eyepiece, and viewing visual images using the optical assembly, wherein visual images from the camera and optical assembly are an improvement for the user in at least one of focus, brightness, clarity and magnification.

In another aspect, a method of using augmented vision, includes providing the eyepiece, controlling the camera through movements of the user without touching controls of the interactive head-mounted eyepiece, sending information from the camera to a processor of the interactive head-mounted eyepiece, and viewing visual images using the optical assembly of the interactive head-mounted eyepiece, wherein visual images from the camera and optical assembly are an improvement for the user in at least one of focus, brightness, clarity and magnification.

In one aspect, a method of using augmented vision includes providing the eyepiece, controlling the camera through movements of the user of the interactive head-mounted eyepiece, sending information from the camera to the integrated processor of the interactive head-mounted eyepiece, applying an image enhancement technique using computer software and the integrated processor of the interactive head-mounted eyepiece, and viewing visual images using the optical assembly of the interactive head-mounted eyepiece, wherein visual images from the camera and optical assembly are an improvement for the user in at least one of focus, brightness, clarity and magnification.

In one aspect, a method for facial recognition includes capturing an image of a subject with the eyepiece, converting the image to biometric data, comparing the biometric data to a database of previously collected biometric data, identifying biometric data matching previously collected biometric data, and reporting the identified matching biometric data as displayed content.

In another aspect, a system includes the eyepiece, a face detection facility in association with the integrated processor facility, wherein the face detection facility captures images of faces in the surrounding environment, compares the captured images to stored images in a face recognition database, and provides a visual indication to indicate a match, where the visual indication corresponds to the current position of the imaged face in the surrounding environment as part of the projected content, and an integrated vibratory actuator in the eyepiece, wherein the vibratory actuator provides a vibration output to alert the user to the match.

In one aspect, a method for augmenting vision includes collecting photons with a short wave infrared sensor mounted on the eyepiece, converting the collected photons in the short wave infrared spectrum to electrical signals, relaying the electrical signals to the eyepiece for display, collecting biometric data using the sensor, collecting audio data using an audio sensor, and transferring the collected biometric data and audio data to a database.

In another aspect, a method for object recognition includes capturing an image of an object with the eyepiece, analyzing the object to determine if the object has been previously captured, increasing the resolution of the areas of the captured image that have not been previously captured and analyzed, and decreasing the resolution of the areas of the captured image that have been previously captured and analyzed.

These and other systems, methods, objects, features, and advantages of the present disclosure will be apparent to those skilled in the art from the following detailed description of the embodiments and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The present disclosure and the following detailed description of certain embodiments thereof may be understood by reference to the following figures:

FIG. 14A depicts motions in an embodiment of the eyepiece featuring nod control.

FIG. 45 depicts a block diagram of a system including the eyepiece.

DETAILED DESCRIPTION

The present disclosure relates to eyepiece electro-optics. The eyepiece may include projection optics suitable to project an image onto a see-through or translucent lens, enabling the wearer of the eyepiece to view the surrounding environment as well as the displayed image. The projection optics, also known as a projector, may include an RGB LED module that uses field sequential color. With field sequential color, a single full color image may be broken down into color fields based on the primary colors of red, green, and blue and imaged by an LCoS (liquid crystal on silicon) optical display 210 individually. As each color field is imaged by the optical display 210, the corresponding LED color is turned on. When these color fields are displayed in rapid sequence, a full color image may be seen. With field sequential color illumination, the resulting projected image in the eyepiece can be adjusted for any chromatic aberrations by shifting the red image relative to the blue and/or green image and so on. The image may thereafter be reflected into a two surface freeform waveguide where the image light engages in total internal reflections (TIR) until reaching the active viewing area of the lens where the user sees the image. A processor, which may include a memory and an operating system, may control the LED light source and the optical display. The projector may also include or be optically coupled to a display coupling lens, a condenser lens, a polarizing beam splitter, and a field lens.

Figure 1:
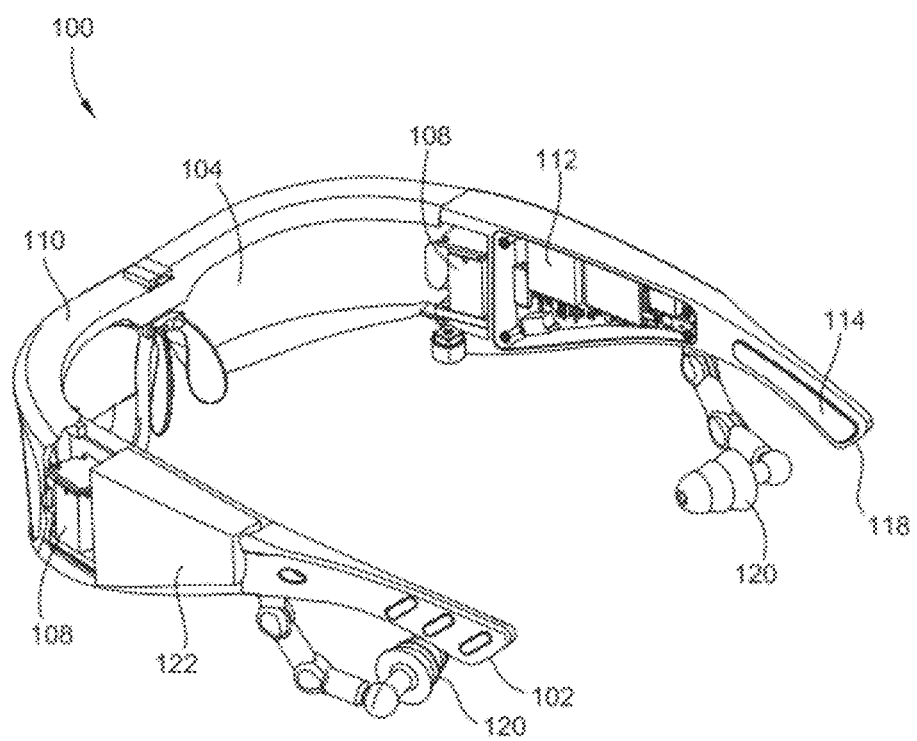
FIG. 1 depicts an illustrative embodiment of the optical arrangement.

Referring to FIG. 1, an illustrative embodiment of the augmented reality eyepiece 100 may be depicted. It will be understood that embodiments of the eyepiece 100 may not include all of the elements depicted in FIG. 1 while other embodiments may include additional or different elements. In embodiments, the optical elements may be embedded in the arm portions 122 of the frame 102 of the eyepiece. Images may be projected with a projector 108 onto at least one lens 104 disposed in an opening of the frame 102. One or more projectors 108, such as a nanoprojector, picoprojector, microprojector, femtoprojector, LASER-based projector, holographic projector, and the like may be disposed in an arm portion of the eyepiece frame 102. In embodiments, both lenses 104 are see-through or translucent while in other embodiments only one lens 104 is translucent while the other is opaque or missing. In embodiments, more than one projector 108 may be included in the eyepiece 100.

In embodiments such as the one depicted in FIG. 1, the eyepiece 100 may also include at least one articulating ear bud 120, a radio transceiver 118 and a heat sink 114 to absorb heat from the LED light engine, to keep it cool and to allow it to operate at full brightness. There is also a TI OMAP4 (open multimedia applications processor) 112, and a flex cable with RF antenna 110, all of which will be further described herein.

Figure 2:
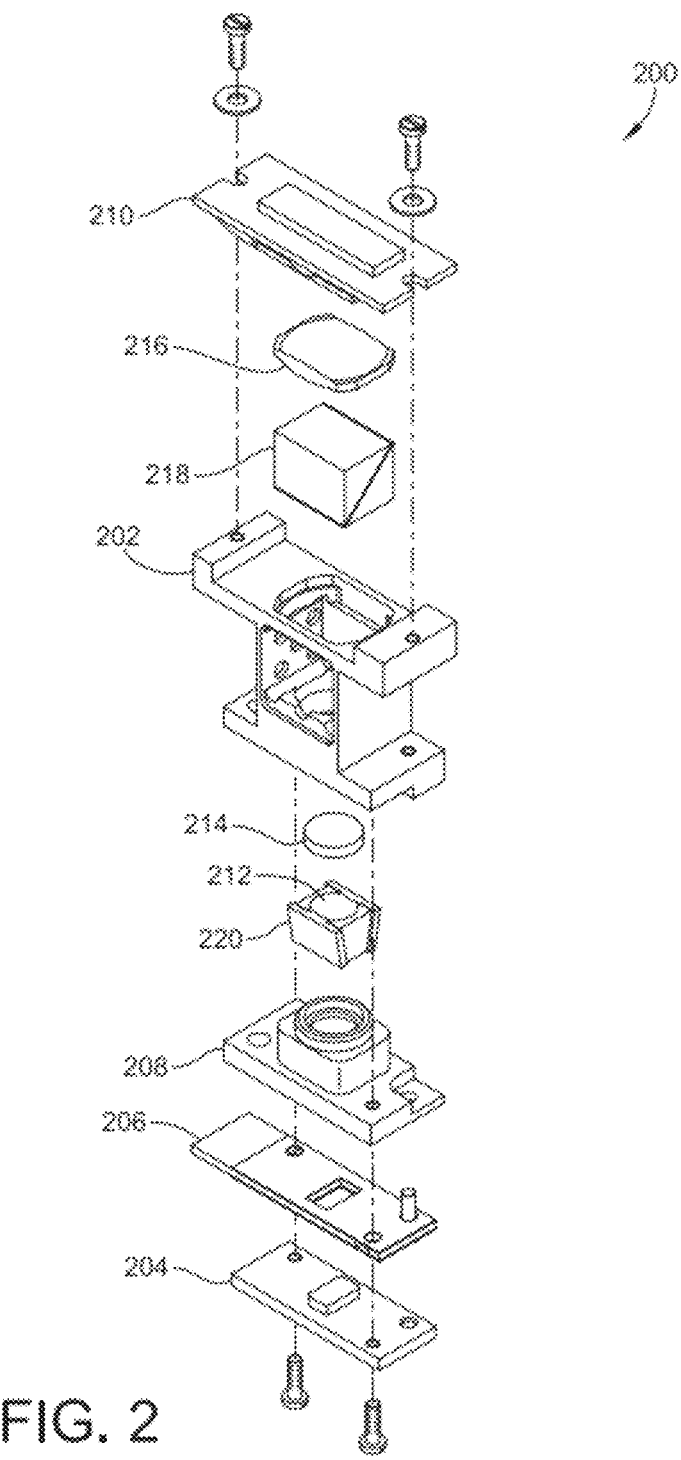
FIG. 2 depicts an RGB LED projector.

In an embodiment and referring to FIG. 2, the projector 200 may be an RGB projector. The projector 200 may include a housing 202, a heatsink 204 and an RGB LED engine or module 206. The RGB LED engine 206 may include LEDs, dichroics, concentrators, and the like. A digital signal processor (DSP) (not shown) may convert the images or video stream into control signals, such as voltage drops/current modifications, pulse width modulation (PWM) signals, and the like to control the intensity, duration, and mixing of the LED light. For example, the DSP may control the duty cycle of each PWM signal to control the average current flowing through each LED generating a plurality of colors. A still image co-processor of the eyepiece may employ noise-filtering, image/video stabilization, and face detection, and be able to make image enhancements. An audio back-end processor of the eyepiece may employ buffering, SRC, equalization and the like.

The projector 200 may include an optical display 210, such as an LCoS display, and a number of components as shown. In embodiments, the projector 200 may be designed with a single panel LCoS display 210; however, a three panel display may be possible as well. In the single panel embodiment, the display 210 is illuminated with red, blue, and green sequentially (aka field sequential color). In other embodiments, the projector 200 may make use of alternative optical display technologies, such as a back-lit liquid crystal display (LCD), a front-lit LCD, a transflective LCD, an organic light emitting diode (OLED), a field emission display (FED), a ferroelectric LCoS (FLCOS) and the like.

The eyepiece may be powered by any power supply, such as battery power, solar power, line power, and the like. The power may be integrated in the frame 102 or disposed external to the eyepiece 100 and in electrical communication with the powered elements of the eyepiece 100. For example, a solar energy collector may be placed on the frame 102, on a belt clip, and the like. Battery charging may occur using a wall charger, car charger, on a belt clip, in an eyepiece case, and the like.

The projector 200 may include the LED light engine 206, which may be mounted on heat sink 204 and holder 208, for ensuring vibration-free mounting for the LED light engine, hollow tapered light tunnel 220, diffuser 212 and condenser lens 214. Hollow tunnel 220 helps to homogenize the rapidly-varying light from the RGB LED light engine. In one embodiment, hollow light tunnel 220 includes a silvered coating. The diffuser lens 212 further homogenizes and mixes the light before the light is led to the condenser lens 214. The light leaves the condenser lens 214 and then enters the polarizing beam splitter (PBS) 218. In the PBS, the LED light is propagated and split into polarization components before it is refracted to a field lens 216 and the LCoS display 210. The LCoS display provides the image for the microprojector. The image is then reflected from the LCoS display and back through the polarizing beam splitter, and then reflected ninety degrees. Thus, the image leaves microprojector 200 in about the middle of the microprojector. The light then is led to the coupling lens 504, described below.

In an embodiment, the digital signal processor (DSP) may be programmed and/or configured to receive video feed information and configure the video feed to drive whatever type of image source is being used with the optical display 210. The DSP may include a bus or other communication mechanism for communicating information, and an internal processor coupled with the bus for processing the information. The DSP may include a memory, such as a random access memory (RAM) or other dynamic storage device (e.g., dynamic RAM (DRAM), static RAM (SRAM), and synchronous DRAM (SDRAM)), coupled to the bus for storing information and instructions to be executed. The DSP can include a non-volatile memory such as for example a read only memory (ROM) or other static storage device (e.g., programmable ROM (PROM), erasable PROM (EPROM), and electrically erasable PROM (EEPROM)) coupled to the bus for storing static information and instructions for the internal processor. The DSP may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The DSP may include at least one computer readable medium or memory for holding instructions programmed and for containing data structures, tables, records, or other data necessary to drive the optical display. Examples of computer readable media suitable for applications of the present disclosure may be compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read. Various forms of computer readable media may be involved in carrying out one or more sequences of one or more instructions to the optical display 210 for execution. The DSP may also include a communication interface to provide a data communication coupling to a network link that can be connected to, for example, a local area network (LAN), or to another communications network such as the Internet. Wireless links may also be implemented. In any such implementation, an appropriate communication interface can send and receive electrical, electromagnetic or optical signals that carry digital data streams representing various types of information (such as the video information) to the optical display 210.

Figure 21:
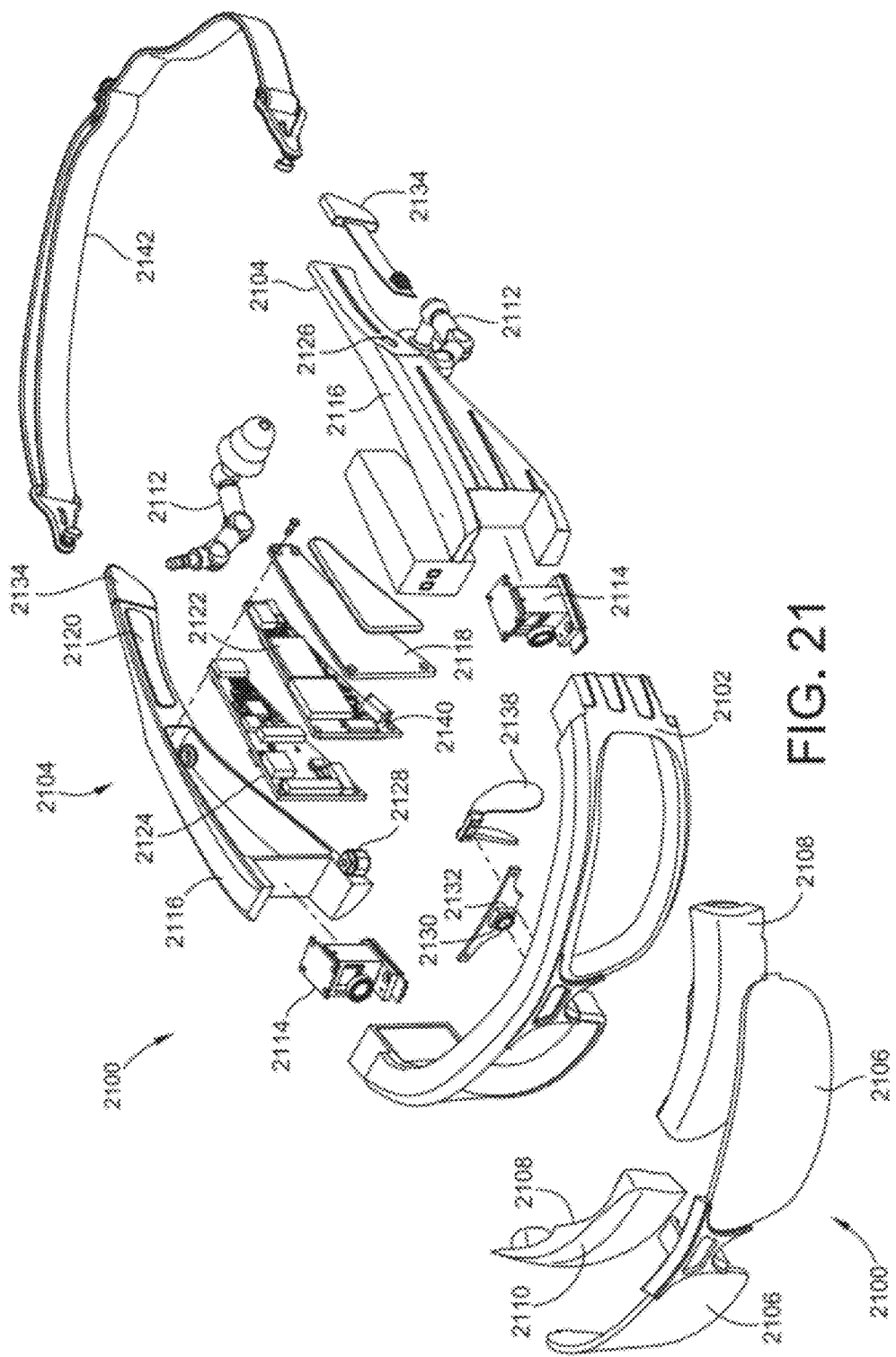
FIG. 21 depicts an alternative arrangement of the eyepiece optics and electronics.
Figure 22:
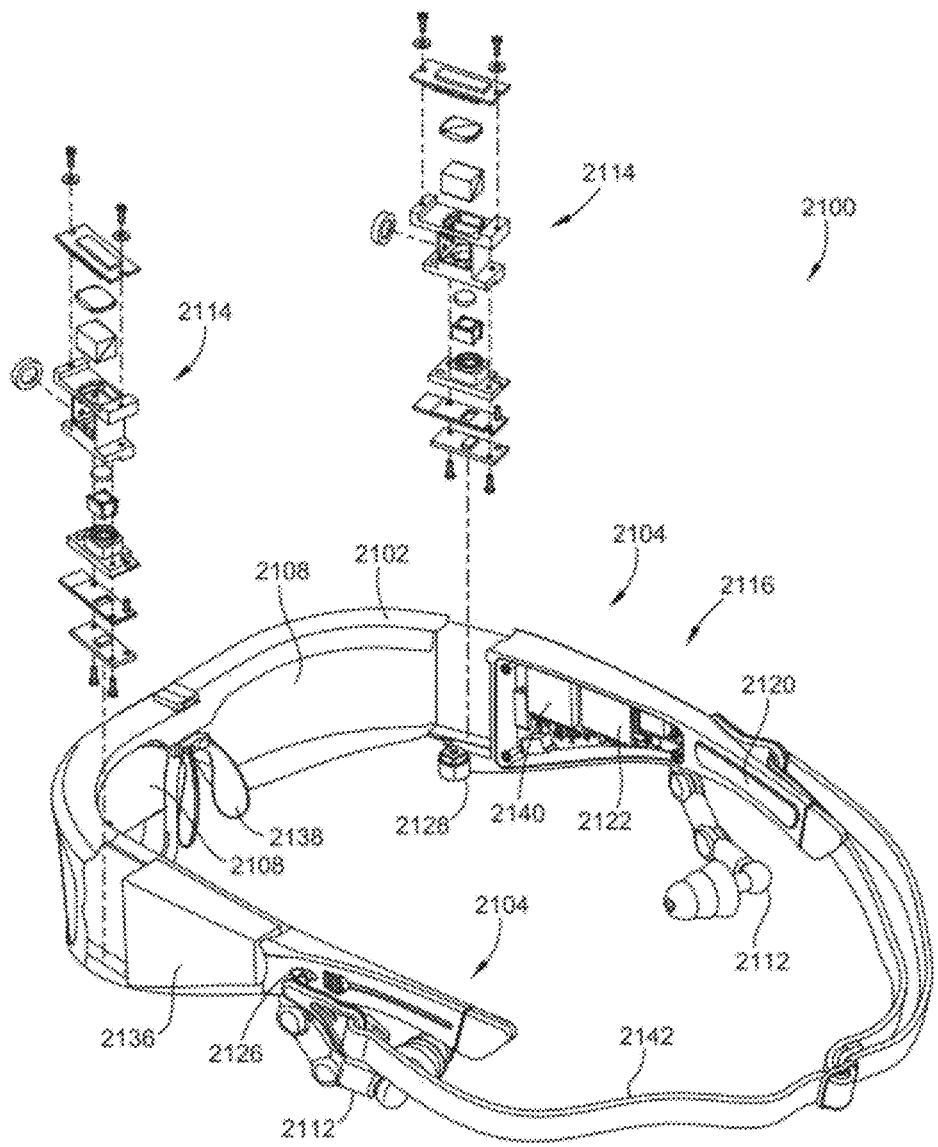
FIG. 22 depicts an alternative arrangement of the eyepiece optics and electronics.

In another embodiment, FIGS. 21 and 22 depict an alternate arrangement of the waveguide and projector in exploded view. In this arrangement, the projector is placed just behind the hinge of the arm of the eyepiece and it is vertically oriented such that the initial travel of the RGB LED signals is vertical until the direction is changed by a reflecting prism in order to enter the waveguide lens. The vertically arranged projection engine may have a PBS 218 at the center, the RGB LED array at the bottom, a hollow, tapered tunnel with thin film diffuser to mix the colors for collection in an optic, and a condenser lens. The PBS may have a pre-polarizer on an entrance face. The pre-polarizer may be aligned to transmit light of a certain polarization, such as p-polarized light and reflect (or absorb) light of the opposite polarization, such as s-polarized light. The polarized light may then pass through the PBS to the field lens 216. The purpose of the field lens 216 may be to create near telecentric illumination of the LCoS panel. The LCoS display may be truly reflective, reflecting colors sequentially with correct timing so the image is displayed properly. Light may reflect from the LCoS panel and, for bright areas of the image, may be rotated to s-polarization. The light then may refract through the field lens 216 and may be reflected at the internal interface of the PBS and exit the projector, heading toward the coupling lens. The hollow, tapered tunnel 220 may replace the homogenizing lenslet from other embodiments. By vertically orienting the projector and placing the PBS in the center, space is saved and the projector is able to be placed in a hinge space with little moment arm hanging from the waveguide.

Light entering the waveguide may be polarized, such as s-polarized. When this light reflects from the user's eye, it may appear as a "night glow" from the user's eye. This night glow may be eliminated by attaching lenses to the waveguide or frame, such as the snap-fit optics described herein, that are oppositely polarized from the light reflecting from the user's eye, such as p-polarized in this case.

In FIGS. 21-22, augmented reality eyepiece 2100 includes a frame 2102 and left and right earpieces or temple pieces 2104. Protective lenses 2106, such as ballistic lenses, are mounted on the front of the frame 2102 to protect the eyes of the user or to correct the user's view of the surrounding environment if they are prescription lenses. The front portion of the frame may also be used to mount a camera or image sensor 2130 and one or more microphones 2132. Not visible in FIG. 21, waveguides are mounted in the frame 2102 behind the protective lenses 2106, one on each side of the center or adjustable nose bridge 2138. The front cover 2106 may be interchangeable, so that tints or prescriptions may be changed readily for the particular user of the augmented reality device. In one embodiment, each lens is quickly interchangeable, allowing for a different prescription for each eye. In one embodiment, the lenses are quickly interchangeable with snap-fits as discussed elsewhere herein. Certain embodiments may only have a projector and waveguide combination on one side of the eyepiece while the other side may be filled with a regular lens, reading lens, prescription lens, or the like. The left and right ear pieces 2104 each vertically mount a projector or microprojector 2114 or other image source atop a spring-loaded hinge 2128 for easier assembly and vibration/shock protection. Each temple piece also includes a temple housing 2116 for mounting associated electronics for the eyepiece, and each may also include an elastomeric head grip pad 2120, for better retention on the user. Each temple piece also includes extending, wrap-around ear buds 2112 and an orifice 2126 for mounting a headstrap 2142.

As noted, the temple housing 2116 contains electronics associated with the augmented reality eyepiece. The electronics may include several circuit boards, as shown, such as for the microprocessor and radios 2122, the communications system on a chip (SOC) 2124, and the open multimedia applications processor (OMAP) processor board 2140. The communications system on a chip (SOC) may include electronics for one or more communications capabilities, including a wide local area network (WLAN), BlueTooth™ communications, frequency modulation (FM) radio, a global positioning system (GPS), a 3-axis accelerometer, one or more gyroscopes, and the like. In addition, the right temple piece may include an optical trackpad (not shown) on the outside of the temple piece for user control of the eyepiece and one or more applications.

The frame 2102 is in a general shape of a pair of wrap-around sunglasses. The sides of the glasses include shape-memory alloy straps 2134, such as nitinol straps. The nitinol or other shape-memory alloy straps are fitted for the user of the augmented reality eyepiece. The straps are tailored so that they assume their trained or preferred shape when worn by the user and warmed to near body temperature.

Other features of this embodiment include detachable, noise-cancelling earbuds. As seen in the figure, the earbuds are intended for connection to the controls of the augmented reality eyepiece for delivering sounds to ears of the user. The sounds may include inputs from the wireless internet or telecommunications capability of the augmented reality eyepiece. The earbuds also include soft, deformable plastic or foam portions, so that the inner ears of the user are protected in a manner similar to earplugs. In one embodiment, the earbuds limit inputs to the user's ears to about 85 dB. This allows for normal hearing by the wearer, while providing protection from gunshot noise or other explosive noises. In one embodiment, the controls of the noise-cancelling earbuds have an automatic gain control for very fast adjustment of the cancelling feature in protecting the wearer's ears.

Figure 23:
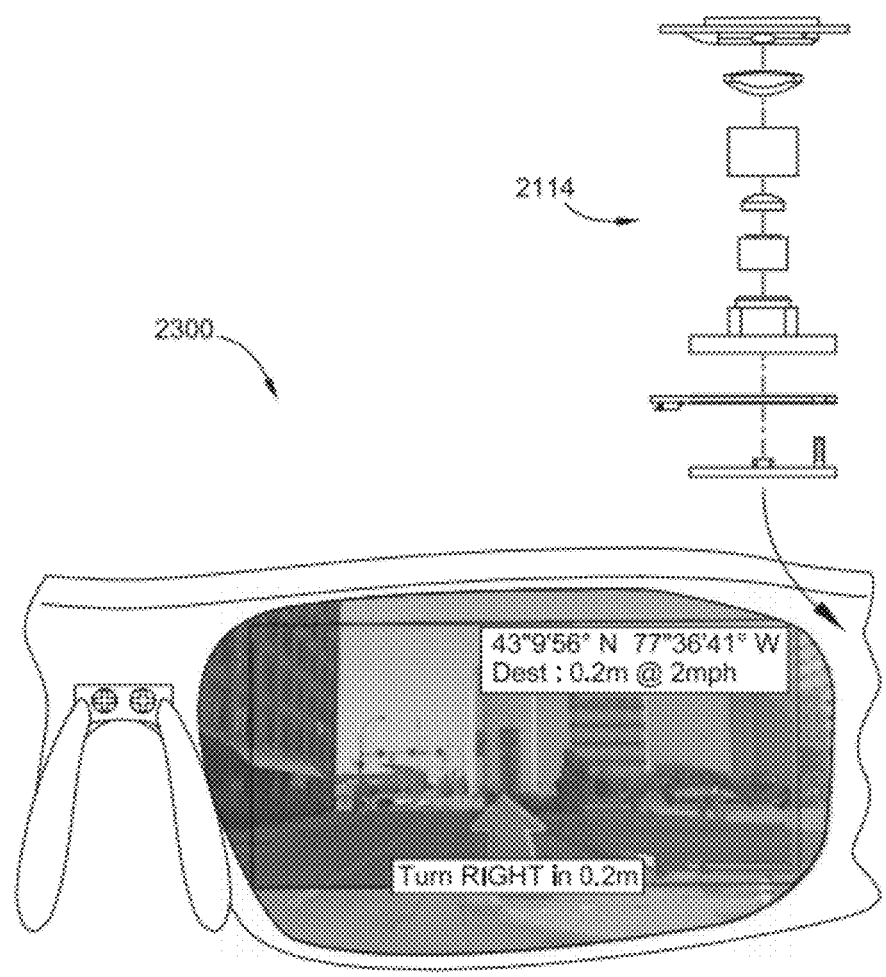
FIG. 23 depicts an alternative arrangement of the eyepiece optics and electronics.

FIG. 23 depicts a layout of the vertically arranged projector 2114, where the illumination light passes from bottom to top through one side of the PBS on its way to the display and imager board, which may be silicon backed, and being refracted as image light where it hits the internal interfaces of the triangular prisms which constitute the polarizing beam splitter, and is reflected out of the projector and into the waveguide lens. In this example, the dimensions of the projector are shown with the width of the imager board being 11 mm, the distance from the end of the imager board to the image centerline being 10.6 mm, and the distance from the image centerline to the end of the LED board being about 11.8 mm.

Figure 25:
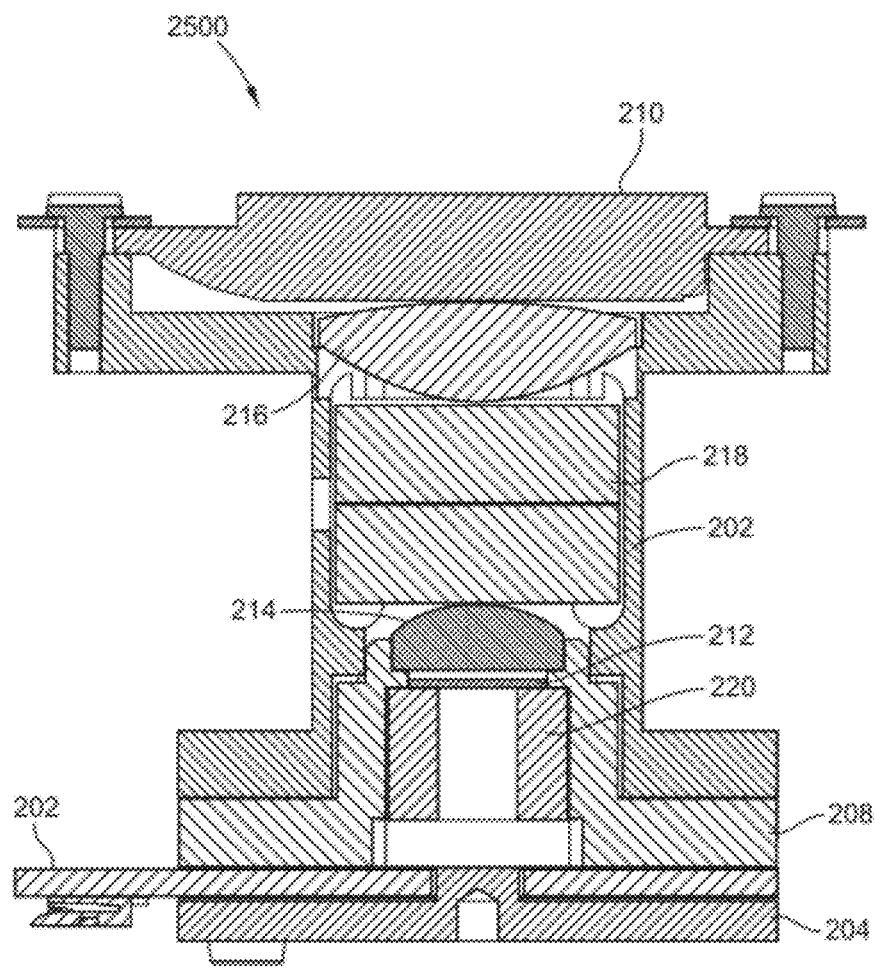
FIG. 25 depicts a detailed view of the projector.

A detailed and assembled view of the components of the projector discussed above may be seen in FIG. 25. This view depicts how compact the micro-projector 2500 is when assembled, for example, near a hinge of the augmented reality eyepiece. Microprojector 2500 includes a housing and a holder 208 for mounting certain of the optical pieces. As each color field is imaged by the optical display 210, the corresponding LED color is turned on. The RGB LED light engine 202 is depicted near the bottom, mounted on heat sink 204. The holder 208 is mounted atop the LED light engine 202, the holder mounting light tunnel 220, diffuser lens 212 (to eliminate hotspots) and condenser lens 214. Light passes from the condenser lens into the polarizing beam splitter 218 and then to the field lens 216. The light then refracts onto the LCoS (liquid crystal on silicon) chip 210, where an image is formed. The light for the image then reflects back through the field lens 216 and is polarized and reflected 90° through the polarizing beam splitter 218. The light then leaves the microprojector for transmission to the optical display of the glasses.

Figure 26:
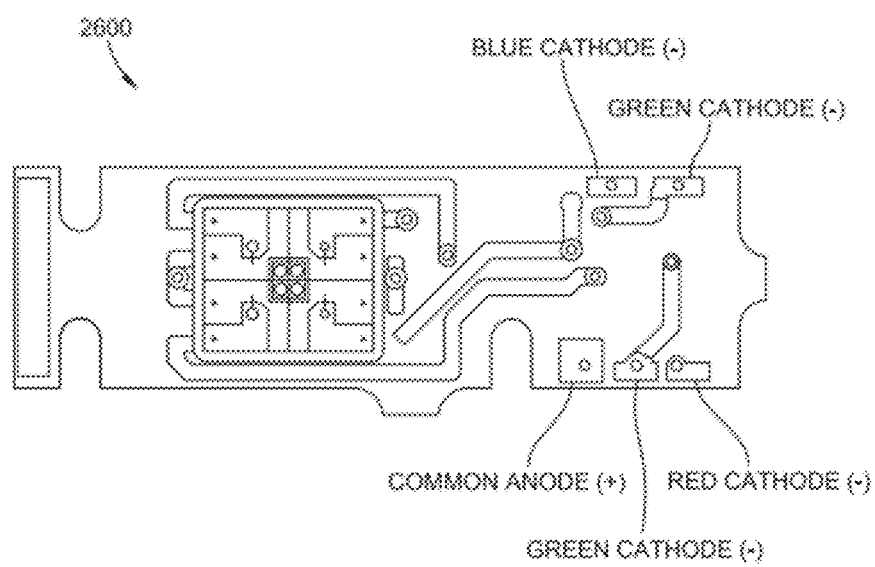
FIG. 26 depicts a detailed view of the RGB LED module.

FIG. 26 depicts an exemplary RGB LED module. In this example, the LED is a 2×2 array with 1 red, 1 blue and 2 green die and the LED array has 4 cathodes and a common anode. The maximum current may be 0.5 A per die and the maximum voltage (≈4V) may be needed for the green and blue die.

Figure 3:
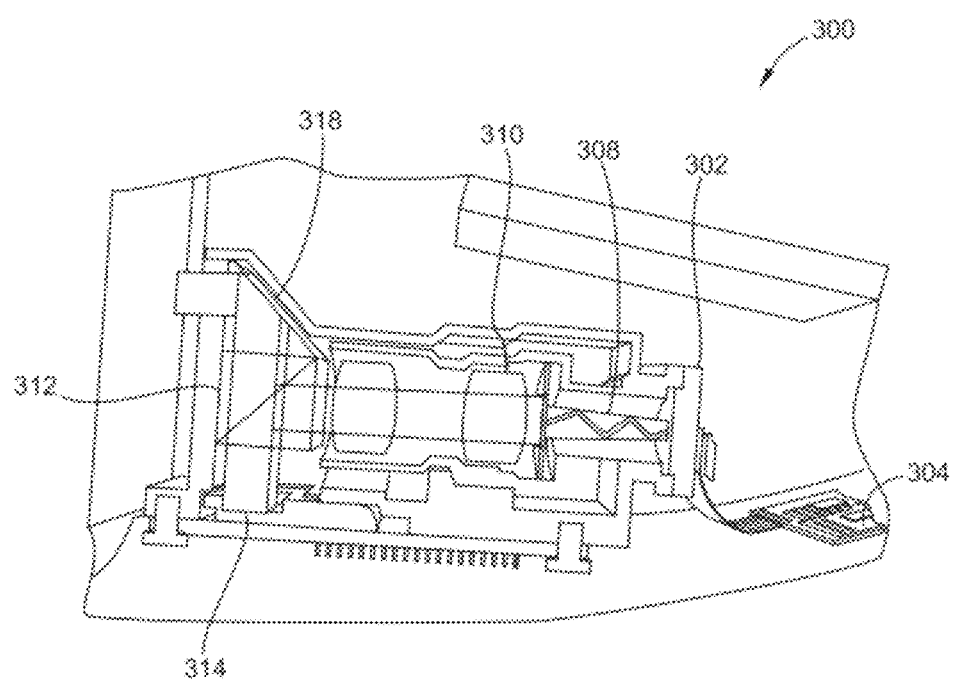
FIG. 3 depicts the projector in use.

FIG. 3 depicts an embodiment of a horizontally disposed projector in use. The projector 300 may be disposed in an arm portion of an eyepiece frame. The LED module 302, under processor control 304, may emit a single color at a time in rapid sequence. The emitted light may travel down a light tunnel 308 and through at least one homogenizing lenslet 310 before encountering a polarizing beam splitter 312 and being deflected towards an LCoS display 314 where a full color image is displayed. The LCoS display may have a resolution of 1280×720p. The image may then be reflected back up through the polarizing beam splitter, reflected off a fold mirror 318 and travel through a collimator on its way out of the projector and into a waveguide. The projector may include a diffractive element to eliminate aberrations.

In an embodiment, the interactive head-mounted eyepiece includes an optical assembly through which a user views a surrounding environment and displayed content, wherein the optical assembly includes a corrective element that corrects the user's view of the surrounding environment, a freeform optical waveguide enabling internal reflections, and a coupling lens positioned to direct an image from an optical display, such as an LCoS display, to the optical waveguide. The eyepiece further includes an integrated processor for handling content for display to the user and an integrated image source, such as a projector facility, for introducing the content to the optical assembly. In embodiments where the image source is a projector, the projector facility includes a light source and the optical display. Light from the light source, such as an RGB module, is emitted under control of the processor and traverses a polarizing beam splitter where it is polarized before being reflected off the optical display, such as the LCoS display or LCD display in certain other embodiments, and into the optical waveguide. A surface of the polarizing beam splitter may reflect the color image from the optical display into the optical waveguide. The RGB LED module may emit light sequentially to form a color image that is reflected off the optical display. The corrective element may be a see-through correction lens that is attached to the optical waveguide to enable proper viewing of the surrounding environment whether the image source is on or off. This corrective element may be a wedge-shaped correction lens, and may be prescription, tinted, coated, or the like. The freeform optical waveguide, which may be described by a higher order polynomial, may include dual freeform surfaces that enable a curvature and a sizing of the waveguide. The curvature and the sizing of the waveguide enable its placement in a frame of the interactive head-mounted eyepiece. This frame may be sized to fit a user's head in a similar fashion to sunglasses or eyeglasses. Other elements of the optical assembly of the eyepiece include a homogenizer through which light from the light source is propagated to ensure that the beam of light is uniform and a collimator that improves the resolution of the light entering the optical waveguide.

Figure 4:
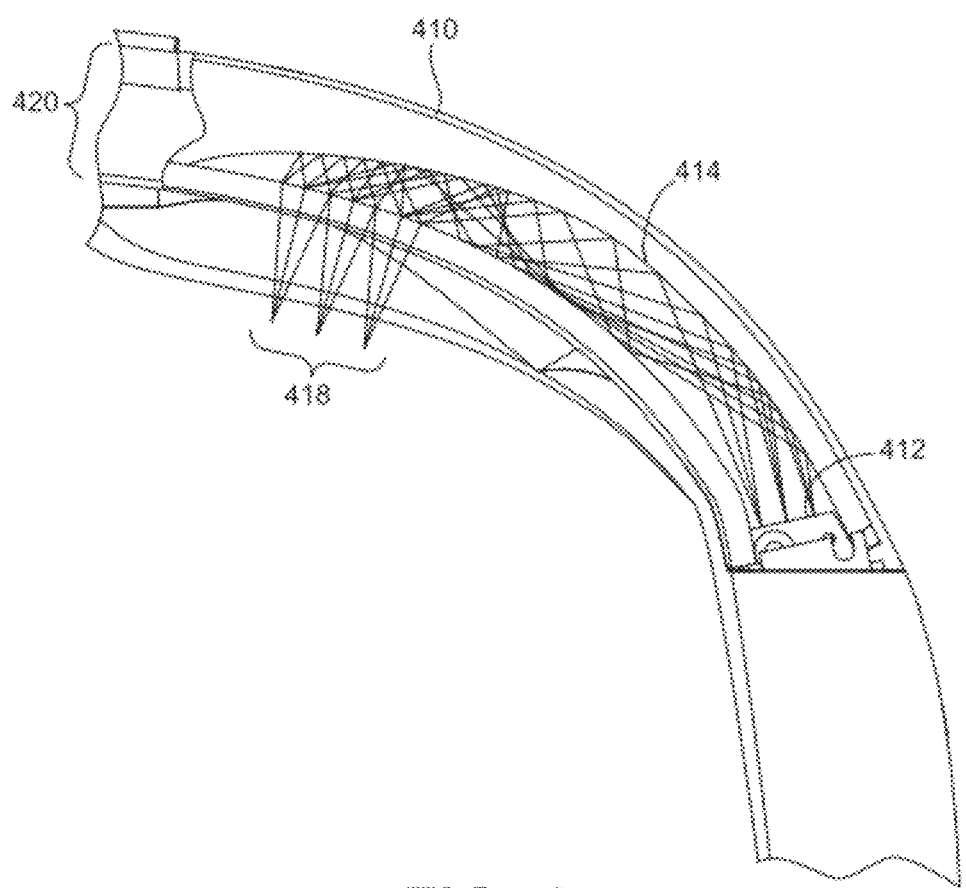
FIG. 4 depicts an embodiment of the waveguide and correction lens disposed in a frame.

Referring to FIG. 4, the image light, which may be polarized and collimated, may optionally traverse a display coupling lens 412, which may or may not be the collimator itself or in addition to the collimator, and enter the waveguide 414. In embodiments, the waveguide 414 may be a freeform waveguide, where the surfaces of the waveguide are described by a polynomial equation. The waveguide may be rectilinear. The waveguide 414 may include two reflective surfaces. When the image light enters the waveguide 414, it may strike a first surface with an angle of incidence greater than the critical angle above which total internal reflection (TIR) occurs. The image light may engage in TIR bounces between the first surface a second facing surface, eventually reaching the active viewing area 418 of the composite lens. In an embodiment, light may engage in at least three TIR bounces. Since the waveguide 414 tapers to enable the TIR bounces to eventually exit the waveguide, the thickness of the composite lens 420 may not be uniform. Distortion through the viewing area of the composite lens 420 may be minimized by disposing a wedge-shaped correction lens 410 along a length of the freeform waveguide 414 in order to provide a uniform thickness across at least the viewing area of the lens 420. The correction lens 410 may be a prescription lens, a tinted lens, a polarized lens, and the like.

In some embodiments, while the optical waveguide may have a first surface and a second surface enabling total internal reflections of the light entering the waveguide, the light may not actually enter the waveguide at an internal angle of incidence that would result in total internal reflection. The eyepiece may include a mirrored surface on the first surface of the optical waveguide to reflect the displayed content towards the second surface of the optical waveguide. Thus, the mirrored surface enables a total reflection of the light entering the optical waveguide or a reflection of at least a portion of the light entering the optical waveguide. In embodiments, the surface may be 100% mirrored or mirrored to a lower percentage. In some embodiments, in place of a mirrored surface, an air gap between the waveguide and the corrective element may cause a reflection of the light that enters the waveguide at an angle of incidence that would not result in TIR.

In an embodiment, the eyepiece includes an integrated image source, such as a projector, that introduces content for display to the optical assembly from a side of the optical waveguide adjacent to an arm of the eyepiece. As opposed to prior art optical assemblies where image injection occurs from a top side of the optical waveguide, the present disclosure provides image injection to the waveguide from a side of the waveguide. The displayed content aspect ratio is between approximately square to approximately rectangular with the long axis approximately horizontal. In embodiments, the displayed content aspect ratio is 16:9. In embodiments, achieving a rectangular aspect ratio for the displayed content where the long axis is approximately horizontal may be done via rotation of the injected image. In other embodiments, it may be done by stretching the image until it reaches the desired aspect ratio.

Figure 5:
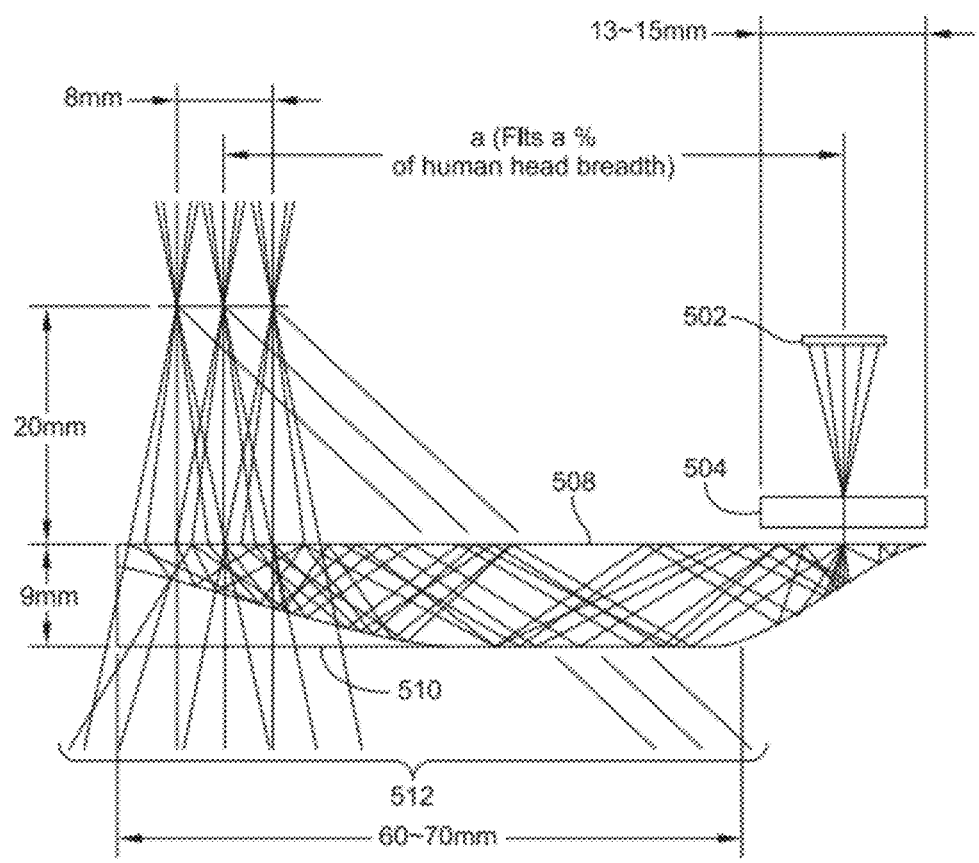
FIG. 5 depicts a design for a waveguide eyepiece.

FIG. 5 depicts a design for a waveguide eyepiece showing sample dimensions. For example, in this design, the width of the coupling lens 504 may be 13~15 mm, with the optical display 502 optically coupled in series. These elements may be disposed in an arm of an eyepiece. Image light from the optical display 502 is projected through the coupling lens 504 into the freeform waveguide 508. The thickness of the composite lens, including waveguide 508 and correction lens 510, may be 9 mm. In this design, the waveguide 502 enables an exit pupil diameter of 8 mm with an eye clearance of 20 mm. The resultant see-through view 512 may be about 60-70 mm. The distance from the pupil to the image light path as it enters the waveguide 502 (dimension a) may be about 50-60 mm, which can accommodate a large % of human head breadths. In an embodiment, the field of view may be larger than the pupil. In embodiments, the field of view may not fill the lens. It should be understood that these dimensions are for a particular illustrative embodiment and should not be construed as limiting. In an embodiment, the waveguide, snap-on optics, and/or the corrective lens may comprise optical plastic. In other embodiments, the waveguide snap-on optics, and/or the corrective lens may comprise glass, marginal glass, bulk glass, metallic glass, palladium-enriched glass, or other suitable glass. In embodiments, the waveguide 508 and correction lens 510 may be made from different materials selected to result in little to no chromatic aberrations. The materials may include a diffraction grating, a holographic grating, and the like.

In embodiments such as that shown in FIG. 1, the projected image may be a stereo image when two projectors 108 are used for the left and right images. To enable stereo viewing, the projectors 108 may be disposed at an adjustable distance from one another that enables adjustment based on the interpupillary distance for individual wearers of the eyepiece.

Having described certain embodiments of the eyepiece, we turn to describing various additional features, applications for use 4512, control technologies and external control devices 4508, associated external devices 4504, software, networking capabilities, integrated sensors 4502, external processing facilities 4510, associated third party facilities 4514, and the like. External devices 4504 for use with the eyepiece include devices useful in entertainment, navigation, computing, communication, and the like. External control devices 4508 include a ring/hand or other haptic controller, external device enabling gesture control (e.g. non-integral camera, device with embedded accelerometer), ° F. to external device, and the like. External processing facilities 4510 include local processing facilities, remote processing facilities, I/F to external applications, and the like. Applications for use 4512 include those for commercial, consumer, military, education, government, augmented reality, advertising, media, and the like. Various third party facilities 4514 may be accessed by the eyepiece or work in conjunction with the eyepiece. Eyepieces 100 may interact with other eyepieces 100 through wireless communication, near-field communication, a wired communication, and the like.

Figure 6:
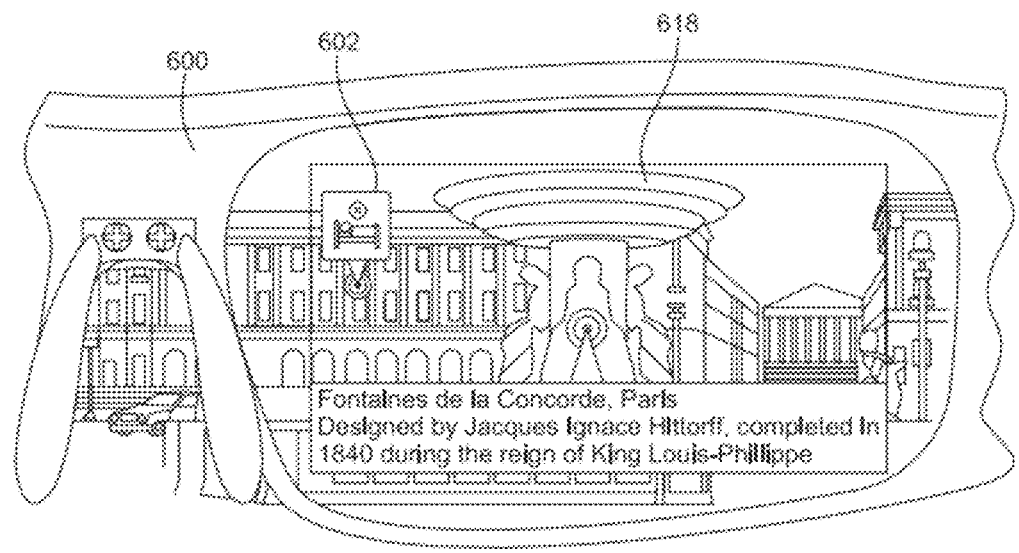
FIG. 6 depicts an embodiment of the eyepiece with a see-through lens.

FIG. 6 depicts an embodiment of the eyepiece 600 with a see-through or translucent lens 602. A projected image 618 can be seen on the lens 602. In this embodiment, the image 618 that is being projected onto the lens 602 happens to be an augmented reality version of the scene that the wearer is seeing, wherein tagged points of interest (POI) in the field of view are displayed to the wearer. The augmented reality version may be enabled by a forward facing camera embedded in the eyepiece (not shown in FIG. 6) that images what the wearer is looking and identifies the location/POI. In one embodiment, the output of the camera or optical transmitter may be sent to the eyepiece controller or memory for storage, for transmission to a remote location, or for viewing by the person wearing the eyepiece or glasses. For example, the video output may be streamed to the virtual screen seen by the user. The video output may thus be used to help determine the user's location, or may be sent remotely to others to assist in helping to locate the location of the wearer, or for any other purpose. Other detection technologies, such as GPS, RFID, manual input, and the like, may be used to determine a wearer's location. Using location or identification data, a database may be accessed by the eyepiece for information that may be overlaid, projected or otherwise displayed with what is being seen. Augmented reality applications and technology will be further described herein.

Figure 7:
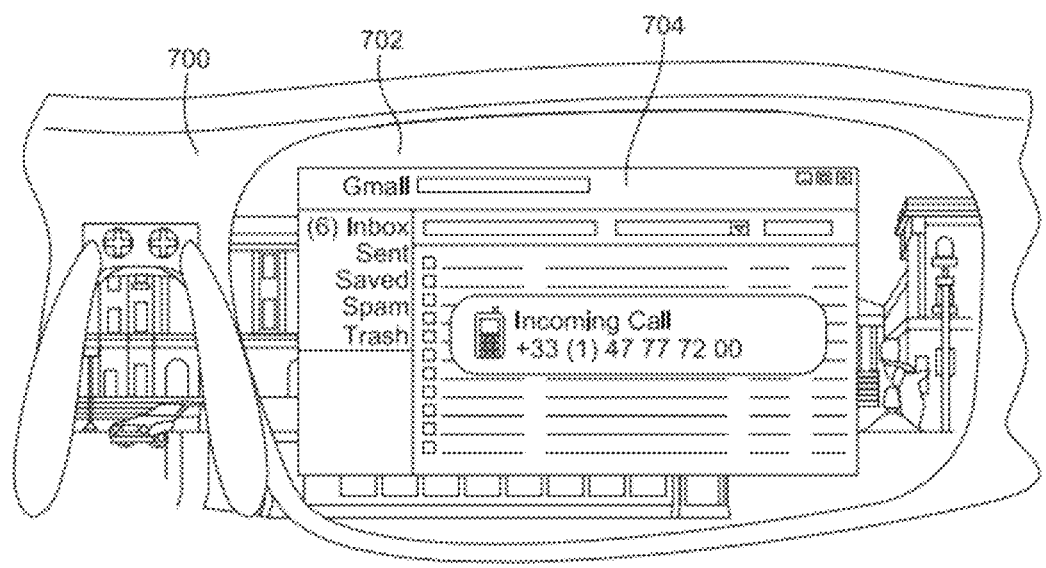
FIG. 7 depicts an embodiment of the eyepiece with a see-through lens.

In FIG. 7, an embodiment of the eyepiece 700 is depicted with a translucent lens 702 on which is being displayed streaming media (an e-mail application) and an incoming call notification. In this embodiment, the media obscures a portion of the viewing area, however, it should be understood that the displayed image may be positioned anywhere in the field of view. In embodiments, the media may be made to be more or less transparent.

Figure 9:
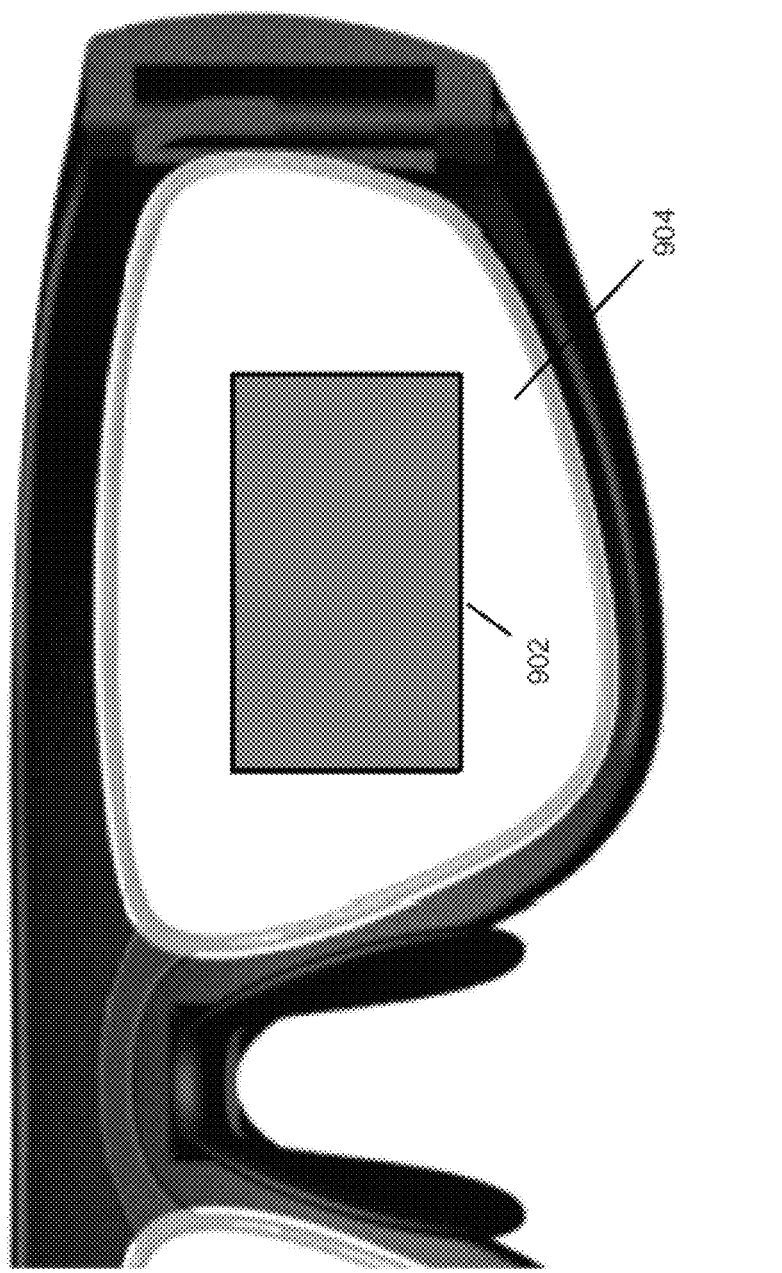
FIG. 9 depicts an electrochromic layer of the eyepiece.

In an embodiment, the eyepiece may receive input from any external source, such as an external converter box. The source may be depicted in the lens of eyepiece. In an embodiment, when the external source is a phone, the eyepiece may use the phone's location capabilities to display location-based augmented reality, including marker overlay from marker-based AR applications. In embodiments, a VNC client running on the eyepiece's processor or an associated device may be used to connect to and control a computer, where the computer's display is seen in the eyepiece by the wearer. In an embodiment, content from any source may be streamed to the eyepiece, such as a display from a panoramic camera riding atop a vehicle, a user interface for a device, imagery from a drone or helicopter, and the like. The lenses may be chromic, such as photochromic or electrochromic. The electrochromic lens may include integral chromic material or a chromic coating which changes the opacity of at least a portion of the lens in response to a burst of charge applied by the processor across the chromic material. For example, and referring to FIG. 9, a chromic portion 902 of the lens 904 is shown darkened, such as for providing greater viewability by the wearer of the eyepiece when that portion is showing displayed content to the wearer. In embodiments, there may be a plurality of chromic areas on the lens that may be controlled independently, such as large portions of the lens, sub-portions of the projected area, programmable areas of the lens and/or projected area, controlled to the pixel level, and the like. Activation of the chromic material may be controlled via the control techniques further described herein or automatically enabled with certain applications (e.g. a streaming video application, a sun tracking application) or in response to a frame-embedded UV sensor. The lens may have an angular sensitive coating which enables transmitting light-waves with low incident angles and reflecting light, such as s-polarized light, with high incident angles. The chromic coating may be controlled in portions or in its entirety, such as by the control technologies described herein. The lenses may be variable contrast. In embodiments, the user may wear the interactive head-mounted eyepiece, where the eyepiece includes an optical assembly through which the user views a surrounding environment and displayed content. The optical assembly may include a corrective element that corrects the user's view of the surrounding environment, an integrated processor for handling content for display to the user, and an integrated image source for introducing the content to the optical assembly. The optical assembly may include an electrochromic layer that provides a display characteristic adjustment that is dependent on displayed content requirements and surrounding environmental conditions. In embodiments, the display characteristic may be brightness, contrast, and the like. The surrounding environmental condition may be a level of brightness that without the display characteristic adjustment would make the displayed content difficult to visualize by the wearer of the eyepiece, where the display characteristic adjustment may be applied to an area of the optical assembly where content is being displayed.

In embodiments, the eyepiece may have brightness, contrast, spatial, resolution, and the like control over the eyepiece display area, such as to alter and improve the user's view of the displayed content against a bright or dark surrounding environment. For example, a user may be using the eyepiece under bright daylight conditions, and in order for the user to clearly see the displayed content the display area my need to be altered in brightness and/or contrast. Alternatively, the viewing area surrounding the display area may be altered. In addition, the area altered, whether within the display area or not, may be spatially oriented or controlled per the application being implemented. For instance, only a small portion of the display area may need to be altered, such as when that portion of the display area deviates from some determined or predetermined contrast ratio between the displayed portion of the display area and the surrounding environment. In embodiments, portions of the lens may be altered in brightness, contrast, spatial extent, resolution, and the like, such as fixed to include the entire display area, adjusted to only a portion of the lens, adaptable and dynamic to changes in lighting conditions of the surrounding environment and/or the brightness-contrast of the displayed content, and the like. Spatial extent (e.g. the area affected by the alteration) and resolution (e.g. display optical resolution) may vary over different portions of the lens, including high resolution segments, low resolution segments, single pixel segments, and the like, where differing segments may be combined to achieve the viewing objectives of the application(s) being executed. In embodiments, technologies for implementing alterations of brightness, contrast, spatial extent, resolution, and the like, may include electrochromic materials, LCD technologies, embedded beads in the optics, flexible displays, suspension particle device (SPD) technologies, colloid technologies, and the like.

In embodiments, there may be various modes of activation of the electrochromic layer. For example, the user may enter sunglass mode where the composite lenses appear only somewhat darkened or the user may enter "Blackout" mode, where the composite lenses appear completely blackened.

In an example of a technology that may be employed in implementing the alterations of brightness, contrast, spatial extent, resolution, and the like, may be electrochromic materials, films, inks, and the like. Electrochromism is the phenomenon displayed by some materials of reversibly changing appearance when electric charge is applied. Various types of materials and structures can be used to construct electrochromic devices, depending on the specific applications. For instance, electrochromic materials include tungsten oxide ($WO_3$), which is the main chemical used in the production of electrochromic windows or smart glass. In embodiments, electrochromic coatings may be used on the lens of the eyepiece in implementing alterations. In another example, electrochromic displays may be used in implementing 'electronic paper', which is designed to mimic the appearance of ordinary paper, where the electronic paper displays reflected light like ordinary paper. In embodiments, electrochromism may be implemented in a wide variety of applications and materials, including gyricon (consisting of polyethylene spheres embedded in a transparent silicone sheet, with each sphere suspended in a bubble of oil so that they can rotate freely), electro-phoretic displays (forming images by rearranging charged pigment particles using an applied electric field), E-Ink technology, electro-wetting, electro-fluidic, interferometric modulator, organic transistors embedded into flexible substrates, nano-chromics displays (NCD), and the like.

In another example of a technology that may be employed in implementing the alterations of brightness, contrast, spatial extent, resolution, and the like, may be suspended particle devices (SPD). When a small voltage is applied to an SPD film, its microscopic particles, which in their stable state are randomly dispersed, become aligned and allow light to pass through. The response may be immediate, uniform, and with stable color throughout the film. Adjustment of the voltage may allow users to control the amount of light, glare and heat passing through. The system's response may range from a dark blue appearance, with up to full blockage of light in its off state, to clear in its on state. In embodiments, SPD technology may be an emulsion applied on a plastic substrate creating the active film. This plastic film may be laminated (as a single glass pane), suspended between two sheets of glass, plastic or other transparent materials, and the like.

The augmented reality glasses may include a lens 818 for each eye of the wearer. The lenses 818 may be made to fit readily into the frame 814, so that each lens may be tailored for the person for whom the glasses are intended. Thus, the lenses may be corrective lenses, and may also be tinted for use as sunglasses, or have other qualities suitable for the intended environment. Thus, the lenses may be tinted yellow, dark or other suitable color, or may be photochromic, so that the transparency of the lens decreases when exposed to brighter light. In one embodiment, the lenses may also be designed for snap fitting into the frames, i.e., snap on lenses are one embodiment.

Of course, the lenses need not be corrective lenses; they may simply serve as sunglasses or as protection for the optical system within the frame. It goes without saying that the outer lenses are important for helping to protect the rather expensive waveguides, viewing systems and electronics within the augmented reality glasses. At a minimum, the outer lenses offer protection from scratching by the environment of the user, whether sand, brambles, thorns and the like, in one environment, and flying debris, bullets and shrapnel, in another environment. In addition, the outer lenses may be decorative, acting to change a look of the lens, perhaps to appeal to the individuality or fashion sense of a user. The outer lenses may also help one individual user to distinguish his or her glasses from others, for example, when many users are gathered together.

It is desirable that the lenses be suitable for impact, such as a ballistic impact. Accordingly, in one embodiment, the lenses and the frames meet ANSI Standard Z87.1-2010 for ballistic resistance. In one embodiment, the lenses also meet ballistic standard CE EN166B. In another embodiment, for military uses, the lenses and frames may meet the standards of MIL-PRF-31013, standards 3.5.1.1 or 4.4.1.1. Each of these standards has slightly different requirements for ballistic resistance and each is intended to protect the eyes of the user from impact by high-speed projectiles or debris. While no particular material is specified, polycarbonate, such as certain Lexan® grades, usually is sufficient to pass tests specified in the appropriate standard.

Figure 8A:
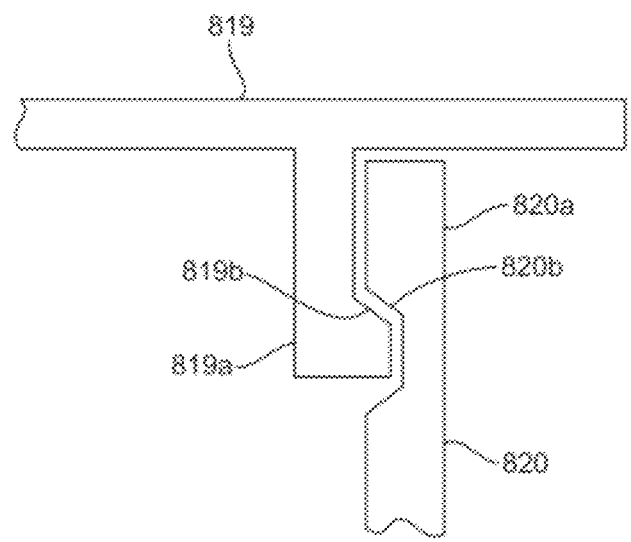
FIGS. 8a and 8b depict an embodiment of snap-fit optics.

In one embodiment, as shown in FIG. 8a, the lenses snap in from the outside of the frame, not the inside, for better impact resistance, since any impact is expected from the outside of the augmented reality eyeglasses. In this embodiment, replaceable lens 819 has a plurality of snap-fit arms 819a which fit into recesses 820a of frame 820. The engagement angle 819b of the arm is greater than 90°, while the engagement angle 820b of the recess is also greater than 90°. Making the angles greater than right angles has the practical effect of allowing removal of lens 819 from the frame 820. The lens 819 may need to be removed if the person's vision has changed or if a different lens is desired for any reason. The design of the snap fit is such that there is a slight compression or bearing load between the lens and the frame. That is, the lens may be held firmly within the frame, such as by a slight interference fit of the lens within the frame.

The cantilever snap fit of FIG. 8a is not the only possible way to removably snap-fit the lenses and the frame. For example, an annular snap fit may be used, in which a continuous sealing lip of the frame engages an enlarged edge of the lens, which then snap-fits into the lip, or possibly over the lip. Such a snap fit is typically used to join a cap to an ink pen. This configuration may have an advantage of a sturdier joint with fewer chances for admission of very small dust and dirt particles. Possible disadvantages include the fairly tight tolerances required around the entire periphery of both the lens and frame, and the requirement for dimensional integrity in all three dimensions over time.

Figure 8B:
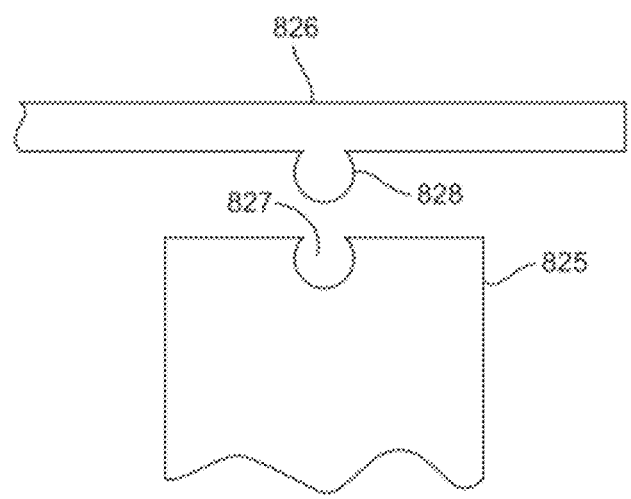

It is also possible to use an even simpler interface, which may still be considered a snap-fit. A groove may be molded into an outer surface of the frame, with the lens having a protruding surface, which may be considered a tongue that fits into the groove. If the groove is semi-cylindrical, such as from about 270° to about 300°, the tongue will snap into the groove and be firmly retained, with removal still possible through the gap that remains in the groove. In this embodiment, shown in FIG. 8b, a lens or replacement lens or cover 826 with a tongue 828 may be inserted into a groove 827 in a frame 825, even though the lens or cover is not snap-fit into the frame. Because the fit is a close one, it will act as a snap-fit and securely retain the lens in the frame.

In another embodiment, the frame may be made in two pieces, such as a lower portion and an upper portion, with a conventional tongue-and-groove fit. In another embodiment, this design may also use standard fasteners to ensure a tight grip of the lens by the frame. The design should not require disassembly of anything on the inside of the frame. Thus, the snap-on or other lens or cover should be assembled onto the frame, or removed from the frame, without having to go inside the frame. As noted in other parts of this disclosure, the augmented reality glasses have many component parts. Some of the assemblies and subassemblies may require careful alignment. Moving and jarring these assemblies may be detrimental to their function, as will moving and jarring the frame and the outer or snap-on lens or cover.

In an embodiment, the electro-optics characteristics may be, but not limited to, as follows:

| Optic Characteristics | Value |
|---|---|
| WAVEGUIDE | |
| virtual display field of view (Diagonal) | ~25 - 30 degrees (equivalent to the FOV of a 24" monitor viewed at 1 m distance) |
| see-through field of view | more than 80 degrees |
| eye clearance | more than 18 mm |
| Material | zeonex optical plastic |
| weight approx | 15 grams |
| Wave Guide dimensions | 60 × 30 × 10 mm (or 9) |
| Size | 15.5 mm (diagonal) |
| Material | PMMA (optical plastics) |
| FOV | 53.5° (diagonal) |
| Active display area | 12.7 mm × 9.0 mm |
| Resolution | 800 × 600 pixels |
| VIRTUAL IMAGING SYSTEM | |
| Type | Folded FFS prism |
| Effective focal length | 15 mm |
| Exit pupil diameter | 8 mm |
| Eye relief | 18.25 mm |
| F# | 1.875 |
| Number of free form surfaces | 2-3 |
| AUGMENTED VIEWING SYSTEM | |
| Type | Free form Lens |
| Number of free form surfaces | 2 |
| Other Parameters | |
| Wavelength | 656.3-486.1 nm |
| Field of view | 45° H × 32° V |
| Vignetting | 0.15 for the top and bottom fields |

-continued

| Optic Characteristics | Value |
|---|---|
| Distortion | <12% at the maximum field |
| Image quality | MTF > 10% at 301 p/mm |

In an embodiment, the Projector Characteristics may be as follows:

| Projector Characteristics | Value |
|---|---|
| Brightness | Adjustable, .25-2 Lumens |
| Voltage | 3.6 VDC |
| Illumination | Red, Green and Blue LEDs |
| Display | SVGA 800 × 600 dpi Syndiant LCOS Display |
| Power Consumption | Adjustable, 50 to 250 mw |
| Target MPE Dimensions | Approximately 24 mm × 12 mm × 6 mm |
| Focus | Adjustable |
| Optics Housing | 6061-T6 Aluminum and Glass-filled ABS/PC |
| Weight | 5 gms |
| RGB Engine | Adjustable Color Output |
| ARCHITECTURE | |
| | 2x 1 GHZ processor cores |
| | 633 MHZ DSPs |
| | 30 M polygons/sec DC graphics accelerator |
| IMAGE CORRECTION | |
| | real-time sensing |
| | image enhancement |
| | noise reduction |
| | keystone correction |
| | perspective correction |

In another embodiment, an augmented reality eyepiece may include electrically-controlled lenses as part of the microprojector or as part of the optics between the microprojector and the waveguide. FIG. 21 depicts an embodiment with such liquid lenses 2152.

The glasses also include at least one camera or optical sensor 2130 that may furnish an image or images for viewing by the user. The images are formed by a microprojector 2114 on each side of the glasses for conveyance to the waveguide 2108 on that side. In one embodiment, an additional optical element, a variable focus lens 2152 is also furnished. The lens is electrically adjustable by the user so that the image seen in the waveguides 2108 are focused for the user.

Variable lenses may include the so-called liquid lenses furnished by Varioptic, S.A., Lyons, France, or by LensVector, Inc., Mountain View, Calif., U.S.A. Such lenses may include a central portion with two immiscible liquids. Typically, in these lenses, the path of light through the lens, i.e., the focal length of the lens is altered or focused by applying an electric potential between electrodes immersed in the liquids. At least one of the liquids is affected by the resulting electric or magnetic field potential. Thus, electrowetting may occur, as described in U.S. Pat. Appl. Publ. 2010/0007807, assigned to LensVector, Inc. Other techniques are described in LensVector Pat. Appl. Publs. 2009/021331 and 2009/0316097. All three of these disclosures are incorporated herein by reference, as though each page and figures were set forth verbatim herein.

Other patent documents from Varioptic, S.A., describe other devices and techniques for a variable focus lens, which may also work through an electrowetting phenomenon. These documents include U.S. Pat. Nos. 7,245,440 and 7,894,440 and U.S. Pat. Appl. Publs. 2010/0177386 and 2010/0295987, each of which is also incorporated herein by reference, as though each page and figures were set forth verbatim herein. In these documents, the two liquids typically have different indices of refraction and different electrical conductivities, e.g., one liquid is conductive, such as an aqueous liquid, and the other liquid is insulating, such as an oily liquid. Applying an electric potential may change the thickness of the lens and does change the path of light through the lens, thus changing the focal length of the lens.

The electrically-adjustable lenses may be controlled by the controls of the glasses. In one embodiment, a focus adjustment is made by calling up a menu from the controls and adjusting the focus of the lens. The lenses may be controlled separately or may be controlled together. The adjustment is made by physically turning a control knob, by indicating with a gesture, or by voice command. In another embodiment, the augmented reality glasses may also include a rangefinder, and focus of the electrically-adjustable lenses may be controlled automatically by pointing the rangefinder, such as a laser rangefinder, to a target or object a desired distance away from the user.

As shown in U.S. Pat. No. 7,894,440, discussed above, the variable lenses may also be applied to the outer lenses of the augmented reality glasses or eyepiece. In one embodiment, the lenses may simply take the place of a corrective lens. The variable lenses with their electric-adjustable control may be used instead of or in addition to the image source- or projector-mounted lenses. The corrective lens inserts provide corrective optics for the user's environment, the outside world, whether the waveguide displays are active or not.

It is important to stabilize the images presented to the wearer of the augmented reality glasses or eyepiece(s), that is, the images seen in the waveguide. The view or images presented travel from one or two digital cameras or sensors mounted on the eyepiece, to digital circuitry, where the images are processed and, if desired, stored as digital data before they appear in the display of the glasses. In any event, and as discussed above, the digital data is then used to form an image, such as by using an LCOS display and a series of RGB light emitting diodes. The light images are processed using a series of lenses, a polarizing beam splitter, an electrically-powered liquid corrective lens and at least one transition lens from the projector to the.

The process of gathering and presenting images includes several mechanical and optical linkages between components of the augmented reality glasses. It seems clear, therefore, that some form of stabilization will be required. This may include optical stabilization of the most immediate cause, the camera itself, since it is mounted on a mobile platform, the glasses, which themselves are movably mounted on a mobile user. Accordingly, camera stabilization or correction may be required. In addition, at least some stabilization or correction should be used for the liquid variable lens. Ideally, a stabilization circuit at that point could correct not only for the liquid lens, but also for any aberration and vibration from many parts of the circuit upstream from the liquid lens, including the image source. One advantage of the present system is that many commercial off-the-shelf cameras are very advanced and typically have at least one image-stabilization feature or option. Thus, there may be many embodiments of the present disclosure, each with a same or a different method of stabilizing an image or a very fast stream of images, as discussed below. The term optical stabilization is typically used herein with the meaning of physically stabilizing the camera, camera platform, or other physical object, while image stabilization refers to data manipulation and processing.

One technique of image stabilization is performed on digital images as they are formed. This technique may use pixels outside the border of the visible frame as a buffer for the undesired motion. Alternatively, the technique may use another relatively steady area or basis in succeeding frames. This technique is applicable to video cameras, shifting the electronic image from frame to frame of the video in a manner sufficient to counteract the motion. This technique does not depend on sensors and directly stabilizes the images by reducing vibrations and other distracting motion from the moving camera. In some techniques, the speed of the images may be slowed in order to add the stabilization process to the remainder of the digital process, and requiring more time per image. These techniques may use a global motion vector calculated from frame-to-frame motion differences to determine the direction of the stabilization.

Optical stabilization for images uses a gravity- or electronically-driven mechanism to move or adjust an optical element or imaging sensor such that it counteracts the ambient vibrations. Another way to optically stabilize the displayed content is to provide gyroscopic correction or sensing of the platform housing the augmented reality glasses, e.g., the user. As noted above, the sensors available and used on the augmented reality glasses or eyepiece include MEMS gyroscopic sensors. These sensors capture movement and motion in three dimensions in very small increments and can be used as feedback to correct the images sent from the camera in real time. It is clear that at least a large part of the undesired and undesirable movement probably is caused by movement of the user and the camera itself. These larger movements may include gross movements of the user, e.g., walking or running, riding in a vehicle. Smaller vibrations may also result within the augmented reality eyeglasses, that is, vibrations in the components in the electrical and mechanical linkages that form the path from the camera (input) to the image in the waveguide (output). These gross movements may be more important to correct or to account for, rather than, for instance, independent and small movements in the linkages of components downstream from the projector.

Figure 34A:
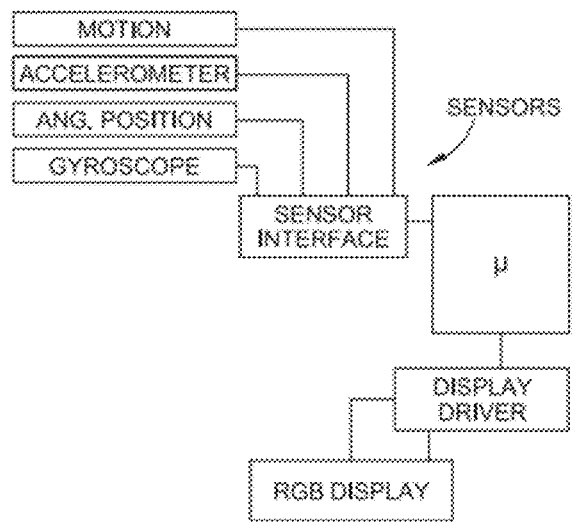
FIG. 34 depicts embodiments of the eyepiece for optical or digital stabilization.

Motion sensing may thus be used to sense the motion and correct for it, as in optical stabilization, or to sense the motion and then correct the images that are being taken and processed, as in image stabilization. An apparatus for sensing motion and correcting the images or the data is depicted in FIG. 34A. In this apparatus, one or more kinds of motion sensors may be used, including accelerometers, angular position sensors or gyroscopes, such as MEMS gyroscopes. Data from the sensors is fed back to the appropriate sensor interfaces, such as analog to digital converters (ADCs) or other suitable interface, such as digital signal processors (DSPs). A microprocessor then processes this information, as discussed above, and sends image-stabilized frames to the display driver and then to the see-through display or waveguide discussed above. In one embodiment, the display begins with the RGB display in the microprojector of the augmented reality eyepiece.

Figure 34B:
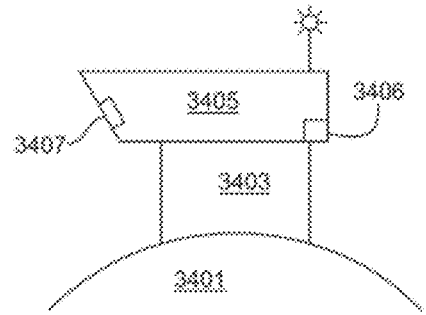

In another embodiment, a video sensor or augmented reality glasses, or other device with a video sensor may be mounted on a vehicle. In this embodiment, the video stream may be communicated through a telecommunication capability or an Internet capability in the vehicle. One application could be sightseeing or touring of an area. Another embodiment could be exploring or reconnaissance, or even patrolling, of an area. In these embodiments, gyroscopic stabilization of the image sensor would be helpful, rather than applying a gyroscopic correction to the images or digital data representing the images. An embodiment of this technique is depicted in FIG. 34B. In this technique, a camera or image sensor 3407 is mounted on a vehicle 3401. One or more motion sensors 3406, such as gyroscopes, are mounted in the camera assembly 3405. A stabilizing platform 3403 receives information from the motion sensors and stabilizes the camera assembly 3405, so that jitter and wobble are minimized while the camera operates. This is true optical stabilization. Alternatively, the motion sensors or gyroscopes may be mounted on or within the stabilizing platform itself. This technique would actually provide optical stabilization, stabilizing the camera or image sensor, in contrast to digital stabilization, correcting the image afterwards by computer processing of the data taken by the camera.

In one technique, the key to optical stabilization is to apply the stabilization or correction before an image sensor converts the image into digital information. In one technique, feedback from sensors, such as gyroscopes or angular velocity sensors, is encoded and sent to an actuator that moves the image sensor, much as an autofocus mechanism adjusts a focus of a lens. The image sensor is moved in such a way as to maintain the projection of the image onto the image plane, which is a function of the focal length of the lens being used. Autoranging and focal length information, perhaps from a range finder of the interactive head-mounted eyepiece, may be acquired through the lens itself. In another technique, angular velocity sensors, sometimes also called gyroscopic sensors, can be used to detect, respectively, horizontal and vertical movements. The motion detected may then be fed back to electromagnets to move a floating lens of the camera. This optical stabilization technique, however, would have to be applied to each lens contemplated, making the result rather expensive.

Stabilization of the liquid lens is discussed in U.S. Pat. Appl. Publ. 2010/0295987, assigned to Varioptic, S.A., Lyon, France. In theory, control of a liquid lens is relatively simple, since there is only one variable to control: the level of voltage applied to the electrodes in the conducting and non-conducting liquids of the lens, using, for examples, the lens housing and the cap as electrodes. Applying a voltage causes a change or tilt in the liquid-liquid interface via the electrowetting effect. This change or tilt adjusts the focus or output of the lens. In its most basic terms, a control scheme with feedback would then apply a voltage and determine the effect of the applied voltage on the result, i.e., a focus or an astigmatism of the image. The voltages may be applied in patterns, for example, equal and opposite + and − voltages, both positive voltages of differing magnitude, both negative voltages of differing magnitude, and so forth. Such lenses are known as electrically variable optic lenses or electro-optic lenses.

Figure 34C:
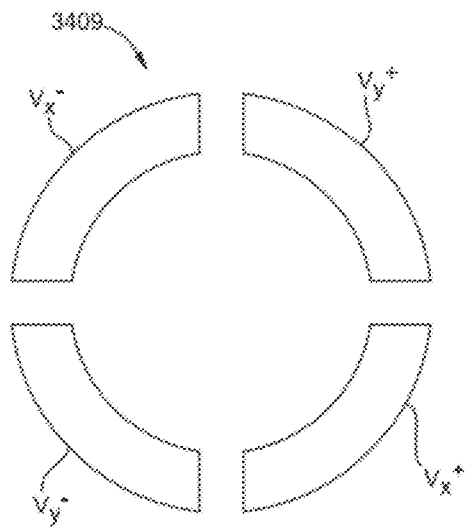

Voltages may be applied to the electrodes in patterns for a short period of time and a check on the focus or astigmatism made. The check may be made, for instance, by an image sensor. In addition, sensors on the camera or in this case the lens, may detect motion of the camera or lens. Motion sensors would include accelerometers, gyroscopes, angular velocity sensors or piezoelectric sensors mounted on the liquid lens or a portion of the optic train very near the liquid lens. In one embodiment, a table, such as a calibration table, is then constructed of voltages applied and the degree of correction or voltages needed for given levels of movement. More sophistication may also be added, for example, by using segmented electrodes in different portions of the liquid so that four voltages may be applied rather than two. Of course, if four electrodes are used, four voltages may be applied, in many more patterns than with only two electrodes. These patterns may include equal and opposite positive and negative voltages to opposite segments, and so forth. An example is depicted in FIG. 34C. Four electrodes 3409 are mounted within a liquid lens housing (not shown). Two electrodes are mounted in or near the non-conducting liquid and two are mounted in or near the conducting liquid. Each electrode is independent in terms of the possible voltage that may be applied.

Look-up or calibration tables may be constructed and placed in the memory of the augmented reality glasses. In use, the accelerometer or other motion sensor will sense the motion of the glasses, i.e., the camera on the glasses or the lens itself. A motion sensor such as an accelerometer will sense in particular, small vibration-type motions that interfere with smooth delivery of images to the waveguide. In one embodiment, the image stabilization techniques described here can be applied to the electrically-controllable liquid lens so that the image from the projector is corrected immediately. This will stabilize the output of the projector, at least partially correcting for the vibration and movement of the augmented reality eyepiece, as well as at least some movement by the user. There may also be a manual control for adjusting the gain or other parameter of the corrections. Note that this technique may also be used to correct for near-sightedness or far-sightedness of the individual user, in addition to the focus adjustment already provided by the image sensor controls and discussed as part of the adjustable-focus projector.

Another variable focus element uses tunable liquid crystal cells to focus an image. These are disclosed, for example, in U.S. Pat. Appl. Publ. Nos. 2009/0213321, 2009/0316097 and 2010/0007807, which are hereby incorporated by reference in their entirety and relied on. In this method, a liquid crystal material is contained within a transparent cell, preferably with a matching index of refraction. The cell includes transparent electrodes, such as those made from indium tin oxide (ITO). Using one spiral-shaped electrode, and a second spiral-shaped electrode or a planar electrode, a spatially non-uniform magnetic field is applied. Electrodes of other shapes may be used. The shape of the magnetic field determines the rotation of molecules in the liquid crystal cell to achieve a change in refractive index and thus a focus of the lens. The liquid crystals can thus be electromagnetically manipulated to change their index of refraction, making the tunable liquid crystal cell act as a lens.

Figure 34D:
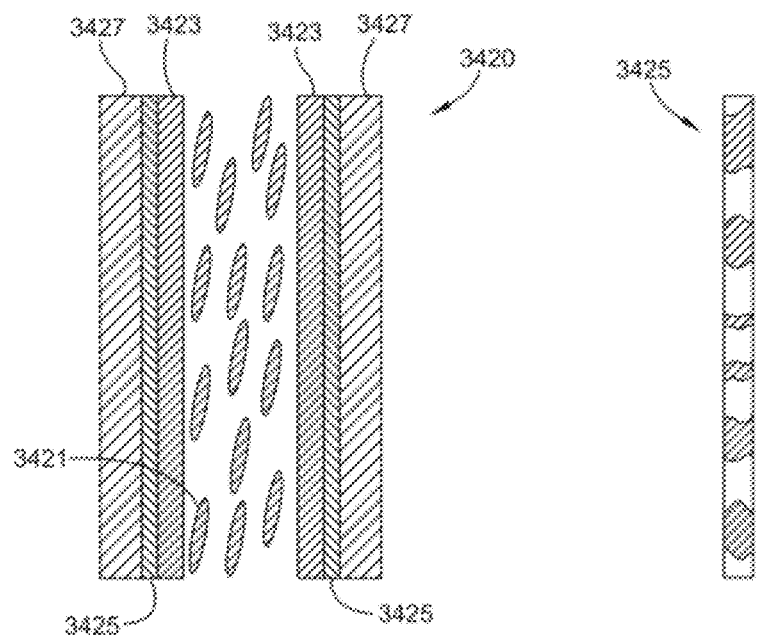
Figure 34E:
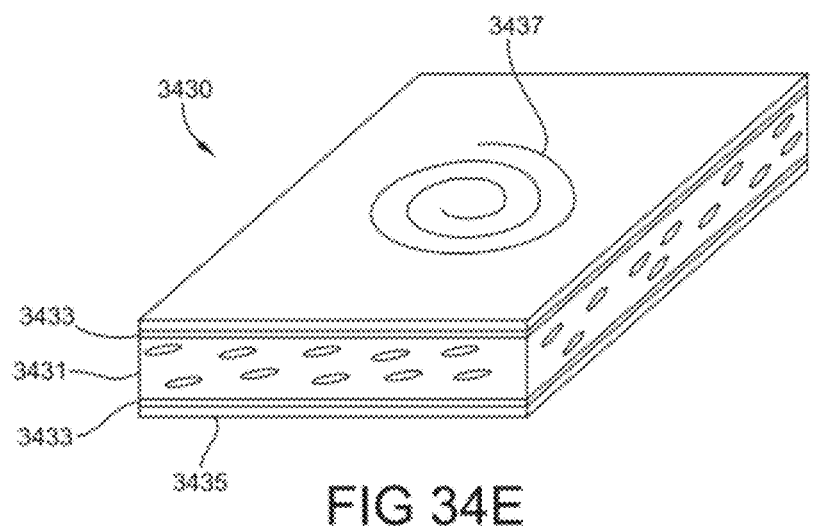

In a first embodiment, a tunable liquid crystal cell 3420 is depicted in FIG. 34D. The cell includes an inner layer of liquid crystal 3421 and thin layers 3423 of orienting material such as polyimide. This material helps to orient the liquid crystals in a preferred direction. Transparent electrodes 3425 are on each side of the orienting material. An electrode may be planar, or may be spiral shaped as shown on the right in FIG. 34D. Transparent glass substrates 3427 contain the materials within the cell. The electrodes are formed so that they will lend shape to the magnetic field. As noted, a spiral shaped electrode on one or both sides, such that the two are not symmetrical, is used in one embodiment. A second embodiment is depicted in FIG. 34E. Tunable liquid crystal cell 3430 includes central liquid crystal material 3431, transparent glass substrate walls 3433, and transparent electrodes. Bottom electrode 3435 is planar, while top electrode 3437 is in the shape of a spiral. Transparent electrodes may be made of indium tin oxide (ITO).

Additional electrodes may be used for quick reversion of the liquid crystal to a non-shaped or natural state. A small control voltage is thus used to dynamically change the refractive index of the material the light passes through. The voltage generates a spatially non-uniform magnetic field of a desired shape, allowing the liquid crystal to function as a lens.

In one embodiment, the camera includes the black silicon, short wave infrared (SWIR) CMOS sensor described elsewhere in this patent. In another embodiment, the camera is a 5 megapixel (MP) optically-stabilized video sensor. In one embodiment, the controls include a 3 GHz microprocessor or microcontroller, and may also include a 633 MHz digital signal processor with a 30 M polygon/second graphic accelerator for real-time image processing for images from the camera or video sensor. In one embodiment, the augmented reality glasses may include a wireless internet, radio or telecommunications capability for wideband, personal area network (PAN), local area network (LAN), a wide local area network, WLAN, conforming to IEEE 802.11, or reach-back communications. The equipment furnished in one embodiment includes a Bluetooth capability, conforming to IEEE 802.15. In one embodiment, the augmented reality glasses include an encryption system, such as a 256-bit Advanced Encryption System (AES) encryption system or other suitable encryption program, for secure communications.

In one embodiment, the wireless telecommunications may include a capability for a 3G or 4G network and may also include a wireless internet capability. In order for an extended life, the augmented reality eyepiece or glasses may also include at least one lithium-ion battery, and as discussed above, a recharging capability. The recharging plug may comprise an AC/DC power converter and may be capable of using multiple input voltages, such as 120 or 240 VAC. The controls for adjusting the focus of the adjustable focus lenses in one embodiment comprises a 2D or 3D wireless air mouse or other non-contact control responsive to gestures or movements of the user. A 2D mouse is available from Logitech, Fremont, Calif., USA. A 3D mouse is described herein, or others such as the Cideko AVK05 available from Cideko, Taiwan, R.O.C, may be used.

In an embodiment, the eyepiece may comprise electronics suitable for controlling the optics, and associated systems, including a central processing unit, non-volatile memory, digital signal processors, 3-D graphics accelerators, and the like. The eyepiece may provide additional electronic elements or features, including inertial navigation systems, cameras, microphones, audio output, power, communication systems, sensors, stopwatch or chronometer functions, thermometer, vibratory temple motors, motion sensor, a microphone to enable audio control of the system, a UV sensor to enable contrast and dimming with photochromic materials, and the like.

In an embodiment, the central processing unit (CPU) of the eyepiece may be an OMAP 4, with dual 1 GHz processor cores. The CPU may include a 633 MHz DSP, giving a capability for the CPU of 30 million polygons/second.

The system may also provide dual micro-SD (secure digital) slots for provisioning of additional removable non-volatile memory.

An on-board camera may provide 1.3 MP color and record up to 60 minutes of video footage. The recorded video may be transferred wirelessly or using a mini-USB transfer device to off-load footage.

The communications system-on-a-chip (SOC) may be capable of operating with wide local area networks (WLAN), Bluetooth version 3.0, a GPS receiver, an FM radio, and the like.

The eyepiece may operate on a 3.6 VDC lithium-ion rechargeable battery for long battery life and ease of use. An additional power source may be provided through solar cells on the exterior of the frame of the system. These solar cells may supply power and may also be capable of recharging the lithium-ion battery.

The total power consumption of the eyepiece may be approximately 400 mW, but is variable depending on features and applications used. For example, processor-intensive applications with significant video graphics demand more power, and will be closer to 400 mW. Simpler, less video-intensive applications will use less power. The operation time on a charge also may vary with application and feature usage.

The micro-projector illumination engine, also known herein as the projector, may include multiple light emitting diodes (LEDs). In order to provide life-like color, Osram red, Cree green, and Cree blue LEDs are used. These are die-based LEDs. The RGB engine may provide an adjustable color output, allowing a user to optimize viewing for various programs and applications.

In embodiments, illumination may be added to the glasses or controlled through various means. For example, LED lights or other lights may be embedded in the frame of the eyepiece, such as in the nose bridge, around the composite lens, or at the temples.

The intensity of the illumination and or the color of illumination may be modulated. Modulation may be accomplished through the various control technologies described herein, through various applications, filtering and magnification.

By way of example, illumination may be modulated through various control technologies described herein such as through the adjustment of a control knob, a gesture, eye movement, or voice command. If a user desires to increase the intensity of illumination, the user may adjust a control knob on the glasses or he may adjust a control knob in the user interface displayed on the lens or by other means. The user may use eye movements to control the knob displayed on the lens or he may control the knob by other means. The user may adjust illumination through a movement of the hand or other body movement such that the intensity or color of illumination changes based on the movement made by the user. Also, the user may adjust the illumination through a voice command such as by speaking a phrase requesting increased or decreased illumination or requesting other colors to be displayed. Additionally, illumination modulation may be achieved through any control technology described herein or by other means.

Further, the illumination may be modulated per the particular application being executed. As an example, an application may automatically adjust the intensity of illumination or color of illumination based on the optimal settings for that application. If the current levels of illumination are not at the optimal levels for the application being executed, a message or command may be sent to provide for illumination adjustment.

In embodiments, illumination modulation may be accomplished through filtering and or through magnification. For example, filtering techniques may be employed that allow the intensity or color of the light to be changed such that the optimal or desired illumination is achieved. Also, in embodiments, the intensity of the illumination may be modulated by applying greater or less magnification to reach the desired illumination intensity.

The projector may be connected to the display to output the video and other display elements to the user. The display used may be an SVGA 800×600 dots/inch SYNDIANT liquid crystal on silicon (LCoS) display.

The target MPE dimensions for the system may be 24 mm×12 mm×6 mm.

The focus may be adjustable, allowing a user to refine the projector output to suit their needs.

The optics system may be contained within a housing fabricated for 6061-T6 aluminum and glass-filled ABS/PC.

The weight of the system, in an embodiment, is estimated to be 3.75 ounces, or 95 grams.

Figure 11:
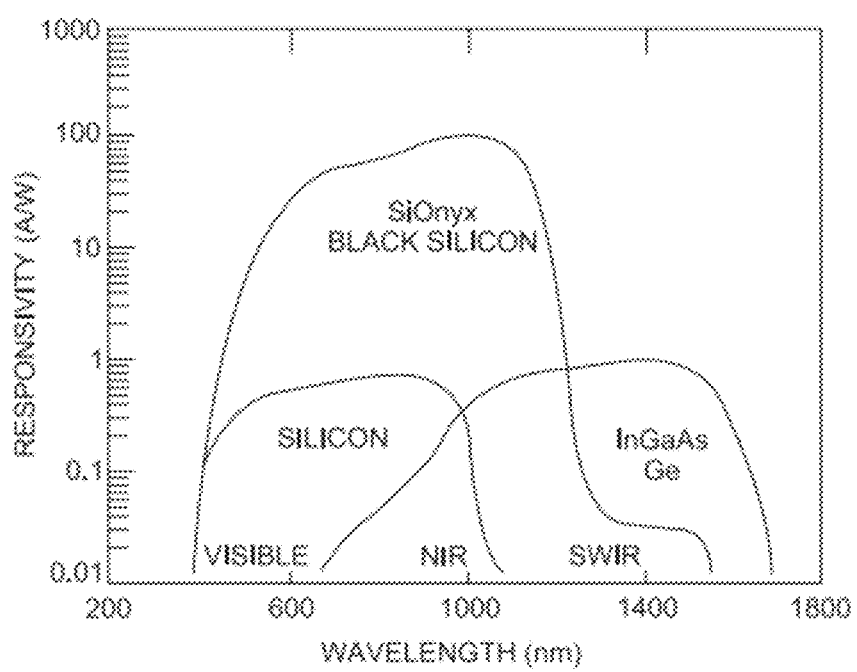
FIG. 11 depicts a plot of responsivity versus wavelength for three substrates.

In an embodiment, the eyepiece and associated electronics provide night vision capability. This night vision capability may be enabled by a black silicon SWIR sensor. Black silicon is a complementary metal-oxide silicon (CMOS) processing technique that enhances the photo response of silicon over 100 times. The spectral range is expanded deep into the short wave infra-red (SWIR) wavelength range. In this technique, a 300 nm deep absorbing and anti-reflective layer is added to the glasses. This layer offers improved responsivity as shown in FIG. 11, where the responsivity of black silicon is much greater than silicon's over the visible and NIR ranges and extends well into the SWIR range. This technology is an improvement over current technology, which suffers from extremely high cost, performance issues, as well as high volume manufacturability problems. Incorporating this technology into night vision optics brings the economic advantages of CMOS technology into the design.

These advantages include using active illumination only when needed. In some instances there may be sufficient natural illumination at night, such as during a full moon. When such is the case, artificial night vision using active illumination may not be necessary. With black silicon CMOS-based SWIR sensors, active illumination may not be needed during these conditions, and is not provided, thus improving battery life.

Figure 12:
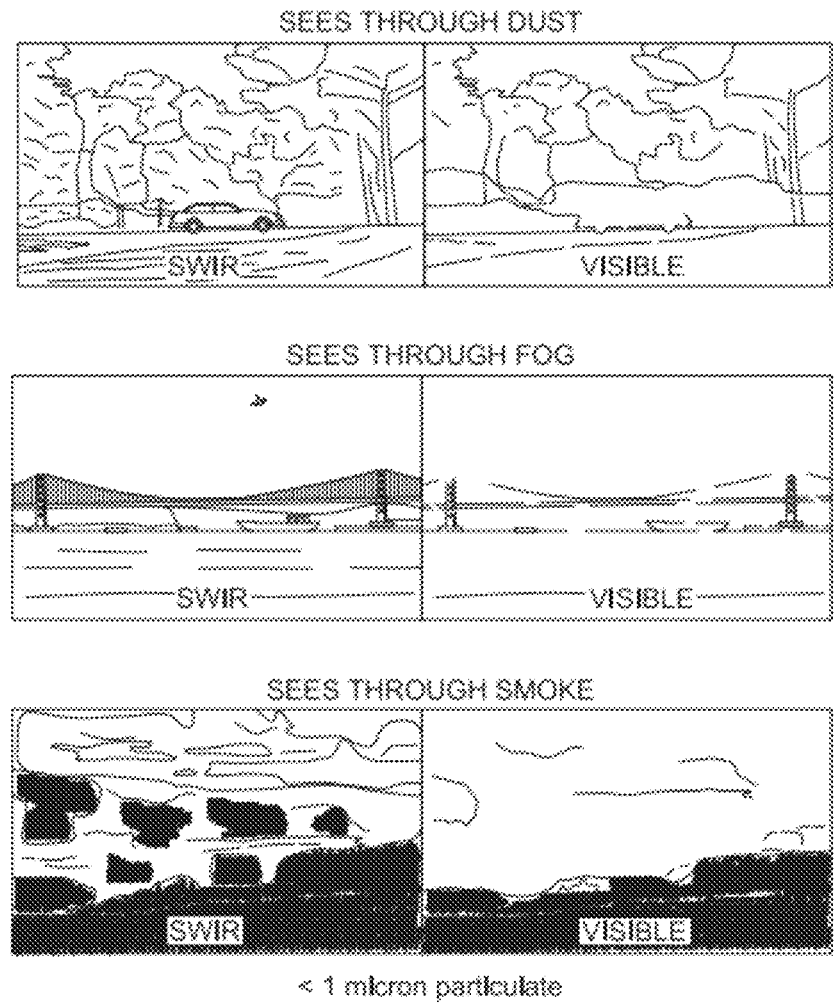
FIG. 12 illustrates the performance of the black silicon sensor.

In addition, a black silicon image sensor may have over eight times the signal to noise ration found in costly indium-gallium arsenide image sensors under night sky conditions. Better resolution is also provided by this technology, offering much higher resolution than available using current technology for night vision. Typically, long wavelength images produced by CMOS-based SWIR have been difficult to interpret, having good heat detection, but poor resolution. This problem is solved with a black image silicon SWIR sensor, which relies on much shorter wavelengths. SWIR is highly desirable for battlefield night vision glasses for these reasons. FIG. 12 illustrates the effectiveness of black silicon night vision technology, providing both before and after images of seeing through a) dust; b) fog, and c) smoke. The images in FIG. 12 demonstrate the performance of the new VIS/NIR/SWIR black silicon sensor.

Figure 17:
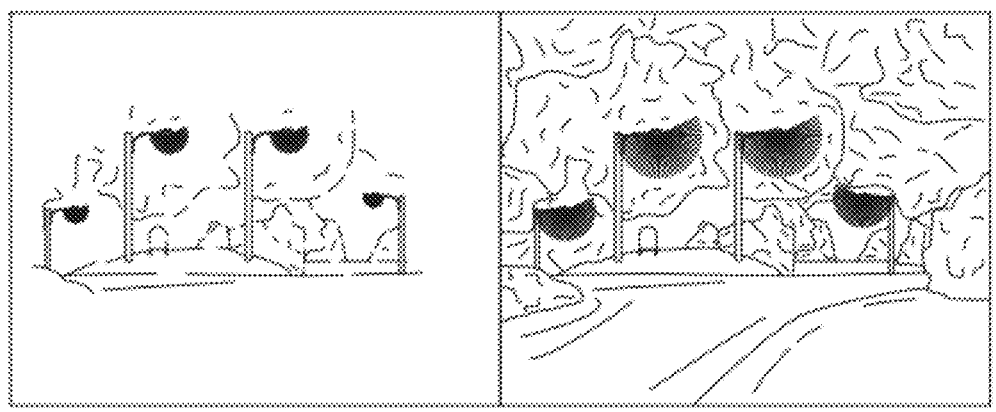
FIG. 17 shows the difference in image quality between A) a flexible platform of uncooled CMOS image sensors capable of VIS/NIR/SWIR imaging and B) an image intensified night vision system

Previous night vision systems suffered from "blooms" from bright light sources, such as streetlights. These "blooms" were particularly strong in image intensifying technology and are also associated with a loss of resolution. In some cases, cooling systems are necessary in image intensifying technology systems, increasing weight and shortening battery power lifespan. FIG. 17 shows the difference in image quality between A) a flexible platform of uncooled CMOS image sensors capable of VIS/NIR/SWIR imaging and B) an image intensified night vision system.

Figure 13A:
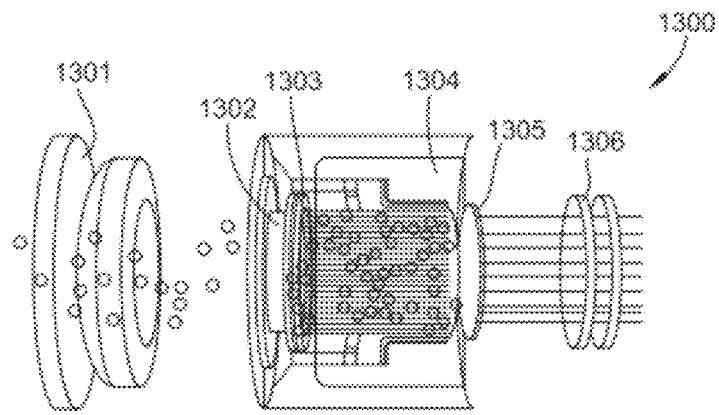
FIG. 13a depicts an incumbent night vision system.
Figure 13B:
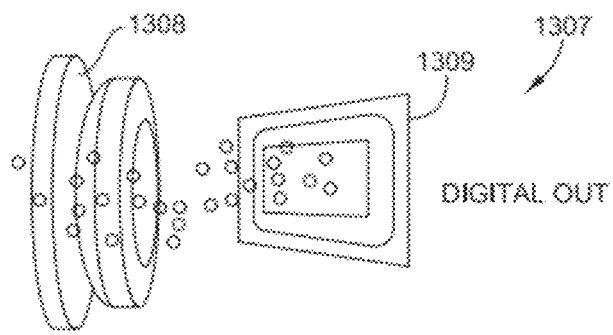
FIG. 13b depicts the night vision system of the present disclosure.

FIG. 13 depicts the difference in structure between current or incumbent vision enhancement technology and uncooled CMOS image sensors. The incumbent platform (FIG. 13A) limits deployment because of cost, weight, power consumption, spectral range, and reliability issues. Incumbent systems 1300 are typically comprised of a front lens 1301, photocathode 1302, micro channel plate 1303, high voltage power supply 1304, phosphorous screen 1305, and eyepiece 1306. This is in contrast to a flexible platform (FIG. 13B) of uncooled CMOS image sensors 1307 capable of VIS/NIR/SWIR imaging at a fraction of the cost, power consumption, and weight. These much simpler sensors include a front lens 1308 and an image sensor 1309 with a digital image output.

Figure 13C:
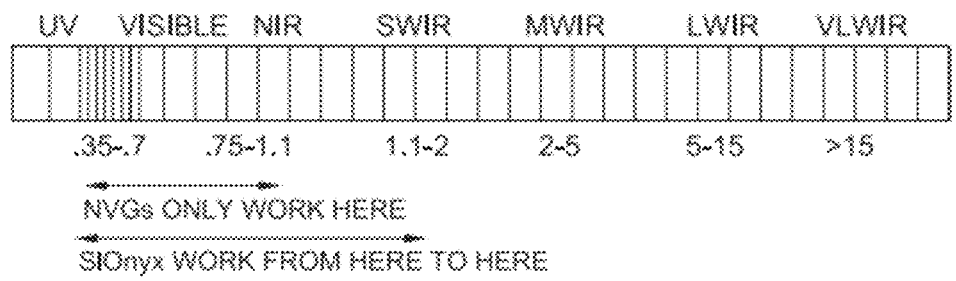
FIG. 13c illustrates the difference in responsivity between the two.

These advantages derive from the CMOS compatible processing technique that enhances the photo response of silicon over 100 times and extends the spectral range deep into the short wave infrared region. The difference in responsivity is illustrated in FIG. 13C. While typical night vision goggles are limited to the UV, visible and near infrared (NIR) ranges, to about 1100 nm (1.1 micrometers) the newer CMOS image sensor ranges also include the short wave infrared (SWIR) spectrum, out to as much as 2000 nm (2 micrometers).

The black silicon core technology may offer significant improvement over current night vision glasses. Femtosecond laser doping may enhance the light detection properties of silicon across a broad spectrum. Additionally, optical response may be improved by a factor of 100 to 10,000. The black silicon technology is a fast, scalable, and CMOS compatible technology at a very low cost, compared to current night vision systems. Black silicon technology may also provide a low operation bias, with 3.3 V typical. In addition, uncooled performance may be possible up to 50° C. Cooling requirements of current technology increase both weight and power consumption, and also create discomfort in users. As noted above, the black silicon core technology offers a high-resolution replacement for current image intensifier technology. Black silicon core technology may provide high speed electronic shuttering at speeds up to 1000 frames/second with minimal cross talk. In certain embodiments of the night vision eyepiece, an OLED display may be preferred over other optical displays, such as the LCoS display.

Further advantages of the eyepiece may include robust connectivity. This connectivity enables download and transmission using Bluetooth, Wi-Fi/Internet, cellular, satellite, 3G, FM/AM, TV, and UVB transceiver.

The eyepiece may provide its own cellular connectivity, such as though a personal wireless connection with a cellular system. The personal wireless connection may be available for only the wearer of the eyepiece, or it may be available to a plurality of proximate users, such as in a Wi-Fi hot spot (e.g. MiFi), where the eyepiece provides a local hotspot for others to utilize. These proximate users may be other wearers of an eyepiece, or users of some other wireless computing device, such as a mobile communications facility (e.g. mobile phone). Through this personal wireless connection, the wearer may not need other cellular or Internet wireless connections to connect to wireless services. For instance, without a personal wireless connection integrated into the eyepiece, the wearer may have to find a WiFi connection point or tether to their mobile communications facility in order to establish a wireless connection. In embodiments, the eyepiece may be able to replace the need for having a separate mobile communications device, such as a mobile phone, mobile computer, and the like, by integrating these functions and user interfaces into the eyepiece. For instance, the eyepiece may have an integrated WiFi connection or hotspot, a real or virtual keyboard interface, a USB hub, speakers (e.g. to stream music to) or speaker input connections, integrated camera, external camera, and the like. In embodiments, an external device, in connectivity with the eyepiece, may provide a single unit with a personal network connection (e.g. WiFi, cellular connection), keyboard, control pad (e.g. a touch pad), and the like.

The eyepiece may include MEMS-based inertial navigation systems, such as a GPS processor, an accelerometer (e.g. for enabling head control of the system and other functions), a gyroscope, an altimeter, an inclinometer, a speedometer/odometer, a laser rangefinder, and a magnetometer, which also enables image stabilization.

The eyepiece may include integrated headphones, such as the articulating earbud 120, that provide audio output to the user or wearer.

In an embodiment, a forward facing camera (see FIG. 21) integrated with the eyepiece may enable basic augmented reality. In augmented reality, a viewer can image what is being viewed and then layer an augmented, edited, tagged, or analyzed version on top of the basic view. In the alternative, associated data may be displayed with or over the basic image. If two cameras are provided and are mounted at the correct interpupillary distance for the user, stereo video imagery may be created. This capability may be useful for persons requiring vision assistance. Many people suffer from deficiencies in their vision, such as near-sightedness, far-sightedness, and so forth. A camera and a very close, virtual screen as described herein provides a "video" for such persons, the video adjustable in terms of focal point, nearer or farther, and fully in control by the person via voice or other command. This capability may also be useful for persons suffering diseases of the eye, such as cataracts, retinitis pigmentosa, and the like. So long as some organic vision capability remains, an augmented reality eyepiece can help a person see more clearly. Embodiments of the eyepiece may feature one or more of magnification, increased brightness, and ability to map content to the areas of the eye that are still healthy. Embodiments of the eyepiece may be used as bifocals or a magnifying glass. The wearer may be able to increase zoom in the field of view or increase zoom within a partial field of view. In an embodiment, an associated camera may make an image of the object and then present the user with a zoomed picture. A user interface may allow a wearer to point at the area that he wants zoomed, such as with the control techniques described herein, so the image processing can stay on task as opposed to just zooming in on everything in the camera's field of view.

A rear-facing camera (not shown) may also be incorporated into the eyepiece in a further embodiment. In this embodiment, the rear-facing camera may enable eye control of the eyepiece, with the user making application or feature selection by directing his or her eyes to a specific item displayed on the eyepiece.

The camera may be a microcassegrain telescoping folded optic camera into the device. The microcassegrain telescoping folded optic camera may be mounted on a handheld device, such as the bio-print device, the bio-phone, and could also be mounted on glasses used as part of a bio-kit to collect biometric data.

A cassegrain reflector is a combination of a primary concave mirror and a secondary convex mirror. These reflectors are often used in optical telescopes and radio antennas because they deliver good light (or sound) collecting capability in a shorter, smaller package.

In a symmetrical cassegrain both mirrors are aligned about the optical axis, and the primary mirror usually has a hole in the center, allowing light to reach the eyepiece or a camera chip or light detection device, such as a CCD chip.

An alternate design, often used in radio telescopes, places the final focus in front of the primary reflector. A further alternate design may tilt the mirrors to avoid obstructing the primary or secondary mirror and may eliminate the need for a hole in the primary mirror or secondary mirror. The microcassegrain telescoping folded optic camera may use any of the above variations, with the final selection determined by the desired size of the optic device.

Figure 35:
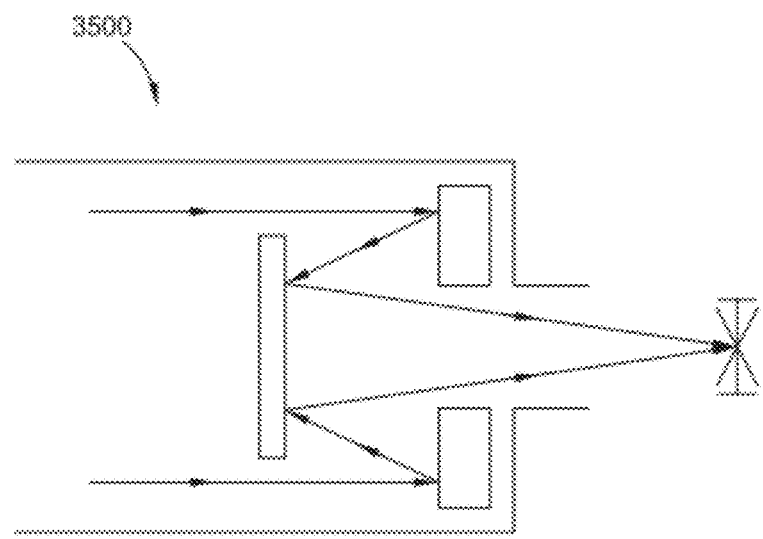
FIG. 35 depicts an embodiment of a classic cassegrain configuration.

The classic cassegrain configuration uses a parabolic reflector as the primary mirror and a hyperbolic mirror as the secondary mirror. Further embodiments of the microcassegrain telescoping folded optic camera may use a hyperbolic primary mirror and/or a spherical or elliptical secondary mirror. In operation the classic cassegrain with a parabolic primary mirror and a hyperbolic secondary mirror reflects the light back down through a hole in the primary, as shown in FIG. 35. Folding the optical path makes the design more compact, and in a "micro" size, suitable for use with the bio-print sensor and bio-print kit described in co-pending application titled "Local Advertising Content on an Interactive Head-Mounted Eyepiece" filed on Feb. 28, 2011. In a folded optic system, the beam is bent to make the optical path much longer than the physical length of the system. One common example of folded optics is prismatic binoculars. In a camera lens the secondary mirror may be mounted on an optically flat, optically clear glass plate that closes the lens tube. This support eliminates "star-shaped" diffraction effects that are caused by a straight-vaned support spider. This allows for a sealed closed tube and protects the primary mirror, albeit at some loss of light collecting power.

The cassegrain design also makes use of the special properties of parabolic and hyperbolic reflectors. A concave parabolic reflector will reflect all incoming light rays parallel to its axis of symmetry to a single focus point. A convex hyperbolic reflector has two foci and reflects all light rays directed at one focus point toward the other focus point. Mirrors in this type of lens are designed and positioned to share one focus, placing the second focus of the hyperbolic mirror at the same point as where the image is observed, usually just outside the eyepiece. The parabolic mirror reflects parallel light rays entering the lens to its focus, which is coincident with the focus of the hyperbolic mirror. The hyperbolic mirror then reflects those light rays to the other focus point, where the camera records the image.

Figure 36:
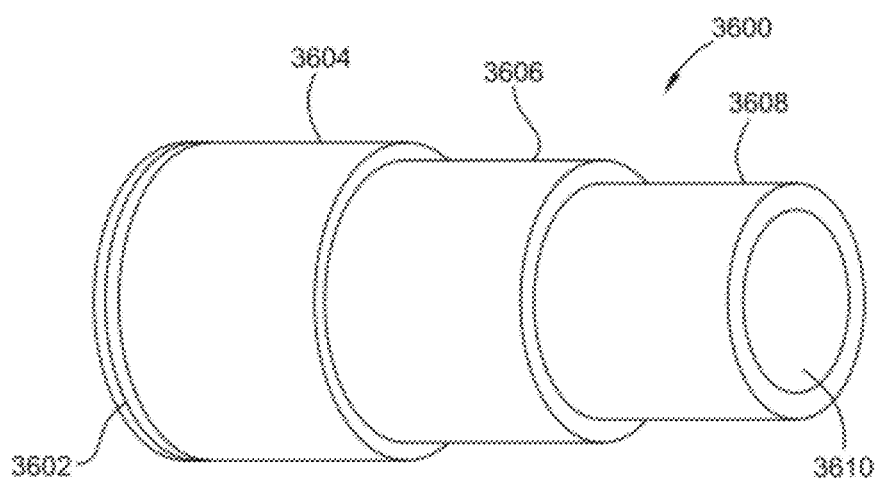
FIG. 36 depicts the configuration of the microcassegrain telescoping folded optic camera.

FIG. 36 shows the configuration of the microcassegrain telescoping folded optic camera. The camera may be mounted on augmented reality glasses, a bio-phone, or other biometric collection device. The assembly, 3600 has multiple telescoping segments that allow the camera to extend with cassegrain optics providing for a longer optical path. Threads 3602 allow the camera to be mounted on a device, such as augmented reality glasses or other biometric collection device. While the embodiment depicted in FIG. 36 uses threads, other mounting schemes such as bayonet mount, knobs, or press-fit, may also be used. A first telescoping section 3604 also acts as an external housing when the lens is in the fully retracted position. The camera may also incorporate a motor to drive the extension and retraction of the camera. A second telescoping section 3606 may also be included. Other embodiments may incorporate varying numbers of telescoping sections, depending on the length of optical path needed for the selected task or data to be collected. A third telescoping section 3608 includes the lens and a reflecting mirror. The reflecting mirror may be a primary reflector if the camera is designed following classic cassegrain design. The secondary mirror may be contained in first telescoping section 3604.

Further embodiments may utilize microscopic mirrors to form the camera, while still providing for a longer optical path through the use of folded optics. The same principles of cassegrain design are used.

Lens 3610 provides optics for use in conjunction with the folded optics of the cassegrain design. The lens 3610 may be selected from a variety of types, and may vary depending on the application. The threads 3602 permit a variety of cameras to be interchanged depending on the needs of the user.

Eye control of feature and option selection may be controlled and activated by object recognition software loaded on the system processor. Object recognition software may enable augmented reality, combine the recognition output with querying a database, combine the recognition output with a computational tool to determine dependencies/likelihoods, and the like.

Three-dimensional viewing is also possible in an additional embodiment that incorporates a 3D projector. Two stacked picoprojectors (not shown) may be used to create the three dimensional image output.

Figure 10:
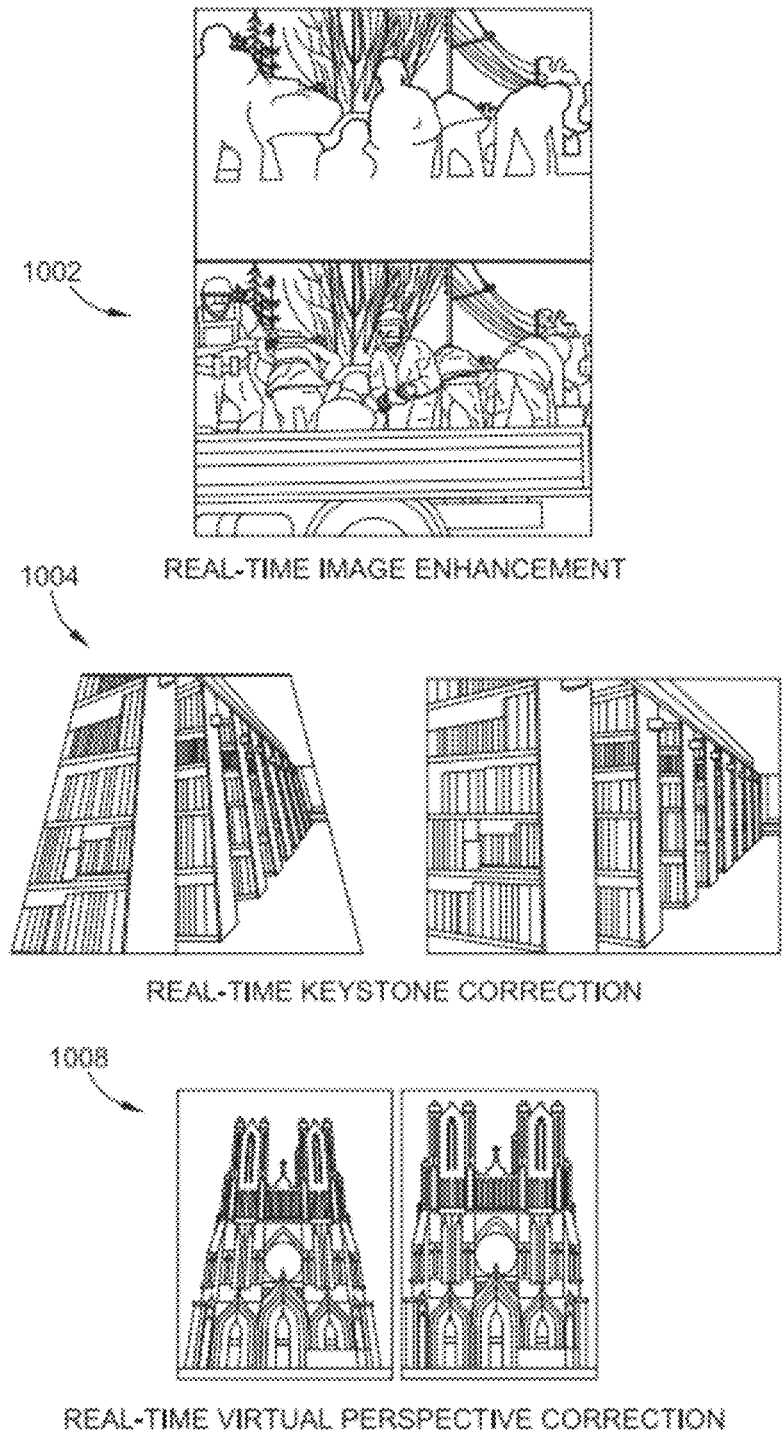
FIG. 10 depicts the advantages of the eyepiece in real-time image enhancement, keystone correction, and virtual perspective correction.

Referring to FIG. 10, a plurality of digital CMOS Sensors with redundant micros and DSPs for each sensor array and projector detect visible, near infrared, and short wave infrared light to enable passive day and night operations, such as real-time image enhancement 1002, real-time keystone correction 1004, and real-time virtual perspective correction 1008.

The augmented reality eyepiece or glasses may be powered by any stored energy system, such as battery power, solar power, line power, and the like. A solar energy collector may be placed on the frame, on a belt clip, and the like. Battery charging may occur using a wall charger, car charger, on a belt clip, in a glasses case, and the like. In one embodiment, the eyepiece may be rechargeable and be equipped with a mini-USB connector for recharging. In another embodiment, the eyepiece may be equipped for remote inductive recharging by one or more remote inductive power conversion technologies, such as those provided by Powercast, Ligonier, Pa., USA; and Fulton Int'l. Inc., Ada, Mich., USA, which also owns another provider, Splashpower, Inc., Cambridge, UK.

The augmented reality eyepiece also includes a camera and any interface necessary to connect the camera to the circuit. The output of the camera may be stored in memory and may also be displayed on the display available to the wearer of the glasses. A display driver may also be used to control the display. The augmented reality device also includes a power supply, such as a battery, as shown, power management circuits and a circuit for recharging the power supply. As noted elsewhere, recharging may take place via a hard connection, e.g., a mini-USB connector, or by means of an inductor, a solar panel input, and so forth.

The control system for the eyepiece or glasses may include a control algorithm for conserving power when the power source, such as a battery, indicates low power. This conservation algorithm may include shutting power down to applications that are energy intensive, such as lighting, a camera, or sensors that require high levels of energy, such as any sensor requiring a heater, for example. Other conservation steps may include slowing down the power used for a sensor or for a camera, e.g., slowing the sampling or frame rates, going to a slower sampling or frame rate when the power is low; or shutting down the sensor or camera at an even lower level. Thus, there may be at least three operating modes depending on the available power: a normal mode; a conserve power mode; and an emergency or shutdown mode.

Applications of the present disclosure may be controlled through movements and direct actions of the wearer, such as movement of his or her hand, finger, feet, head, eyes, and the like, enabled through facilities of the eyepiece (e.g. accelerometers, gyros, cameras, optical sensors, GPS sensors, and the like) and/or through facilities worn or mounted on the wearer (e.g. body mounted sensor control facilities). In this way, the wearer may directly control the eyepiece through movements and/or actions of their body without the use of a traditional hand-held remote controller. For instance, the wearer may have a sense device, such as a position sense device, mounted on one or both hands, such as on at least one finger, on the palm, on the back of the hand, and the like, where the position sense device provides position data of the hand, and provides wireless communications of position data as command information to the eyepiece. In embodiments, the sense device of the present disclosure may include a gyroscopic device (e.g. electronic gyroscope, MEMS gyroscope, mechanical gyroscope, quantum gyroscope, ring laser gyroscope, fiber optic gyroscope), accelerometers, MEMS accelerometers, velocity sensors, force sensors, optical sensors, proximity sensor, RFID, and the like, in the providing of position information. For example, a wearer may have a position sense device mounted on their right index finger, where the device is able to sense motion of the finger. In this example, the user may activate the eyepiece either through some switching mechanism on the eyepiece or through some predetermined motion sequence of the finger, such as moving the finger quickly, tapping the finger against a hard surface, and the like. Note that tapping against a hard surface may be interpreted through sensing by accelerometers, force sensors, and the like. The position sense device may then transmit motions of the finger as command information, such as moving the finger in the air to move a cursor across the displayed or projected image, moving in quick motion to indicate a selection, and the like. In embodiments, the position sense device may send sensed command information directly to the eyepiece for command processing, or the command processing circuitry may be co-located with the position sense device, such as in this example, mounted on the finger as part of an assembly including the sensors of the position sense device.

In embodiments, the wearer may have a plurality of position sense devices mounted on their body. For instance, and in continuation of the preceding example, the wearer may have position sense devices mounted on a plurality of points on the hand, such as with individual sensors on different fingers, or as a collection of devices, such as in a glove. In this way, the aggregate sense command information from the collection of sensors at different locations on the hand may be used to provide more complex command information. For instance, the wearer may use a sensor device glove to play a game, where the glove senses the grasp and motion of the user's hands on a ball, bat, racket, and the like, in the use of the present disclosure in the simulation and play of a simulated game. In embodiments, the plurality of position sense devices may be mounted on different parts of the body, allowing the wearer to transmit complex motions of the body to the eyepiece for use by an application.

In embodiments, the sense device may have a force sensor, such as for detecting when the sense device comes in contact with an object. For instance, a sense device may include a force sensor at the tip of a wearer's finger. In this case, the wearer may tap, multiple tap, sequence taps, swipe, touch, and the like to generate a command to the eyepiece. Force sensors may also be used to indicate degrees of touch, grip, push, and the like, where predetermined or learned thresholds determine different command information. In this way, commands may be delivered as a series of continuous commands that constantly update the command information being used in an application through the eyepiece. In an example, a wearer may be running a simulation, such as a game application, military application, commercial application, and the like, where the movements and contact with objects, such as through at least one of a plurality of sense devices, are fed to the eyepiece as commands that influence the simulation displayed through the eyepiece.

In embodiments, the sense device may include an optical sensor or optical transmitter as a way for movement to be interpreted as a command. For instance, a sense device may include an optical sensor mounted on the hand of the wearer, and the eyepiece housing may include an optical transmitter, such that when a user moves their hand past the optical transmitter on the eyepiece, the motions may be interpreted as commands. A motion detected through an optical sensor may include swiping past at different speeds, with repeated motions, combinations of dwelling and movement, and the like. In embodiments, optical sensors and/or transmitters may be located on the eyepiece, mounted on the wearer (e.g. on the hand, foot, in a glove, piece of clothing), or used in combinations between different areas on the wearer and the eyepiece, and the like.

In one embodiment, a number of sensors useful for monitoring the condition of the wearer or a person in proximity to the wearer are mounted within the augmented reality glasses. Sensors have become much smaller, thanks to advances in electronics technology. Signal transducing and signal processing technologies have also made great progress in the direction of size reduction and digitization. Accordingly, it is possible to have not merely a temperature sensor in the AR glasses, but an entire sensor array. These sensors may include, as noted, a temperature sensor, and also sensor to detect: pulse rate; beat-to-beat heart variability; EKG or ECG; respiration rate; core body temperature; heat flow from the body; galvanic skin response or GSR; EMG; EEG; EOG; blood pressure; body fat; hydration level; activity level; oxygen consumption; glucose or blood sugar level; body position; and UV radiation exposure or absorption. In addition, there may also be a retinal sensor and a blood oxygenation sensor (such as an $SpO_2$ sensor), among others. Such sensors are available from a variety of manufacturers, including Vermed, Bellows Falls, Vt., USA; VTI, Ventaa, Finland; and ServoFlow, Lexington, Mass., USA.

In some embodiments, it may be more useful to have sensors mounted on the person or on equipment of the person, rather than on the glasses themselves. For example, accelerometers, motion sensors and vibration sensors may be usefully mounted on the person, on clothing of the person, or on equipment worn by the person. These sensors may maintain continuous or periodic contact with the controller of the AR glasses through a Bluetooth® radio transmitter or other radio device adhering to IEEE 802.11 specifications. For example, if a physician wishes to monitor motion or shock experienced by a patient during a foot race, the sensors may be more useful if they are mounted directly on the person's skin, or even on a T-shirt worn by the person, rather than mounted on the glasses. In these cases, a more accurate reading may be obtained by a sensor placed on the person or on the clothing rather than on the glasses. Such sensors need not be as tiny as the sensors which would be suitable for mounting on the glasses themselves, and be more useful, as seen.

The AR glasses or goggles may also include environmental sensors or sensor arrays. These sensors are mounted on the glasses and sample the atmosphere or air in the vicinity of the wearer. These sensors or sensor array may be sensitive to certain substances or concentrations of substances. For example, sensors and arrays are available to measure concentrations of carbon monoxide, oxides of nitrogen ("$NO_x$"), temperature, relative humidity, noise level, volatile organic chemicals (VOC), ozone, particulates, hydrogen sulfide, barometric pressure and ultraviolet light and its intensity. Vendors and manufacturers include: Sensares, Crolles, FR; Cairpol, Ales, FR; Critical Environmental Technologies of Canada, Delta, B.C., Canada; Apollo Electronics Co., Shenzhen, China; and AV Technology Ltd., Stockport, Cheshire, UK. Many other sensors are well known. If such sensors are mounted on the person or on clothing or equipment of the person, they may also be useful. These environmental sensors may include radiation sensors, chemical sensors, poisonous gas sensors, and the like.

In one embodiment, environmental sensors, health monitoring sensors, or both, are mounted on the frames of the augmented reality glasses. In another embodiment, the sensors may be mounted on the person or on clothing or equipment of the person. For example, a sensor for measuring electrical activity of a heart of the wearer may be implanted, with suitable accessories for transducing and transmitting a signal indicative of the person's heart activity.

The signal may be transmitted a very short distance via a Bluetooth® radio transmitter or other radio device adhering to IEEE 802.15.1 specifications. Other frequencies or protocols may be used instead. The signal may then be processed by the signal-monitoring and processing equipment of the augmented reality glasses, and recorded and displayed on the virtual screen available to the wearer. In another embodiment, the signal may also be sent via the AR glasses to a friend or squad leader of the wearer. Thus, the health and well-being of the person may be monitored by the person and by others, and may also be tracked over time.

In another embodiment, environmental sensors may be mounted on the person or on equipment of the person. For example, radiation or chemical sensors may be more useful if worn on outer clothing or a web-belt of the person, rather than mounted directly on the glasses. As noted above, signals from the sensors may be monitored locally by the person through the AR glasses. The sensor readings may also be transmitted elsewhere, either on demand or automatically, perhaps at set intervals, such as every quarter-hour or half-hour. Thus, a history of sensor readings, whether of the person's body readings or of the environment, may be made for tracking or trending purposes.

In an embodiment, an RF/micropower impulse radio (MIR) sensor may be associated with the eyepiece and serve as a short-range medical radar. The sensor may operate on an ultra-wide band. The sensor may include an RF/impulse generator, receiver, and signal processor, and may be useful for detecting and measuring cardiac signals by measuring ion flow in cardiac cells within 3 mm of the skin. The receiver may be a phased array antenna to enable determining a location of the signal in a region of space. The sensor may be used to detect and identify cardiac signals through blockages, such as walls, water, concrete, dirt, metal, wood, and the like. For example, a user may be able to use the sensor to determine how many people are located in a concrete structure by how many heart rates are detected. In another embodiment, a detected heart rate may serve as a unique identifier for a person so that they may be recognized in the future. In an embodiment, the RF/impulse generator may be embedded in one device, such as the eyepiece or some other device, while the receiver is embedded in a different device, such as another eyepiece or device. In this way, a virtual "tripwire" may be created when a heart rate is detected between the transmitter and receiver. In an embodiment, the sensor may be used as an in-field diagnostic or self-diagnosis tool. EKG's may be analyzed and stored for future use as a biometric identifier. A user may receive alerts of sensed heart rate signals and how many heart rates are present as displayed content in the eyepiece.

Figure 29:
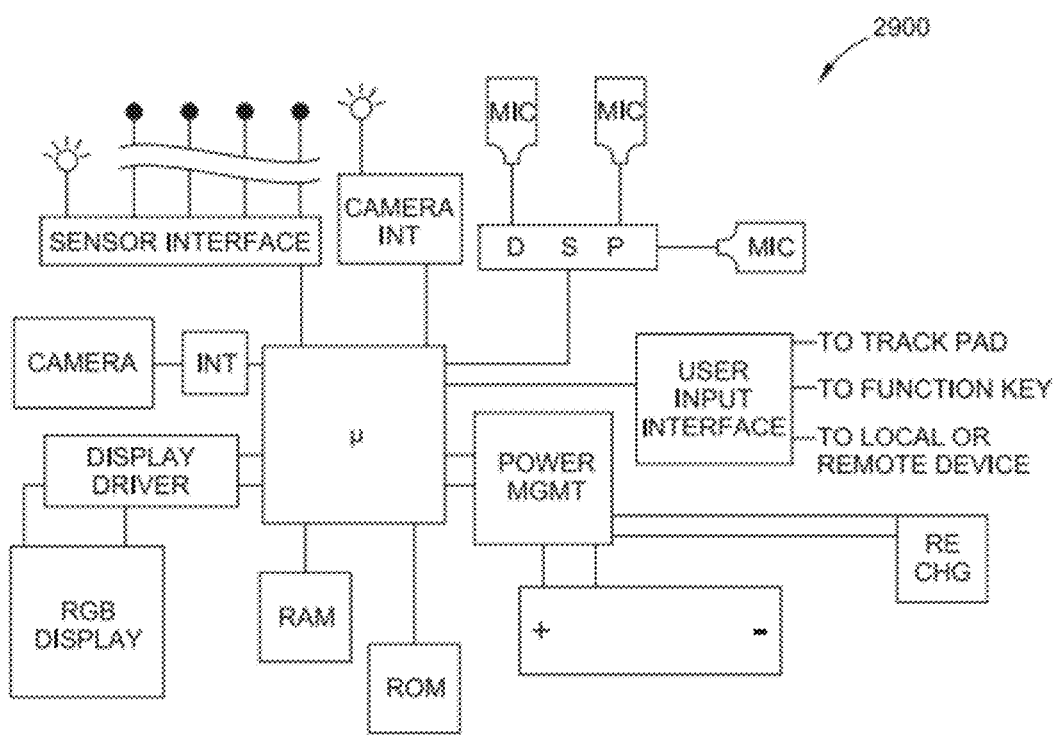
FIG. 29 depicts an exemplary electronic circuit diagram for an augmented reality eyepiece.

FIG. 29 depicts an embodiment of an augmented reality eyepiece or glasses with a variety of sensors and communication equipment. One or more than one environmental or health sensors are connected to a sensor interface locally or remotely through a short range radio circuit and an antenna, as shown. The sensor interface circuit includes all devices for detecting, amplifying, processing and sending on or transmitting the signals detected by the sensor(s). The remote sensors may include, for example, an implanted heart rate monitor or other body sensor (not shown). The other sensors may include an accelerometer, an inclinometer, a temperature sensor, a sensor suitable for detecting one or more chemicals or gasses, or any of the other health or environmental sensors discussed in this disclosure. The sensor interface is connected to the microprocessor or microcontroller of the augmented reality device, from which point the information gathered may be recorded in memory, such as random access memory (RAM) or permanent memory, read only memory (ROM), as shown.

In an embodiment, a sense device enables simultaneous electric field sensing through the eyepiece. Electric field (EF) sensing is a method of proximity sensing that allows computers to detect, evaluate and work with objects in their vicinity. Physical contact with the skin, such as a handshake with another person or some other physical contact with a conductive or a non-conductive device or object, may be sensed as a change in an electric field and either enable data transfer to or from the eyepiece or terminate data transfer. For example, videos captured by the eyepiece may be stored on the eyepiece until a wearer of the eyepiece with an embedded electric field sensing transceiver touches an object and initiates data transfer from the eyepiece to a receiver. The transceiver may include a transmitter that includes a transmitter circuit that induces electric fields toward the body and a data sense circuit, which distinguishes transmitting and receiving modes by detecting both transmission and reception data and outputs control signals corresponding to the two modes to enable two-way communication. An instantaneous private network between two people may be generated with a contact, such as a handshake. Data may be transferred between an eyepiece of a user and a data receiver or eyepiece of the second user. Additional security measures may be used to enhance the private network, such as facial or audio recognition, detection of eye contact, fingerprint detection, biometric entry, and the like.

In embodiments, there may be an authentication facility associated with accessing functionality of the eyepiece, such as access to displayed or projected content, access to restricted projected content, enabling functionality of the eyepiece itself (e.g. as through a login to access functionality of the eyepiece) either in whole or in part, and the like. Authentication may be provided through recognition of the wearer's voice, iris, retina, fingerprint, and the like, or other biometric identifier. The authentication system may provide for a database of biometric inputs for a plurality of users such that access control may be provided for use of the eyepiece based on policies and associated access privileges for each of the users entered into the database. The eyepiece may provide for an authentication process. For instance, the authentication facility may sense when a user has taken the eyepiece off, and require re-authentication when the user puts it back on. This better ensures that the eyepiece only provides access to those users that are authorized, and for only those privileges that the wearer is authorized for. In an example, the authentication facility may be able to detect the presence of a user's eye or head as the eyepiece is put on. In a first level of access, the user may only be able to access low-sensitivity items until authentication is complete. During authentication, the authentication facility may identify the user, and look up their access privileges. Once these privileges have been determined, the authentication facility may then provide the appropriate access to the user. In the case of an unauthorized user being detected, the eyepiece may maintain access to low-sensitivity items, further restrict access, deny access entirely, and the like.

In an embodiment, a receiver may be associated with an object to enable control of that object via touch by a wearer of the eyepiece, wherein touch enables transmission or execution of a command signal in the object. For example, a receiver may be associated with a car door lock. When a wearer of the eyepiece touches the car, the car door may unlock. In another example, a receiver may be embedded in a medicine bottle. When the wearer of the eyepiece touches the medicine bottle, an alarm signal may be initiated. In another example, a receiver may be associated with a wall along a sidewalk. As the wearer of the eyepiece passes the wall or touches the wall, advertising may be launched either in the eyepiece or on a video panel of the wall.

Figure 14:
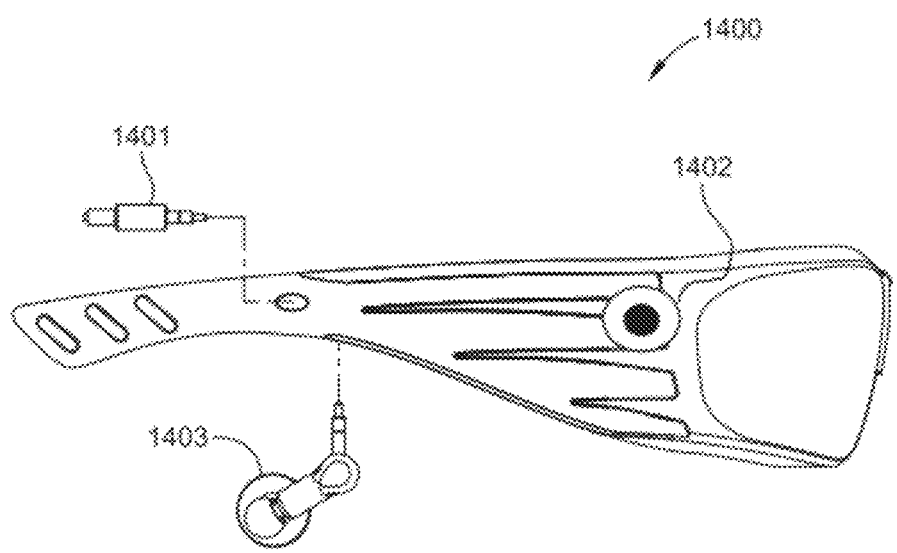
FIG. 14 depicts a tactile interface of the eyepiece.
Figure 15:
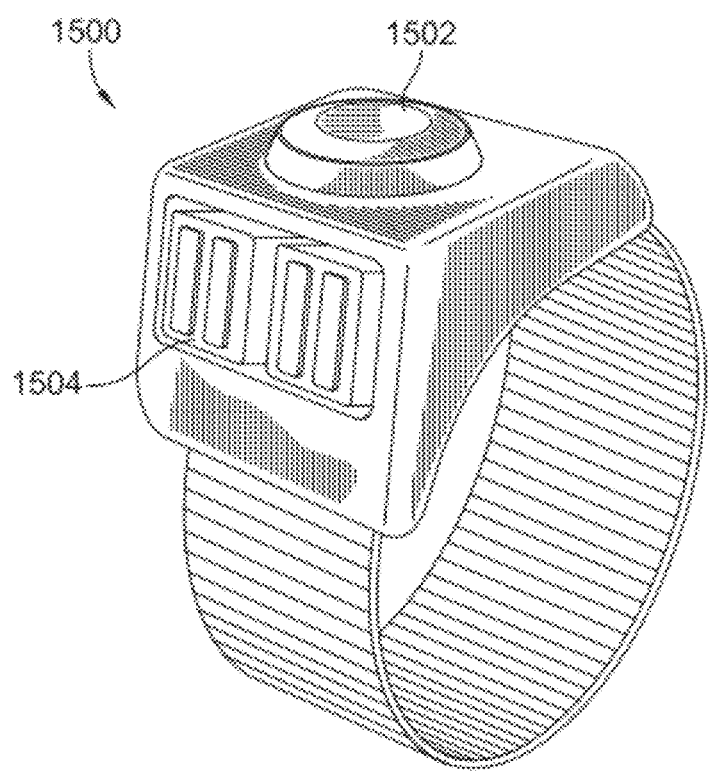
FIG. 15 depicts a ring that controls the eyepiece.

In an embodiment, when a wearer of the eyepiece initiates a physical contact, a WiFi exchange of information with a receiver may provide an indication that the wearer is connected to an online activity such as a game or may provide verification of identity in an online environment. In the embodiment, a representation of the person could change color or undergo some other visual indication in response to the contact. In embodiments, the eyepiece may include tactile interface as in FIG. 14, such as to enable haptic control of the eyepiece, such as with a swipe, tap, touch, press, click, roll of a rollerball, and the like. For instance, the tactile interface 1402 may be mounted on the frame of the eyepiece, such as on an arm, both arms, the nosepiece, the top of the frame, the bottom of the frame, and the like. The wearer may then touch the tactile interface in a plurality of ways to be interpreted by the eyepiece as commands, such as by tapping one or multiple times on the interface, by brushing a finger across the interface, by pressing and holding, by pressing more than one interface at a time, and the like. In embodiments, the tactile interface may be attached to the wearer's body, their clothing, as an attachment to their clothing, as a ring 1500, as a bracelet, as a necklace, and the like. For example, the interface may be attached on the body, such as on the back of the wrist, where touching different parts of the interface provides different command information (e.g. touching the front portion, the back portion, the center, holding for a period of time, tapping, swiping, and the like). In another example, the wearer may have an interface mounted in a ring as shown in FIG. 15, a hand piece, and the like, where the interface may have at least one of a plurality of command interface types, such as a tactile interface, a position sensor device, and the like with wireless command connection to the eyepiece. In an embodiment, the ring 1500 may have controls that mirror a computer mouse, such as buttons 1504 (e.g. functioning as a one-button, multi-button, and like mouse functions), a 2D position control 1502, scroll wheel, and the like. The buttons 1504 and 2D position control 1502 may be as shown in FIG. 15, where the buttons are on the side facing the thumb and the 2D position controller is on the top. Alternately, the buttons and 2D position control may be in other configurations, such as all facing the thumb side, all on the top surface, or any other combination. The 2D position control 1502 may be a 2D button position controller (e.g. such as the TrackPoint pointing device embedded in some laptop keyboards to control the position of the mouse), a pointing stick, joystick, an optical track pad, an opto touch wheel, a touch screen, touch pad, track pad, scrolling track pad, trackball, any other position or pointing controller, and the like. In embodiments, control signals from the tactile interface (such as the ring tactile interface 1500) may be provided with a wired or wireless interface to the eyepiece, where the user is able to conveniently supply control inputs, such as with their hand, thumb, finger, and the like. For example, the user may be able to articulate the controls with their thumb, where the ring is worn on the user's index finger. In embodiments, a method or system may provide an interactive head-mounted eyepiece worn by a user, wherein the eyepiece includes an optical assembly through which the user views a surrounding environment and displayed content, a processor for handling content for display to the user, and an integrated projector facility for projecting the content to the optical assembly, and a control device worn on a hand of the user, including at least one control component actuated by a digit of a hand of the user, and providing a control command from the actuation of the at least one control component to the processor as a command instruction. The command instruction may be directed to the manipulation of content for display to the user. The control device may be worn on a first digit of the hand of the user, and the at least one control component may be actuated by a second digit of a hand of the user. The first digit may be the index finger, the second digit the thumb, and the first and second digit on the same hand of the user. The control device may have at least one control component mounted on the index finger side facing the thumb. The at least one control component may be a button. The at least one control component may be a 2D position controller. The control device may have at least one button actuated control component mounted on the index finger side facing the thumb, and a 2D position controller actuated control component mounted on the top facing side of the index finger. The control components may be mounted on at least two digits of the user's hand. The control device may be worn as a glove on the hand of the user. The control device may be worn on the wrist of the user. The at least one control component may be worn on at least one digit of the hand, and a transmission facility may be worn separately on the hand. The transmission facility may be worn on the wrist. The transmission facility may be worn on the back of the hand. The control component may be at least one of a plurality of buttons. The at least one button may provide a function substantially similar to a conventional computer mouse button. Two of the plurality of buttons may function substantially similar to primary buttons of a conventional two-button computer mouse. The control component may be a scrolling wheel. The control component may be a 2D position control component. The 2D position control component may be a button position controller, pointing stick, joystick, optical track pad, opto-touch wheel, touch screen, touch pad, track pad, scrolling track pad, trackball, capacitive touch screen, and the like. The 2D position control component may be controlled with the user's thumb. The control component may be a touch-screen capable of implementing touch controls including button-like functions and 2D manipulation functions. The control component may be actuated when the user puts on the projected processor content pointing and control device. A surface-sensing component in the control device for detecting motion across a surface may also be provided. The surface sensing component may be disposed on the palmar side of the user's hand. The surface may be at least one of a hard surface, a soft surface, surface of the user's skin, surface of the user's clothing, and the like. Providing control commands may be transmitted wirelessly, through a wired connection, and the like. The control device may control a pointing function associated with the displayed processor content. The pointing function may be control of a cursor position; selection of displayed content, selecting and moving displayed content; control of zoom, pan, field of view, size, position of displayed content; and the like. The control device may control a pointing function associated with the viewed surrounding environment. The pointing function may be placing a cursor on a viewed object in the surrounding environment. The viewed object's location position may be determined by the processor in association with a camera integrated with the eyepiece. The viewed object's identification may be determined by the processor in association with a camera integrated with the eyepiece. The control device may control a function of the eyepiece. The function may be associated with the displayed content. The function may be a mode control of the eyepiece. The control device may be foldable for ease of storage when not worn by the user. In embodiments, the control device may be used with external devices, such as to control the external device in association with the eyepiece. External devices may be entertainment equipment, audio equipment, portable electronic devices, navigation devices, weapons, automotive controls, and the like.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; and a tactile control interface mounted on the eyepiece that accepts control inputs from the user through at least one of a user touching the interface and the user being proximate to the interface.

Figure 15A:
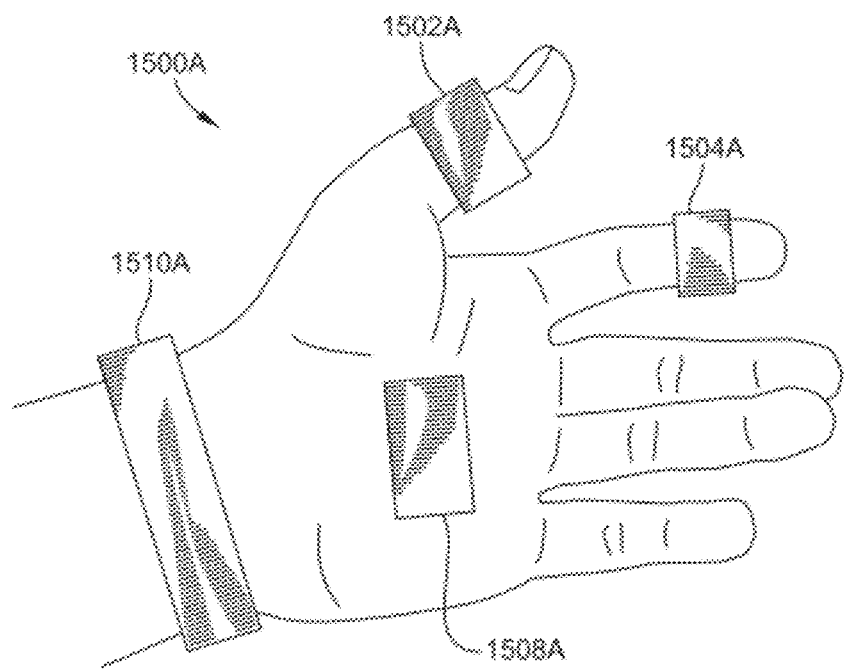
FIG. 15A depicts hand mounted sensors in an embodiment of a virtual mouse.

In embodiments, control of the eyepiece, and especially control of a cursor associated with displayed content to the user, may be enabled through hand control, such as with a worn device 1500 as in FIG. 15, as a virtual computer mouse 1500A as in FIG. 15A, and the like. For instance, the worn device 1500 may transmit commands through physical interfaces (e.g. a button 1502, scroll wheel 1504), and the virtual computer mouse 1500A may be able interpret commands though detecting motion and actions of the user's thumb, fist, hand, and the like. In computing, a physical mouse is a pointing device that functions by detecting two-dimensional motion relative to its supporting surface. A physical mouse traditionally consists of an object held under one of the user's hands, with one or more buttons. It sometimes features other elements, such as "wheels", which allow the user to perform various system-dependent operations, or extra buttons or features that can add more control or dimensional input. The mouse's motion translates into the motion of a cursor on a display, which allows for fine control of a graphical user interface. In the case of the eyepiece, the user may be able to utilize a physical mouse, a virtual mouse, or combinations of the two. In embodiments, a virtual mouse may involve one or more sensors attached to the user's hand, such as on the thumb 1502A, finger 1504A, palm 1508A, wrist 1510A, and the like, where the eyepiece receives signals from the sensors and translates the received signals into motion of a cursor on the eyepiece display to the user. In embodiments, the signals may be received through an exterior interface, such as the tactile interface 1402, through a receiver on the interior of the eyepiece, at a secondary communications interface, on an associated physical mouse or worn interface, and the like. The virtual mouse may also include actuators or other output type elements attached to the user's hand, such as for haptic feedback to the user through vibration, force, electrical impulse, temperature, and the like. Sensors and actuators may be attached to the user's hand by way of a wrap, ring, pad, glove, and the like. As such, the eyepiece virtual mouse may allow the user to translate motions of the hand into motion of the cursor on the eyepiece display, where 'motions' may include slow movements, rapid motions, jerky motions, position, change in position, and the like, and may allow users to work in three dimensions, without the need for a physical surface, and including some or all of the six degrees of freedom. Note that because the 'virtual mouse' may be associated with multiple portions of the hand, the virtual mouse may be implemented as multiple 'virtual mouse' controllers, or as a distributed controller across multiple control members of the hand. In embodiments, the eyepiece may provide for the use of a plurality of virtual mice, such as for one on each of the user's hands, one or more of the user's feet, and the like.

In embodiments, the eyepiece virtual mouse may need no physical surface to operate, and detect motion such as through sensors, such as one of a plurality of accelerometer types (e.g. tuning fork, piezoelectric, shear mode, strain mode, capacitive, thermal, resistive, electromechanical, resonant, magnetic, optical, acoustic, laser, three dimensional, and the like), and through the output signals of the sensor(s) determine the translational and angular displacement of the hand, or some portion of the hand. For instance, accelerometers may produce output signals of magnitudes proportional to the translational acceleration of the hand in the three directions. Pairs of accelerometers may be configured to detect rotational accelerations of the hand or portions of the hand. Translational velocity and displacement of the hand or portions of the hand may be determined by integrating the accelerometer output signals and the rotational velocity and displacement of the hand may be determined by integrating the difference between the output signals of the accelerometer pairs. Alternatively, other sensors may be utilized, such as ultrasound sensors, imagers, IR/RF, magnetometer, gyro magnetometer, and the like. As accelerometers, or other sensors, may be mounted on various portions of the hand, the eyepiece may be able to detect a plurality of movements of the hand, ranging from simple motions normally associated with computer mouse motion, to more highly complex motion, such as interpretation of complex hand motions in a simulation application. In embodiments, the user may require only a small translational or rotational action to have these actions translated to motions associated with user intended actions on the eyepiece projection to the user.

In embodiments, the virtual mouse may have physical switches associated with it to control the device, such as an on/off switch mounted on the hand, the eyepiece, or other part of the body. The virtual mouse may also have on/off control and the like through pre-defined motions or actions of the hand. For example, the operation of the virtual mouse may be enabled through a rapid back and forth motion of the hand. In another example, the virtual mouse may be disabled through a motion of the hand past the eyepiece, such as in front of the eyepiece. In embodiments, the virtual mouse for the eyepiece may provide for the interpretation of a plurality of motions to operations normally associated with physical mouse control, and as such, familiar to the user without training, such as single clicking with a finger, double clicking, triple clicking, right clicking, left clicking, click and drag, combination clicking, roller wheel motion, and the like. In embodiments, the eyepiece may provide for gesture recognition, such as in interpreting hand gestures via mathematical algorithms.

In embodiments, gesture control recognition may be provided through technologies that utilize capacitive changes resulting from changes in the distance of a user's hand from a conductor element as part of the eyepiece's control system, and so would require no devices mounted on the user's hand. In embodiments, the conductor may be mounted as part of the eyepiece, such as on the arm or other portion of the frame, or as some external interface mounted on the user's body or clothing. For example, the conductor may be an antenna, where the control system behaves in a similar fashion to the touch-less musical instrument known as the theremin. The theremin uses the heterodyne principle to generate an audio signal, but in the case of the eyepiece, the signal may be used to generate a control input signal. The control circuitry may include a number of radio frequency oscillators, such as where one oscillator operates at a fixed frequency and another controlled by the user's hand, where the distance from the hand varies the input at the control antenna. In this technology, the user's hand acts as a grounded plate (the user's body being the connection to ground) of a variable capacitor in an L-C (inductance-capacitance) circuit, which is part of the oscillator and determines its frequency. In another example, the circuit may use a single oscillator, two pairs of heterodyne oscillators, and the like. In embodiments, there may be a plurality of different conductors used as control inputs. In embodiments, this type of control interface may be ideal for control inputs that vary across a range, such as a volume control, a zoom control, and the like. However, this type of control interface may also be used for more discrete control signals (e.g. on/off control) where a predetermined threshold determines the state change of the control input.

In embodiments, the eyepiece may interface with a physical remote control device, such as a wireless track pad mouse, hand held remote control, body mounted remote control, remote control mounted on the eyepiece, and the like. The remote control device may be mounted on an external piece of equipment, such as for personal use, gaming, professional use, military use, and the like. For example, the remote control may be mounted on a rifle for a sport rifle shooter, such as mounted on a pistol grip, on a muzzle shroud, on a fore grip, and the like, providing remote control to the shooter without the need to remove their hands from the rifle. The remote control may be removably mounted to the eyepiece.

In embodiments, a remote control for the eyepiece may be activated and/or controlled through a proximity sensor. A proximity sensor may be a sensor able to detect the presence of nearby objects without any physical contact. For example, a proximity sensor may emit an electromagnetic or electrostatic field, or a beam of electromagnetic radiation (infrared, for instance), and look for changes in the field or return signal. The object being sensed is often referred to as the proximity sensor's target. Different proximity sensor targets may demand different sensors. For example, a capacitive or photoelectric sensor might be suitable for a plastic target; an inductive proximity sensor requires a metal target. Other examples of proximity sensor technologies include capacitive displacement sensors, eddy-current, magnetic, photocell (reflective), laser, passive thermal infrared, passive optical, CCD, reflection of ionizing radiation, and the like. In embodiments, the proximity sensor may be integral to any of the control embodiments described herein, including physical remote controls, virtual mouse, interfaces mounted on the eyepiece, controls mounted on an external piece of equipment (e.g. a game controller), and the like.

Figure 15B:
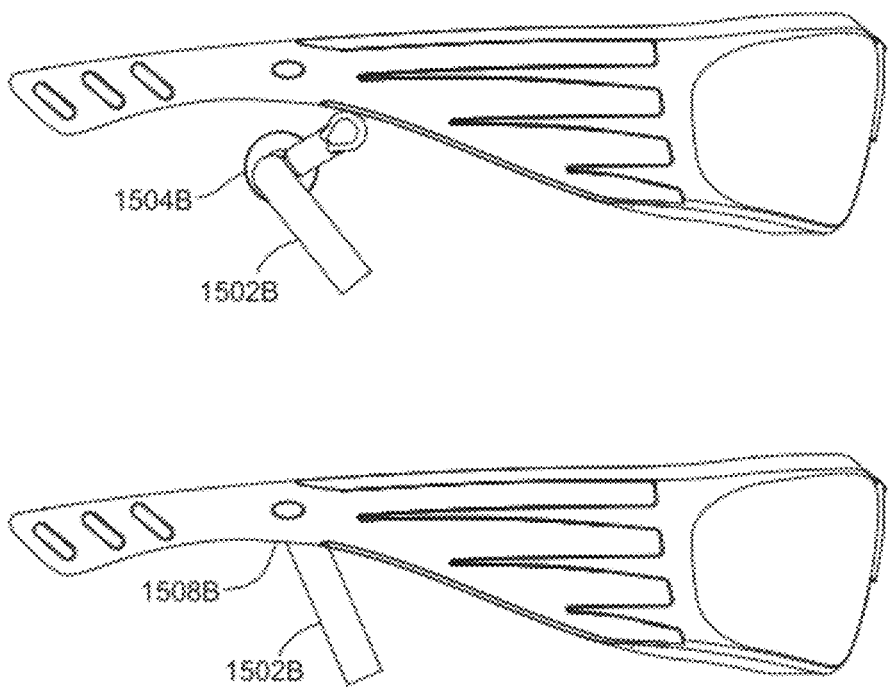
FIG. 15B depicts a facial actuation sensor as mounted on the eyepiece.

In embodiments, control of the eyepiece, and especially control of a cursor associated with displayed content to the user, may be enabled through the sensing of the motion of a facial feature, the tensing of a facial muscle, the clicking of the teeth, the motion of the jaw, and the like, of the user wearing the eyepiece through a facial actuation sensor 1502B. For instance, as shown in FIG. 15B, the eyepiece may have a facial actuation sensor as an extension from the eyepiece earphone assembly 1504B, from the arm 1508B of the eyepiece, and the like, where the facial actuation sensor may sense a force, a vibration, and the like associated with the motion of a facial feature. The facial actuation sensor may also be mounted separate from the eyepiece assembly, such as part of a standalone earpiece, where the sensor output of the earpiece and the facial actuation sensor may be either transferred to the eyepiece by either wired or wireless communication (e.g. Bluetooth or other communications protocol known to the art). The facial actuation sensor may also be attached to around the ear, in the mouth, on the face, on the neck, and the like. The facial actuation sensor may also be comprised of a plurality of sensors, such as to optimize the sensed motion of different facial or interior motions or actions. In embodiments, the facial actuation sensor may detect motions and interpret them as commands, or the raw signals may be sent to the eyepiece for interpretation. Commands may be commands for the control of eyepiece functions, controls associated with a cursor or pointer as provided as part of the display of content to the user, and the like. For example, a user may click their teeth once or twice to indicate a single or double click, such as normally associated with the click of a computer mouse. In another example, the user may tense a facial muscle to indicate a command, such as a selection associated with the projected image. In embodiments, the facial actuation sensor may utilize noise reduction processing to minimize the background motions of the face, the head, and the like, such as through adaptive signal processing technologies. A voice activity sensor may also be utilized to reduce interference, such as from the user, from other individuals nearby, from surrounding environmental noise, and the like. In an example, the facial actuation sensor may also improve communications and eliminate noise by detecting vibrations in the cheek of the user during speech, such as with multiple microphones to identify the background noise and eliminate it through noise cancellation, volume augmentation, and the like.

Figure 15C:
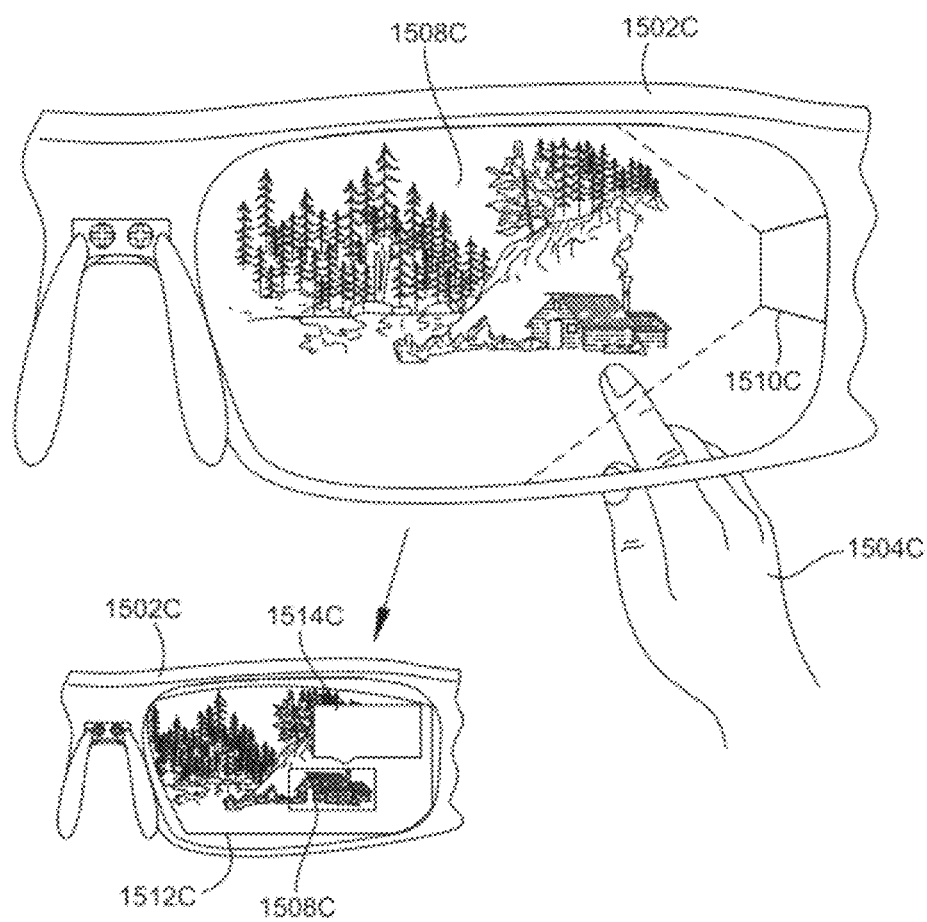
FIG. 15C depicts a hand pointing control of the eyepiece.

In embodiments, the user of the eyepiece may be able to obtain information on some environmental feature, location, object, and the like, viewed through the eyepiece by raising their hand into the field of view of the eyepiece and pointing at the object or position. For instance, the pointing finger of the user may indicate an environmental feature, where the finger is not only in the view of the eyepiece but also in the view of an embedded camera. The system may now be able to correlate the position of the pointing finger with the location of the environmental feature as seen by the camera. Additionally, the eyepiece may have position and orientation sensors, such as GPS and a magnetometer, to allow the system to know the location and line of sight of the user. From this, the system may be able to extrapolate the position information of the environmental feature, such as to provide the location information to the user, to overlay the position of the environmental information onto a 2D or 3D map, to further associate the established position information to correlate that position information to secondary information about that location (e.g. address, names of individuals at the address, name of a business at that location, coordinates of the location), and the like. Referring to FIG. 15C, in an example, the user is looking though the eyepiece 1502C and pointing with their hand 1504C at a house 1508C in their field of view, where an embedded camera 1510C has both the pointed hand 1504C and the house 1508C in its field of view. In this instance, the system is able to determine the location of the house 1508C and provide location information 1514C and a 3D map superimposed onto the user's view of the environment. In embodiments, the information associated with an environmental feature may be provided by an external facility, such as communicated with through a wireless communication connection, stored internal to the eyepiece, such as downloaded to the eyepiece for the current location, and the like.

In embodiments, the user may be able to control their view perspective relative to a 3D projected image, such as a 3D projected image associated with the external environment, a 3D projected image that has been stored and retrieved, a 3D displayed movie (such as downloaded for viewing), and the like. For instance, and referring again to FIG. 15C, the user may be able to change the view perspective of the 3D displayed image 1512C, such as by turning their head, and where the live external environment and the 3D displayed image stay together even as the user turns their head, moves their position, and the like. In this way, the eyepiece may be able to provide an augmented reality by overlaying information onto the user's viewed external environment, such as the overlaid 3D displayed map 1512C, the location information 1514C, and the like, where the displayed map, information, and the like, may change as the user's view changes. In another instance, with 3D movies or 3D converted movies, the perspective of the viewer may be changed to put the viewer 'into' the movie environment with some control of the viewing perspective, where the user may be able to move their head around and have the view change in correspondence to the changed head position, where the user may be able to 'walk into' the image when they physically walk forward, have the perspective change as the user moves the gazing view of their eyes, and the like. In addition, additional image information may be provided, such as at the sides of the user's view that could be accessed by turning the head.

Figure 15D:
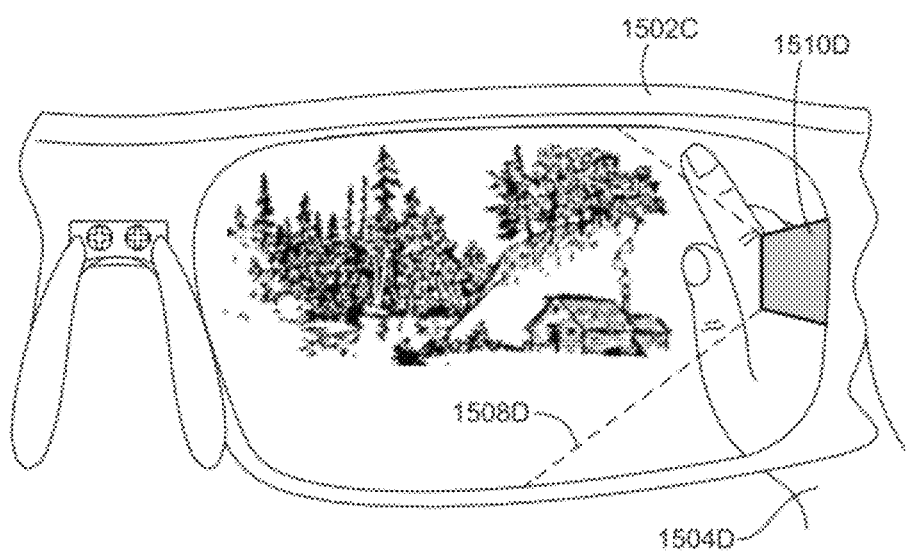
FIG. 15D depicts a hand pointing control of the eyepiece.

Referring to FIG. 15D, in embodiments the user of the eyepiece 1502D may be able to use multiple hand/finger points from of their hand 1504D to define the field of view (FOV) 1508D of the camera 1510D relative to the see-thru view, such as for augmented reality applications. For instance, in the example shown, the user is utilizing their first finger and thumb to adjust the FOV 1508D of the camera 1510D of the eyepiece 1502D. The user may utilize other combinations to adjust the FOV 1508D, such as with combinations of fingers, fingers and thumb, combinations of fingers and thumbs from both hands, use of the palm(s), cupped hand(s), and the like. The use of multiple hand/finger points may enable the user to alter the FOV 1508 of the camera 1510D in much the same way as users of touch screens, where different points of the hand/finger establish points of the FOV to establish the desired view. In this instance however, there is no physical contact made between the user's hand(s) and the eyepiece. Here, the camera may be commanded to associate portions of the user's hand(s) to the establishing or changing of the FOV of the camera. The command may be any command type described herein, including and not limited to hand motions in the FOV of the camera, commands associated with physical interfaces on the eyepiece, commands associated with sensed motions near the eyepiece, commands received from a command interface on some portion of the user, and the like. The eyepiece may be able to recognize the finger/hand motions as the command, such as in some repetitive motion. In embodiments, the user may also utilize this technique to adjust some portion of the projected image, where the eyepiece relates the viewed image by the camera to some aspect of the projected image, such as the hand/finger points in view to the projected image of the user. For example, the user may be simultaneously viewing the external environment and a projected image, and the user utilizes this technique to change the projected viewing area, region, magnification, and the like. In embodiments, the user may perform a change of FOV for a plurality of reasons, including zooming in or out from a viewed scene in the live environment, zoom in or out from a viewed portion of the projected image, to change the viewing area allocated to the projected image, to change the perspective view of the environment or projected image, and the like.

Figure 15E:
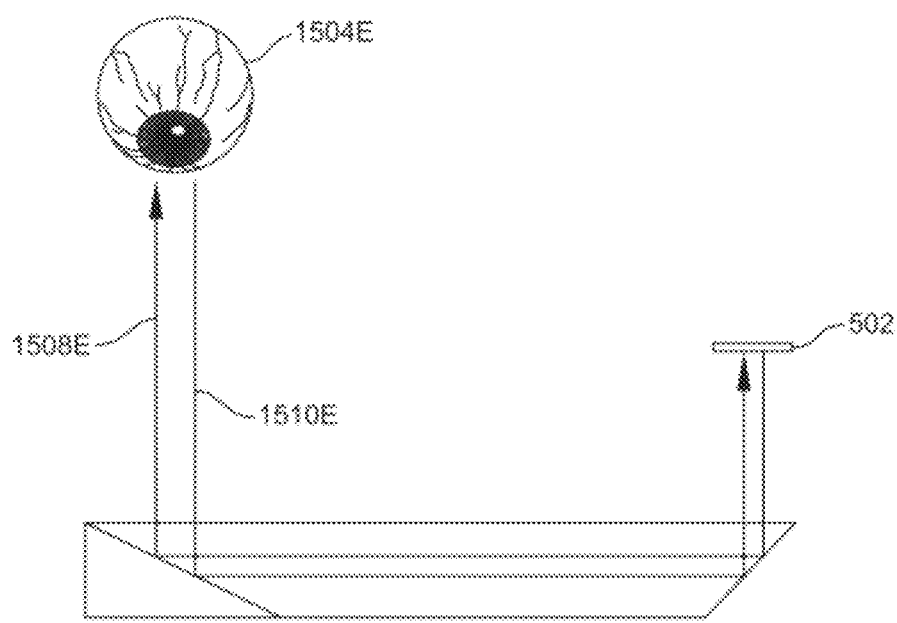
FIG. 15E depicts an example of eye tracking control.

In embodiments the eyepiece may be able to determine where the user is gazing, or the motion of the user's eye, by tracking the eye through reflected light off the user's eye. This information may then be used to help correlate the user's line of sight with respect to the projected image, a camera view, the external environment, and the like, and used in control techniques as described herein. For instance, the user may gaze at a location on the projected image and make a selection, such as with an external remote control or with some detected eye movement (e.g. blinking). In an example of this technique, and referring to FIG. 15E, transmitted light 1508E, such as infrared light, may be reflected 1510E from the eye 1504E and sensed at the optical display 502 (e.g. with a camera or other optical sensor). The information may then be analyzed to extract eye rotation from changes in reflections. In embodiments, an eye tracking facility may use the corneal reflection and the center of the pupil as features to track over time; use reflections from the front of the cornea and the back of the lens as features to track; image features from inside the eye, such as the retinal blood vessels, and follow these features as the eye rotates; and the like. Alternatively, the eyepiece may use other techniques to track the motions of the eye, such as with components surrounding the eye, mounted in contact lenses on the eye, and the like. For instance, a special contact lens may be provided to the user with an embedded optical component, such as a mirror, magnetic field sensor, and the like, for measuring the motion of the eye. In another instance, electric potentials may be measured and monitored with electrodes placed around the eyes, utilizing the steady electric potential field from the eye as a dipole, such as with its positive pole at the cornea and its negative pole at the retina. In this instance, the electric signal may be derived using contact electrodes placed on the skin around the eye, on the frame of the eyepiece, and the like. If the eye moves from the centre position towards the periphery, the retina approaches one electrode while the cornea approaches the opposing one. This change in the orientation of the dipole and consequently the electric potential field results in a change in the measured signal. By analyzing these changes, eye movement can be tracked.

Figure 15F:
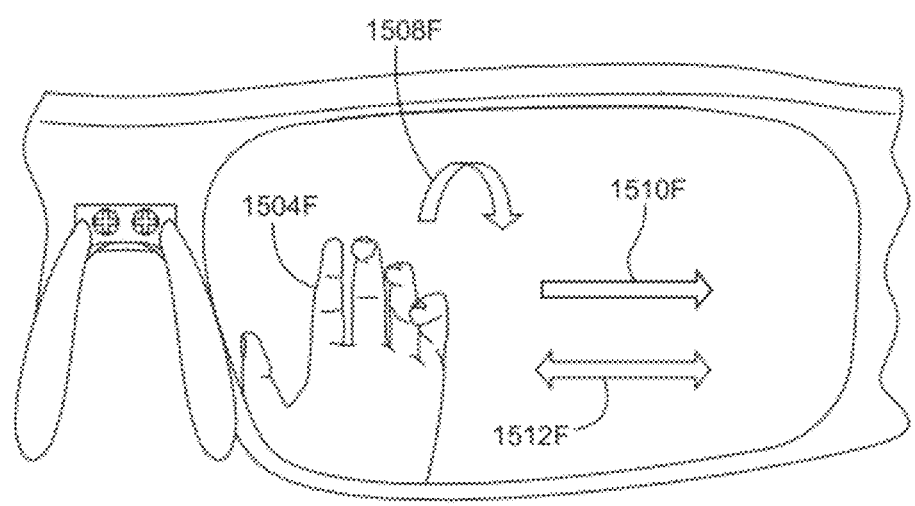
FIG. 15F depicts a hand positioning control of the eyepiece.

In embodiments, the eyepiece may have a plurality of modes of operation where control of the eyepiece is controlled at least in part by positions, shapes, motions of the hand, and the like. To provide this control the eyepiece may utilize hand recognition algorithms to detect the shape of the hand/fingers, and to then associate those hand configurations, possibly in combination with motions of the hand, as commands. Realistically, as there may be only a limited number of hand configurations and motions available to command the eyepiece, these hand configurations may need to be reused depending upon the mode of operation of the eyepiece. In embodiments, certain hand configurations or motions may be assigned for transitioning the eyepiece from one mode to the next, thereby allowing for the reuse of hand motions. For instance, and referring to FIG. 15F, the user's hand 1504F may be moved in view of a camera on the eyepiece, and the movement may then be interpreted as a different command depending upon the mode, such as a circular motion 1508F, a motion across the field of view 1510F, a back and forth motion 1512F, and the like. In a simplistic example, suppose there are two modes of operation, mode one for panning a view from the projected image and mode two for zooming the projected image. In this example the user may want to use a left-to-right finger-pointed hand motion to command a panning motion to the right. However, the user may also want to use a left-to-right finger-pointed hand motion to command a zooming of the image to greater magnification. To allow the dual use of this hand motion for both command types, the eyepiece may be configured to interpret the hand motion differently depending upon the mode the eyepiece is currently in, and where specific hand motions have been assigned for mode transitions. For instance, a clockwise rotational motion may indicate a transition from pan to zoom mode, and a counter-clockwise rotational motion may indicate a transition from zoom to pan mode. This example is meant to be illustrative and not limiting in anyway, where one skilled in the art will recognize how this general technique could be used to implement a variety of command/mode structures using the hand(s) and finger(s), such as hand-finger configurations-motions, two-hand configuration-motions, and the like.

In embodiments, a system may comprise an interactive head-mounted eyepiece worn by a user, wherein the eyepiece includes an optical assembly through which the user views a surrounding environment and displayed content, wherein the optical assembly comprises a corrective element that corrects the user's view of the surrounding environment, an integrated processor for handling content for display to the user, and an integrated image source for introducing the content to the optical assembly; and an integrated camera facility that images a gesture, wherein the integrated processor identifies and interprets the gesture as a command instruction. The control instruction may provide manipulation of the content for display, a command communicated to an external device, and the like.

In embodiments, control of the eyepiece may be enabled through eye movement, an action of the eye, and the like. For instance, there may be a camera on the eyepiece that views back to the wearer's eye(s), where eye movements or actions may be interpreted as command information, such as through blinking, repetitive blinking, blink count, blink rate, eye open-closed, gaze tracking, eye movements to the side, up and down, side to side, through a sequence of positions, to a specific position, dwell time in a position, gazing toward a fixed object (e.g. the corner of the lens of the eyepiece), through a certain portion of the lens, at a real-world object, and the like. In addition, eye control may enable the viewer to focus on a certain point on the displayed image from the eyepiece, and because the camera may be able to correlate the viewing direction of the eye to a point on the display, the eyepiece may be able to interpret commands though a combination of where the wearer is looking and an action by the wearer (e.g. blinking, touching an interface device, movement of a position sense device, and the like). For example, the viewer may be able to look at an object on the display, and select that object through the motion of a finger enabled through a position sense device.

In some embodiments, the glasses may be equipped with eye tracking devices for tracking movement of the user's eye, or preferably both eyes; alternatively, the glasses may be equipped with sensors for six-degree freedom of movement tracking, i.e., head movement tracking. These devices or sensors are available, for example, from Chronos Vision GmbH, Berlin, Germany and ISCAN, Woburn, Mass. Retinal scanners are also available for tracking eye movement. Retinal scanners may also be mounted in the augmented reality glasses and are available from a variety of companies, such as Tobii, Stockholm, Sweden, and SMI, Teltow, Germany, and ISCAN.

The augmented reality eyepiece also includes a user input interface, as shown, to allow a user to control the device. Inputs used to control the device may include any of the sensors discussed above, and may also include a trackpad, one or more function keys and any other suitable local or remote device. For example, an eye tracking device may be used to control another device, such as a video game or external tracking device. As an example, an augmented reality eyepiece equipped with an eye tracking device, discussed elsewhere in this document, which allows the eyepiece to track the direction of the user's eye or preferably, eyes, and send the movements to the controller of the eyepiece. The movements may then be transmitted to a control device for a video game controlled by the control device, which may be within sight of the user. The movement of the user's eyes is then converted by suitable software to signals for controlling movement in the video game, such as quadrant (range) and azimuth (direction). Additional controls may be used in conjunction with eye tracking, such as with the user's trackpad or function keys.

In embodiments, control of the eyepiece may be enabled though gestures by the wearer. For instance, the eyepiece may have a camera that views outward (e.g. forward, to the side, down) and interprets gestures or movements of the hand of the wearer as control signals. Hand signals may include passing the hand past the camera, hand positions or sign language in front of the camera, pointing to a real-world object (such as to activate augmentation of the object), and the like. Hand motions may also be used to manipulate objects displayed on the inside of the translucent lens, such as moving an object, rotating an object, deleting an object, opening-closing a screen or window in the image, and the like. Although hand motions have been used in the preceding examples, any portion of the body or object held or worn by the wearer may also be utilized for gesture recognition by the eyepiece.

In embodiments, head motion control may be used to send commands to the eyepiece, where motion sensors such as accelerometers, gyros, or any other sensor described herein, may be mounted on the wearer's head, on the eyepiece, in a hat, in a helmet, and the like. Referring to FIG. 14A, head motions may include quick motions of the head, such as jerking the head in a forward and/or backward motion 1412, in an up and/or down motion 1410, in a side to side motion as a nod, dwelling in a position, such as to the side, moving and holding in position, and the like. Motion sensors may be integrated into the eyepiece, mounted on the user's head or in a head covering (e.g. hat, helmet) by wired or wireless connection to the eyepiece, and the like. In embodiments, the user may wear the interactive head-mounted eyepiece, where the eyepiece includes an optical assembly through which the user views a surrounding environment and displayed content. The optical assembly may include a corrective element that corrects the user's view of the surrounding environment, an integrated processor for handling content for display to the user, and an integrated image source for introducing the content to the optical assembly. At least one of a plurality of head motion sensing control devices may be integrated or in association with the eyepiece that provide control commands to the processor as command instructions based upon sensing a predefined head motion characteristic. The head motion characteristic may be a nod of the user's head such that the nod is an overt motion dissimilar from ordinary head motions. The overt motion may be a jerking motion of the head. The control instructions may provide manipulation of the content for display, be communicated to control an external device, and the like. Head motion control may be used in combination with other control mechanisms, such as using another control mechanism as discussed herein to activate a command and for the head motion to execute it. For example, a wearer may want to move an object to the right, and through eye control, as discussed herein, select the object and activate head motion control. Then, by tipping their head to the right, the object may be commanded to move to the right, and the command terminated through eye control.

In embodiments, the eyepiece may be controlled through audio, such as through a microphone. Audio signals may include speech recognition, voice recognition, sound recognition, sound detection, and the like. Audio may be detected though a microphone on the eyepiece, a throat microphone, a jaw bone microphone, a boom microphone, a headphone, ear bud with microphone, and the like.

In embodiments, command inputs may provide for a plurality of control functions, such as turning on/off the eyepiece projector, turn on/off audio, turn on/off a camera, turn on/off augmented reality projection, turn on/off GPS, interaction with display (e.g. select/accept function displayed, replay of captured image or video, and the like), interaction with the real-world (e.g. capture image or video, turn a page of a displayed book, and the like), perform actions with an embedded or external mobile device (e.g. mobile phone, navigation device, music device, VoIP, and the like), browser controls for the Internet (e.g. submit, next result, and the like), email controls (e.g. read email, display text, text-to-speech, compose, select, and the like), GPS and navigation controls (e.g. save position, recall saved position, show directions, view location on map), and the like.

In embodiments, the eyepiece may provide 3D display imaging to the user, such as through conveying a stereoscopic, auto-stereoscopic, computer-generated holography, volumetric display image, stereograms/stereoscopes, view-sequential displays, electro-holographic displays, parallax "two view" displays and parallax panoramagrams, re-imaging systems, and the like, creating the perception of 3D depth to the viewer. Display of 3D images to the user may employ different images presented to the user's left and right eyes, such as where the left and right optical paths have some optical component that differentiates the image, where the projector facility is projecting different images to the user's left and right eye's, and the like. The optical path, including from the projector facility through the optical path to the user's eye, may include a graphical display device that forms a visual representation of an object in three physical dimensions. A processor, such as the integrated processor in the eyepiece or one in an external facility, may provide 3D image processing as at least a step in the generation of the 3D image to the user.

In embodiments, holographic projection technologies may be employed in the presentation of a 3D imaging effect to the user, such as computer-generated holography (CGH), a method of digitally generating holographic interference patterns. For instance, a holographic image may be projected by a holographic 3D display, such as a display that operates on the basis of interference of coherent light. Computer generated holograms have the advantage that the objects which one wants to show do not have to possess any physical reality at all, that is, they may be completely generated as a 'synthetic hologram'. There are a plurality of different methods for calculating the interference pattern for a CGH, including from the fields of holographic information and computational reduction as well as in computational and quantization techniques. For instance, the Fourier transform method and point source holograms are two examples of computational techniques. The Fourier transformation method may be used to simulate the propagation of each plane of depth of the object to the hologram plane, where the reconstruction of the image may occur in the far field. In an example process, there may be two steps, where first the light field in the far observer plane is calculated, and then the field is Fourier transformed back to the lens plane, where the wavefront to be reconstructed by the hologram is the superposition of the Fourier transforms of each object plane in depth. In another example, a target image may be multiplied by a phase pattern to which an inverse Fourier transform is applied. Intermediate holograms may then be generated by shifting this image product, and combined to create a final set. The final set of holograms may then be approximated to form kinoforms for sequential display to the user, where the kinoform is a phase hologram in which the phase modulation of the object wavefront is recorded as a surface-relief profile. In the point source hologram method the object is broken down in self-luminous points, where an elementary hologram is calculated for every point source and the final hologram is synthesized by superimposing all the elementary holograms.

In an embodiment, 3-D or holographic imagery may be enabled by a dual projector system where two projectors are stacked on top of each other for a 3D image output. Holographic projection mode may be entered by a control mechanism described herein or by capture of an image or signal, such as an outstretched hand with palm up, an SKU, an RFID reading, and the like. For example, a wearer of the eyepiece may view a letter 'X' on a piece of cardboard which causes the eyepiece to enter holographic mode and turning on the second, stacked projector. Selecting what hologram to display may be done with a control technique. The projector may project the hologram onto the cardboard over the letter 'X'. Associated software may track the position of the letter 'X' and move the projected image along with the movement of the letter 'X'. In another example, the eyepiece may scan a SKU, such as a SKU on a toy construction kit, and a 3-D image of the completed toy construction may be accessed from an online source or non-volatile memory. Interaction with the hologram, such as rotating it, zooming in/out, and the like, may be done using the control mechanisms described herein. Scanning may be enabled by associated bar code/SKU scanning software. In another example, a keyboard may be projected in space or on a surface. The holographic keyboard may be used in or to control any of the associated applications/functions.

Figure 24:
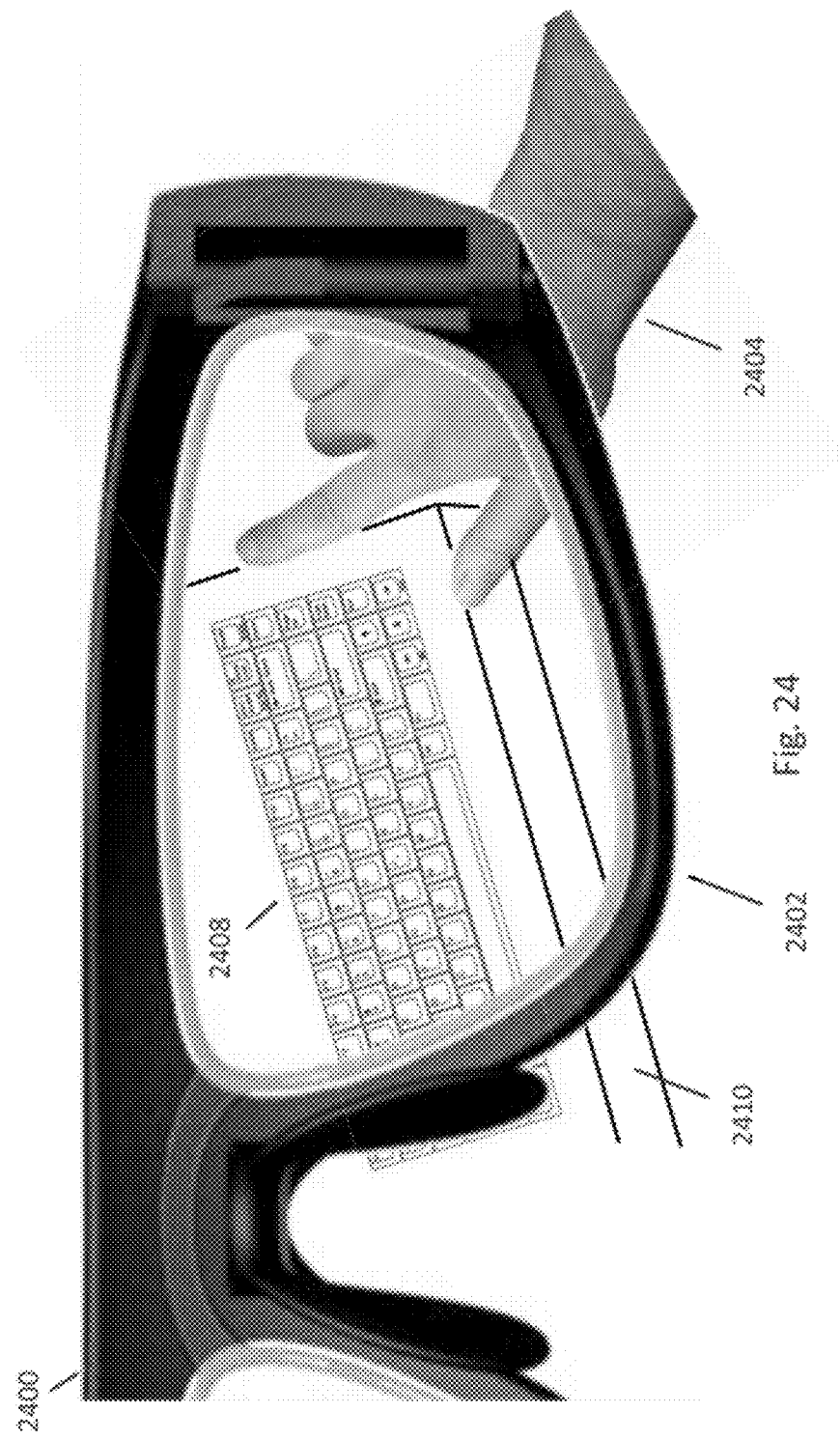
FIG. 24 depicts a lock position of a virtual keyboard.

In embodiments, eyepiece facilities may provide for locking the position of a virtual keyboard down relative to a real environmental object (e.g. a table, a wall, a vehicle dashboard, and the like) where the virtual keyboard then does not move as the wearer moves their head. In an example, and referring to FIG. 24, the user may be sitting at a table and wearing the eyepiece 2402, and wish to input text into an application, such as a word processing application, a web browser, a communications application, and the like. The user may be able to bring up a virtual keyboard 2408, or other interactive control element (e.g. virtual mouse, calculator, touch screen, and the like), to use for input. The user may provide a command for bringing up the virtual keyboard 2408, and use a hand gesture 2404 for indicating the fixed location of the virtual keyboard 2408. The virtual keyboard 2408 may then remain fixed in space relative to the outside environment, such as fixed to a location on the table 2410, where the eyepiece facilities keep the location of the virtual keyboard 2408 on the table 2410 even when the user turns their head. That is, the eyepiece 2402 may compensate for the user's head motion in order to keep the user's view of the virtual keyboard 2408 located on the table 2410. In embodiments, the user may wear the interactive head-mounted eyepiece, where the eyepiece includes an optical assembly through which the user views a surrounding environment and displayed content. The optical assembly may include a corrective element that corrects the user's view of the surrounding environment, an integrated processor for handling content for display to the user, and an integrated image source for introducing the content to the optical assembly. An integrated camera facility may be provided that images the surrounding environment, and identifies a user hand gesture as an interactive control element location command, such as a hand-finger configuration moved in a certain way, positioned in a certain way, and the like. The location of the interactive control element then may remain fixed in position with respect to an object in the surrounding environment, in response to the interactive control element location command, regardless of a change in the viewing direction of the user. In this way, the user may be able to utilize a virtual keyboard in much the same way they would a physical keyboard, where the virtual keyboard remains in the same location. However, in the case of the virtual keyboard there are not 'physical limitations', such as gravity, to limit where the user may locate the keyboard. For instance, the user could be standing next to a wall, and place the keyboard location on the wall, and the like.

Figure 30:
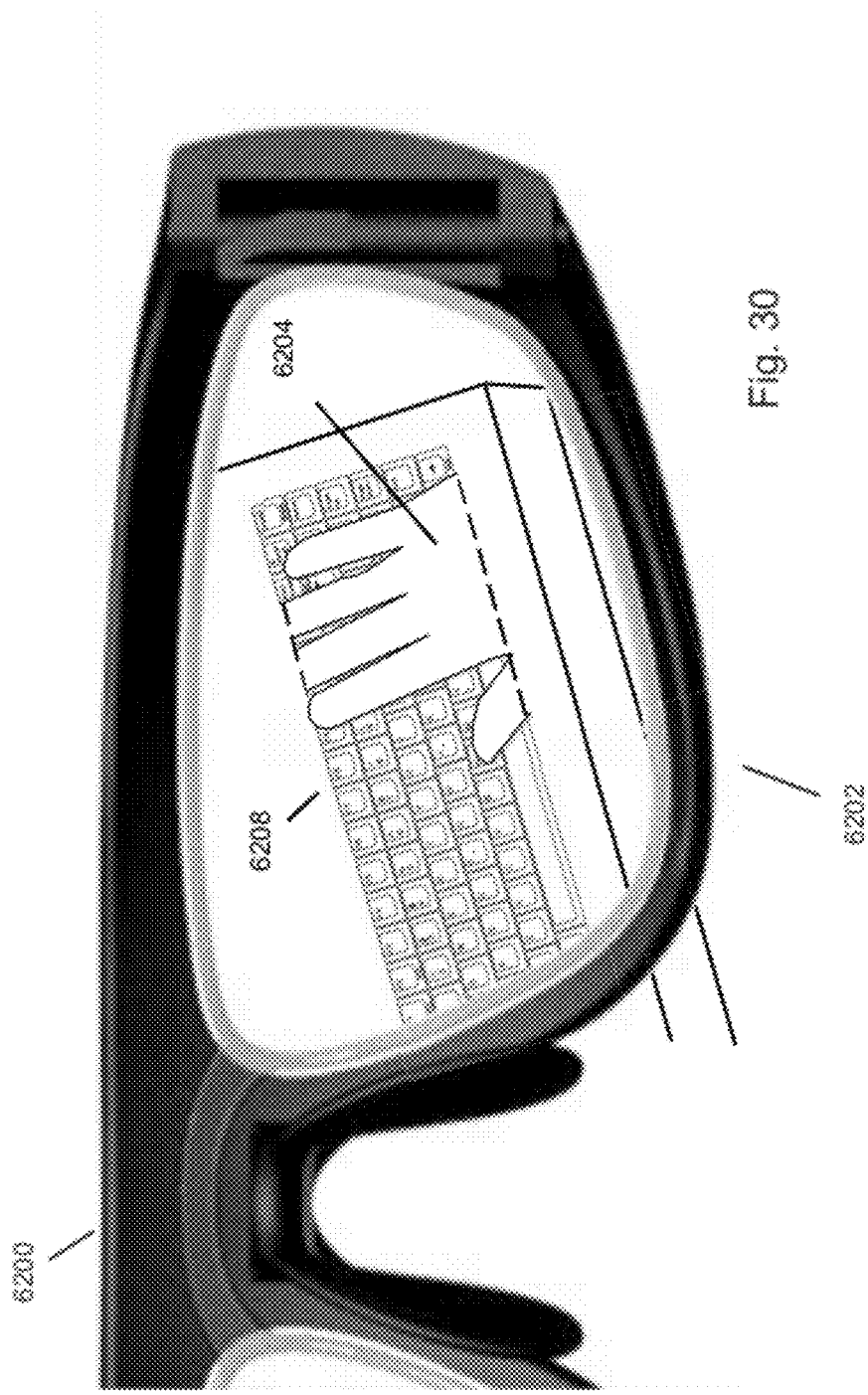
FIG. 30 depicts partial image removal by the eyepiece.

In embodiments, eyepiece facilities may provide for removing the portions of a virtual keyboard projection where intervening obstructions appear (e.g. the user's hand getting in the way, where it is not desired to project the keyboard onto the user's hand). In an example, and referring to FIG. 30, the eyepiece 6202 may provide a projected virtual keyboard 6208 to the wearer, such as onto a tabletop. The wearer may then reach 'over' the virtual keyboard 6208 to type. As the keyboard is merely a projected virtual keyboard, rather than a physical keyboard, without some sort of compensation to the projected image the projected virtual computer would be projected 'onto' the back of the user's hand. However, as in this example, the eyepiece may provide compensation to the projected image such that the portion of the wearer's hand 6204 that is obstructing the intended projection of the virtual keyboard onto the table may be removed from the projection. That is, it may not be desirable for portions of the keyboard projection 6208 to be visualized onto the user's hand, and so the eyepiece subtracts the portion of the virtual keyboard projection that is co-located with the wearer's hand 6204. In embodiments, the user may wear the interactive head-mounted eyepiece, where the eyepiece includes an optical assembly through which the user views a surrounding environment and displayed content. The optical assembly may include a corrective element that corrects the user's view of the surrounding environment, an integrated processor for handling content for display to the user, and an integrated image source for introducing the content to the optical assembly. The displayed content may include an interactive control element (e.g. virtual keyboard, virtual mouse, calculator, touch screen, and the like). An integrated camera facility may image a user's body part as it interacts with the interactive control element, wherein the processor removes a portion of the interactive control element by subtracting the portion of the interactive control element that is determined to be co-located with the imaged user body part based on the user's view. In embodiments, this technique of partial projected image removal may be applied to other projected images and obstructions, and is not meant to be restricted to this example of a hand over a virtual keyboard.

Figure 37:
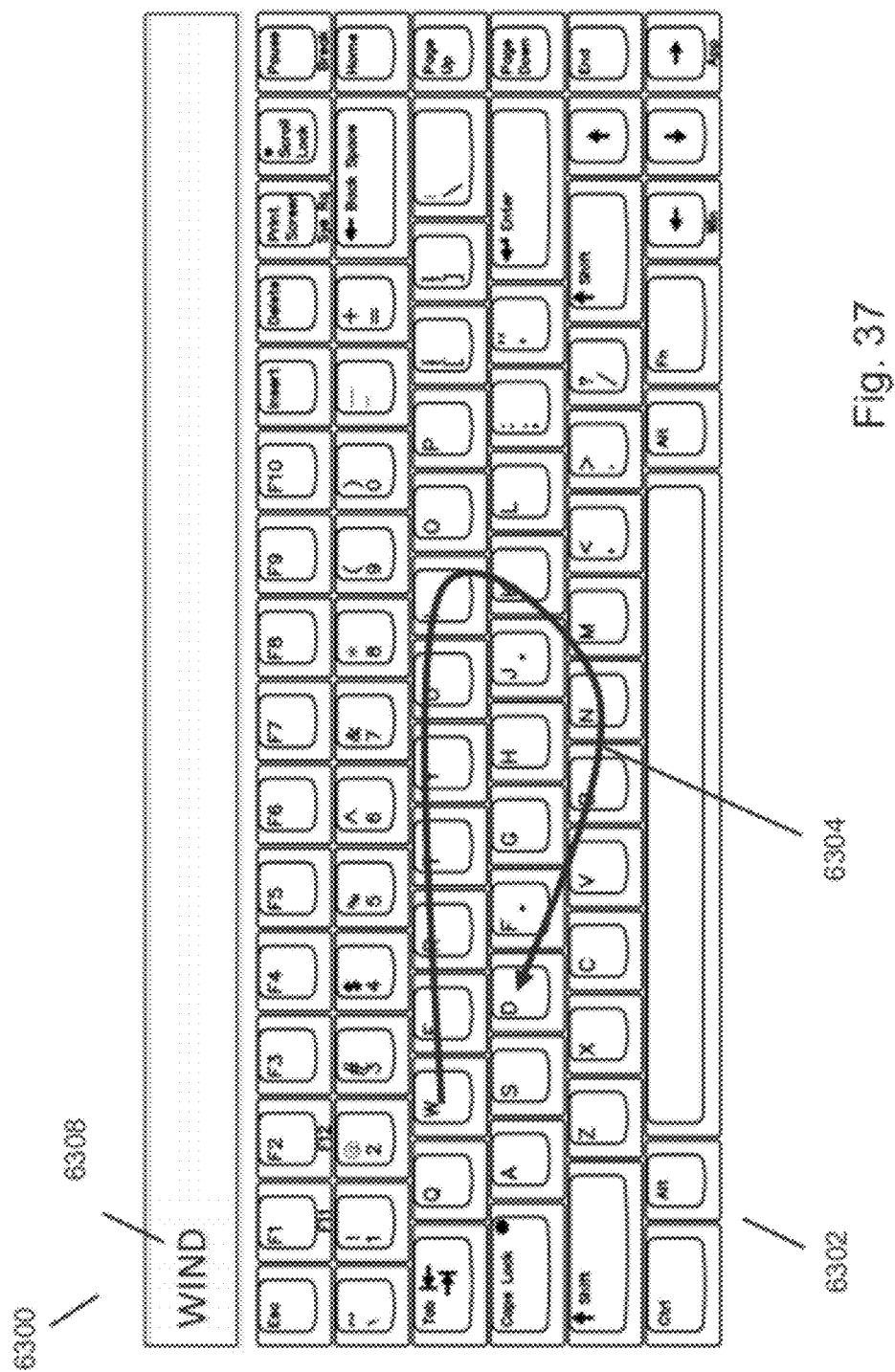
FIG. 37 depicts a swipe process with a virtual keyboard.

In embodiments, eyepiece facilities may provide for the ability to determine an intended text input from a sequence of character contacts swiped across a virtual keypad, such as with the finger, a stylus, and the like. For example, and referring to FIG. 37, the eyepiece may be projecting a virtual keyboard 6302, where the user wishes to input the word 'wind'. Normally, the user would discretely press the key positions for 'w', then T, then 'n', and finally 'd', and a facility (camera, accelerometer, and the like, such as described herein) associated with the eyepiece would interpret each position as being the letter for that position. However, the system may also be able to monitor the movement, or swipe, of the user's finger or other pointing device across the virtual keyboard and determine best fit matches for the pointer movement. In the figure, the pointer has started at the character 'w' and swept a path 6304 though the characters e, r, t, y, u, i, k, n, b, v, f, and d where it stops. The eyepiece may observe this sequence and determine the sequence through an input path analyzer, feed the sensed sequence into a word matching search facility, and output a best fit word, in this case 'wind' as text 6308. In embodiments, the eyepiece may provide the best-fit word, a listing of best-fit words, and the like. In embodiments, the user may wear the interactive head-mounted eyepiece, where the eyepiece includes an optical assembly through which the user views a surrounding environment and displayed content. The optical assembly may include a corrective element that corrects the user's view of the surrounding environment, an integrated processor for handling content for display to the user, and an integrated image source for introducing the content to the optical assembly. The displayed content may comprise an interactive keyboard control element (e.g. a virtual keyboard, calculator, touch screen, and the like), and where the keyboard control element is associated with an input path analyzer, a word matching search facility, and a keyboard input interface. The user may input text by sliding a pointing device (e.g. a finger, a stylus, and the like) across character keys of the keyboard input interface in a sliding motion through an approximate sequence of a word the user would like to input as text, wherein the input path analyzer determines the characters contacted in the input path, the word matching facility finds a best word match to the sequence of characters contacted and inputs the best word match as input text.

Figure 38:
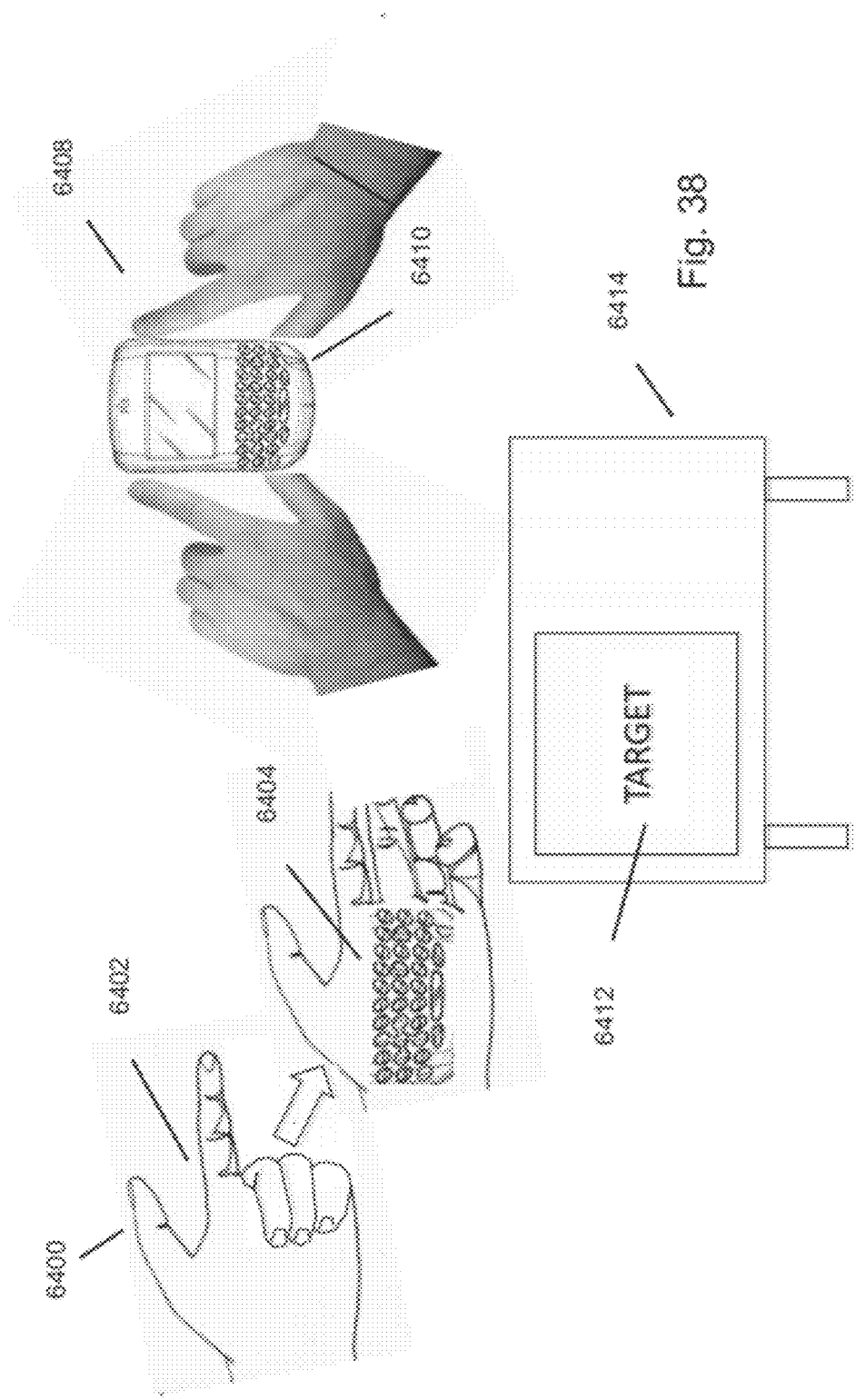
FIG. 38 depicts a target marker process for a virtual keyboard.

In embodiments, eyepiece facilities may provide for presenting displayed content corresponding to an identified marker indicative of the intention to display the content. That is, the eyepiece may be commanded to display certain content based upon sensing a predetermined external visual cue. The visual cue may be an image, an icon, a picture, face recognition, a hand configuration, a body configuration, and the like. The displayed content may be an interface device that is brought up for use, a navigation aid to help the user find a location once they get to some travel location, an advertisement when the eyepiece views a target image, an informational profile, and the like. In embodiments, visual marker cues and their associated content for display may be stored in memory on the eyepiece, in an external computer storage facility and imported as needed (such as by geographic location, proximity to a trigger target, command by the user, and the like), generated by a third-party, and the like. In embodiments, the user may wear the interactive head-mounted eyepiece, where the eyepiece includes an optical assembly through which the user views a surrounding environment and displayed content. The optical assembly may include a corrective element that corrects the user's view of the surrounding environment, an integrated processor for handling content for display to the user, and an integrated image source for introducing the content to the optical assembly. An integrated camera facility may be provided that images an external visual cue, wherein the integrated processor identifies and interprets the external visual cue as a command to display content associated with the visual cue. Referring to FIG. 38, in embodiments the visual cue 6412 may be included in a sign 6414 in the surrounding environment, where the projected content is associated with an advertisement. The sign may be a billboard, and the advertisement for a personalized advertisement based on a preferences profile of the user. The visual cue 6402,6410 may be a hand gesture, and the projected content a projected virtual keyboard 6404, 6408. For instance, the hand gesture may be a thumb and index finger gesture 6402 from a first user hand, and the virtual keyboard 6404 projected on the palm of the first user hand, and where the user is able to type on the virtual keyboard with a second user hand. The hand gesture 6410 may be a thumb and index finger gesture combination of both user hands, and the virtual keyboard 6408 projected between the user hands as configured in the hand gesture, where the user is able to type on the virtual keyboard using the thumbs of the user's hands. Visual cues may provide the wearer of the eyepiece with an automated resource for associating a predetermined external visual cue with a desired outcome in the way of projected content, thus freeing the wearer from searching for the cues themselves.

The eyepiece may be useful for various applications and markets. It should be understood that the control mechanisms described herein may be used to control the functions of the applications described herein. The eyepiece may run a single application at a time or multiple applications may run at a time. Switching between applications may be done with the control mechanisms described herein. The eyepiece may be used in military applications, gaming, image recognition applications, to view/order e-books, GPS Navigation (Position, Direction, Speed and ETA), Mobile TV, athletics (view pacing, ranking, and competition times; receive coaching), telemedicine, industrial inspection, aviation, shopping, inventory management tracking, firefighting (enabled by VIS/NIRSWIR sensor that sees through fog, haze, dark), outdoor/adventure, custom advertising, and the like. In an embodiment, the eyepiece may be used with e-mail, such as GMAIL in FIG. 7, the Internet, web browsing, viewing sports scores, video chat, and the like. In an embodiment, the eyepiece may be used for educational/training purposes, such as by displaying step by step guides, such as hands-free, wireless maintenance and repair instructions. For example, a video manual and/or instructions may be displayed in the field of view. In an embodiment, the eyepiece may be used in Fashion, Health, and Beauty. For example, potential outfits, hairstyles, or makeup may be projected onto a mirror image of a user. In an embodiment, the eyepiece may be used in Business Intelligence, Meetings, and Conferences. For example, a user's name tag can be scanned, their face run through a facial recognition system, or their spoken name searched in database to obtain biographical information. Scanned name tags, faces, and conversations may be recorded for subsequent viewing or filing.

In an embodiment, a "Mode" may be entered by the eyepiece. In the mode, certain applications may be available. For example, a consumer version of the eyepiece may have a Tourist Mode, Educational Mode, Internet Mode, TV Mode, Gaming Mode, Exercise Mode, Stylist Mode, Personal Assistant Mode, and the like.

A user of the augmented reality glasses may wish to participate in video calling or video conferencing while wearing the glasses. Many computers, both desktop and laptop have integrated cameras to facilitate using video calling and conferencing. Typically, software applications are used to integrate use of the camera with calling or conferencing features. With the augmented reality glasses providing much of the functionality of laptops and other computing devices, many users may wish to utilize video calling and video conferencing while on the move wearing the augmented reality glasses.

In an embodiment, a video calling or video conferencing application may work with a WiFi connection, or may be part of a 3G or 4G calling network associated with a user's cell phone. The camera for video calling or conferencing is placed on a device controller, such as a watch or other separate electronic computing device. Placing the video calling or conferencing camera on the augmented reality glasses is not feasible, as such placement would provide the user with a view only of themselves, and would not display the other participants in the conference or call. However, the user may choose to use the forward-facing camera to display their surroundings or another individual in the video call.

Figure 32:
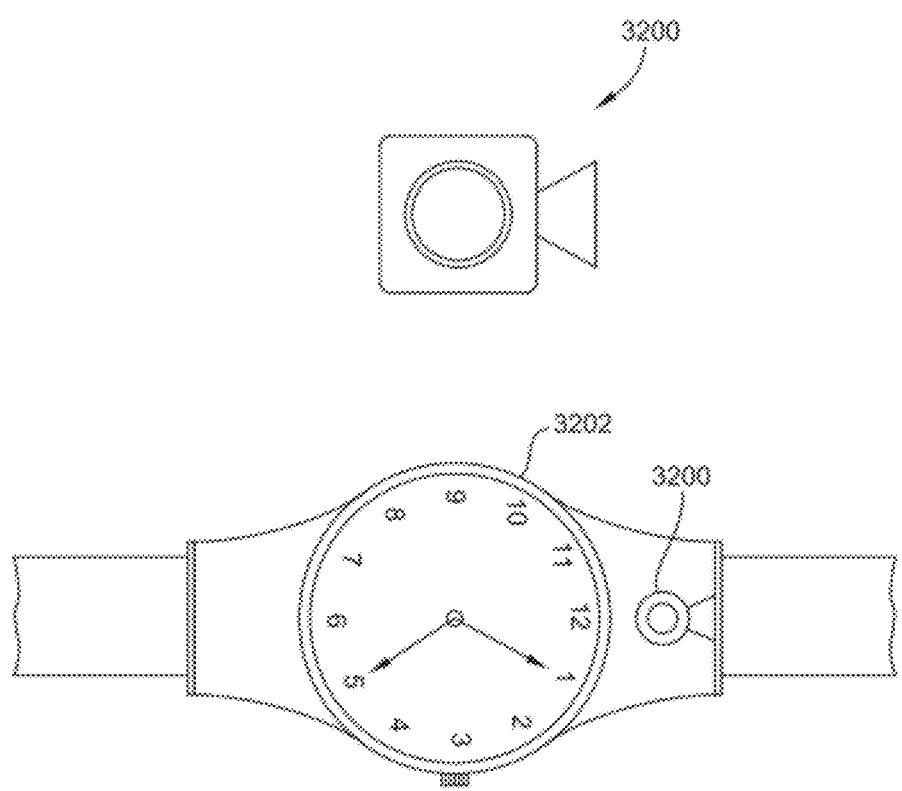
FIG. 32 depicts a typical camera for use in video calling or conferencing.

FIG. 32 depicts a typical camera 3200 for use in video calling or conferencing. Such cameras are typically small and could be mounted on a watch 3202, as shown in FIG. 32, cell phone or other portable computing device, including a laptop computer. Video calling works by connecting the device controller with the cell phone or other communications device. The devices utilize software compatible with the operating system of the glasses and the communications device or computing device. In an embodiment, the screen of the augmented reality glasses may display a list of options for making the call and the user may gesture using a pointing control device or use any other control technique described herein to select the video calling option on the screen of the augmented reality glasses.

Figure 33:
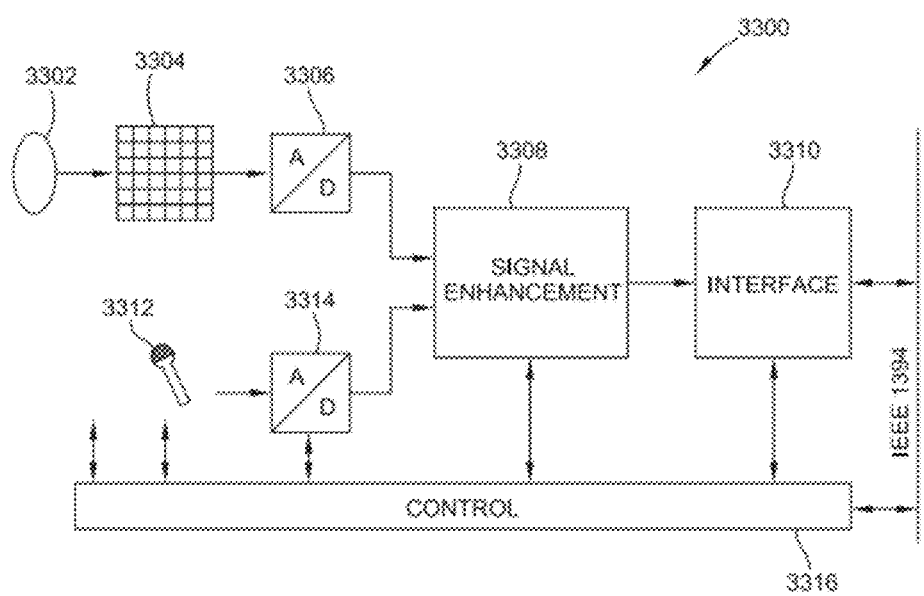
FIG. 33 illustrates an embodiment of a block diagram of a video calling camera.

FIG. 33 illustrates an embodiment of a block diagram of a video calling camera. The camera incorporates a lens 3302, a CCD/CMOS sensor 3304, analog to digital converters for video signals, 3306, and audio signals, 3314. Microphone 3312 collects audio input. Both analog to digital converters 3306 and 3314 send their output signals to a signal enhancement module 3308. The signal enhancement module 3308 forwards the enhanced signal, which is a composite of both video and audio signals to interface 3310. Interface 3310 is connected to an IEEE 1394 standard bus interface, along with a control module 3316.

In operation, the video call camera depends on the signal capture which transforms the incident light, as well as incident sound into electrons. For light this process is performed by CCD or CMOS chip 3304. The microphone transforms sound into electrical impulses.

The first step in the process of generating an image for a video call is to digitize the image. The CCD or CMOS chip 3304 dissects the image and converts it into pixels. If a pixel has collected many photons, the voltage will be high. If the pixel has collected few photons, the voltage will be low. This voltage is an analog value. During the second step of digitization, the voltage is transformed into a digital value by the analog to digital converter 3306, which handles image processing. At this point, a raw digital image is available.

Audio captured by the microphone 3312 is also transformed into a voltage. This voltage is sent to the analog to digital converter 3314 where the analog values are transformed into digital values.

The next step is to enhance the signal so that it may be sent to viewers of the video call or conference. Signal enhancement includes creating color in the image using a color filter, located in front of the CCD or CMOS chip 3304. This filter is red, green, or blue and changes its color from pixel to pixel, and in an embodiment, may be a color filter array, or Bayer filter. These raw digital images are then enhanced by the filter to meet aesthetic requirements. Audio data may also be enhanced for a better calling experience.

In the final step before transmission, the image and audio data are compressed and output as a digital video stream, in an embodiment using a digital video camera. If a photo camera is used, single images may be output, and in a further embodiment, voice comments may be appended to the files. The enhancement of the raw digital data takes place away from the camera, and in an embodiment may occur in the device controller or computing device that the augmented reality glasses communicate with during a video call or conference.

Further embodiments may provide for portable cameras for use in industry, medicine, astronomy, microscopy, and other fields requiring specialized camera use. These cameras often forgo signal enhancement and output the raw digital image. These cameras may be mounted on other electronic devices or the user's hand for ease of use.

The camera interfaces to the augmented reality glasses and the device controller or computing device using an IEEE 1394 interface bus. This interface bus transmits time critical data, such as a video and data whose integrity is critically important, including parameters or files to manipulate data or transfer images.

In addition to the interface bus, protocols define the behavior of the devices associated with the video call or conference. The camera for use with the augmented reality glasses, may, in embodiments, employ one of the following protocols: AV/C, DCAM, or SBP-2.

AV/C is a protocol for Audio Video Control and defines the behavior of digital video devices, including video cameras and video recorders.

DCAM refers to the 1394 based Digital Camera Specification and defines the behavior of cameras that output uncompressed image data without audio.

SBP-2 refers to Serial Bus Protocol and defines the behavior of mass storage devices, such as hard drives or disks.

Devices that use the same protocol are able to communicate with each other. Thus, for video calling using the augmented reality glasses, the same protocol may be used by the video camera on the device controller and the augmented reality glasses. Because the augmented reality glasses, device controller, and camera use the same protocol, data may be exchanged among these devices. Files that may be transferred among devices include: image and audio files, image and audio data flows, parameters to control the camera, and the like.

In an embodiment, a user desiring to initiate a video call may select a video call option from a screen presented when the call process is initiated. The user selects by making a gesture using a pointing device, or gesture to signal the selection of the video call option. The user then positions the camera located on the device controller, wristwatch, or other separable electronic device so that the user's image is captured by the camera. The image is processed through the process described above and is then streamed to the augmented reality glasses and the other participants for display to the users.

In embodiments, the camera may be mounted on a cell phone, personal digital assistant, wristwatch, pendant, or other small portable device capable of being carried, worn, or mounted. The images or video captured by the camera may be streamed to the eyepiece.

In embodiments, the present disclosure may provide the wearer with GPS-based content reception, as in FIG. 6. As noted, augmented reality glasses of the present disclosure may include memory, a global positioning system, a compass or other orienting device, and a camera. GPS-based computer programs available to the wearer may include a number of applications typically available from the Apple Inc. App Store for iPhone use. Similar versions of these programs are available for other brands of smartphones and may be applied to embodiments of the present disclosure. These programs include, for example, SREngine (scene recognition engine), NearestTube, TAT Augmented ID, Yelp, Layar, and TwittARound, as well as other more specialized applications, such as RealSki.

SREngine is a scene recognition engine that is able to identify objects viewed by the user's camera. It is a software engine able to recognize static scenes, such as scenes of architecture, structures, pictures, objects, rooms, and the like. It is then able to automatically apply a virtual "label" to the structures or objects according to what it recognizes. For example, the program may be called up by a user of the present disclosure when viewing a street scene, such as FIG. 6. Using a camera of the augmented reality glasses, the engine will recognize the Fontaines de la Concorde in Paris. The program will then summon a virtual label, shown in FIG. 6 as part of a virtual image 618 projected onto the lens 602. The label may be text only, as seen at the bottom of the image 618. Other labels applicable to this scene may include "fountain," "museum," "hotel," or the name of the columned building in the rear. Other programs of this type may include the Wikitude AR Travel Guide, Yelp and many others.

NearestTube, for example, uses the same technology to direct a user to the closest subway station in London, and other programs may perform the same function, or similar, in other cities. Layar is another application that uses the camera, a compass or direction, and GPS data to identify a user's location and field of view. With this information, an overlay or label may appear virtually to help orient and guide the user. Yelp and Monocle perform similar functions, but their databases are somewhat more specialized, helping to direct users in a similar manner to restaurants or to other service providers.

The user may control the glasses, and call up these functions, using any of the controls described in this patent. For example, the glasses may be equipped with a microphone to pick up voice commands from a user and process them using software contained with a memory of the glasses. The user may then respond to prompts from small speakers or earbuds also contained within the glasses frame. The glasses may also be equipped with a tiny track pad, similar to those found on smartphones. The trackpad may allow a user to move a pointer or indicator on the virtual screen within the AR glasses, similar to a touch screen. When the user reaches a desired point on the screen, the user depresses the track pad to indicate his or her selection. Thus, a user may call up a program, e.g., a travel guide, and then find his or her way through several menus, perhaps selecting a country, a city and then a category. The category selections may include, for example, hotels, shopping, museums, restaurants, and so forth. The user makes his or her selections and is then guided by the AR program. In one embodiment, the glasses also include a GPS locator, and the present country and city provides default locations that may be overridden.

In an embodiment, the eyepiece's object recognition software may process the images being received by the eyepiece's forward facing camera in order to determine what is in the field of view. In other embodiments, the GPS coordinates of the location as determined by the eyepiece's GPS may be enough to determine what is in the field of view. In other embodiments, an RFID or other beacon in the environment may be broadcasting a location. Any one or combination of the above may be used by the eyepiece to identify the location and the identity of what is in the field of view.

When an object is recognized, the resolution for imaging that object may be increased or images or video may be captured at low compression. Additionally, the resolution for other objects in the user's view may be decreased, or captured at a higher compression rate in order to decrease the needed bandwidth.

Once determined, content related to points of interest in the field of view may be overlaid on the real world image, such as social networking content, interactive tours, local information, and the like. Information and content related to movies, local information, weather, restaurants, restaurant availability, local events, local taxis, music, and the like may be accessed by the eyepiece and projected on to the lens of the eyepiece for the user to view and interact with. For example, as the user looks at the Eiffel Tower, the forward facing camera may take an image and send it for processing to the eyepiece's associated processor. Object recognition software may determine that the structure in the wearer's field of view is the Eiffel Tower. Alternatively, the GPS coordinates determined by the eyepiece's GPS may be searched in a database to determine that the coordinates match those of the Eiffel Tower. In any event, content may then be searched relating to the Eiffel Tower visitor's information, restaurants in the vicinity and in the Tower itself, local weather, local Metro information, local hotel information, other nearby tourist spots, and the like. Interacting with the content may be enabled by the control mechanisms described herein. In an embodiment, GPS-based content reception may be enabled when a Tourist Mode of the eyepiece is entered.

In an embodiment, the eyepiece may be used to view streaming video. For example, videos may be identified via search by GPS location, search by object recognition of an object in the field of view, a voice search, a holographic keyboard search, and the like. Continuing with the example of the Eiffel Tower, a video database may be searched via the GPS coordinates of the Tower or by the term 'Eiffel Tower' once it has been determined that is the structure in the field of view. Search results may include geo-tagged videos or videos associated with the Eiffel Tower. The videos may be scrolled or flipped through using the control techniques described herein. Videos of interest may be played using the control techniques described herein. The video may be laid over the real world scene or may be displayed on the lens out of the field of view. In an embodiment, the eyepiece may be darkened via the mechanisms described herein to enable higher contrast viewing. In another example, the eyepiece may be able to utilize a camera and network connectivity, such as described herein, to provide the wearer with streaming video conferencing capabilities.

As noted, the user of augmented reality may receive content from an abundance of sources. A visitor or tourist may desire to limit the choices to local businesses or institutions; on the other hand, businesses seeking out visitors or tourists may wish to limit their offers or solicitations to persons who are in their area or location but who are visiting rather than local residents. Thus, in one embodiment, the visitor or tourist may limit his or her search only to local businesses, say those within certain geographic limits. These limits may be set via GPS criteria or by manually indicating a geographic restriction. For example, a person may require that sources of streaming content or ads be limited to those within a certain radius (a set number or km or miles) of the person. Alternatively, the criteria may require that the sources are limited to those within a certain city or province. These limits may be set by the augmented reality user just as a user of a computer at a home or office would limit his or her searches using a keyboard or a mouse; the entries for augmented reality users are simply made by voice, by hand motion, or other ways described elsewhere in the portions of this disclosure discussing controls.

In addition, the available content chosen by a user may be restricted or limited by the type of provider. For example, a user may restrict choices to those with a website operated by a government institution (.gov) or by a non-profit institution or organization (.org). In this way, a tourist or visitor who may be more interested in visiting government offices, museums, historical sites and the like, may find his or her choices less cluttered. The person may be more easily able to make decisions when the available choices have been pared down to a more reasonable number. The ability to quickly cut down the available choices is desirable in more urban areas, such as Paris or Washington, D.C., where there are many choices.

The user controls the glasses in any of the manners or modes described elsewhere in this patent. For example, the user may call up a desired program or application by voice or by indicating a choice on the virtual screen of the augmented reality glasses. The augmented glasses may respond to a track pad mounted on the frame of the glasses, as described above. Alternatively, the glasses may be responsive to one or more motion or position sensors mounted on the frame. The signals from the sensors are then sent to a microprocessor or microcontroller within the glasses, the glasses also providing any needed signal transducing or processing. Once the program of choice has begun, the user makes selections and enters a response by any of the methods discussed herein, such as signaling "yes" or "no" with a head movement, a hand gesture, a trackpad depression, or a voice command.

At the same time, content providers, that is, advertisers, may also wish to restrict their offerings to persons who are within a certain geographic area, e.g., their city limits. At the same time, an advertiser, perhaps a museum, may not wish to offer content to local persons, but may wish to reach visitors or out-of-towners. The augmented reality devices discussed herein are desirably equipped with both GPS capability and telecommunications capability. It will be a simple matter for the museum to provide streaming content within a limited area by limiting its broadcast power. The museum, however, may provide the content through the Internet and its content may be available world-wide. In this instance, a user may receive content through an augmented reality device advising that the museum is open today and is available for touring.

The user may respond to the content by the augmented reality equivalent of clicking on a link for the museum. The augmented reality equivalent may be a voice indication, a hand or eye movement, or other sensory indication of the user's choice, or by using an associated body-mounted controller. The museum then receives a cookie indicating the identity of the user or at least the user's internet service provider (ISP). If the cookie indicates or suggests an internet service provider other than local providers, the museum server may then respond with advertisements or offers tailored to visitors. The cookie may also include an indication of a telecommunications link, e.g., a telephone number. If the telephone number is not a local number, this is an additional clue that the person responding is a visitor. The museum or other institution may then follow up with the content desired or suggested by its marketing department.

Another application of the augmented reality eyepiece takes advantage of a user's ability to control the eyepiece and its tools with a minimum use of the user's hands, using instead voice commands, gestures or motions. As noted above, a user may call upon the augmented reality eyepiece to retrieve information. This information may already be stored in a memory of the eyepiece, but may instead be located remotely, such as a database accessible over the Internet or perhaps via an intranet which is accessible only to employees of a particular company or organization. The eyepiece may thus be compared to a computer or to a display screen which can be viewed and heard at an extremely close range and generally controlled with a minimal use of one's hands.

Applications may thus include providing information on-the-spot to a mechanic or electronics technician. The technician can don the glasses when seeking information about a particular structure or problem encountered, for example, when repairing an engine or a power supply. Using voice commands, he or she may then access the database and search within the database for particular information, such as manuals or other repair and maintenance documents. The desired information may thus be promptly accessed and applied with a minimum of effort, allowing the technician to more quickly perform the needed repair or maintenance and to return the equipment to service. For mission-critical equipment, such time savings may also save lives, in addition to saving repair or maintenance costs.

The information imparted may include repair manuals and the like, but may also include a full range of audio-visual information, i.e., the eyepiece screen may display to the technician or mechanic a video of how to perform a particular task at the same time the person is attempting to perform the task. The augmented reality device also includes telecommunications capabilities, so the technician also has the ability to call on others to assist if there is some complication or unexpected difficulty with the task. This educational aspect of the present disclosure is not limited to maintenance and repair, but may be applied to any educational endeavor, such as secondary or post-secondary classes, continuing education courses or topics, seminars, and the like.

In an embodiment, a Wi-Fi enabled eyepiece may run a location-based application for geo-location of opted-in users. Users may opt-in by logging into the application on their phone and enabling broadcast of their location, or by enabling geo-location on their own eyepiece. As a wearer of the eyepiece scans people, and thus their opted-in device, the application may identify opted-in users and send an instruction to the projector to project an augmented reality indicator on an opted-in user in the user's field of view. For example, green rings may be placed around people who have opted-in to have their location seen. In another example, yellow rings may indicate people who have opted-in but don't meet some criteria, such as they do not have a FACEBOOK account, or that there are no mutual friends if they do have a FACEBOOK account.

Figure 16:
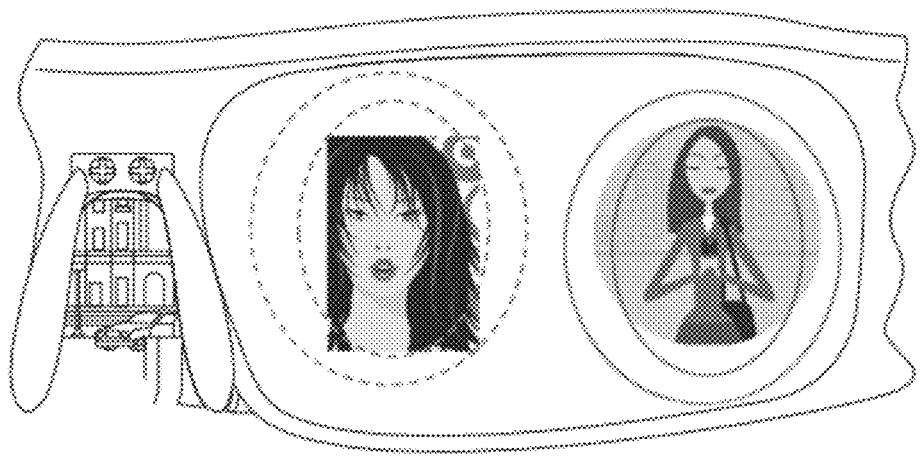
FIG. 16 depicts a location-based application mode of the eyepiece.

Some social networking, career networking, and dating applications may work in concert with the location-based application. Software resident on the eyepiece may coordinate data from the networking and dating sites and the location-based application. For example, TwittARound is one such program which makes use of a mounted camera to detect and label location-stamped tweets from other tweeters nearby. This will enable a person using the present disclosure to locate other nearby Twitter users. Alternatively, users may have to set their devices to coordinate information from various networking and dating sites. For example, the wearer of the eyepiece may want to see all E-HARMONY users who are broadcasting their location. If an opted-in user is identified by the eyepiece, an augmented reality indicator may be laid over the opted-in user. The indicator may take on a different appearance if the user has something in common with the wearer, many things in common with the user, and the like. For example, and referring to FIG. 16, two people are being viewed by the wearer. Both of the people are identified as E-HARMONY users by the rings placed around them. However, the woman shown with solid rings has more than one item in common with the wearer while the woman shown with dotted rings has no items in common with the wearer. Any available profile information may get accessed and displayed to the user.

In an embodiment, when the wearer directs the eyepiece in the direction of a user who has a networking account, such as FACEBOOK, TWITTER, BLIPPY, LINKEDIN, GOOGLE, WIKIPEDIA, and the like, the user's recent posts or profile information may be displayed to the wearer. For example, recent status updates, "tweets", "blips", and the like may get displayed, as mentioned above for TwittARound. In an embodiment, when the wearer points the eyepiece in a target user's direction, they may indicate interest in the user if the eyepiece is pointed for a duration of time and/or a gesture, head, eye, or audio control is activated. The target user may receive an indication of interest on their phone or in their glasses. If the target user had marked the wearer as interesting but was waiting on the wearer to show interest first, an indication may immediately pop up in the eyepiece of the target user's interest. A control mechanism may be used to capture an image and store the target user's information on associated non-volatile memory or in an online account.

In other applications for social networking, a facial recognition program, such as TAT Augmented ID, from TAT—The Astonishing Tribe, Malmö, Sweden, may be used. Such a program may be used to identify a person by his or her facial characteristics. This software uses facial recognition software to identify a person. Using other applications, such as photo identifying software from Flickr, one can then identify the particular nearby person, and one can then download information from social networking sites with information about the person. This information may include the person's name and the profile the person has made available on sites such as Facebook, Twitter, and the like. This application may be used to refresh a user's memory of a person or to identify a nearby person, as well as to gather information about the person.

In other applications for social networking, the wearer may be able to utilize location-based facilities of the eyepiece to leave notes, comments, reviews, and the like, at locations, in association with people, places, products, and the like. For example, a person may be able to post a comment on a place they visited, where the posting may then be made available to others through the social network. In another example, a person may be able to post that comment at the location of the place such that the comment is available when another person comes to that location. In this way, a wearer may be able to access comments left by others when they come to the location. For instance, a wearer may come to the entrance to a restaurant, and be able to access reviews for the restaurant, such as sorted by some criteria (e.g. most recent review, age of reviewer, and the like).

A user may initiate the desired program by voice, by selecting a choice from a virtual touchscreen, as described above, by using a trackpad to select and choose the desired program, or by any of the control techniques described herein. Menu selections may then be made in a similar or complementary manner. Sensors or input devices mounted in convenient locations on the user's body may also be used, e.g., sensors and a track pad mounted on a wrist pad, on a glove, or even a discreet device, perhaps of the size of a smart phone or a personal digital assistant.

Applications of the present disclosure may provide the wearer with Internet access, such as for browsing, searching, shopping, entertainment, and the like, such as through a wireless communications interface to the eyepiece. For instance, a wearer may initiate a web search with a control gesture, such as through a control facility worn on some portion of the wearer's body (e.g. on the hand, the head, the foot), on some component being used by the wearer (e.g. a personal computer, a smart phone, a music player), on a piece of furniture near the wearer (e.g. a chair, a desk, a table, a lamp), and the like, where the image of the web search is projected for viewing by the wearer through the eyepiece. The wearer may then view the search through the eyepiece and control web interaction though the control facility.

In an example, a user may be wearing an embodiment configured as a pair of glasses, with the projected image of an Internet web browser provided through the glasses while retaining the ability to simultaneously view at least portions of the surrounding real environment. In this instance, the user may be wearing a motion sensitive control facility on their hand, where the control facility may transmit relative motion of the user's hand to the eyepiece as control motions for web control, such as similar to that of a mouse in a conventional personal computer configuration. It is understood that the user would be enabled to perform web actions in a similar fashion to that of a conventional personal computer configuration. In this case, the image of the web search is provided through the eyepiece while control for selection of actions to carry out the search is provided though motions of the hand. For instance, the overall motion of the hand may move a cursor within the projected image of the web search, the flick of the finger(s) may provide a selection action, and so forth. In this way, the wearer may be enabled to perform the desired web search, or any other Internet browser-enabled function, through an embodiment connected to the Internet. In one example, a user may have downloaded computer programs Yelp or Monocle, available from the App Store, or a similar product, such as NRU ("near you"), an application from Zagat to locate nearby restaurants or other stores, Google Earth, Wikipedia, or the like. The person may initiate a search, for example, for restaurants, or other providers of goods or services, such as hotels, repairmen, and the like, or information. When the desired information is found, locations are displayed or a distance and direction to a desired location is displayed. The display may take the form of a virtual label co-located with the real world object in the user's view.

Other applications from Layar (Amsterdam, the Netherlands) include a variety of "layers" tailored for specific information desired by a user. A layer may include restaurant information, information about a specific company, real estate listings, gas stations, and so forth. Using the information provided in a software application, such as a mobile application and a user's global positioning system (GPS), information may be presented on a screen of the glasses with tags having the desired information. Using the haptic controls or other control discussed elsewhere in this disclosure, a user may pivot or otherwise rotate his or her body and view buildings tagged with virtual tags containing information. If the user seeks restaurants, the screen will display restaurant information, such as name and location. If a user seeks a particular address, virtual tags will appear on buildings in the field of view of the wearer. The user may then make selections or choices by voice, by trackpad, by virtual touch screen, and so forth.

Applications of the present disclosure may provide a way for advertisements to be delivered to the wearer. For example, advertisements may be displayed to the viewer through the eyepiece as the viewer is going about his or her day, while browsing the Internet, conducting a web search, walking though a store, and the like. For instance, the user may be performing a web search, and through the web search the user is targeted with an advertisement. In this example, the advertisement may be projected in the same space as the projected web search, floating off to the side, above, or below the view angle of the wearer. In another example, advertisements may be triggered for delivery to the eyepiece when some advertising providing facility, perhaps one in proximity to the wearer, senses the presence of the eyepiece (e.g. through a wireless connection, RFID, and the like), and directs the advertisement to the eyepiece.

For example, the wearer may be window-shopping in Manhattan, where stores are equipped with such advertising providing facilities. As the wearer walks by the stores, the advertising providing facilities may trigger the delivery of an advertisement to the wearer based on a known location of the user determined by an integrated location sensor of the eyepiece, such as a GPS. In an embodiment, the location of the user may be further refined via other integrated sensors, such as a magnetometer to enable hyperlocal augmented reality advertising. For example, a user on a ground floor of a mall may receive certain advertisements if the magnetometer and GPS readings place the user in front of a particular store. When the user goes up one flight in the mall, the GPS location may remain the same, but the magnetometer reading may indicate a change in elevation of the user and a new placement of the user in front of a different store. In embodiments, one may store personal profile information such that the advertising providing facility is able to better match advertisements to the needs of the wearer, the wearer may provide preferences for advertisements, the wearer may block at least some of the advertisements, and the like. The wearer may also be able to pass advertisements, and associated discounts, on to friends. The wearer may communicate them directly to friends that are in close proximity and enabled with their own eyepiece; they may also communicate them through a wireless Internet connection, such as to a social network of friends, though email, SMS; and the like. The wearer may be connected to facilities and/or infrastructure that enables the communication of advertisements from a sponsor to the wearer; feedback from the wearer to an advertisement facility, the sponsor of the advertisement, and the like; to other users, such as friends and family, or someone in proximity to the wearer; to a store, such as locally on the eyepiece or in a remote site, such as on the Internet or on a user's home computer; and the like. These interconnectivity facilities may include integrated facilities to the eyepiece to provide the user's location and gaze direction, such as through the use of GPS, 3-axis sensors, magnetometer, gyros, accelerometers, and the like, for determining direction, speed, attitude (e.g. gaze direction) of the wearer. Interconnectivity facilities may provide telecommunications facilities, such as cellular link, a WiFi/MiFi bridge, and the like. For instance, the wearer may be able to communicate through an available WiFi link, through an integrated MiFi (or any other personal or group cellular link) to the cellular system, and the like. There may be facilities for the wearer to store advertisements for a later use. There may be facilities integrated with the wearer's eyepiece or located in local computer facilities that enable caching of advertisements, such as within a local area, where the cached advertisements may enable the delivery of the advertisements as the wearer nears the location associated with the advertisement. For example, local advertisements may be stored on a server that contains geo-located local advertisements and specials, and these advertisements may be delivered to the wearer individually as the wearer approaches a particular location, or a set of advertisements may be delivered to the wearer in bulk when the wearer enters a geographic area that is associated with the advertisements so that the advertisements are available when the user nears a particular location. The geographic location may be a city, a part of the city, a number of blocks, a single block, a street, a portion of the street, sidewalk, and the like, representing regional, local, hyper-local areas. Note that the preceding discussion uses the term advertisement, but one skilled in the art will appreciate that this can also mean an announcement, a broadcast, a circular, a commercial, a sponsored communication, an endorsement, a notice, a promotion, a bulletin, a message, and the like.

Figure 18:
FIG. 18 depicts an augmented reality-enabled custom billboard.

FIGS. 18-20A depict ways to deliver custom messages to persons within a short distance of an establishment that wishes to send a message, such as a retail store. Referring to FIG. 18 now, embodiments may provide for a way to view custom billboards, such as when the wearer of the eyepiece is walking or driving, by applications as mentioned above for searching for providers of goods and services. As depicted in FIG. 18, the billboard 1800 shows an exemplary augmented reality-based advertisement displayed by a seller or a service provider. The exemplary advertisement, as depicted, may relate to an offer on drinks by a bar. For example, two drinks may be provided for the cost of just one drink. With such augmented reality-based advertisements and offers, the wearer's attention may be easily directed towards the billboards. The billboards may also provide details about location of the bar such as street address, floor number, phone number, and the like. In accordance with other embodiments, several devices other than eyepiece may be utilized to view the billboards. These devices may include without limitations smartphones, IPHONEs, IPADs, car windshields, user glasses, helmets, wristwatches, headphones, vehicle mounts, and the like. In accordance with an embodiment, a user (wearer in case the augmented reality technology is embedded in the eyepiece) may automatically receive offers or view a scene of the billboards as and when the user passes or drives by the road. In accordance with another embodiment, the user may receive offers or view the scene of the billboards based on his request.

Figure 19:
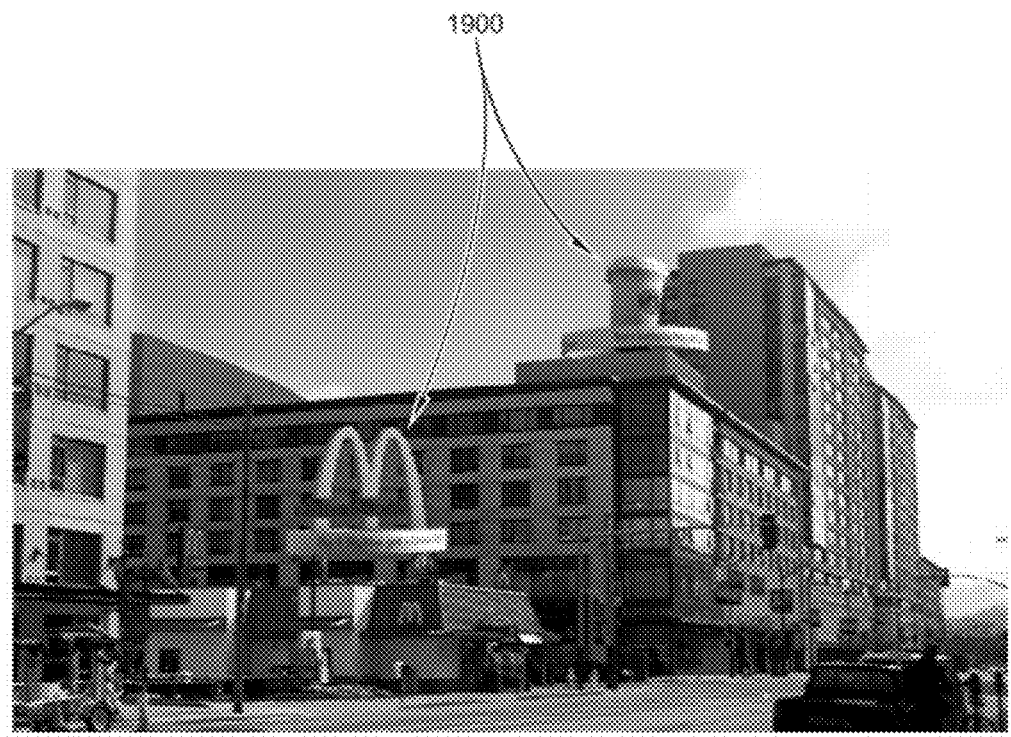
FIG. 19 depicts an augmented reality-enabled custom advertisement.

FIG. 19 illustrates two exemplary roadside billboards 1900 containing offers and advertisements from sellers or service providers that may be viewed in the augmented reality manner. The augmented advertisement may provide a live and near-to-reality perception to the user or the wearer.

Figure 20:
FIG. 20 an augmented reality-enabled custom artwork.
Figure 20A:
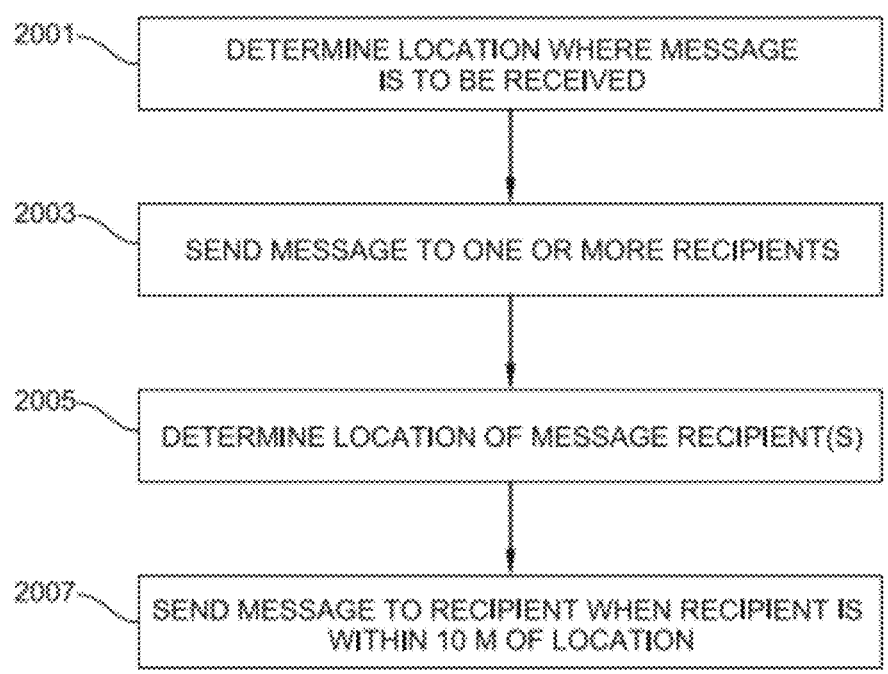
FIG. 20A depicts a method for posting messages to be transmitted when a viewer reaches a certain location.

As illustrated in FIG. 20, the augmented reality enabled device such as the camera lens provided in the eyepiece may be utilized to receive and/or view graffiti 2000, slogans, drawings, and the like, that may be displayed on the roadside or on top, side, front of the buildings and shops. The roadside billboards and the graffiti may have a visual (e.g. a code, a shape) or wireless indicator that may link the advertisement, or advertisement database, to the billboard. When the wearer nears and views the billboard, a projection of the billboard advertisement may then be provided to the wearer. In embodiments, one may also store personal profile information such that the advertisements may better match the needs of the wearer, the wearer may provide preferences for advertisements, the wearer may block at least some of the advertisements, and the like. In embodiments, the eyepiece may have brightness and contrast control over the eyepiece projected area of the billboard so as to improve readability for the advertisement, such as in a bright outside environment.

In other embodiments, users may post information or messages on a particular location, based on its GPS location or other indicator of location, such as a magnetometer reading. The intended viewer is able to see the message when the viewer is within a certain distance of the location, as explained with FIG. 20A. In a first step 2001 of the method FIG. 20A, a user decides the location where the message is to be received by persons to whom the message is sent. The message is then posted 2003, to be sent to the appropriate person or persons when the recipient is close to the intended "viewing area." Location of the wearers of the augmented reality eyepiece is continuously updated 2005 by the GPS system which forms a part of the eyepiece. When the GPS system determines that the wearer is within a certain distance of the desired viewing area, e.g., 10 meters, the message is then sent 2007 to the viewer. In one embodiment, the message then appears as e-mail or a text message to the recipient, or if the recipient is wearing an eyepiece, the message may appear in the eyepiece. Because the message is sent to the person based on the person's location, in one sense, the message may be displayed as "graffiti" on a building or feature at or near the specified location. Specific settings may be used to determine if all passersby to the "viewing area" can see the message or if only a specific person or group of people or devices with specific identifiers.

Embodiments may provide for a way to view information associated with products, such as in a store. Information may include nutritional information for food products, care instructions for clothing products, technical specifications for consumer electronics products, e-coupons, promotions, price comparisons with other like products, price comparisons with other stores, and the like. This information may be projected in relative position with the product, to the periphery of sight to the wearer, in relation to the store layout, and the like. The product may be identified visually through a SKU, a brand tag, and the like; transmitted by the product packaging, such as through an RFID tag on the product; transmitted by the store, such as based on the wearer's position in the store, in relative position to the products; and the like.

For example, a viewer may be walking though a clothing store, and as they walk are provided with information on the clothes on the rack, where the information is provided through the product's RFID tag. In embodiments, the information may be delivered as a list of information, as a graphic representation, as audio and/or video presentation, and the like. In another example, the wearer may be food shopping, and advertisement providing facilities may be providing information to the wearer in association with products in the wearer's proximity, the wearer may be provided information when they pick up the product and view the brand, product name, SKU, and the like. In this way, the wearer may be provided a more informative environment in which to effectively shop.

One embodiment may allow a user to receive or share information about shopping or an urban area through the use of the augmented reality enabled devices such as the camera lens fitted in the eyepiece of exemplary sunglasses. These embodiments will use augmented reality (AR) software applications such as those mentioned above in conjunction with searching for providers of goods and services. In one scenario, the wearer of the eyepiece may walk down a street or a market for shopping purposes. Further, the user may activate various modes that may assist in defining user preferences for a particular scenario or environment. For example the user may enter navigation mode through which the wearer may be guided across the streets and the market for shopping of the preferred accessories and products. The mode may be selected and various directions may be given by the wearer through various methods such as through text commands, voice commands, and the like. In an embodiment, the wearer may give a voice command to select the navigation mode which may result in the augmented display in front of the wearer. The augmented information may depict information pertinent to the location of various shops and vendors in the market, offers in various shops and by various vendors, current happy hours, current date and time and the like. Various sorts of options may also be displayed to the wearer. The wearer may scroll the options and walk down the street guided through the navigation mode. Based on options provided, the wearer may select a place that suits him the best for shopping based on such as offers and discounts and the like.

The wearer may give a voice command to navigate toward the place and the wearer may then be guided toward it. The wearer may also receive advertisements and offers automatically or based on request regarding current deals, promotions and events in the interested location such as a nearby shopping store. The advertisements, deals and offers may appear in proximity of the wearer and options may be displayed for purchasing desired products based on the advertisements, deals and offers. The wearer may for example select a product and purchase it through a Google checkout. A message or an email may appear on the eyepiece, similar to the one depicted in FIG. 7, with information that the transaction for the purchase of the product has been completed. A product delivery status/information may also be displayed. The wearer may further convey or alert friends and relatives regarding the offers and events through social networking platforms and may also ask them to join.

In embodiments, the user may wear the head-mounted eyepiece wherein the eyepiece includes an optical assembly through which the user may view a surrounding environment and displayed content. The displayed content may comprise one or more local advertisements. The location of the eyepiece may be determined by an integrated location sensor and the local advertisement may have a relevance to the location of the eyepiece. By way of example, the user's location may be determined via GPS, RFID, manual input, and the like. Further, the user may be walking by a coffee shop, and based on the user's proximity to the shop, an advertisement, similar to those depicted in FIG. 19, showing the store's brand of coffee may appear in the user's field of view. The user may experience similar types of local advertisements as he or she moves about the surrounding environment.

In other embodiments, the eyepiece may contain a capacitive sensor capable of sensing whether the eyepiece is in contact with human skin. Such sensor or group of sensors may be placed on the eyepiece and or eyepiece arm in such a manner that allows detection of when the glasses are being worn by a user. In other embodiments, sensors may be used to determine whether the eyepiece is in a position such that they may be worn by a user, for example, when the earpiece is in the unfolded position. Furthermore, local advertisements may be sent only when the eyepiece is in contact with human skin, in a wearable position, a combination of the two, actually worn by the user and the like. In other embodiments, the local advertisement may be sent in response to the eyepiece being powered on or in response to the eyepiece being powered on and worn by the user and the like. By way of example, an advertiser may choose to only send local advertisements when a user is in proximity to a particular establishment and when the user is actually wearing the glasses and they are powered on allowing the advertiser to target the advertisement to the user at the appropriate time.

In accordance with other embodiments, the local advertisement may be displayed to the user as a banner advertisement, two-dimensional graphic, text and the like. Further, the local advertisement may be associated with a physical aspect of the user's view of the surrounding environment. The local advertisement may also be displayed as an augmented reality advertisement wherein the advertisement is associated with a physical aspect of the surrounding environment. Such advertisement may be two or three-dimensional. By way of example, a local advertisement may be associated with a physical billboard as described further in FIG. 18 wherein the user's attention may be drawn to displayed content showing a beverage being poured from a billboard 1800 onto an actual building in the surrounding environment. The local advertisement may also contain sound that is displayed to the user through an earpiece, audio device or other means. Further, the local advertisement may be animated in embodiments. For example, the user may view the beverage flow from the billboard onto an adjacent building and, optionally, into the surrounding environment. Similarly, an advertisement may display any other type of motion as desired in the advertisement. Additionally, the local advertisement may be displayed as a three-dimensional object that may be associated with or interact with the surrounding environment. In embodiments where the advertisement is associated with an object in the user's view of the surrounding environment, the advertisement may remain associated with or in proximity to the object even as the user turns his head. For example, if an advertisement, such as the coffee cup as described in FIG. 19, is associated with a particular building, the coffee cup advertisement may remain associated with and in place over the building even as the user turns his head to look at another object in his environment.

In other embodiments, local advertisements may be displayed to the user based on a web search conducted by the user where the advertisement is displayed in the content of the web search results. For example, the user may search for "happy hour" as he is walking down the street, and in the content of the search results, a local advertisement may be displayed advertising a local bar's beer prices.

Further, the content of the local advertisement may be determined based on the user's personal information. The user's information may be made available to a web application, an advertising facility and the like. Further, a web application, advertising facility or the user's eyepiece may filter the advertising based on the user's personal information. Generally, for example, a user may store personal information about his likes and dislikes and such information may be used to direct advertising to the user's eyepiece. By way of specific example, the user may store data about his affinity for a local sports team, and as advertisements are made available, those advertisements with his favorite sports team may be given preference and pushed to the user. Similarly, a user's dislikes may be used to exclude certain advertisements from view. In various embodiments, the advertisements may be cashed on a server where the advertisement may be accessed by at least one of an advertising facility, web application and eyepiece and displayed to the user.

In various embodiments, the user may interact with any type of local advertisement in numerous ways. The user may request additional information related to a local advertisement by making at least one action of an eye movement, body movement and other gesture. For example, if an advertisement is displayed to the user, he may wave his hand over the advertisement in his field of view or move his eyes over the advertisement in order to select the particular advertisement to receive more information relating to such advertisement. Moreover, the user may choose to ignore the advertisement by any movement or control technology described herein such as through an eye movement, body movement, other gesture and the like. Further, the user may chose to ignore the advertisement by allowing it to be ignored by default by not selecting the advertisement for further interaction within a given period of time. For example, if the user chooses not to gesture for more information from the advertisement within five seconds of the advertisement being displayed, the advertisement may be ignored by default and disappear from the users view.

Furthermore, the user may select to not allow local advertisements to be displayed whereby said user selects such an option on a graphical user interface or by turning such feature off via a control on said eyepiece.

In other embodiments, the eyepiece may include an audio device. Accordingly, the displayed content may comprise a local advertisement and audio such that the user is also able to hear a message or other sound effects as they relate to the local advertisement. By way of example, and referring again to FIG. 18, while the user sees the beer being poured, he will actually be able to hear an audio transmission corresponding to the actions in the advertisement. In this case, the user may hear the bottle open and then the sound of the liquid pouring out of the bottle and onto the rooftop. In yet other embodiments, a descriptive message may be played, and or general information may be given as part of the advertisement. In embodiments, any audio may be played as desired for the advertisement.

In accordance with another embodiment, social networking may be facilitated with the use of the augmented reality enabled devices such as a camera lens fitted in the eyepiece. This may be utilized to connect several users or other persons that may not have the augmented reality enabled device together who may share thoughts and ideas with each other. For instance, the wearer of the eyepiece may be sitting in a school campus along with other students. The wearer may connect with and send a message to a first student who may be present in a coffee shop. The wearer may ask the first student regarding persons interested in a particular subject such as environmental economics for example. As other students pass through the field of view of the wearer, the camera lens fitted inside the eyepiece may track and match the students to a networking database such as 'Google me' that may contain public profiles. Profiles of interested and relevant persons from the public database may appear and pop-up in front of the wearer on the eyepiece. Some of the profiles that may not be relevant may either be blocked or appear blocked to the user. The relevant profiles may be highlighted for quick reference of the wearer. The relevant profiles selected by the wearer may be interested in the subject environmental economics and the wearer may also connect with them. Further, they may also be connected with the first student. In this manner, a social network may be established by the wearer with the use of the eyepiece enabled with the feature of the augmented reality. The social networks managed by the wearer and the conversations therein may be saved for future reference.

The present disclosure may be applied in a real estate scenario with the use of the augmented reality enabled devices such as a camera lens fitted in an eyepiece. The wearer, in accordance with this embodiment, may want to get information about a place in which the user may be present at a particular time such as during driving, walking, jogging and the like. The wearer may, for instance, want to understand residential benefits and loss in that place. He may also want to get detailed information about the facilities in that place. Therefore, the wearer may utilize a map such as a Google online map and recognize the real estate that may be available there for lease or purchase. As noted above, the user may receive information about real estate for sale or rent using mobile Internet applications such as Layar. In one such application, information about buildings within the user's field of view is projected onto the inside of the glasses for consideration by the user. Options may be displayed to the wearer on the eyepiece lens for scrolling, such as with a trackpad mounted on a frame of the glasses. The wearer may select and receive information about the selected option. The augmented reality enabled scenes of the selected options may be displayed to the wearer and the wearer may be able to view pictures and take a facility tour in the virtual environment. The wearer may further receive information about real estate agents and fix an appointment with one of those. An email notification or a call notification may also be received on the eyepiece for confirmation of the appointment. If the wearer finds the selected real estate of worth, a deal may be made and that may be purchased by the wearer.

In accordance with another embodiment, customized and sponsored tours and travels may be enhanced through the use of the augmented reality-enabled devices, such as a camera lens fitted in the eyepiece. For instance, the wearer (as a tourist) may arrive in a city such as Paris and wants to receive tourism and sightseeing related information about the place to accordingly plan his visit for the consecutive days during his stay. The wearer may put on his eyepiece or operate any other augmented reality enabled device and give a voice or text command regarding his request. The augmented reality enabled eyepiece may locate wearer position through geo-sensing techniques and decide tourism preferences of the wearer. The eyepiece may receive and display customized information based on the request of the wearer on a screen. The customized tourism information may include information about art galleries and museums, monuments and historical places, shopping complexes, entertainment and nightlife spots, restaurants and bars, most popular tourist destinations and centers/attractions of tourism, most popular local/cultural/regional destinations and attractions, and the like without limitations. Based on user selection of one or more of these categories, the eyepiece may prompt the user with other questions such as time of stay, investment in tourism and the like. The wearer may respond through the voice command and in return receive customized tour information in an order as selected by the wearer. For example the wearer may give a priority to the art galleries over monuments. Accordingly, the information may be made available to the wearer. Further, a map may also appear in front of the wearer with different sets of tour options and with different priority rank such as:

Priority Rank 1: First tour Option (Champs Elyse, Louvre, Rodin, Museum, Famous Café)
Priority Rank 2: Second option
Priority Rank 3: Third Option The wearer, for instance, may select the first option since it is ranked as highest in priority based on wearer indicated preferences. Advertisements related to sponsors may pop up right after selection. Subsequently, a virtual tour may begin in the augmented reality manner that may be very close to the real environment. The wearer may for example take a 30 seconds tour to a vacation special to the Atlantis Resort in the Bahamas. The virtual 3D tour may include a quick look at the rooms, beach, public spaces, parks, facilities, and the like. The wearer may also experience shopping facilities in the area and receive offers and discounts in those places and shops. At the end of the day, the wearer might have experienced a whole day tour sitting in his chamber or hotel. Finally, the wearer may decide and schedule his plan accordingly.

Another embodiment may allow information concerning auto repairs and maintenance services with the use of the augmented reality enabled devices such as a camera lens fitted in the eyepiece. The wearer may receive advertisements related to auto repair shops and dealers by sending a voice command for the request. The request may, for example include a requirement of oil change in the vehicle/car. The eyepiece may receive information from the repair shop and display to the wearer. The eyepiece may pull up a 3D model of the wearer's vehicle and show the amount of oil left in the car through an augmented reality enabled scene/view. The eyepiece may show other relevant information also about the vehicle of the wearer such as maintenance requirements in other parts like brake pads. The wearer may see 3D view of the wearing brake pads and may be interested in getting those repaired or changed. Accordingly, the wearer may schedule an appointment with a vendor to fix the problem via using the integrated wireless communication capability of the eyepiece. The confirmation may be received through an email or an incoming call alert on the eyepiece camera lens.

In accordance with another embodiment, gift shopping may benefit through the use of the augmented reality enabled devices such as a camera lens fitted in the eyepiece. The wearer may post a request for a gift for some occasion through a text or voice command. The eyepiece may prompt the wearer to answer his preferences such as type of gifts, age group of the person to receive the gift, cost range of the gift and the like. Various options may be presented to the user based on the received preferences. For instance, the options presented to the wearer may be: Cookie basket, Wine and cheese basket, Chocolate assortment, Golfer's gift basket, and the like.

The available options may be scrolled by the wearer and the best fit option may be selected via the voice command or text command. For example, the wearer may select the Golfer's gift basket. A 3D view of the Golfer's gift basket along with a golf course may appear in front of the wearer. The virtual 3D view of the Golfer's gift basket and the golf course enabled through the augmented reality may be perceived very close to the real world environment. The wearer may finally respond to the address, location and other similar queries prompted through the eyepiece. A confirmation may then be received through an email or an incoming call alert on the eyepiece camera lens.

Another application that may appeal to users is mobile on-line gaming using the augmented reality glasses. These games may be computer video games, such as those furnished by Electronic Arts Mobile, UbiSoft and Activision Blizzard, e.g., World of Warcraft® (WoW). Just as games and recreational applications are played on computers at home (rather than computers at work), augmented reality glasses may also use gaming applications. The screen may appear on an inside of the glasses so that a user may observe the game and participate in the game. In addition, controls for playing the game may be provided through a virtual game controller, such as a joystick, control module or mouse, described elsewhere herein. The game controller may include sensors or other output type elements attached to the user's hand, such as for feedback from the user through acceleration, vibration, force, electrical impulse, temperature, electric field sensing, and the like. Sensors and actuators may be attached to the user's hand by way of a wrap, ring, pad, glove, bracelet, and the like. As such, an eyepiece virtual mouse may allow the user to translate motions of the hand, wrist, and/or fingers into motions of the cursor on the eyepiece display, where "motions" may include slow movements, rapid motions, jerky motions, position, change in position, and the like, and may allow users to work in three dimensions, without the need for a physical surface, and including some or all of the six degrees of freedom.

Figure 27:
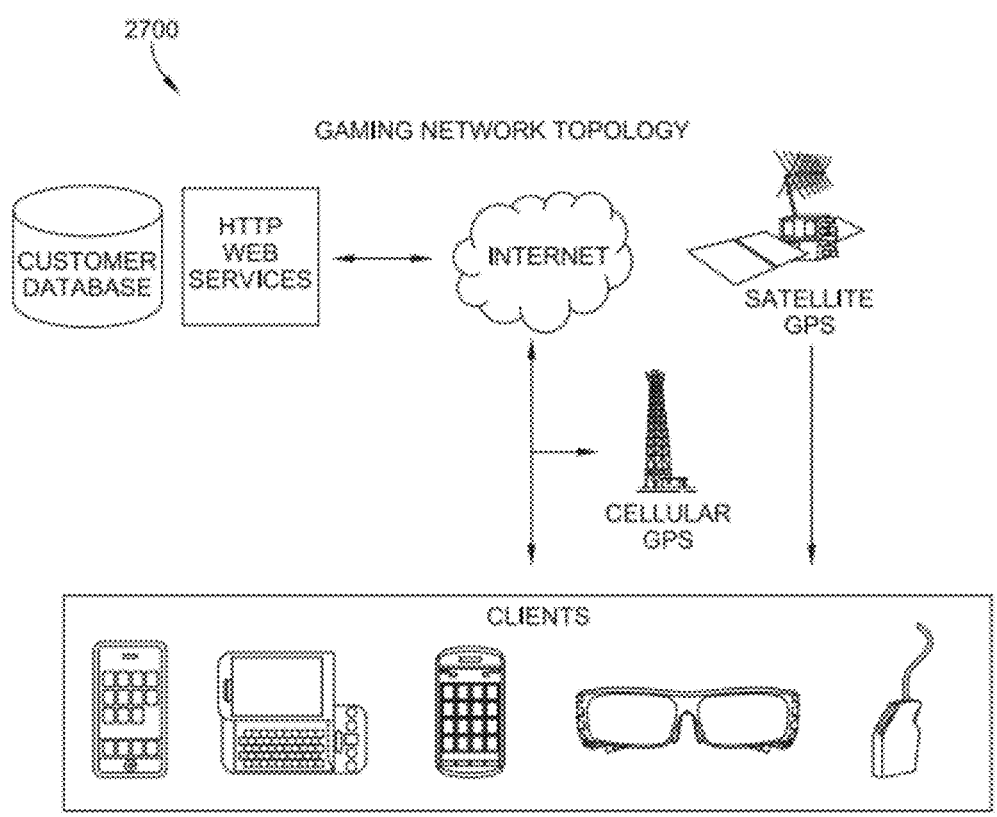
FIG. 27 depicts a gaming network.

As seen in FIG. 27, gaming applications may use both the internet and a GPS. In one embodiment, a game is downloaded from a customer database via a game provider, perhaps using their web services and the internet as shown, to a user computer or augmented reality glasses. At the same time, the glasses, which also have telecommunication capabilities, receive and send telecommunications and telemetry signals via a cellular tower and a satellite. Thus, an on-line gaming system has access to information about the user's location as well as the user's desired gaming activities.

Games may take advantage of this knowledge of the location of each player. For example, the games may build in features that use the player's location, via a GPS locator or magnetometer locator, to award points for reaching the location. The game may also send a message, e.g., display a clue, or a scene or images, when a player reaches a particular location. A message, for example, may be to go to a next destination, which is then provided to the player. Scenes or images may be provided as part of a struggle or an obstacle which must be overcome, or as an opportunity to earn game points. Thus, in one embodiment, augmented reality eyepieces or glasses may use the wearer's location to quicken and enliven computer-based video games.

Figure 28:
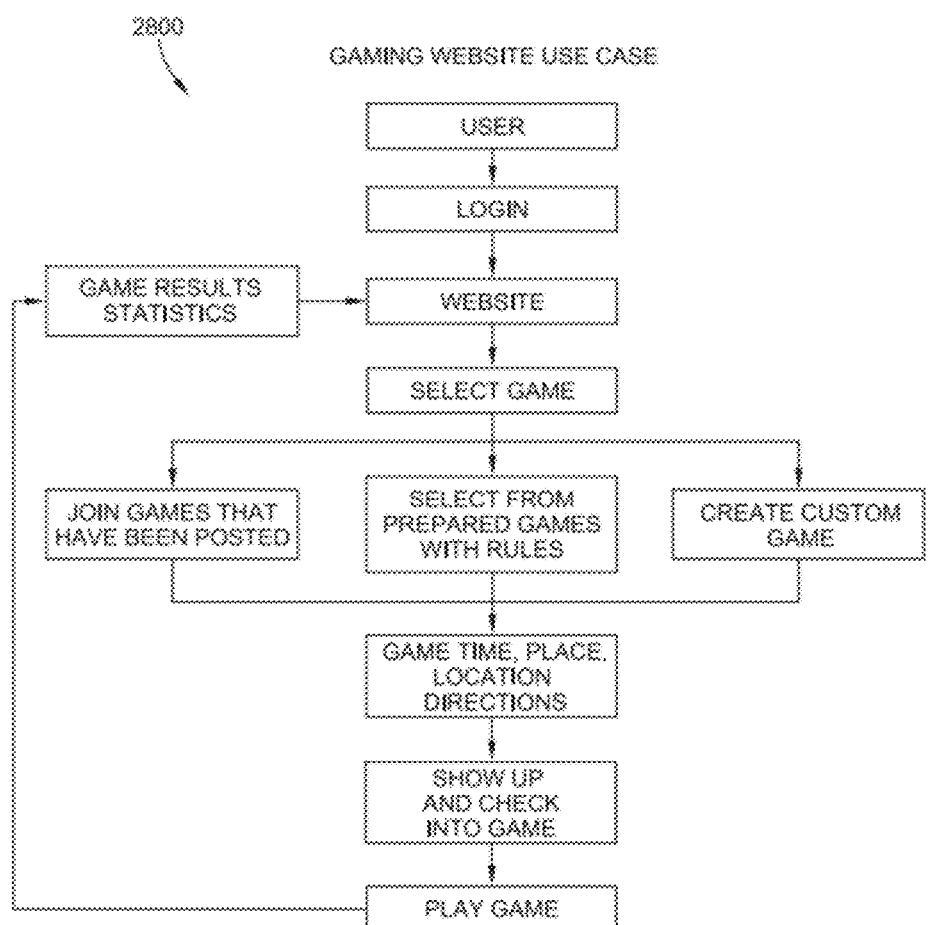
FIG. 28 depicts a method for gaming using augmented reality glasses.

One method of playing augmented reality games is depicted in FIG. 28. In this method, a user logs into a website whereby access to a game is permitted. The game is selected. In one example, the user may join a game, if multiple player games are available and desired; alternatively, the user may create a custom game, perhaps using special roles the user desired. The game may be scheduled, and in some instances, players may select a particular time and place for the game, distribute directions to the site where the game will be played, etc. Later, the players meet and check into the game, with one or more players using the augmented reality glasses. Participants then play the game and if applicable, the game results and any statistics (scores of the players, game times, etc.) may be stored. Once the game has begun, the location may change for different players in the game, sending one player to one location and another player or players to a different location. The game may then have different scenarios for each player or group of players, based on their GPS or magnetometer-provided locations. Each player may also be sent different messages or images based on his or her role, his or her location, or both. Of course, each scenario may then lead to other situations, other interactions, directions to other locations, and so forth. In one sense, such a game mixes the reality of the player's location with the game in which the player is participating.

Games can range from simple games of the type that would be played in a palm of a player's hand, such as small, single player games. Alternatively, more complicated, multiplayer games may also be played. In the former category are games such as SkySiege, AR Drone and Fire Fighter 360. In addition, multiplayer games are also easily envisioned. Since all players must log into the game, a particular game may be played by friends who log in and specify the other person or persons. The location of the players is also available, via GPS or other method. Sensors in the augmented reality glasses or in a game controller as described above, such as accelerometers, gyroscopes or even a magnetic compass, may also be used for orientation and game playing. An example is AR Invaders, available for iPhone applications from the App Store. Other games may be obtained from other vendors and for non-iPhone type systems, such as Layar, of Amsterdam and Paris SA, Paris, France, supplier of AR Drone, AR Flying Ace and AR Pursuit.

In embodiments, games may also be in 3D such that the user can experience 3D gaming. For example, when playing a 3D game, the user may view a virtual, augmented reality or other environment where the user is able to control his view perspective. The user may turn his head to view various aspects of the virtual environment or other environment. As such, when the user turns his head or makes other movements, he may view the game environment as if he were actually in such environment. For example, the perspective of the user may be such that the user is put 'into' a 3D game environment with at least some control over the viewing perspective where the user may be able to move his head and have the view of the game environment change in correspondence to the changed head position. Further, the user may be able to 'walk into' the game when he physically walks forward, and have the perspective change as the user moves. Further, the perspective may also change as the user moves the gazing view of his eyes, and the like. Additional image information may be provided, such as at the sides of the user's view that could be accessed by turning the head.

In embodiments, the 3D game environment may be projected onto the lenses of the glasses or viewed by other means. Further, the lenses may be opaque or transparent. In embodiments, the 3D game image may be associated with and incorporate the external environment of the user such that the user may be able to turn his head and the 3D image and external environment stay together. Further, such 3D gaming image and external environment associations may change such that the 3D image associates with more than one object or more than one part of an object in the external environment at various instances such that it appears to the user that the 3D image is interacting with various aspects or objects of the actual environment. By way of example, the user may view a 3D game monster climb up a building or on to an automobile where such building or automobile is an actual object in the user's environment. In such a game, the user may interact with the monster as part of the 3D gaming experience. The actual environment around the user may be part of the 3D gaming experience. In embodiments where the lenses are transparent, the user may interact in a 3D gaming environment while moving about his or her actual environment. The 3D game may incorporate elements of the user's environment into the game, it may be wholly fabricated by the game, or it may be a mixture of both.

In embodiments, the 3D images may be associated with or generated by an augmented reality program, 3D game software and the like or by other means. In embodiments where augmented reality is employed for the purpose of 3D gaming, a 3D image may appear or be perceived by the user based on the user's location or other data. Such an augmented reality application may provide for the user to interact with such 3D image or images to provide a 3D gaming environment when using the glasses. As the user changes his location, for example, play in the game may advance and various 3D elements of the game may become accessible or inaccessible to the viewer. By way of example, various 3D enemies of the user's game character may appear in the game based on the actual location of the user. The user may interact with or cause reactions from other users playing the game and or 3D elements associated with the other users playing the game. Such elements associated with users may include weapons, messages, currency, a 3D image of the user and the like. Based on a user's location or other data, he or she may encounter, view, or engage, by any means, other users and 3D elements associated with other users. In embodiments, 3D gaming may also be provided by software installed in or downloaded to the glasses where the user's location is or is not used.

In embodiments, the lenses may be opaque to provide the user with a virtual reality or other virtual 3D gaming experience where the user is 'put into' the game where the user's movements may change the viewing perspective of the 3D gaming environment for the user. The user may move through or explore the virtual environment through various body, head, and or eye movements, use of game controllers, one or more touch screens, or any of the control techniques described herein which may allow the user to navigate, manipulate, and interact with the 3D environment, and thereby play the 3D game.

In various embodiments, the user may navigate, interact with and manipulate the 3D game environment and experience 3D gaming via body, hand, finger, eye, or other movements, through the use of one or more wired or wireless controllers, one or more touch screens, any of the control techniques described herein, and the like.

In embodiments, internal and external facilities available to the eyepiece may provide for learning the behavior of a user of the eyepiece, and storing that learned behavior in a behavioral database to enable location-aware control, activity-aware control, predictive control, and the like. For example, a user may have events and/or tracking of actions recorded by the eyepiece, such as commands from the user, images sensed through a camera, GPS location of the user, sensor inputs over time, triggered actions by the user, communications to and from the user, user requests, web activity, music listened to, directions requested, recommendations used or provided, and the like. This behavioral data may be stored in a behavioral database, such as tagged with a user identifier or autonomously. The eyepiece may collect this data in a learn mode, collection mode, and the like. The eyepiece may utilize past data taken by the user to inform or remind the user of what they did before, or alternatively, the eyepiece may utilize the data to predict what eyepiece functions and applications the user may need based on past collected experiences. In this way, the eyepiece may act as an automated assistant to the user, for example, launching applications at the usual time the user launches them, turning off augmented reality and the GPS when nearing a location or entering a building, streaming in music when the user enters the gym, and the like. Alternately, the learned behavior and/or actions of a plurality of eyepiece users may be autonomously stored in a collective behavior database, where learned behaviors amongst the plurality of users are available to individual users based on similar conditions. For example, a user may be visiting a city, and waiting for a train on a platform, and the eyepiece of the user accesses the collective behavior database to determine what other users have done while waiting for the train, such as getting directions, searching for points of interest, listening to certain music, looking up the train schedule, contacting the city website for travel information, connecting to social networking sites for entertainment in the area, and the like. In this way, the eyepiece may be able to provide the user with an automated assistant with the benefit of many different user experiences. In embodiments, the learned behavior may be used to develop preference profiles, recommendations, advertisement targeting, social network contacts, behavior profiles for the user or groups of users, and the like, for/to the user.

In an embodiment, the augmented reality eyepiece or glasses may include one or more acoustic sensors for detecting sound. An example is depicted above in FIG. 29. In one sense, acoustic sensors are similar to microphones, in that they detect sounds. Acoustic sensors typically have one or more frequency bandwidths at which they are more sensitive, and the sensors can thus be chosen for the intended application. Acoustic sensors are available from a variety of manufacturers and are available with appropriate transducers and other required circuitry. Manufacturers include ITT Electronic Systems, Salt Lake City, Utah, USA; Meggitt Sensing Systems, San Juan Capistrano, Calif., USA; and National Instruments, Austin, Tex., USA. Suitable microphones include those which comprise a single microphone as well as those which comprise an array of microphones, or a microphone array.

Acoustic sensors may include those using micro electromechanical systems (MEMS) technology. Because of the very fine structure in a MEMS sensor, the sensor is extremely sensitive and typically has a wide range of sensitivity. MEMS sensors are typically made using semiconductor manufacturing techniques. An element of a typical MEMS accelerometer is a moving beam structure composed of two sets of fingers. One set is fixed to a solid ground plane on a substrate; the other set is attached to a known mass mounted on springs that can move in response to an applied acceleration. This applied acceleration changes the capacitance between the fixed and moving beam fingers. The result is a very sensitive sensor. Such sensors are made, for example, by STMicroelectronics, Austin, Tex. and Honeywell International, Morristown N.J., USA.

In addition to identification, sound capabilities of the augmented reality devices may also be applied to locating an origin of a sound. As is well known, at least two sound or acoustic sensors are needed to locate a sound. The acoustic sensor will be equipped with appropriate transducers and signal processing circuits, such as a digital signal processor, for interpreting the signal and accomplishing a desired goal. One application for sound locating sensors may be to determine the origin of sounds from within an emergency location, such as a burning building, an automobile accident, and the like. Emergency workers equipped with embodiments described herein may each have one or more than one acoustic sensors or microphones embedded within the frame. Of course, the sensors could also be worn on the person's clothing or even attached to the person. In any event, the signals are transmitted to the controller of the augmented reality eyepiece. The eyepiece or glasses are equipped with GPS technology and may also be equipped with direction-finding capabilities; alternatively, with two sensors per person, the microcontroller can determine a direction from which the noise originated.

If there are two or more firefighters, or other emergency responders, their location is known from their GPS capabilities. Either of the two, or a fire chief, or the control headquarters, then knows the position of two responders and the direction from each responder to the detected noise. The exact point of origin of the noise can then be determined using known techniques and algorithms. See e.g., *Acoustic Vector-Sensor Beamforming and Capon Direction Estimation*, M. Hawkes and A. Nehorai, IEEE Transactions on Signal Processing, vol. 46, no. 9, September 1998, at 2291-2304; see also *Crámer-Rao Bounds for Direction Finding by an Acoustic Vector Sensor Under Nonideal Gain-Phase Responses, Noncollocation or Nonorthogonal Orientation*, P. K. Tam and K. T. Wong, IEEE Sensors Journal, vol. 9. No. 8, August 2009, at 969-982. The techniques used may include timing differences (differences in time of arrival of the parameter sensed), acoustic velocity differences, and sound pressure differences. Of course, acoustic sensors typically measure levels of sound pressure (e.g., in decibels), and these other parameters may be used in appropriate types of acoustic sensors, including acoustic emission sensors and ultrasonic sensors or transducers.

The appropriate algorithms and all other necessary programming may be stored in the microcontroller of the eyepiece, or in memory accessible to the eyepiece. Using more than one responder, or several responders, a likely location may then be determined, and the responders can attempt to locate the person to be rescued. In other applications, responders may use these acoustic capabilities to determine the location of a person of interest to law enforcement. In still other applications, a number of people on maneuvers may encounter hostile fire, including direct fire (line of sight) or indirect fire (out of line of sight, including high angle fire). The same techniques described here may be used to estimate a location of the hostile fire. If there are several persons in the area, the estimation may be more accurate, especially if the persons are separated at least to some extent, over a wider area. This may be an effective tool to direct counter-battery or counter-mortar fire against hostiles. Direct fire may also be used if the target is sufficiently close.

In addition to microphones, the augmented reality eyepiece may be equipped with ear buds, which may be articulating ear buds, as mentioned elsewhere herein, and may be removably attached 1403, or may be equipped with an audio output jack 1401. The eyepiece and ear buds may be equipped to deliver noise-cancelling interference, allowing the user to better hear sounds delivered from the audio-video communications capabilities of the augmented reality eyepiece or glasses, and may feature automatic gain control. The speakers or ear buds of the augmented reality eyepiece may also connect with the full audio and visual capabilities of the device, with the ability to deliver high quality and clear sound from the included telecommunications device. As noted elsewhere herein, this includes radio or cellular telephone (smart phone) audio capabilities, and may also include complementary technologies, such as Bluetooth™ capabilities or related technologies, such as IEEE 802.11, for wireless personal area networks (WPAN).

Another aspect of the augmented audio capabilities includes speech recognition and identification capabilities. Speech recognition concerns understanding what is said while speech identification concerns understanding who the speaker is. Speech identification may work hand in hand with the facial recognition capabilities of these devices to more positively identify persons of interest. As described elsewhere in this document, a camera connected as part of the augmented reality eyepiece can unobtrusively focus on desired personnel, such as a single person in a crowd. Using the camera and appropriate facial recognition software, an image of the person may be taken. The features of the image are then broken down into any number of measurements and statistics, and the results are compared to a database of known persons. An identity may then be made. In the same manner, a voice or voice sampling from the person of interest may be taken. The sample may be marked or tagged, e.g., at a particular time interval, and labeled, e.g., a description of the person's physical characteristics or a number. The voice sample may be compared to a database of known persons, and if the person's voice matches, then an identification may be made.

In one embodiment, important characteristics of a particular person's speech may be understood from a sample or from many samples of the person's voice. The samples are typically broken into segments, frames and subframes. Typically, important characteristics include a fundamental frequency of the person's voice, energy, formants, speaking rate, and the like. These characteristics are analyzed by software which analyses the voice according to certain formulae or algorithms. This field is constantly changing and improving. However, currently such classifiers may include algorithms such as neural network classifiers, k-classifiers, hidden Markov models, Gaussian mixture models and pattern matching algorithms, among others.

Figure 31:
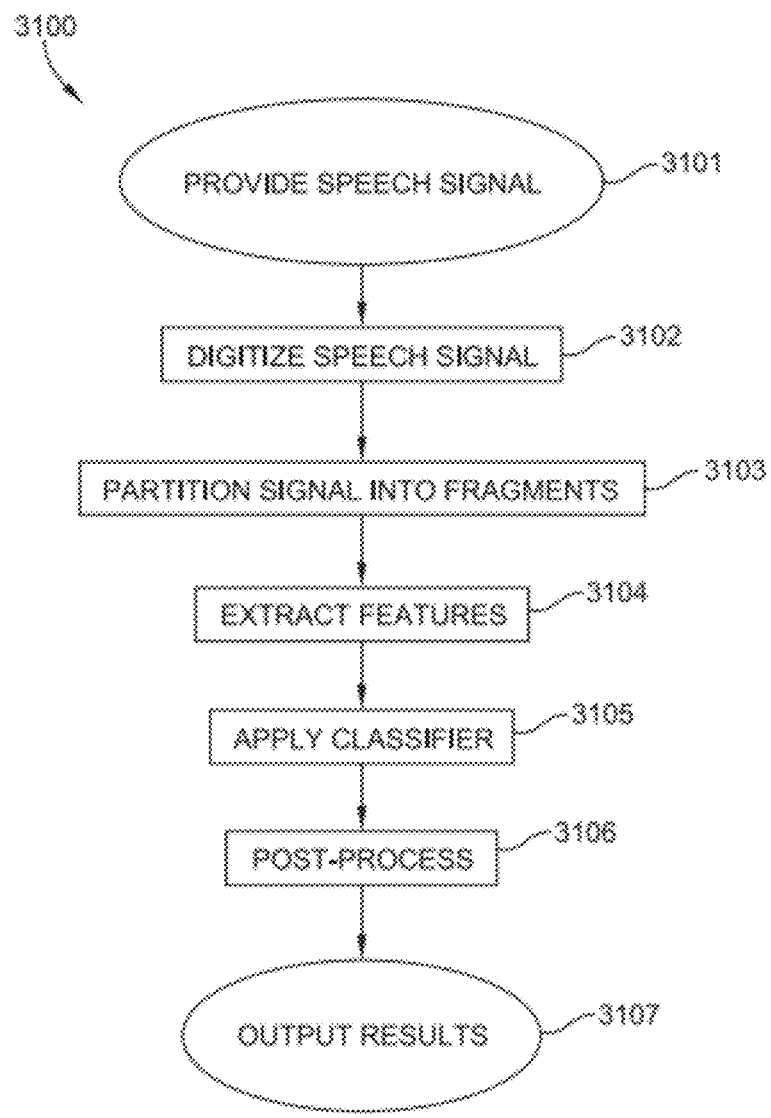
FIG. 31 depicts a flowchart for a method of identifying a person based on speech of the person as captured by microphones of the augmented reality device.

A general template 3100 for speech recognition and speaker identification is depicted in FIG. 31. A first step 3101 is to provide a speech signal. Ideally, one has a known sample from prior encounters with which to compare the signal. The signal is then digitized in step 3102 and is partitioned in step 3103 into fragments, such as segments, frames and subframes. Features and statistics of the speech sample are then generated and extracted in step 3104. The classifier, or more than one classifier, is then applied in step 3105 to determine general classifications of the sample. Post-processing of the sample may then be applied in step 3106, e.g., to compare the sample to known samples for possible matching and identification. The results may then be output in step 3107. The output may be directed to the person requesting the matching, and may also be recorded and sent to other persons and to one or more databases.

In an embodiment, the audio capabilities of the eyepiece include hearing protection with the associated earbuds. The audio processor of the eyepiece may enable automatic noise suppression, such as if a loud noise is detected near the wearer's head. Any of the control technologies described herein may be used with automatic noise suppression.

In an embodiment, the eyepiece may include a nitinol head strap. The head strap may be a thin band of curved metal which may either pull out from the arms of the eyepiece or rotate out and extend out to behind the head to secure the eyepiece to the head. In one embodiment, the tip of the nitinol strap may have a silicone cover such that the silicone cover is grasped to pull out from the ends of the arms. In embodiments, only one arm has a nitinol band, and it gets secured to the other arm to form a strap. In other embodiments, both arms have a nitinol band and both sides get pulled out to either get joined to form a strap or independently grasp a portion of the head to secure the eyepiece on the wearer's head.

Referring to FIG. 21, the eyepiece may include one or more adjustable wrap around extendable arms 2134. The adjustable wrap around extendable arms 2134 may secure the position of the eyepiece to the user's head. One or more of the extendable arms 2134 may be made out of a shape memory material. In embodiments, one or both of the arms may be made of nitinol and/or any shape-memory material. In other instances, the end of at least one of the wrap around extendable arms 2134 may be covered with silicone. Further, the adjustable wrap around extendable arms 2134 may extend from the end of an eyepiece arm 2116. They may extend telescopically and/or they may slide out from an end of the eyepiece arms. They may slide out from the interior of the eyepiece arms 2116 or they may slide along an exterior surface of the eyepiece arms 2116. Further, the extendable arms 2134 may meet and secure to each other. The extendable arms may also attach to another portion of the head mounted eyepiece to create a means for securing the eyepiece to the user's head. The wrap around extendable arms 2134 may meet to secure to each other, interlock, connect, magnetically couple, or secure by other means so as to provide a secure attachment to the user's head. In embodiments, the adjustable wrap around extendable arms 2134 may also be independently adjusted to attach to or grasp portions of the user's head. As such the independently adjustable arms may allow the user increased customizability for a personalized fit to secure the eyepiece to the user's head. Further, in embodiments, at least one of the wrap around extendable arms 2134 may be detachable from the head mounted eyepiece. In yet other embodiments, the wrap around extendable arms 2134 may be an add-on feature of the head mounted eyepiece. In such instances, the user may chose to put extendable, non-extendable or other arms on to the head mounted eyepiece. For example, the arms may be sold as a kit or part of a kit that allows the user to customize the eyepiece to his or her specific preferences. Accordingly, the user may customize that type of material from which the adjustable wrap around extendable arm 2134 is made by selecting a different kit with specific extendable arms suited to his preferences. Accordingly, the user may customize his eyepiece for his particular needs and preferences.

In yet other embodiments, an adjustable strap, 2142, may be attached to the eyepiece arms such that it extends around the back of the user's head in order to secure the eyepiece in place. The strap may be adjusted to a proper fit. It may be made out of any suitable material, including but not limited to rubber, silicone, plastic, cotton and the like.

In an embodiment, the eyepiece may include security features, such as M-Shield Security, Secure content, DSM, Secure Runtime, IPSec, and the like. Other software features may include: User Interface, Apps, Framework, BSP, Codecs, Integration, Testing, System Validation, and the like.

In an embodiment, the eyepiece materials may be chosen to enable ruggedization.

In an embodiment, the eyepiece may be able to access a 3G access point that includes a 3G radio, an 802.11b connection and a Bluetooth connection to enable hopping data from a device to a 3G-enable embodiment of the eyepiece.

Figure 39:
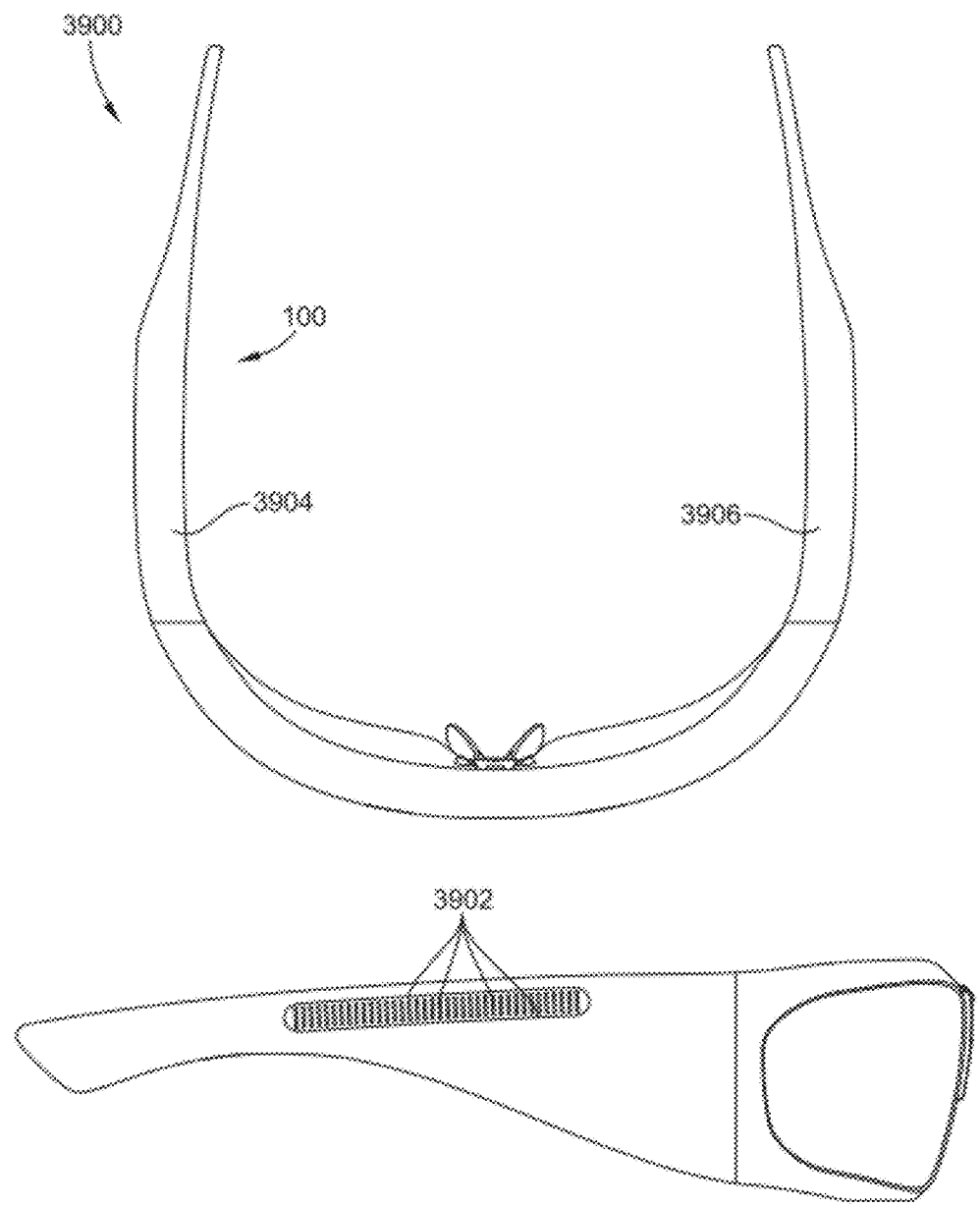
FIG. 39 illustrates glasses for biometric data capture according to an embodiment.

A further embodiment of the eyepiece may be used to provide biometric data collection and result reporting. Biometric data may be visual biometric data, such as facial biometric data or iris biometric data, or may be audio biometric data. FIG. 39 depicts an embodiment providing biometric data capture. The assembly, 3900 incorporates the eyepiece 100, discussed above in connection with FIG. 1. Eyepiece 100 provides an interactive head-mounted eyepiece that includes an optical assembly. Other eyepieces providing similar functionality may also be used. Eyepieces may also incorporate global positioning system capability to permit location information display and reporting.

The optical assembly allows a user to view the surrounding environment, including individuals in the vicinity of the wearer. An embodiment of the eyepiece allows a user to biometrically identify nearby individuals using facial images and iris images or both facial and iris images or audio samples. The eyepiece incorporates a corrective element that corrects a user's view of the surrounding environment and also displays content provided to the user through in integrated processor and image source. The integrated image source introduces the content to be displayed to the user to the optical assembly.

The eyepiece also includes an optical sensor for capturing biometric data. The integrated optical sensor, in an embodiment may incorporate a camera mounted on the eyepiece. This camera is used to capture biometric images of an individual near the user of the eyepiece. The user directs the optical sensor or the camera toward a nearby individual by positioning the eyepiece in the appropriate direction, which may be done just by looking at the individual. The user may select whether to capture one or more of a facial image, an iris image, or an audio sample.

The biometric data that may be captured by the eyepiece illustrated in FIG. 39 includes facial images for facial recognition, iris images for iris recognition, and audio samples for voice identification. The eyepiece 100 incorporates multiple microphones 3902 in an endfire array disposed along both the right and left temples of the eyepiece 100. The microphone arrays 3902 are specifically tuned to enable capture of human voices in an environment with a high level of ambient noise. Microphones 3902 provide selectable options for improved audio capture, including omni-directional operation, or directional beam operation. Directional beam operation allows a user to record audio samples from a specific individual by steering the microphone array in the direction of the subject individual.

Audio biometric capture is enhanced by incorporating phased array audio and video tracking for audio and video capture. Audio tracking allows for continuing to capture an audio sample when the target individual is moving in an environment with other noise sources.

To provide power for the display optics and biometric data collection the eyepiece 100 also incorporates a lithium-ion battery 3904, that is capable of operating for over twelve hours on a single charge. In addition, the eyepiece 100 also incorporates a processor and solid-state memory 3906 for processing the captured biometric data. The processor and memory are configurable to function with any software or algorithm used as part of a biometric capture protocol or format, such as the .wav format.

A further embodiment of the eyepiece assembly 3900 provides an integrated communications facility that transmits the captured biometric data to a remote facility that stores the biometric data in a biometric data database. The biometric data database interprets the captured biometric data, interprets the data, and prepares content for display on the eyepiece.

In operation, a wearer of the eyepiece desiring to capture biometric data from a nearby observed individual positions himself or herself so that the individual appears in the field of view of the eyepiece. Once in position the user initiates capture of biometric information. Biometric information that may be captured includes iris images, facial images, and audio data.

In operation, a wearer of the eyepiece desiring to capture audio biometric data from a nearby observed individual positions himself or herself so that the individual appears is near the eyepiece, specifically, near the microphone arrays located in the eyepiece temples. Once in position the user initiates capture of audio biometric information. This audio biometric information consists of a recorded sample of the target individual speaking. Audio samples may be captured in conjunction with visual biometric data, such as iris and facial images.

To capture an iris image, the wearer/user observes the desired individual and positions the eyepiece such that the optical sensor assembly or camera may collect an image of the biometric parameters of the desired individual. Once captured the eyepiece processor and solid-state memory prepare the captured image for transmission to the remote computing facility for further processing.

The remote computing facility receives the transmitted biometric image and compares the transmitted image to previously captured images of the same type. Iris or facial images are compared with previously collected iris or facial images to determine if the individual has been previously encountered and identified.

Once the comparison has been made, the remote computing facility transmits a report of the comparison to the wearer/user's eyepiece, for display. The report may indicate that the captured biometric image matches previously captured images. In such cases, the user receives a report including the identity of the individual, along with other identifying information or statistics. Not all captured biometric data allows for an unambiguous determination of identity. In such cases, the remote computing facility provides a report of findings and may request the user to collect additional biometric data, possibly of a different type, to aid in the identification and comparison process. Visual biometric data may be supplemented with audio biometric data as a further aid to identification.

Facial images are captured in a similar manner as iris images. The field of view is necessarily larger, due to the size of the images collected. This also permits to user to stand further off from the subject whose facial biometric data is being captured.

In operation the user may have originally captured a facial image of the individual. However, the facial image may be incomplete or inconclusive because the individual may be wearing clothing or other apparel, such as a hat, that obscures facial features. In such a case, the remote computing facility may request that a different type of biometric capture be used and additional images or data be transmitted. In the case described above, the user may be directed to obtain an iris image to supplement the captured facial image. In other instances, the additional requested data may be an audio sample of the individual's voice.

Figure 40:
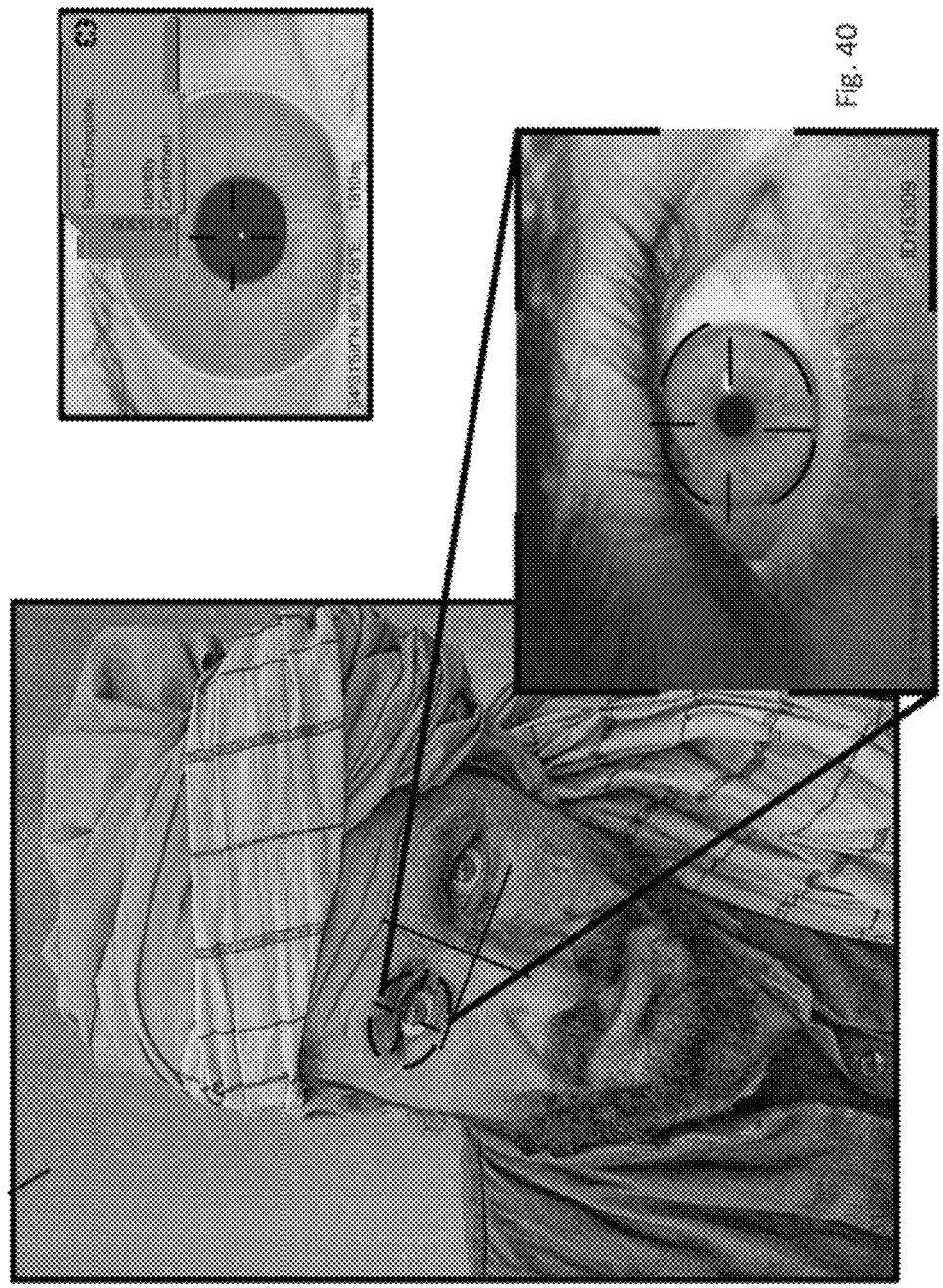
FIG. 40 illustrates iris recognition using the biometric data capture glasses according to an embodiment.

FIG. 40 illustrates capturing an iris image for iris recognition. The figure illustrates the focus parameters used to analyze the image and includes a geographical location of the individual at the time of biometric data capture. FIG. 40 also depicts a sample report that is displayed on the eyepiece.

Figure 41:
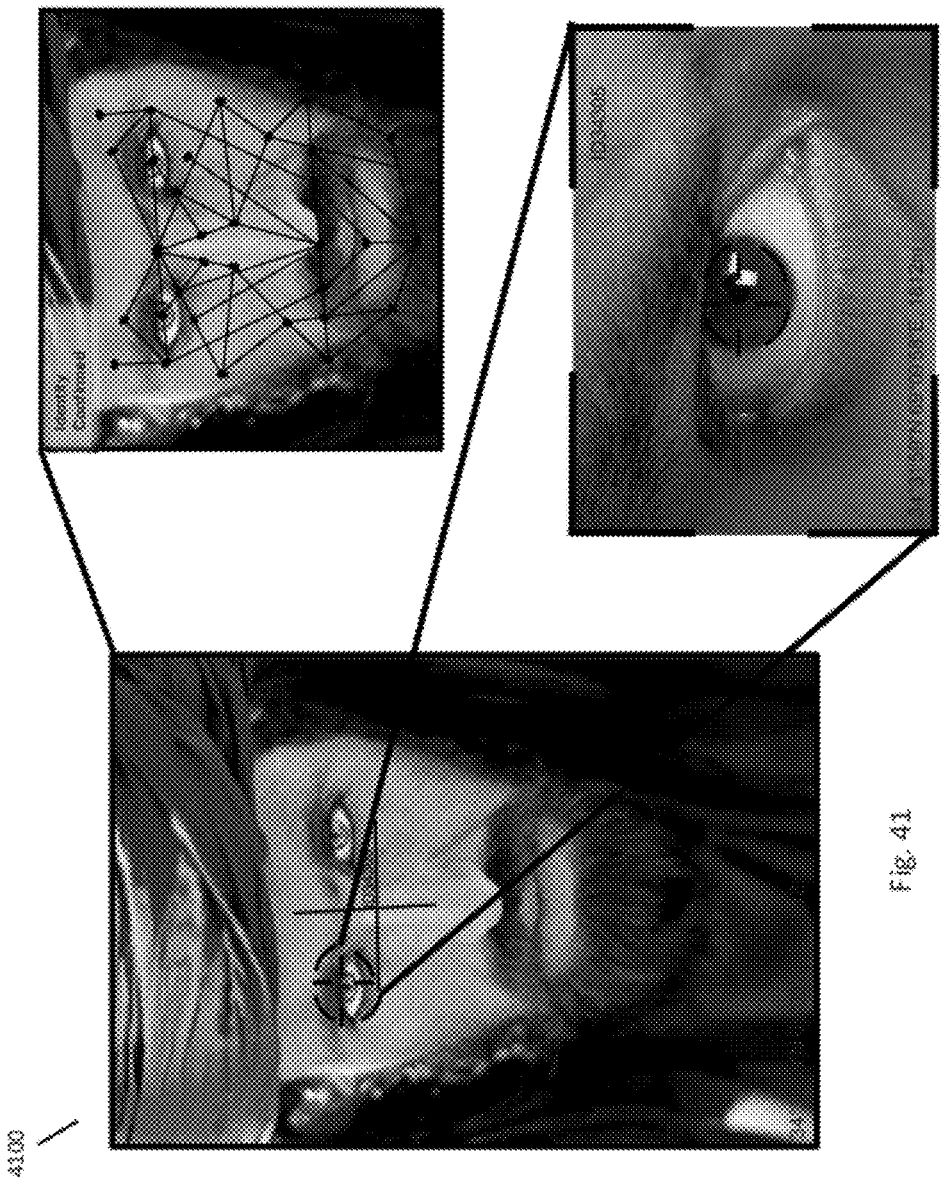
FIG. 41 depicts face and iris recognition according to an embodiment.

FIG. 41 illustrates capture of multiple types of biometric data, in this instance, facial and iris images. The capture may be done at the same time, or by request of the remote computing facility if a first type of biometric data leads to an inconclusive result.

Figure 42:
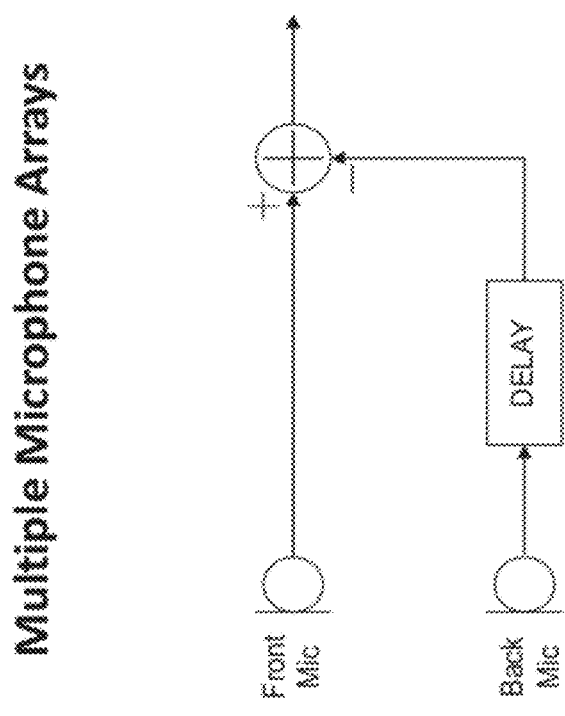
FIG. 42 illustrates use of dual omni-microphones according to an embodiment.
Figure 43:
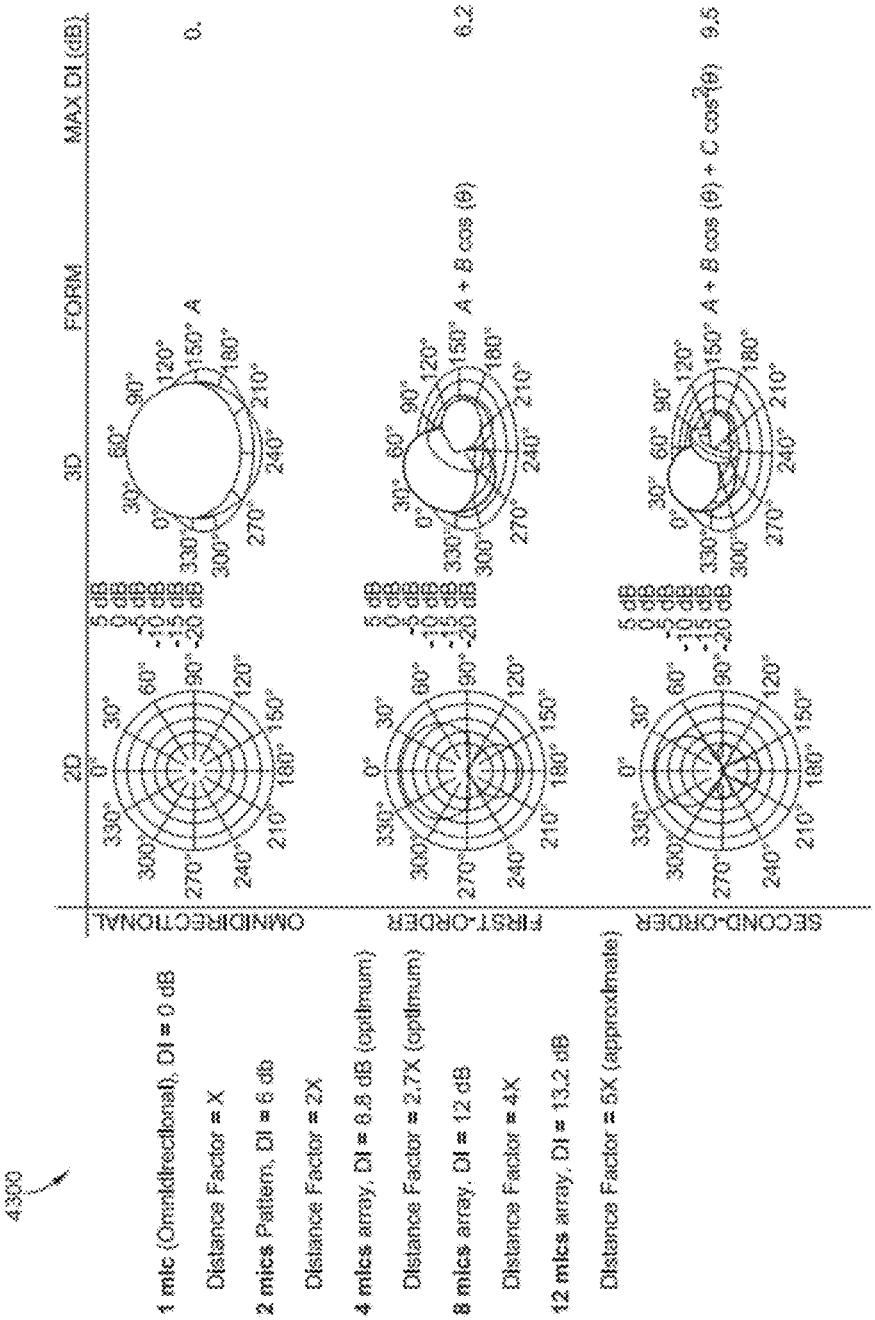
FIG. 43 depicts the directionality improvements with multiple microphones.

FIG. 42 shows the electrical configuration of the multiple microphone arrays contained in the temples of the eyepiece of FIG. 39. The endfire microphone arrays allow for greater discrimination of signals and better directionality at a greater distance. Signal processing is improved by incorporating a delay into the transmission line of the back microphone. The use of dual omni-directional microphones enables switching from an omni-directional microphone to a directional microphone. This allows for better direction finding for audio capture of a desired individual. FIG. 43 illustrates the directionality improvements available with multiple microphones.

The multiple microphones may be arranged in a composite microphone array. Instead of using one standard high quality microphone to capture an audio sample, the eyepiece temple pieces house multiple microphones of different character. One example of multiple microphone use uses microphones from cut off cell phones to reproduce the exact electrical and acoustic properties of the individual's voice. This sample is stored for future comparison in a database. If the individual's voice is later captured, the earlier sample is available for comparison, and will be reported to the eyepiece user, as the acoustic properties of the two samples will match.

Figure 44:
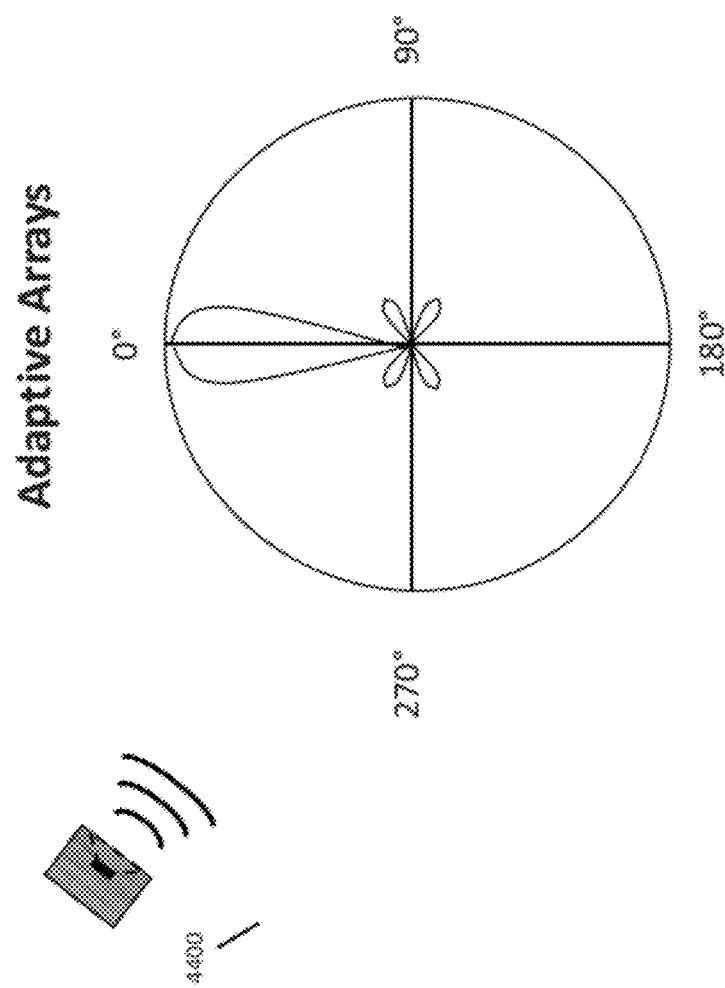
FIG. 44 shows the use of adaptive arrays to steer the audio capture facility according to an embodiment.

FIG. 44 shows the use of adaptive arrays to improve audio data capture. By modifying pre-existing algorithms for audio processing adaptive arrays can be created that allow the user to steer the directionality of the antenna in three dimensions. Adaptive array processing permits location of the source of the speech, thus tying the captured audio data to a specific individual. Array processing permits simple summing of the cardioid elements of the signal to be done either digitally or using analog techniques. In normal use, a user should switch the microphone between the omni-directional pattern and the directional array. The processor allows for beamforming, array steering and adaptive array processing, to be performed on the eyepiece.

In an embodiment, the integrated camera may continuously record a video file, and the integrated microphone may continuously record an audio file. The integrated processor of the eyepiece may enable event tagging in long sections of the continuous audio or video recording. For example, a full day of passive recording may be tagged whenever an event, conversation, encounter, or other item of interest takes place. Tagging may be accomplished through the explicit press of a button, a noise or physical tap, a hand gesture, or any other control technique described herein. A marker may be placed in the audio or video file or stored in a metadata header. In embodiments, the marker may include the GPS coordinate of the event, conversation, encounter, or other item of interest. In other embodiments, the marker may be time-synced with a GPS log of the day. Other logic based triggers can also tag the audio or video file such as proximity relationships to other users, devices, locations, or the like.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers, processor-embedded eyewear and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. An interactive head-mounted display device, comprising:
    an optical assembly through which at least a portion of a surrounding environment and displayed content are viewable;
    an integrated processor for handling content for display;
    an integrated image source for introducing the content to the optical assembly;
    a temple arm extending from the optical assembly to an end, the temple arm forming an interior cavity that extends from the end along a length of the temple arm and configured to receive an adjustable extension; and
    an adjustable extension slideably connected through the mouth at the end of the temple arm into the interior cavity toward the optical assembly, the adjustable extension slideable within the interior cavity of the temple arm to selectively change a collective length of the temple arm and the adjustable extension by an amount that is inversely proportional to a corresponding change in an overlap length of the temple arm and the adjustable extension.

2. The interactive head-mounted display device of claim 1, wherein the adjustable extension is at least partially covered with silicone.

3. The interactive head-mounted display device of claim 1, wherein the temple arm is a first temple arm, wherein the adjustable extension is a first adjustable extension, wherein the interactive head-mounted display device further comprises a second temple arm supporting the optical assembly and a second adjustable extension slideably connected to the second temple arm, and wherein the first and second adjustable extensions are configured to meet and secure to each other.

4. The interactive head-mounted display device of claim 1, wherein the temple arm is a first temple arm, wherein the adjustable extension is a first adjustable extension, wherein the interactive head-mounted display device further comprises a second temple arm supporting the optical assembly and a second adjustable extension slideably connected to the second temple arm, and wherein each of the first and second adjustable extensions independently grasp a different portion of the head.

5. The interactive head-mounted display device of claim 1, wherein the adjustable extension is detachable from the temple arm.

6. The interactive head-mounted display device of claim 1, wherein the adjustable extension is an add-on feature of the interactive head-mounted display device.

7. The interactive head-mounted display device of claim 1, wherein the adjustable extension comprises a shape memory material.

8. The interactive head-mounted display device of claim 1, wherein the adjustable extension is telescopically connected to the temple arm.

9. The interactive head-mounted display device of claim 1, wherein the adjustable extension is slideably connected to an exterior of the temple arm.

10. The interactive head-mounted display device of claim 1, wherein the adjustable extension is slideably connected to an interior of the temple arm.

11. The interactive head-mounted display device of claim 1, wherein the adjustable extension is removably connected to the temple arm, and wherein the temple arm is configured to interchangeably connect with a plurality of differently configured adjustable extensions.

12. The interactive head-mounted display device of claim 3, wherein the first and second adjustable extensions secure to each other via a magnetic coupling.

\* \* \* \* \*